(12) United States Patent
Binder

(10) Patent No.: US 11,876,785 B2
(45) Date of Patent: *Jan. 16, 2024

(54) SYSTEM AND METHOD FOR ROUTING-BASED INTERNET SECURITY

(71) Applicant: May Patents Ltd., Hod Hasharon (IL)

(72) Inventor: Yehuda Binder, Ramat Gan (IL)

(73) Assignee: May Patents Ltd., Hod-Hasharon (IL)

( * ) Notice: Subject to any disclaimer, the term of this patent is extended or adjusted under 35 U.S.C. 154(b) by 35 days.

This patent is subject to a terminal disclaimer.

(21) Appl. No.: 17/685,410

(22) Filed: Mar. 3, 2022

(65) Prior Publication Data

US 2022/0191176 A1 Jun. 16, 2022

Related U.S. Application Data

(60) Continuation of application No. 16/807,757, filed on Mar. 3, 2020, now Pat. No. 11,303,612, which is a
(Continued)

(30) Foreign Application Priority Data

Dec. 22, 2010 (IL) .......................................... 210169

(51) Int. Cl.
*H04L 9/40* (2022.01)
*H04L 67/63* (2022.01)
(Continued)

(52) U.S. Cl.
CPC ............ *H04L 63/0281* (2013.01); *G06F 7/58* (2013.01); *G06F 21/602* (2013.01); *G06F 21/78* (2013.01);
(Continued)

(58) Field of Classification Search
CPC ... H04L 63/0281; H04L 51/046; H04L 63/18; H04L 67/63; H04L 63/0428; G06F 7/58;
(Continued)

(56) References Cited

U.S. PATENT DOCUMENTS 3,922,494 A 11/1975 Cooper et al.
3,962,539 A 6/1976 Ehrsam et al.
(Continued)

FOREIGN PATENT DOCUMENTS

EP 0948176 10/1999
EP 1850554 A2 10/2007
(Continued)

OTHER PUBLICATIONS

R. Fielding et al, RFC 2616: Hypertext Transfer Protocol—HTTP/1.1, Jun. 1999, retrieved from the Internet http://rcf-editor.org [retrieved Apr. 15, 2002] (114 pages).
(Continued)

*Primary Examiner* — Abu S Sholeman
(74) *Attorney, Agent, or Firm* — May Patents Ltd. c/o Dorit Shem-Tov

(57) ABSTRACT

Method and system for improving the security of storing digital data in a memory or its delivery as a message over the Internet from a sender to a receiver using one or more hops is disclosed. The message is split at the sender into multiple overlapping or non-overlapping slices according to a slicing scheme, and the slices are encapsulated in packets each destined to a different relay server as an intermediate node according to a delivery scheme. The relay servers relay the received slices to another other relay server or to the receiver. Upon receiving all the packets containing all the slices, the receiver combines the slices reversing the slicing scheme, whereby reconstructing the message sent.

51 Claims, 73 Drawing Sheets

Related U.S. Application Data continuation of application No. 15/679,185, filed on Aug. 17, 2017, now Pat. No. 10,652,214, which is a continuation of application No. 14/492,551, filed on Sep. 22, 2014, now Pat. No. 9,762,547, which is a division of application No. 13/325,438, filed on Dec. 14, 2011, now Pat. No. 9,177,157.

(60) Provisional application No. 61/430,275, filed on Jan. 6, 2011.

(51) Int. Cl.
  *G06F 21/60*    (2013.01)
  *G06F 21/78*    (2013.01)
  *G06F 21/80*    (2013.01)
  *G06F 21/85*    (2013.01)
  *G06F 7/58*    (2006.01)
  *H04L 51/046*    (2022.01)

(52) U.S. Cl.
  CPC .......... *G06F 21/80* (2013.01); *G06F 21/85* (2013.01); *H04L 51/046* (2013.01); *H04L 63/18* (2013.01); *H04L 67/63* (2022.05); *H04L 63/0428* (2013.01)

(58) Field of Classification Search
  CPC ........ G06F 21/602; G06F 21/78; G06F 21/80; G06F 21/85
  See application file for complete search history.

(56) References Cited

U.S. PATENT DOCUMENTS

| | | | |
|---|---|---|---|
| 4,168,396 A | 9/1979 | Best | |
| 4,405,829 A | 9/1983 | Rivest et al. | |
| 4,529,870 A | 7/1985 | Chaum | |
| 4,598,170 A | 1/1986 | Piosenka et al. | |
| 4,759,063 A | 7/1988 | Chaum | |
| 4,853,884 A | 8/1989 | Brown et al. | |
| 4,905,176 A | 2/1990 | Schulz | |
| 4,914,698 A | 4/1990 | Chaum | |
| 4,937,781 A | 6/1990 | Lee | |
| 4,947,430 A | 8/1990 | Chaum | |
| 4,991,210 A | 2/1991 | Chaum | |
| 5,191,542 A | 2/1993 | Murofushi | |
| 5,245,320 A | 9/1993 | Bouton | |
| 5,276,736 A | 1/1994 | Chaum | |
| 5,341,415 A | 8/1994 | Baran | |
| 5,359,626 A * | 10/1994 | Kloker | H04B 1/205 375/220 |
| 5,373,558 A | 12/1994 | Chaum | |
| 5,485,520 A | 1/1996 | Chaum et al. | |
| 5,493,614 A | 2/1996 | Chaum | |
| 5,550,782 A | 8/1996 | Cliff | |
| 5,666,516 A | 9/1997 | Combs | |
| 5,712,913 A | 1/1998 | Chaum | |
| 5,724,027 A | 3/1998 | Shipman et al. | |
| 5,758,195 A | 5/1998 | Balmer | |
| 5,765,197 A | 6/1998 | Combs | |
| 5,781,631 A | 7/1998 | Chaum | |
| 5,864,706 A | 1/1999 | Kurokawa | |
| 5,873,101 A | 2/1999 | Klein | |
| 5,892,826 A * | 4/1999 | Brown | H04L 9/00 713/193 |
| 5,943,283 A | 8/1999 | Wong et al. | |
| 5,946,469 A | 8/1999 | Chidester | |
| 5,960,172 A | 9/1999 | Hwang | |
| 6,005,939 A | 12/1999 | Fortenberry et al. | |
| 6,012,144 A | 1/2000 | Pickett | |
| 6,047,374 A | 4/2000 | Barton | |
| 6,061,278 A | 5/2000 | Kato et al. | |
| 6,070,154 A | 5/2000 | Tavor et al. | |
| 6,108,644 A | 8/2000 | Goldschlag et al. | |
| 6,061,794 A | 9/2000 | Angelo et al. | |
| 6,122,716 A | 9/2000 | Combs | |
| 6,088,802 A | 11/2000 | Bialick et al. | |
| 6,173,330 B1 | 1/2001 | Guo | |
| 6,266,704 B1 | 7/2001 | Reed | |
| 6,304,860 B1 | 10/2001 | Martin, Jr. et al. | |
| 6,345,359 B1 | 2/2002 | Bianco | |
| 6,400,815 B1 | 6/2002 | Gilboy et al. | |
| 6,457,164 B1 | 9/2002 | Hwang et al. | |
| 6,460,050 B1 | 10/2002 | Pace et al. | |
| 6,466,470 B1 | 10/2002 | Chang | |
| 6,473,609 B1 | 10/2002 | Schwartz et al. | |
| 6,501,995 B1 | 12/2002 | Kinney et al. | |
| 6,507,914 B1 | 1/2003 | Cain et al. | |
| 6,574,239 B1 | 6/2003 | Dowling et al. | |
| 6,594,780 B1 | 7/2003 | Shen et al. | |
| 6,601,108 B1 | 7/2003 | Marmor | |
| 6,546,491 B1 | 8/2003 | Challener et al. | |
| 6,622,230 B1 * | 9/2003 | Yano | G11C 16/08 365/230.03 |
| 6,657,994 B1 | 12/2003 | Rajakarunanayake | |
| 6,725,438 B2 | 4/2004 | van Ginneken | |
| 6,760,845 B1 | 6/2004 | Cafarelli et al. | |
| 6,782,424 B2 | 8/2004 | Yodaiken | |
| 6,788,782 B1 | 9/2004 | Fotsch et al. | |
| 6,799,271 B2 | 9/2004 | Kugai | |
| 6,801,499 B1 | 10/2004 | Anandakumar et al. | |
| 6,820,160 B1 | 11/2004 | Allman | |
| 6,868,402 B1 | 3/2005 | Hirota et al. | |
| 6,876,696 B1 * | 4/2005 | Goodson | H04L 5/1438 375/219 |
| 6,922,817 B2 | 7/2005 | Bradfield et al. | |
| 6,958,984 B2 | 10/2005 | Kotzin | |
| 6,978,383 B2 | 12/2005 | Boyle et al. | |
| 7,002,942 B2 | 2/2006 | Kotzin | |
| 7,002,958 B1 | 2/2006 | Basturk et al. | |
| 7,032,224 B2 | 4/2006 | Kadakia et al. | |
| 7,051,370 B2 | 5/2006 | Wakino | |
| 7,093,137 B1 | 8/2006 | Sato et al. | |
| 7,099,110 B2 | 8/2006 | Detzler | |
| 7,099,479 B1 | 8/2006 | Ishibashi et al. | |
| 7,120,666 B2 | 10/2006 | McCanne et al. | |
| 7,120,892 B1 | 10/2006 | Knol et al. | |
| 7,124,157 B2 | 10/2006 | Katsunori | |
| 7,133,648 B1 | 11/2006 | Robinson et al. | |
| 7,145,933 B1 | 12/2006 | Szajnowski | |
| 7,149,841 B2 | 12/2006 | LaBerge | |
| 7,149,992 B2 | 12/2006 | Chang et al. | |
| 7,178,021 B1 | 2/2007 | Hanna et al. | |
| 7,185,204 B2 | 2/2007 | Narayanaswami et al. | |
| 7,240,303 B1 | 3/2007 | Schubert et al. | |
| 7,200,576 B2 | 4/2007 | Steeves et al. | |
| 7,203,741 B2 | 4/2007 | Marco et al. | |
| 7,219,131 B2 | 5/2007 | Banister et al. | |
| 7,188,163 B2 | 6/2007 | Srinivasan et al. | |
| 7,242,678 B2 | 7/2007 | O'Neill et al. | |
| 7,275,213 B2 | 9/2007 | Katano | |
| 7,284,274 B1 | 10/2007 | Walls et al. | |
| 7,320,071 B1 | 1/2008 | Friedman et al. | |
| 7,321,602 B2 | 1/2008 | Bae et al. | |
| 7,336,614 B2 | 2/2008 | Motegi et al. | |
| 7,337,100 B1 | 2/2008 | Hutton et al. | |
| 7,350,204 B2 | 3/2008 | Lambert et al. | |
| 7,350,207 B2 | 3/2008 | Fisher | |
| 7,340,700 B2 | 4/2008 | Emerson et al. | |
| 7,406,711 B2 | 7/2008 | Fuchs et al. | |
| 7,396,257 B2 | 8/2008 | Takahashi | |
| 7,412,422 B2 | 8/2008 | Shiloh | |
| 7,428,271 B2 | 9/2008 | Han et al. | |
| 7,330,891 B2 | 12/2008 | Yodaiken | |
| 7,478,235 B2 | 1/2009 | England et al. | |
| 7,486,678 B1 | 3/2009 | Devanagondi et al. | |
| 7,516,217 B2 | 7/2009 | Yodaiken | |
| 7,558,942 B1 | 7/2009 | Chen | |
| 7,565,546 B2 | 7/2009 | Candelore | |
| 7,533,377 B2 | 12/2009 | Appavoo et al. | |
| 7,627,531 B2 | 12/2009 | Breck et al. | |
| 7,635,272 B2 | 12/2009 | Poppe | |
| 7,640,215 B2 | 12/2009 | Wang et al. | |
| 7,673,032 B1 | 3/2010 | Augart | |

(56) References Cited

U.S. PATENT DOCUMENTS

| | | |
|---|---|---|
| 7,677,065 B1 | 3/2010 | Miao |
| 7,697,438 B2 | 4/2010 | Ji et al. |
| 7,701,845 B2 | 4/2010 | Bryant et al. |
| 7,707,307 B2 | 4/2010 | Miles et al. |
| 7,724,907 B2 | 5/2010 | Candelore |
| 7,729,260 B2 | 6/2010 | Larsson et al. |
| 7,730,272 B2 | 6/2010 | Lee |
| 7,730,300 B2 | 6/2010 | Candelore |
| 7,733,913 B1 | 6/2010 | Cheung et al. |
| 7,746,905 B2 | 6/2010 | Binder |
| 7,747,853 B2 | 6/2010 | Candelore |
| 7,747,873 B2 | 6/2010 | Rabin et al. |
| 7,752,318 B2 | 7/2010 | Kojima |
| 7,757,945 B2 | 7/2010 | Gray et al. |
| 7,765,163 B2 | 7/2010 | Ludtke et al. |
| 7,792,985 B2 | 7/2010 | Liu |
| 7,735,078 B1 | 8/2010 | Vaidya |
| 7,774,592 B2 | 8/2010 | Ishikawa et al. |
| 7,783,779 B1 | 8/2010 | Scales et al. |
| 7,784,106 B2 | 8/2010 | Wheeler et al. |
| 7,822,666 B1 | 10/2010 | Bursch |
| 7,822,820 B2 | 10/2010 | Levasseur et al. |
| 7,830,838 B2 | 11/2010 | Kohvakka et al. |
| 7,835,960 B2 | 11/2010 | Breck et al. |
| 7,843,834 B2 | 11/2010 | Picard |
| 7,844,504 B1 | 11/2010 | Flockhart et al. |
| 7,844,513 B2 | 11/2010 | Smith |
| 7,848,224 B2 | 12/2010 | Bryant et al. |
| 7,848,240 B2 | 12/2010 | Previdi et al. |
| 7,849,455 B2 | 12/2010 | Kadner et al. |
| 7,853,680 B2 | 12/2010 | Phatak |
| 7,853,782 B1 | 12/2010 | Geddes |
| 7,860,922 B2 | 12/2010 | Singer et al. |
| 7,860,923 B2 | 12/2010 | Singer et al. |
| 7,865,585 B2 | 1/2011 | Samuels et al. |
| 7,869,399 B2 | 1/2011 | Terry |
| 7,949,299 B2 | 5/2011 | Rudolf et al. |
| 7,962,755 B2 | 6/2011 | Pizano et al. |
| 7,970,835 B2 | 6/2011 | St. Jacques |
| 7,971,241 B2 | 6/2011 | Guyot et al. |
| 8,041,792 B2 | 10/2011 | Donaghey et al. |
| 8,050,623 B2 | 11/2011 | Singer et al. |
| 8,085,814 B2 | 12/2011 | Ma et al. |
| 8,108,500 B2 | 1/2012 | Peeters et al. |
| 8,171,101 B2 | 5/2012 | Gladwin |
| 8,189,768 B2 | 5/2012 | Raniere |
| 8,234,436 B2 | 7/2012 | Chu |
| 8,284,717 B2 | 9/2012 | Voyer et al. |
| 8,218,539 B2 | 10/2012 | Dai |
| 8,291,115 B2 | 10/2012 | Bitterlich |
| 8,301,179 B2 | 10/2012 | Plestid |
| 8,266,705 B2 | 11/2012 | Hikichi |
| 8,316,125 B2 | 11/2012 | DeHaan |
| 8,433,810 B2 | 4/2013 | Peeters et al. |
| 8,479,251 B2 | 7/2013 | Feinleib et al. |
| 8,499,059 B2 | 7/2013 | Stoyanov |
| 8,606,891 B2 | 10/2013 | Donaghey et al. |
| 8,769,035 B2 | 1/2014 | Resch et al. |
| 8,745,372 B2 | 3/2014 | Orsini et al. |
| 8,799,322 B2 | 5/2014 | deMilo et al. |
| 8,755,522 B2 | 6/2014 | Stella et al. |
| 8,788,803 B2 | 7/2014 | Irvine |
| 8,799,642 B2 | 8/2014 | Raniere |
| 8,832,179 B2 | 9/2014 | Owen et al. |
| 8,750,847 B2 | 10/2014 | Elie et al. |
| 8,669,882 B2 | 11/2014 | Donaghey et al. |
| 8,959,373 B2 | 2/2015 | Suzuki |
| 8,959,649 B2 | 2/2015 | Hikichi |
| 9,762,547 B2 | 9/2017 | Binder |
| 2001/0011312 A1 | 8/2001 | Chu |
| 2001/0033583 A1 | 10/2001 | Rabenko |
| 2002/0007413 A1 | 1/2002 | Garcia-Luna-Aceves et al. |
| 2002/0007456 A1 | 1/2002 | Peinado et al. |
| 2002/0018126 A1 | 2/2002 | Ikeda |
| 2002/0065930 A1 | 5/2002 | Rhodes |
| 2002/0069396 A1 | 6/2002 | Bhattacharya et al. |
| 2002/0120874 A1 | 8/2002 | Shu et al. |
| 2002/0123895 A1 | 9/2002 | Potekhin |
| 2002/0133491 A1 | 9/2002 | Sim et al. |
| 2002/0161973 A1* | 10/2002 | Ulrich .................. G06F 16/10 |
| | | 711/170 |
| 2002/0188935 A1 | 12/2002 | Hertling et al. |
| 2002/0194596 A1 | 12/2002 | Srivastava |
| 2003/0009518 A1 | 1/2003 | Harrow et al. |
| 2003/0016825 A1 | 1/2003 | Jones |
| 2003/0126317 A1 | 3/2003 | Chang |
| 2003/0074403 A1 | 4/2003 | Harrow et al. |
| 2003/0115364 A1 | 6/2003 | Shu |
| 2003/0147369 A1 | 7/2003 | Singh et al. |
| 2003/0156718 A1 | 8/2003 | Candelore et al. |
| 2003/0174648 A1 | 9/2003 | Wang et al. |
| 2003/0131119 A1 | 10/2003 | Noonan et al. |
| 2003/0200307 A1 | 10/2003 | Raju et al. |
| 2003/0200451 A1* | 10/2003 | Evans .................. G06F 21/85 |
| | | 713/193 |
| 2003/0204602 A1 | 10/2003 | Hudson |
| 2003/0210694 A1 | 11/2003 | Jayaraman et al. |
| 2004/0003262 A1 | 1/2004 | England et al. |
| 2004/0088646 A1 | 5/2004 | Yeager et al. |
| 2004/0103275 A1 | 5/2004 | Ji et al. |
| 2004/0181688 A1 | 9/2004 | Wittkotter |
| 2004/0199879 A1 | 10/2004 | Bradfield et al. |
| 2004/0212490 A1 | 10/2004 | Fredericks |
| 2004/0255290 A1 | 12/2004 | Bates et al. |
| 2004/0264506 A1 | 12/2004 | Furukawa |
| 2005/0010620 A1 | 1/2005 | Silvers et al. |
| 2005/0010789 A1 | 1/2005 | Liang |
| 2005/0010954 A1* | 1/2005 | Binder ................ H01R 31/065 |
| | | 725/74 |
| 2005/0097171 A1 | 5/2005 | Hikichi |
| 2005/0204404 A1 | 9/2005 | Hrabik et al. |
| 2005/0240892 A1 | 10/2005 | Broberg, III et al. |
| 2006/0039468 A1 | 2/2006 | Emerson et al. |
| 2006/0136976 A1 | 6/2006 | Coupe et al. |
| 2006/0143617 A1 | 6/2006 | Knauerhase et al. |
| 2006/0165232 A1 | 7/2006 | Burazerovic et al. |
| 2006/0251026 A1 | 9/2006 | Kalhan |
| 2006/0271758 A1 | 11/2006 | Innan et al. |
| 2006/0282897 A1 | 12/2006 | Sima et al. |
| 2007/0011448 A1 | 1/2007 | Chhabr et al. |
| 2007/0021138 A1 | 1/2007 | Allen |
| 2007/0047782 A1 | 1/2007 | Hull et al. |
| 2007/0050516 A1 | 1/2007 | Bona |
| 2007/0255963 A1 | 1/2007 | Pizano et al. |
| 2007/0055739 A1 | 3/2007 | Marmor |
| 2007/0091926 A1 | 4/2007 | Apostolopoulos et al. |
| 2007/0136455 A1 | 6/2007 | Lee et al. |
| 2007/0156855 A1 | 7/2007 | Johnson |
| 2007/0053512 A1 | 8/2007 | Walter |
| 2007/0183457 A1 | 9/2007 | Leitch |
| 2007/0226810 A1 | 9/2007 | Hotti |
| 2007/0239655 A1 | 10/2007 | Agetsuma et al. |
| 2007/0242620 A1 | 10/2007 | Zhai |
| 2007/0266175 A1 | 11/2007 | Bitterlich |
| 2007/0277224 A1 | 11/2007 | Osborn et al. |
| 2008/0008089 A1 | 1/2008 | Bomstein et al. |
| 2008/0022374 A1 | 1/2008 | Brown et al. |
| 2008/0025506 A1 | 1/2008 | Muraoka |
| 2008/0052497 A1* | 2/2008 | Sueyoshi ............ G06F 9/30036 |
| | | 712/E9.017 |
| 2008/0091833 A1 | 4/2008 | Pizano |
| 2008/0092235 A1 | 4/2008 | Comlekoglu |
| 2008/0095149 A1 | 4/2008 | Dai |
| 2008/0109446 A1 | 5/2008 | Wang |
| 2008/0125123 A1 | 5/2008 | Dorenbosch et al. |
| 2008/0127302 A1 | 5/2008 | Qvarfordt et al. |
| 2008/0276302 A1 | 6/2008 | Touboul |
| 2008/0219122 A1 | 9/2008 | Detzler et al. |
| 2008/0222291 A1 | 9/2008 | Weller et al. |
| 2008/0229300 A1 | 9/2008 | O'Brien |
| 2008/0235391 A1 | 9/2008 | Painter et al. |
| 2008/0247540 A1 | 9/2008 | Ahn et al. |
| 2008/0242336 A1 | 10/2008 | Willigenburg |
| 2008/0263658 A1 | 10/2008 | Michael et al. |

(56) References Cited

U.S. PATENT DOCUMENTS

| | | |
|---|---|---|
| 2009/0016532 A1* | 1/2009 | Baldischweiler .... G06Q 20/341 713/193 |
| 2009/0076628 A1 | 3/2009 | Smith et al. |
| 2009/0083366 A1 | 3/2009 | Roantree et al. |
| 2009/0083369 A1 | 3/2009 | Marmor |
| 2009/0113294 A1 | 4/2009 | Sanghavi et al. |
| 2009/0033668 A1 | 5/2009 | Pederson et al. |
| 2009/0136219 A1 | 5/2009 | Kikugawa |
| 2009/0138623 A1 | 5/2009 | Bosch et al. |
| 2009/0172171 A1 | 7/2009 | Amir |
| 2009/0013111 A1 | 8/2009 | Berland et al. |
| 2009/0212844 A1 | 8/2009 | Darmawan et al. |
| 2009/0217122 A1 | 8/2009 | Yokokawa |
| 2009/0253433 A1 | 8/2009 | Voyer et al. |
| 2009/0254900 A1 | 8/2009 | Nakamura |
| 2009/0271877 A1 | 10/2009 | Bradley |
| 2009/0276522 A1 | 11/2009 | Seidel |
| 2009/0279559 A1 | 11/2009 | Wong et al. |
| 2009/0319773 A1 | 12/2009 | Frenkel et al. |
| 2010/0002882 A1 | 1/2010 | Rieger et al. |
| 2010/0024004 A1 | 1/2010 | Boegelund et al. |
| 2010/0083240 A1 | 1/2010 | Siman |
| 2010/0167690 A1 | 1/2010 | Andersson et al. |
| 2010/0066808 A1 | 3/2010 | Tucker et al. |
| 2010/0067703 A1 | 3/2010 | Candelore |
| 2010/0085977 A1 | 4/2010 | Khalid et al. |
| 2010/0094970 A1 | 4/2010 | Zuckerman et al. |
| 2010/0115063 A1 | 5/2010 | Gladwin |
| 2010/0195663 A1 | 5/2010 | Sharma et al. |
| 2010/0154044 A1 | 6/2010 | Manku |
| 2010/0161752 A1 | 6/2010 | Collet |
| 2010/0167822 A1* | 7/2010 | Crumby ............... G07F 17/32 463/42 |
| 2010/0192230 A1 | 7/2010 | Steeves et al. |
| 2010/0235438 A1 | 9/2010 | Narayanan et al. |
| 2010/0262950 A1 | 10/2010 | Garland |
| 2010/0281257 A1 | 11/2010 | Yamazaki et al. |
| 2010/0293555 A1 | 11/2010 | Vepsalainen |
| 2010/0201400 A1 | 12/2010 | Nardone et al. |
| 2010/0325622 A1 | 12/2010 | Morton |
| 2010/0325727 A1 | 12/2010 | Neystadt et al. |
| 2010/0329270 A1 | 12/2010 | Asati et al. |
| 2010/0332479 A1 | 12/2010 | Prahlad et al. |
| 2011/0296391 A1 | 1/2011 | Gass et al. |
| 2011/0131423 A1 | 2/2011 | Ponsini |
| 2011/0064081 A1 | 3/2011 | Lee et al. |
| 2011/0093540 A1 | 4/2011 | Eisenberg et al. |
| 2011/0102443 A1 | 5/2011 | Dror et al. |
| 2011/0145336 A1 | 6/2011 | Carroll |
| 2011/0154313 A1 | 6/2011 | Nolterieke et al. |
| 2011/0197268 A1 | 8/2011 | Ravikumar et al. |
| 2011/0202755 A1 | 8/2011 | Orsini et al. |
| 2011/0208716 A1 | 8/2011 | Liu et al. |
| 2011/0209131 A1 | 8/2011 | Hohenstein et al. |
| 2011/0225633 A1 | 9/2011 | Pai |
| 2011/0225634 A1 | 9/2011 | Pai |
| 2011/0247047 A1 | 10/2011 | Loureiro et al. |
| 2011/0258460 A1 | 10/2011 | Pizano et al. |
| 2011/0258701 A1 | 10/2011 | Cruz et al. |
| 2011/0270969 A1 | 11/2011 | Noh et al. |
| 2011/0314347 A1 | 12/2011 | Nakano et al. |
| 2011/0314542 A1 | 12/2011 | Viswanathan et al. |
| 2011/0321028 A1 | 12/2011 | Evans et al. |
| 2012/0017197 A1 | 1/2012 | Mehta |
| 2012/0020362 A1 | 1/2012 | Khan et al. |
| 2012/0066672 A1 | 3/2012 | Smith et al. |
| 2012/0079472 A1 | 3/2012 | Lenger |
| 2012/0079604 A1 | 3/2012 | Hikichi |
| 2012/0099566 A1 | 4/2012 | Laine et al. |
| 2012/0084427 A1 | 5/2012 | Peeters et al. |
| 2012/0124239 A1 | 5/2012 | Shribman et al. |
| 2012/0130781 A1 | 5/2012 | Li |
| 2012/0158578 A1 | 6/2012 | Sedayao et al. |
| 2012/0166582 A1 | 6/2012 | Binder |
| 2012/0166588 A1 | 6/2012 | Wilkinson |
| 2012/0220280 A1 | 8/2012 | Elie et al. |
| 2012/0239925 A1 | 9/2012 | Raniere |
| 2012/0254456 A1 | 10/2012 | Visharam et al. |
| 2013/0054536 A1 | 2/2013 | Sengupta et al. |
| 2013/0144977 A1 | 6/2013 | Wilkinson |
| 2013/0166768 A1 | 6/2013 | Gouache et al. |
| 2013/0201316 A1 | 8/2013 | Binder et al. |
| 2013/0204849 A1 | 8/2013 | Chacko |
| 2013/0218731 A1 | 8/2013 | Elson |
| 2013/0227047 A1 | 8/2013 | Dolce et al. |
| 2013/0272519 A1 | 10/2013 | Huang |
| 2014/0082260 A1 | 3/2014 | Oh et al. |
| 2014/0359431 A1 | 4/2014 | Tummalapenta et al. |
| 2014/0172929 A1 | 6/2014 | Sedayao et al. |
| 2014/0173089 A1 | 6/2014 | Li et al. |
| 2014/0301334 A1 | 10/2014 | Labranche et al. |
| 2014/0310441 A1 | 10/2014 | Klughart |
| 2015/0033001 A1 | 1/2015 | Ivanov |
| 2015/0067819 A1 | 3/2015 | Shribman et al. |
| 2015/0358648 A1 | 12/2015 | Limberg |
| 2016/0021430 A1 | 1/2016 | LaBosco et al. |
| 2016/0065368 A1* | 3/2016 | Hars ................ H04L 9/3242 713/190 |
| 2018/0213060 A1 | 7/2018 | Koonce |

FOREIGN PATENT DOCUMENTS

| | | |
|---|---|---|
| EP | 2107730 A1 | 10/2009 |
| EP | 2110986 A1 | 10/2009 |
| EP | 2333997 A1 | 6/2011 |
| EP | 2597869 A1 | 5/2015 |
| GB | 2444343 A1 | 6/2008 |
| JP | 2007280388 | 10/2007 |
| KR | 1020090097034 | 9/2009 |
| WO | 2000/018078 | 3/2000 |
| WO | 2005011195 A2 | 2/2005 |
| WO | 2006000038 A1 | 1/2006 |
| WO | 2006023836 A2 | 3/2006 |
| WO | 2008065341 A2 | 6/2008 |
| WO | 2010090562 A1 | 8/2010 |
| WO | 2011150346 A2 | 12/2011 |
| WO | 2012051006 A1 | 4/2012 |
| WO | 2012067726 A1 | 5/2012 |
| WO | 2015034752 A1 | 3/2015 |

OTHER PUBLICATIONS

"On the Leakage of Personally Identifiable Information via Online Social Networks"—Wills et al., AT&T, Apr. 2009 http://www2.research.att.com/~bala/papers/wosn09.pdf.

Roger Dingledine, Nick Mathewon, and Paul Syverson, Tor: the Second-Generation Onion Router, In Proceedings of the 13th conference on USENIX Security Symposium, vol. 13, 2004 (17 pages).

Goldschlag D.M., Reed M.G., Syverson P.F., Hiding Routing Information, Lecture Notes in Computer Science, vol. 1174, Springer, Berlin, Heidelberg, 1996 (14 pages).

Schneier, Anonymity and Tor Network, Schneier on Security Sep. 20, 2007, https://www.schneier.com/blog/archives/2007/09...html, p. 1-22, accessed Apr. 26, 20 (22 pages).

Reed M.G., Syverson P.F. Goldschlag D.M., Protocols Using Anonymous Connections: Mobile applications, Lecture Notes in Computer Science, vol. 1361, Springer, Berlin, Heidelberg, 1997 (11 pages).

Nick Mathewon, and Roger Dingledine, Location Diversity in Anonymity Networks, In Proceedings of the 2004 ACM workshop on Privacy in the electronic society. Association for Computing Machinery, New York, NY, USA 66-67 (11 pages).

Mathew Edman and Paul Syverson, As-Awareness in Tor Path Selection, In Proceedings of the 16th ACM conference on Computer and Communication Security (CCS 09). Association for Computing Machinery, New York, NY, USA 380-389 (10 pages).

Banerjee, Priyanka, Anonymous Routing in Wireless Networks: Onion Routing, Team Project Report 2007, p. 1-16 (16 pages).

McCoy D., Bauer K., Grunwald D., Kohno T., Sicker D., Shining Light in Dark Places: Understandings the Tor Network, Lecture Notes in Computer Science, vol. 5134, Springer, Berlin, Heidelberg, 2008 (14 pages).

(56) References Cited

OTHER PUBLICATIONS

Harry Newton, Newton's Telecom Dictionary, Mar. 2004, CNP Books, p. 182, 183, 433, 434, 435, 437, 665, 737 (10 pages).
Chakravarty et al., Identifying Proxy Nodes in a Tor Anonymization Circuit, 2008, IEEE International Conference on Signal Image Technology and Internet Based Systems, Bali, 2008, pp. 633-639 (7 pages).
Orfali et al., Client/Server Survival Guide, 3rd ed., John Wiley and Sons Inc. 1999, p. 15 (3 pages).
Reed M.G., Syverson P.F., Goldschlag D.M., Proxies for Anonymous Routing, in Proceedings 12th Annual Computer Security Applications Conference, 1996, pp. 95-104 (10 pages).
Microsoft Computer Dictionary, Fifth Edition, published 2002, ISBN-0-7356-1495-4 (648 pages).
Jaatun et al., "The design of a redundant array of independent net-storages for improved confidentiality in cloud computing", Journal of Cloud Computing, Jul. 2012. download: http://www.journalofcloudcomputing.com/content/1/1/13.
Martin B., "Dell Solid State Disk (SSD) Drives—Storage Solutions for Select Poweredge Servers", May 2009 (7 pages).
Janukowicz J., Reisel D., White-Paper "MLC Solid State Drives: Accelerating the Adoption of SSDs", IDC #213730, Sep. 2008 (11 pages).
Dufrasne B., Blum K, Dubberke U., IBM Corp. Redpaper "DS8000: Introducing Solid State Drives", 2009 (20 pages).
Hughes G. UCSD CMRR, Coughlin T. Coughlin Associates: "Tutorial on Disk Drive Data Sanitization", Sep. 2006 (15 pages).
Edelstein R., Converge Net Inc., "The Limitations of Software Based Hard Drive Sanitization—the Myth of a Legacy Technology", Sep. 2007 (15 pages).
Edelstein R., Converge Net Inc., "Data Loss Prevention: Managing the Final Stage of the Data Life Cycle Model—a Perspective on Decommissioning Storage Technology", May 2007 (16 pages).
Ponemon Institute "Fourth Annual US Cost of Data Breach Study", Jan. 2009 (13 pages).
National Institute of Standards and Technology (NIST) Special Publication 800-88: "Guidelines for Media Sanitization", Sep. 2006 (43 pages).
Hughes G. F. and Commins D.M. of University of California, Coughlin T. of Coughlin Associates, "Disposal of Disk and Tape Data by Secure Sanitization", Co-published by the IEEE Computer and Reliability Societies, IEEE Security & Privacy p. 29-34, Jul./Aug. 2009 (6 pages).
"Chapter 1: Mass Storage Basics", downloaded Oct. 2011 from: http://www.lvr.com/files/usb_mass_storage_chapter_1.pdf (24 pages).
"Fibre Channel Solutions Guide" by FCIA—Fibre Channel Industry Association (www.fibrechannel.org), Sep. 2010 (24 pages).
"Technology Brief—Fibre Channel Basics", by Apple Computer, Inc., May 2006 (10 pages).
Weimer T. Unylogix, "Fibre Channel Fundamentals", downloaded from the Internet Oct. 2011 (12 pages).
White Paper "Introduction to InfiniBand™", Mellanox technologies Inc., Document No. 2003WP Rev. 1.90 (20 pages).
Grun P., InfiniBand™ Trade Association:"Introduction to InfiniBand™ for End Users", 2010 (54 pages).
White Paper "An Introduction to InfiniBand—Bringing I/O up to speed" Rev. No. v1.1, by JNI Corporation, Jan. 25, 2002 (9 pages).
"Serial ATA technology, Technology Brief, 4th edition", by Hewlett-Packard Development Company, L.P., TC1108815, Oct. 2011 (10 pages).
White paper "External Serial ATA", by Silicon Image, Inc., Sep. 2004 (16 pages).
Krutov I. Redpaper: "IBM System x Server Disk Drive Interface Technology", IBM Corp. Document REDP-4791-00, Oct. 10, 2011 (20 pages).
"Serial ATA Advanced Host Controller Interface (AHCI)", Revision 1.0, downloaded from Intel website, Oct. 2011 (83 pages).
"Serial ATA—a comparison with Ultra ATA Technology", downloaded from www.seagate.com on Oct. 2011 (7 pages).
Tutorial "PCI Express—an Overview of the PCI Express Standard", National Instruments, Published Aug. 13, 2009 (7 pages).
White Paper "Creating a PCI Express™ Interconnect", Intel Corporation, Downloaded Oct. 2011 (8 pages).
"PHY Interface for the PCI Express™ Architecture", Version 2.00, Intel Corporation 2007 (38 pages).
Cooper S., One Stop Systems, Presentation "Utilizing PCI Express Technology", Downloaded Oct. 2011 (35 pages).
White Paper "Serial Attached SCSI and Serial Compatibility", Intel Corporation Doc. 0103/OC/EW/PP/1K-254402-001, 2002 (8 pages).
Product Manual "Serial Attached SCSI (SAS) Interface Manual", Publication No. 100293071, Rev. B, Seagate Technology LLC, May 2006 (131 pages).
Technology Brief, 4th edition, "Serial Attached SCSI technologies and architectures", Hewlett-Packard Development Company, L.P., TC0000772, Aug. 2011 (21 pages).
"Universal Serial Bus 3.0 Specification", Revision 1.0, Jun. 6, 2011, downloaded from www.usb.org (531 pages).
Peacock C., "USB in a Nutshell", 3rd Release, Nov. 23, 2002 (30 pages).
IEEE Std. 802.3af-2003, "Part 3: Carrier Sense Multiple Access with Collision Detection (CSMA/CD) Access Method and Physical Layer Specifications, Amendment: Data Terminal Equipment (DTE) Power via Media Dependent Interface (MDI)", Jun. 18, 2003 (133 pages).
IEEE Std. 802.3at-2009, "Part 3: Carrier Sense Multiple Access with Collision Detection (CSMA/CD) Access Method and Physical Layer Specifications, Amendment 3: Data Terminal Equipment (DTE) Power via Media Dependent Interface (MDI) Enhancements", Oct. 30, 2009 (141 pages).
White Paper "All You Need to Know About Power over Ethernet (PoE) and the IEEE 802.3af Standard", by PowerDsine Ltd., 06-0002-082 May 20, 2004 (24 pages).
Presentation "Multi-Gigabit Transceivers—Getting Started with Xilinx's Rocket I/Os", by Sandia National Laboratories, Jul. 26, 2007 (18 pages).
Product Specification "Virtex-4 Family Overview", DS112 (v3.1) by Xilinx, Inc., Aug. 30, 2010 (9 pages).
Presentation "Virtex-5 FXT—a new FPGA Platform, plus a Look into the Future", by Xilinx, Inc., Aug. 2008 (26 pages).
"RockelO™ Transceiver User Guide", UG024 (v3.0), Feb. 22, 2007 (156 pages).
Suckow E.H., "Basics of High-Performance SerDes Design: Part I", Fairchild Semiconductor International, downloaded Oct. 2011 (8 pages).
Lewis D., DesignCon 2004—"SerDes Architectures and Applications", National semiconductor Corporation, 2004 (14 pages).
Special Publication 800-111 "Guide to Storage Encryption Technologies for End User Devices", by the National Institute of Standards and Technology (NIST), Nov. 2007 (40 pages).
Fruhwirth C., "New Methods in Hard Disk Encryption", Institute for Computer Languages, Jul. 18, 2005 (124 pages).
Schiesser M., "Complete Hard Disk Encryption Using FreeBSD's GEOM Framework", Oct. 20, 2005 (27 pages).
Technology Paper "128-Bit Versus 256-Bit AES Encryption", Seagate Technology LLC., 2008 (6 pages).
Reference PP-CSIDK-CCv3.1 Version 1.4 "Protection Profile—On-the-fly Mass Storage Encryption Application", by 'Direction central de la securite systems d'information', Aug. 2008 (43 pages).
"Full Disk Encryption—a cryptovision whitepaper", version 1.0, by cv cryptovision GmbH, downloaded Oct. 2011 (5 pages).
"18-bit SerDes Design Guide" by National Semiconductor Corporation, Jun. 2005 (20 pages).
Technology Paper "Seagate DriveTrust™ Technology Enables Robust Security within the Hard Drive", by Seagate Technology LLC, 2006 (5 pages).
Technology Paper "DriveTrust™ Technology: a Technical Overview", by Seagate Technology LLC, 2006 (4 pages).
Athavale A. and Christensen C., "High-Speed Serial I/O Made Simple—a designers' Guide, with FPGA Applications", Edition 1.0, Xilinx Connectivity Solutions, Xilinx Inc., PN0402399, Apr. 2005 (210 pages).

(56) References Cited

OTHER PUBLICATIONS

Von Ahn L., Blum M., and Langford J., "Telling Humans and Computers Apart Automatically", 'Communication off the ACM' vol. 47, No. 2, pp. 57-60, Feb. 2004 (4 pages).

Von Ahn L., Blum M., Hopper N. J. and Langford J., "CAPTCHA: Using Hard AI Problems for Security", downloaded Nov. 2011 (18 pages).

Von Ahn L., Maurer B., McMillen C., Abraham D., and Blum M., "reCAPTCHA: Human-Based Character Recognition via Web Security Measures", SCIENCE vol. 321 pp. 1465-1468, Sep. 12, 2008 (4 pages).

"IP storage Inside White Paper", Storage Networking Industry Association (SNIA) IP Storage Forum, Oct. 2007 (42 pages).

Cisco Systems, Inc. publication No. 1-587005-001-3 (Jun. 1999), "Internetworking Technologies Handbook", Chapter 5: "Routing Basics", pp. 5-1 to 5-10 (10 pages).

"Internetworking Technology Overview", Jun. 1999, Chapter 30: "Internet Protocols", pp. 30-31 to 30-16 (16 pages).

Cisco Systems, Inc. publication No. 1-587005-001-3 (Jun. 1999), "Internetworking Technologies Handbook", Chapter 32: "IPv6", pp. 32-1 to 32-6 (6 pages).

Cisco Systems, Inc. publication No. 1-587005-001-3 (Jun. 1999), "Internetworking Technologies Handbook", Chapter 30: "OSI Routing", pp. 1-10 (10 pages).

Cisco Systems, Inc. publication No. 1-587005-001-3 (Jun. 1999), "Internetworking Technologies Handbook", Chapter 51: "Security Technologies", pp. 51-1 to 51-12 (12 pages).

Internetworking Technology Overview, Chapter 18: "Multiservice Access Technologies", pp. 18-1 to 18-10 (10 pages).

Cisco Systems, Inc. publication No. 1-587005-001-3 (Jun. 1999), "Internetworking Technologies Handbook", Chapter 19: "Voice/Data Integration Technologies", pp. 19-1 to 19-30 (30 pages).

Cisco Systems, Inc. Document ID: 6450 (Jan. 2006): "How NAT Works" (10 pages).

IETF RFC 4949 "Internet Security Glossary Version 2" (Aug. 2007) (366 pages).

Cisco Systems, Inc. (1992), "An Introduction to IP Security (IPSec) Encryption", (28 pages).

W. Steven Conner, Intel Corp et al. slide-show "IEEE 802.11s Tutorial" presented at IEEE 802 Plenary, Dallas on Nov. 13, 2006 (93 pages).

Eugen Borcoci, University Politehnica Bucharest, slide-show "Wireless Mesh Networks Technologies: Architectures, Protocols, Resource Management and Applications", INFOWARE Conference, Aug. 22-29, 2009, Cannes, France (212 pages).

Joseph D. Camp and Edward W. Knightly, Electrical and Computer Engineering, Rice University, Houston, TX, "The IEEE 802.11s Extended Service Set Mesh Networking Standard", IEEE Communication magazine (Aug. 2008) (6 pages).

IBM Corporation, International Technical Support Organization Redbook Document No. GG24-3376-07 "TCP/IP Tutorial and Technical Overview", ISBN 0738494682 8th Edition Dec. 2006, (1004 pages).

IBM Corporation, International Technical Support Organization Redbook Document No. GG24-4338-00 "Introduction to Networking Technologies", 1st Edition Apr. 1994, (220 pages).

IBM Corporation, International Technical Support Organization Redbook Document No. SG24-2580-01 "IP Network Design Guide", 2nd Edition Jun. 1999, (324 pages).

IBM Corporation, International Technical Support Organization Redbook Document No. SG24-4756-00 "Local Area Network Concepts and Products: LAN Operation Systems and management", 1st Edition May 1996, (216 pages).

Cisco Systems, Inc. publication No. 1-587005-001-3 (Jun. 1999), "Internetworking Technologies Handbook", Chapter 7: "Ethernet Technologies", pp. 7-1 to 7-38 (38 pages).

Standard Microsystems Corporation (SMSC) "LAN91C111 10/100 Non-PCI Ethernet Single Chip MAC + PHY" Data-Sheet, Rev. 15 (Feb. 20, 2004) (127 pages).

Electronic Transaction Association (ETA) white paper: "Maintaining Your Data: Internet Security", May 2001 (20 pages).

IETF RFC 3631 "Security Mechanisms for the Internet" (Dec. 2003) (21 pages).

IETF RFC 1750 "Randomness Recommendations for Security" (Dec. 1994) (31 pages).

Cisco Systems, Inc. publication No. 1-587005-001-3 (Jun. 1999), "Internetworking Technologies Handbook", Chapter 20: "Wireless Technologies", pp. 20-21 to 20-42 (42 pages).

IETF RFC 1940 "Source Demand Routing: Packet Format and Forwarding Specification (Version 1)." (May 1996) (28 pages).

IETF RFC 4728 "The Dynamic Source Routing Protocol (DSR) for Mobile Ad Hoc Networks for IPv4" (Feb. 2007) (107 pages).

Johnson D.B., Maltz D.A., Broch J., Computer Science Department, Carnegie Mellon University "DSR: The Dynamic Source Routing Protocol for Multi-Hop Wireless Ad Hoc Networks", 2001 (25 pages).

Feigenbaum J., Johnson A., Syverson P., "Probabilistic Analysis of Onion Routing in a Black-box Model [Extended Abstract]", WPES'07: Proceedings of the 2007 ACM Workshop on Privacy in Electronic Society, ACM Press, Oct. 2007, pp. 1-10 (10 pages).

Feigenbaum J., Johnson A., Syverson P., "A Model of Onion Routing with Provable Anonymity", In Proceedings of Financial Cryptography and Data Security '07 (FC 2007), pp. 57-71 (15 pages).

Syverson P., "Making Anonymous Communication", Generation 2 Onion Routing briefing slides, Center for High Assurance Computer Systems, Naval Research Laboratory, Presented at the National Science Foundation, Jun. 8, 2004 (64 pages).

Feigenbaum J., Johnson A., Syverson P., "A Model of Onion Routing with Provable Anonymity", Financial Cryptography and Data Security, 11th International Conference, FC 2007, LNCS forthcoming (15 pages).

Overlier L., Syverson P., "Valet Services: Improving Hidden Servers with a Personal Touch", Proceedings of the 2006 Privacy Enhancing Technologies Workshop, Springer-Verlag, LNCS 4285 (22 pages).

Dingledine R., Mathewson N., Syverson P., "Tor: the Second-Generation Onion Router", in Proceedings of the 13th USENIX Security Symposium, Aug. 2004 (17 pages).

Syverson P., Reed M. G., Goldschlag D. M., "Onion Routing Access Configurations, DISCEX 2000: Proceedings of the DARPA Information Survivability Conference and Exposition", vol. I Hilton Head, SC, IEEE CS Press, Jan. 2000, pp. 34-40 (7 pages).

Syverson P., Tsudik G., Reed M., Landwehr C., "Towards an Analysis of Onion Routing Security," Workshop on Design Issues in Anonymity and Unobservability Berkeley, CA, Jul. 2000 (14 pages).

Syverson P., Reed M. G., Goldschlag D. M., "Onion Routing for Anonymous and Private Internet Connections," Communications of the ACM, vol. 42, No. 2, Feb. 1999 (5 pages).

Syverson P. F., Reed M. G., Goldschlag D. M., "Anonymous Connections and Onion Routing," IEEE Journal on Selected Areas in Communication Special Issue on Copyright and Privacy Protection, 1998 (15 pages).

Overlier L., Syverson P., "Improving Efficiency and Simplicity of Tor circuit establishment and hidden services", Proceedings of the 2007 Privacy Enhancing Technologies Symposium, Springer-Verlag, LNCS 4776 (20 pages).

"TC: A Tor control protocol (Version 1)", downloaded Nov. 2010 from www.torproject.org (24 pages).

Dingeledine R., Mathewson N., "Tor Protocol Specification", downloaded Nov. 2010 from www.torproject.org (12 pages).

"Tor Directory Protocol, Version 3", downloaded Nov. 2010 from www.torproject.org (29 pages).

Chaum D., "Untraceable electronic mail, return addresses, and digital pseudonyms", In Communications of the ACM 24(2), Feb. 1981, pp. 84-88 (5 pages).

Chaum D., "The Dining Cryptographers Problem: Unconditional Sender and Recipient Untraceability", Journal of Cryptology, 1988(1), pp. 65-75 (11 pages).

(56) References Cited

OTHER PUBLICATIONS

"Security Guidance for Critical Areas of Focus in Cloud Computing V2.1", Prepared by the Cloud Security Alliance, Dec. 2009 (76 pages).
"80186/80188 High-Integration 16-Bit Microprocessors", Intel Corporation, Nov. 1994 (33 pages).
"MC68360 QUad Integrated Communications Controller—User's Manual", Motorola, Inc., 1995 (962 pages).
"True Random Number Generation IC RPG100/RPG100B" Rev. 08 publication No. HM-RAE100-0509, by FDK Corporation, Downloaded from the Internet on Oct. 2011 (4 pages).
"Hard-Disk Basics" compiled from PCguide.com by Mehedi Hasan, Feb. 12, 2005 (738 pages).
"RockeIO™ Transceiver User Guide", UG024 (v3.0), Feb. 22, 2007 (156 pages).
DoD 5220.22-M National Industrial Security Program Operating Manual (NISPOM) Jan. 1995, U.S. Government Printing Office ISBN 0-16-045560-X (96 pages).
Ravi Budruk et al., "PCI Express System Architecture", 2003 by MindShare Inc. (9th printing,.
White Paper "Blu-ray Disc Format, 4. Key Technologies", by Blu-ray Disc Founders, Aug. 2004 (8 pages).
Brochure "Blu-ray Technology—DISCover the infinite storage media", by DISC Archiving Systems B.V., 2010 (2 pages).
Whitepaper "Sustainable Archival Storage—"The Benefits of Optical Archiving"", by DISC Archiving Systems B.V., downloaded from www.disc-group.com Nov. 2011 (17 pages).
International Search Report of PCT/IL2011/000953 dated Jun. 20, 2012.

\* cited by examiner

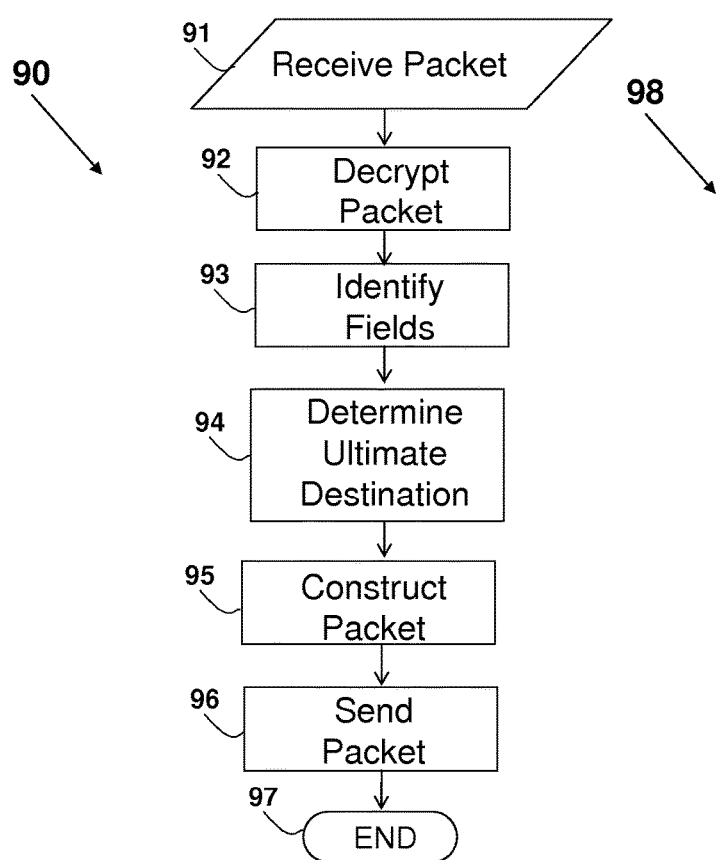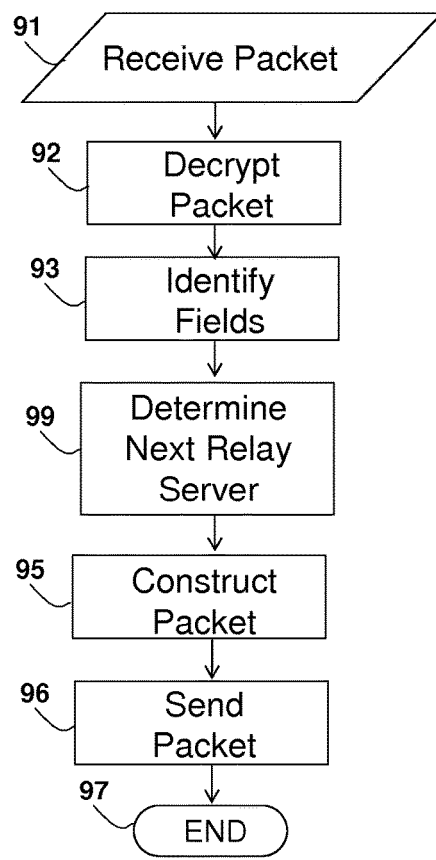
FIG. 9a
FIG. 9b

SYSTEM AND METHOD FOR ROUTING-BASED INTERNET SECURITY

TECHNICAL FIELD

This disclosure relates generally to an apparatus and method for improved networking or storage security using an address or data scrambling, partitioning and routing in digital data networks, and more particularly, to a secured digital data when it is IP-based communicated over the Internet or when it is stored in a memory.

BACKGROUND

The Internet is a global system of interconnected computer networks that use the standard Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers in the Internet. These data routes are hosted by commercial, government, academic and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

The Internet, and consequently its backbone networks, does not rely on central control or coordinating facilities, nor do they implement any global network policies. The resilience of the Internet results from its principal architectural features, most notably the idea of placing as few network states and control functions as possible in the network elements, but instead relying on the endpoints of communication to handle most of the processing to ensure data integrity, reliability and authentication. In addition, the high degree of redundancy of today's network links and sophisticated real-time routing protocols provides alternative paths of communications for load balancing and congestion avoidance.

The Internet Protocol (IP) is the principal communications protocol used for relaying datagrams (packets) across an internetwork using the Internet Protocol Suite. Responsible for routing packets across network boundaries, it is the primary protocol that establishes the Internet. IP is the primary protocol in the Internet Layer of the Internet Protocol Suite and has the task of delivering datagrams from the source host to the destination host based on their addresses. For this purpose, IP defines addressing methods and structures for datagram encapsulation. Internet Protocol Version 4 (IPv4) is the dominant protocol of the Internet. IPv4 is described in Internet Engineering Task Force (IETF) Request for Comments (RFC) 791 and RFC 1349, and the successor, Internet Protocol Version 6 (IPv6), is in active and growing deployment worldwide. IPv4 uses 32-bit addresses (providing 4 billion, or $4.3 \times 10^9$ addresses), while IPv6 uses 128-bit addresses (providing 340 undecillion or $34 \times 10^{38}$ addresses), as described in RFC 2460.

The Internet Protocol is responsible for addressing hosts and routing datagrams (packets) from a source host to the destination host across one or more IP networks. For this purpose the Internet Protocol defines an addressing system that has two functions. Addresses identify hosts and provide a logical location service. Each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of delivery guaranteeing, proper sequencing, avoidance of duplicate delivery, and data integrity are addressed by an upper transport layer protocol (e.g., TCP—Transmission Control Protocol and UDP—User Datagram Protocol).

The design principles of the Internet protocols assume that the network infrastructure is inherently unreliable at any single network element or transmission medium and that it is dynamic in terms of availability of links and nodes. No central monitoring or performance measurement facility exists that tracks or maintains the state of the entire network. For the benefit of reducing network complexity, end-to-end principle is used, where the intelligence in the network is purposely mostly located at the end nodes of each data transmission. Routers in the transmission path simply forward packets to the next known local gateway, matching the routing prefix for the destination address.

The main aspects of the IP technology are IP addressing and routing. Addressing refers to how end hosts become assigned IP addresses and how sub-networks of IP host addresses are divided and grouped together. IP routing is performed by all hosts, but most importantly by internetwork routers, which typically use either Interior Gateway Protocols (IGPs) or External Gateway Protocols (EGPs) to help make IP datagram forwarding decisions across IP connected networks. Core routers serving in the Internet backbone commonly use the Border Gateway Protocol (BGP) as per RFC 4098 or Multi-Protocol Label Switching (MPLS). Other prior art publications relating to Internet related protocols and routing include the following chapters of the publication number 1-587005-001-3 by Cisco Systems, Inc. (July 1999) titled: "Internetworking Technologies Handbook", which are all incorporated in their entirety for all purposes as if fully set forth herein: Chapter 5: "Routing Basics" (pages 5-1 to 5-10), Chapter 30: "Internet Protocols" (pages 30-1 to 30-16), Chapter 32: "IPv6" (pages 32-1 to 32-6), Chapter 45: "OSI Routing" (pages 45-1 to 45-8) and Chapter 51: "Security" (pages 51-1 to 51-12), as well as IBM Corporation, International Technical Support Organization Redbook Documents No. GG24-4756-00 titled: "Local area Network Concepts and Products: LAN Operation Systems and management", 1st Edition May 1996, Redbook Document No. GG24-4338-00 titled: "Introduction to Networking Technologies", 1 Edition April 1994, Redbook Document No. GG24-2580-01 "IP Network Design Guide", $2^{nd}$ Edition June 1999, and Redbook Document No. GG24-3376-07 "TCP/IP Tutorial and Technical Overview", ISBN 0738494682 $8^{th}$ Edition December 2006, which are incorporated in their entirety for all purposes as if fully set forth herein.

A Wireless Mesh Network (WMN) and Wireless Distribution Systems (WDS) are known in the art to be a communication network made up of clients, mesh routers and gateways organized in a mesh topology and connected using radio. Such wireless networks may be based on DSR as the routing protocol. WMNs are standardized in IEEE 802.11s and described in a slide-show by W. Steven Conner, Intel Corp. et al. titled: "IEEE 802.11s Tutorial" presented at the IEEE 802 Plenary, Dallas on Nov. 13, 2006, in a slide-show by Eugen Borcoci of University Politehnica Bucharest, titled: "Wireless Mesh Networks Technologies: Architectures, Protocols, Resource Management and Applications", presented in INFOWARE Conference on Aug. 22-29, 2009 in Cannes, France, and in an IEEE Communication magazine paper by Joseph D. Camp and Edward W. Knightly of Electrical and Computer Engineering, Rice University, Houston, TX, USA, titled: "The IEEE 802.11s Extended Service Set Mesh Networking Standard", which are incorporated in their entirety for all purposes as if fully set forth herein. The arrangement described herein can be equally applied to such wireless networks, wherein two clients exchange information using different paths by using mesh routers as intermediate and relay servers. Commonly in wireless networks, the routing is based on MAC addresses. Hence, the above discussion relating to IP addresses applies in such networks to using the MAC addresses for identifying the client originating the message, the mesh routers (or gateways) serving as the relay servers, and the client serving as the ultimate destination computer.

A schematic view of a prior art internet-based network 10 is shown in FIG. 1a. The Internet or the Internet backbone is shown as the dashed line defining the cloud 11. Various endpoint devices ('hosts') such as servers 14a, 14b, 14c, and 14d, laptops 12a and 12b, and desktop computers 13a, 13b, and 13c are shown interconnected via the Internet 11. The Internet backbone 11 contains routers 15a-j interconnected by various bi-directional packet-based communication links 16a-n. The communication link 16a connects routers 15h and 15j, communication link 16b connects routers 15f and 15j, communication link 16c connects routers 15f and 15i, communication link 16d connects routers 15h and 15g, communication link 16e connects routers 15g and 15c, communication link 16f connects routers 15c and 15f, communication link 16g connects routers 15i and 15j, communication link 16h connects routers 15d and 15i, communication link 16i connects routers 15d and 15e, communication link 16k connects routers 15e and 15f, communication link 16l connects routers 15e and 15a, communication link 16m connects routers 15c and 15a, and communication link 16n connects routers 15a and 15b. Similarly, communication link 17a connects laptop 12b to the Internet 11 via router 15a, communication link 17b connects server 14a to router 15a, communication link 17c connects desktop computer 13c to router 15d, communication link 17d connects server 14d to router 15i, communication link 17e connects computer 13b to router 15i, communication link 17f connects server 14b to router 15j, communication link 17g connects laptop 12a to router 15j, communication link 17h connects server 14c to router 15g, and communication link 17i connects computer 13a to router 15c.

An overview of an IP-based packet 18 is shown in FIG. 1b. The packet may be generally segmented into the IP data 19b to be carried as payload, and the IP header 19f. The IP header 19f contains the IP address of the source as Source IP Address field 19d and the Destination IP Address field 19c. In most cases, the IP header 19f and the payload 19b are further encapsulated by adding a Frame Header 19e and Frame Footer 19a used by higher layer protocols.

The Internet is a packet switching network, wherein packets are forwarded from their source to their ultimate destination via the routers. In one non-limiting example shown as system 20 in FIG. 2, when laptop 12a ('source') wishes to send information to desktop computer 13c ('destination'), a packet is formed at the source, which includes the destination IP address and the source IP address. The packets are routed in the Internet based on various policies and routing algorithms. For example, the packet is first sent to the router 15j over link 17g, as schematically shown by the dashed line path 21a. From router 15j the packet is forwarded to router 15h over link 16a (designated as path 21b), which in turn sends the packet to router 15g over link 16d (path 21c). From router 15g the packet is forwarded to router 15c over link 16e (designated as path 21d), which in turn sends the packet to router 15f over link 16f (path 21e). From router 15f the packet is forwarded to router 15e over link 16k (designated as path 21f), which in turn sends the packet to router 15d over link 16i (path 21g). The packet is then terminated at the destination 13c via link 17c (path 21h).

The Internet structure is using a client-server model, among other models. The terms 'server' or 'server computer' relates herein to a device or computer (or a series of computers) connected to the Internet and is used for providing specific facilities or services to other computers or other devices (referred to in this context as 'clients') connected to the Internet. A server is commonly a host that has an IP address and executes a 'server program', and typically operating as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' herein refers to a program or to a device or a computer (or a series of computers) executing this program, which accesses a server over the Internet for a service or a resource. Clients commonly initiate connections that a server may accept. For example, web browsers are clients that connect to web servers for retrieving web pages, and email clients connect to mail storage servers for retrieving mails.

A network routing is commonly used in the Internet, where the knowledge of the network layout is in the network routing devices, which accordingly determine where to forward the packet. In such a case, the source needs only to specify the destination IP address. Source routing is a method described in RFC 1940 that can be used to specify the route that a packet should take through the network. In source routing the path through the Internet is set by the source. When the sender determines the exact network route the packets must take, 'strict' source routing is used. An alternate common form of source routing is called Loose Source Record Route (LSRR). When using the LSRR the sender provides one or more hops (such as an intermediate router) that the packet must go through. The Dynamic Source Routing (DSR) is a simple and efficient on-demand routing protocol designed for use in multi-hop wireless ad hoc network of mobile devices, such as wireless mesh networks. The DSR is described in RFC 4728 and is designed to restrict the bandwidth consumed by control packets in ad hoc wireless networks by eliminating the periodic table-update messages that are required in the table-driven approach.

The Internet is a public network, based on known network protocols such as TCP/IP, which specifications are widely and published. Hence, a third party ('attacker') may hijack, intercept, alter, tamper with and interpret any clear text packets transferred over the Internet rendering the transport of messages across the Internet non-secured. Methods of attacking data carried over the Internet include using network packet sniffers, IP spoofing, man-in-the-middle attacks and more. As such, there is a need to secure sensitive or confidential information transported over the Internet, such as bank account details and credit card numbers exchanged during a commercial transaction, medical records, criminal records, vehicle driver information, loan applications, stock trading, voter registration and other sensitive information carried over the Internet. Commonly, such data is not carried as clear text but is rather encrypted, so that the data is transferred over the Internet as transformed (or scrambled) data forming unreadable formats (typically by using a mathematical algorithm).

Encryption based mechanisms are commonly end-to-end processes involving only the sender and the receiver, where the sender encrypts the plain text message by transforming it using an algorithm, making it unreadable to anyone, except the receiver which possesses special knowledge. The data is then sent to the receiver over a network, and when received the special knowledge enables the receiver to reverse the process (decrypt) to make the information readable as in the original message. The encryption process commonly involves computing resources such as processing power, storage space and requires time for executing the encryption/decryption algorithm, which may delay the delivery of the message.

Transport Layer Security (TLS) and its predecessor Secure Sockets Layer (SSL) are non-limiting examples of end-to-end cryptographic protocols, providing secured communication above the OSI Transport Layer, using keyed message authentication code and symmetric cryptography. In client/server applications, the TLS client and server negotiate a stateful connection by using a handshake procedure, during which various parameters are agreed upon, allowing a communication in a way designed to prevent eavesdropping and tampering. The TLS 1.2 is defined in RFC 5246, and several versions of the protocol are in widespread use in applications such as web browsing, electronic mail, Internet faxing, instant messaging and Voice-over-IP (VoIP). In application design, TLS is usually implemented on top of any of the Transport Layer protocols, encapsulating the application-specific protocols such as HTTP, FTP, SMTP, NNTP, and XMPP. Historically, it has been used primarily with reliable transport protocols such as the Transmission Control Protocol (TCP). However, it has also been implemented with datagram-oriented transport protocols, such as the User Datagram Protocol (UDP) and the Datagram Congestion Control Protocol (DCCP), a usage which has been standardized independently using the term Datagram Transport Layer Security (DTLS). A prominent use of TLS is for securing World Wide Web traffic carried by HTTP to form HTTPS. Notable applications are electronic commerce and asset management. Increasingly, the Simple Mail Transfer Protocol (SMTP) is also protected by TLS (RFC 3207). These applications use public key certificates to verify the identity of endpoints. Another Layer 4 (Transport Layer) and upper layers encryption-based communication protocols include SSH (Secure Shell) and SSL (Secure Socket Layer).

Layer 3 (Network Layer) and lower layer encryption based protocols include IPsec, L2TP (Layer 2 Tunneling Protocol) over IPsec, and Ethernet over IPsec. The IPsec is a protocol suite for securing IP communication by encrypting and authenticating each IP packet of a communication session. The IPsec standard is currently based on RFC 4301 and RFC 4309, and was originally described in RFCs 1825-1829, which are now obsolete, and uses the Security Parameter Index (SPI, as per RFC 2401) as an identification tag added to the header while using IPsec for tunneling the IP traffic. An IPsec overview is provided in Cisco Systems, Inc. document entitled: "An Introduction to IP Security (IPSec) Encryption", which is incorporated in its entirety for all purposes as if fully set forth herein.

Two common approaches to cryptography are found in U.S. Pat. No. 3,962,539 to Ehrsam et al., entitled "Product Block Cipher System for Data Security", and in U.S. Pat. No. 4,405,829 to Rivest et al., entitled "Cryptographic Communications System and Method", which are incorporated in their entirety for all purposes as if fully set forth herein. The Ehrsam patent discloses what is commonly known as the Data Encryption Standard (DES), while the Rivest patent discloses what is commonly known as the RSA algorithm (which stands for Rivest, Shamir and Adleman who first publicly described it), which is widely used in electronic commerce protocols. The RSA involves using a public key and a private key. DES is based upon secret-key cryptography, also referred to as symmetric cryptography, and relies upon a 56-bit key for encryption. In this form of cryptography, the sender and receiver of cipher text both possess identical secret keys, which are, in an ideal world, completely unique and unknown to the world outside of the sender and receiver. By encoding plain text into cipher text using the secret key, the sender may send the cipher text to the receiver using any available public or otherwise insecure communication system. The receiver, having received the cipher text, decrypts it using the secret key to arrive at the plain text.

An example of a method for Internet security is disclosed in U.S. Pat. No. 6,070,154 to Tavor et al. entitled: "Internet Credit Card Security" which is incorporated in its entirety for all purposes as if fully set forth herein. The patent discloses a method for transmitting credit card numbers in a secured manner via the Internet, wherein the security is provided by transmitting the credit card number in a plurality of different transmissions, each transmission containing part of the credit card number. Another method is disclosed in U.S. Pat. No. 6,012,144 to Pickett entitled: "Transaction Security Method and Apparatus" which is incorporated in its entirety for all purposes as if fully set forth herein, suggesting to use two or more non-secured networks to ensure transaction security. U.S. Pat. No. 7,774,592 to Ishikawa et al. entitled: "Encryption Communication Method", which is incorporated in its entirety for all purposes as if fully set forth herein, discloses a secure communication system, which executes, on an open network to which many and unspecified nodes are connected, encryption-based communication between nodes belonging to a specific group.

There is a growing widespread use of the Internet for carrying multimedia, such as video and audio. Various audio services include Internet-radio stations and VoIP (Voice-over-IP). Video services over the Internet include video conferencing and IPTV (IP Television). In most cases, the multimedia service is a real-time (or near real-time) application, and thus sensitive to delays over the Internet. In particular, two-way services such a VoIP or other telephony services and video-conferencing are delay sensitive. In some cases, the delays induced by the encryption process, as well as the hardware/software costs associated with the encryption, render encryption as non-practical. Therefore, it is not easy to secure enough capacity of the Internet accessible by users to endure real-time communication applications such as Internet games, chatting, VoIP, MoIP (Multimedia-over- IP), etc. In this case, there may be a data loss, delay or severe jitter in the course of communication due to the property of an Internet protocol, thereby causing inappropriate real-time video communication. The following chapters of the publication number 1-587005-001-3 by Cisco Systems, Inc. (July 1999) titled: "Internetworking Technologies Handbook", relate to multimedia carried over the Internet, and are all incorporated in their entirety for all purposes as if fully set forth herein: Chapter 18: "Multiservice Access Technologies" (pages 18-1 to 18-10), and Chapter 19: "Voice/Data Integration Technologies" (pages 19-1 to 19-30).

VoIP systems in widespread use today fall into three groups: systems using the ITU-T H.323 protocol, systems using the SIP protocol, and systems that use proprietary protocols. H.323 is a standard for teleconferencing that was developed by the International Telecommunications Union (ITU). It supports full multimedia audio, video and data transmission between groups of two or more participants, and it is designed to support large networks. H.323 is network-independent: it can be used over networks using transport protocols other than TCP/IP. H.323 is still a very important protocol, but it has fallen out of use for consumer VoIP products due to the fact that it is difficult to make it work through firewalls that are designed to protect computers running many different applications. It is a system best suited to large organizations that possess the technical skills to overcome these problems.

SIP (for Session Initiation Protocol) is an Internet Engineering Task Force (IETF) standard signaling protocol for teleconferencing, telephony, presence and event notification and instant messaging. It provides a mechanism for setting up and managing connections, but not for transporting the audio or video data. It is probably now the most widely used protocol for managing Internet telephony. Like the IETF protocols, SIP is defined in a number of RFCs, principally RFC 3261. A SIP-based VoIP implementation may send the encoded voice data over the network in a number of ways. Most implementations use Real-time Transport Protocol (RTP), which is defined in RFC 3550. Both SIP and RTP are implemented on UDP, which, as a connectionless protocol, can cause difficulties with certain types of routers and firewalls. Usable SIP phones therefore also need to use STUN (for Simple Traversal of UDP over NAT), a protocol defined in RFC 3489 that allows a client behind a NAT router to find out its external IP address and the type of NAT device.

Onion routing (OR) is a technique for anonymous communication over the Internet or any other computer network. Messages are repeatedly encrypted and then sent through several network nodes called onion routers. Each onion router removes a layer of encryption to uncover routing instructions, and sends the message to the next router where this is repeated. This prevents these intermediary nodes from knowing the origin, destination, and contents of the message. To prevent an adversary from eavesdropping on message content, messages are encrypted between routers. The advantage of onion routing (and mix cascades in general) is that it is not necessary to trust each cooperating router; if one or more routers are compromised, anonymous communication can still be achieved. This is because each router in an OR network accepts messages, re-encrypts them, and transmits to another onion router. The idea of onion routing (OR) is to protect the privacy of the sender and the recipient of a message, while also providing protection for message content as it traverses a network. Onion routing accomplishes this according to the principle of Chaum mix cascades: messages travel from source to destination via a sequence of proxies ("onion routers"), which re-route messages in an unpredictable path.

Routing onions are data structures used to create paths through which many messages can be transmitted. To create an onion, the router at the head of a transmission selects a number of onion routers at random and generates a message for each one, providing it with symmetric keys for decrypting messages, and instructing it which router will be next in the path. Each of these messages, and the messages intended for subsequent routers, is encrypted with the corresponding router's public key. This provides a layered structure, in which it is necessary to decrypt all outer layers of the onion in order to reach an inner layer. Onion routing is described in U.S. Pat. No. 6,266,704 to Reed et al. entitled: "Onion Routing Network for Securely Moving data through Communication Networks", which is incorporated in its entirety for all purposes as if fully set forth herein. Other prior art publications relating to onion routing are the publications "Probabilistic Analysis of Onion Routing in a Black-box Model [Extended Abstract]" presented in WPES'07: Proceedings of the 2007 ACM Workshop on Privacy in Electronic Society, "A Model of Onion Routing with Provable Anonymity" presented in Proceedings of Financial Cryptography and Data Security '07, and "A Model of Onion Routing with Provable Anonymity", presented in the Financial Cryptography and Data Security, 11th International Conference, all by Feigenbaum J., Johnson J. and Syverson P., publications "Improving Efficiency and Simplicity of Tor circuit establishment and hidden services", Proceedings of the 2007 Privacy Enhancing Technologies Symposium, Springer-Verlag, LNCS 4776, publication "Untraceable electronic mail, return addresses, and digital pseudonyms" by Chaum D., in Communications of the ACM 24(2), February 1981, and "Valet Services: Improving Hidden Servers with a Personal Touch", Proceedings of the 2006 Privacy Enhancing Technologies Workshop, Springer-Verlag, LNCS 4285, both by Overlier L., Syverson P., publications "Making Anonymous Communication", Generation 2 Onion Routing briefing slides, Center for High Assurance Computer Systems, naval Research Laboratory, Presented at the National Science Foundation, Jun. 8, 2004 by Syverson P., publications "Onion Routing Access Configurations, "DISCEX 2000: Proceedings of the DARPA Information Survivability Conference and Exposition", Volume I Hilton Head, SC, IEEE CS Press, January 2000, "Onion Routing for Anonymous and Private Internet Connections," Communications of the ACM, vol. 42, num. 2, February 1999, and "Anonymous Connections and Onion Routing," IEEE Journal on Selected Areas in Communication Special Issue on Copyright and Privacy Protection, 1998, all by Syverson P., Reed M. G., Goldschlag M., publication "Towards an Analysis of Onion Routing Security, and "Workshop on Design Issues in Anonymity and Unobservability Berkeley, CA, July 2000 by Syverson P., Tsudik G., Reed M. G., and Landwehr C, which are incorporated in their entirety for all purposes as if fully set forth herein.

'Tor' is an anonymizing network based on the principles of 'onion routing', and involves a system which selects a randomly chosen route for each connection, via the routers present in the Tor network. The last server appears herein as an 'exit node' and sends the data to the final recipient after leaving the Tor cloud. At this point, it is no longer possible for an observer constantly watching the 'exit node' to determine who the sender of the message was. This concept and its components are known from the 'Tor' project in http://www.torproject.org. The Tor network concept is described in U.S. Patent Application Publication 2010/0002882 to Rieger et al., in the publication "Tor The Second-Generation Onion Router", in Proceedings of the 13th USENIX Security Symposium August 2004, by Dingledine R., Mathewson N., Syverson P., in publication "Tor Protocol specification" by Dingledine R. and Mathewson N., in publication "Tor Directory Protocol, Version 3", and publication "TC: A Tor Control Protocol" downloaded from the Tor web-site, which are incorporated in their entirety for all purposes as if fully set forth herein.

In computer architecture, such as the in the hosts or the servers above, a bus is a subsystem commonly consisting of a conductor, or group of conductors, that are used for carrying signals, data or power, and typically serves as a common connection between the circuits, devices or other components. A bus can be used for transferring data between components within a computer system, between computers or between a computer and peripheral devices. Many physical or logical arrangements may be used to implement a bus, such as parallel (wherein each data word is carried in parallel on multiple electrical conductors or wires), serial (such as bit-serial connections), or a combination of both, and the bus may be wired in various topologies such as multi-drop (electrical parallel) or daisy-chain. Further, a bus may be implemented as a communication network employing hubs or switches. A bus may be internal, commonly implemented as a passive back-plane or motherboard conductors, or external, the latter is commonly a cable, and may use passive or active circuitry. A bus may further carry a power signal (commonly low-voltage DC power signal, e.g., 3.3 Volts DC (VDC), 5 VDC, 12 VDC and 48 VDC). In a parallel bus, the number of lines or wires, or the number of bits carried in parallel, is referred to as the bus width.

A non-limiting schematic example of a computer system 160 employing memory-mapped I/O (Input/Output) scheme is shown in FIG. 16. A processor 163 (which may serve as a CPU—Central Processing Unit) is connected to a memory 162 and I/O circuitry 161 via bus 164. The bus 164 comprises three buses, an address bus 166, a data 167 and control bus 165. The address bus 166 carries the address specified by the processor 163, relating to the physical or virtual location in the memory 162, or physical or virtual specific I/O component, while the value to be read or written is sent on the data bus 167. The control bus 165 carries control information between the processor 163 and other devices, such as commands from the processor 163 or signals that report to the processor 163 the status of various devices such as memory 162 and I/O 161, and also for controlling and supporting the address bus 166 and the data bus 167. As a non-limiting example, one line of the control bus may be used to indicate whether the CPU 163 is currently reading from, or writing to, the memory 162 (R/W line). The address bus 166 and the data bus 167 may be carried separately over dedicated conductors (non-multiplexed bus), or alternatively may be carried over the same conductors using time-multiplexing.

A schematic non-limiting example of detailed coupling of a memory component 171 to address bus 166, data bus 167 and control bus 165 is shown in sub-system 170 shown in FIG. 17. The memory 171 is capable of storing 256 bytes (256*8), and thus addressable by 8 address lines $A_7$ (MSB—Most Significant Bit), $A_6$, $A_5$, $A_4$, $A_3$, $A_2$, $A_1$ and $A_0$ (LSB—Least Significant Bit), connected via $A_7$ line 176a, $A_6$ line 176b, $A_5$ line 176c, $A_4$ line 176d, $A_3$ line 176e, $A_2$ line 176f, $A_1$ line 176g and $A_0$ line 176h, collectively referred to as address bus 176 carrying the address word. The processor specifies an address over the address bus 166, and the address bus 176 may be coupled to receive the address from the address bus 166 via an address logic circuit 174. The address logic circuit 174 may be a simple buffer or line-driver, or may be a latch or register that are commonly used in a multiplexed bus environment. Similarly, data values to be written to, or read from, the memory 171 are coupled to or from the data 167 via data logic 175, may be a simple bi-directional buffer or line-driver, or may be a bi-directional latch or register which are commonly used in a multiplexed bus environment. The 8 bits data word is designated as $D_7$ (MSB), $D_6$, $D_5$, $D_4$, $D_3$, $D_2$, $D_1$ and $D_0$ (LSB), connected via $D_7$ line 177a, $D_6$ line 177b, $D_5$ line 177c, $D_4$ line 177d, $D_3$ line 177e, $D_2$ line 177f, $D_1$ line 177g and $D_0$ line 177h, collectively referred to as data bus 177 carrying the address word. The control block 172 connects to the control bus 165 and may also be coupled to the address bus 166 and the data bus 167, and produce the signal R/W 173 which connects to the memory 171 to indicate a Write cycle (R/W=Logic '0') or a Read cycle (R/W=Logic '1'). A non-limiting example of a processor may be 80186 or 80188 available from Intel Corporation located at Santa-Clara, California, USA. The 80186 and its detailed memory connections are described in the manual "80186/80188 High-Integration 16-Bit Microprocessors" by Intel Corporation, which is incorporated in its entirety for all purposes as if fully set forth herein. Another non-limiting example of a processor may be MC68360 available from Motorola Inc. located at. Schaumburg, Illinois, USA. The MC68360 and its detailed memory connections are described in the manual "MC68360 Quad Integrated Communications Controller—User's Manual" by Motorola, Inc., which is incorporated in its entirety for all purposes as if fully set forth herein. While exampled above regarding an address bus having 8-bit width, other widths of address buses are commonly used, such as the 16-bit, 32-bit and 64-bit. Similarly, while exampled above regarding a data bus having 8-bit width, other widths of data buses are commonly used, such as 16-bit, 32-bit and 64-bit width.

There is a requirement for protecting data stored in a memory from authorized use. The terms "memory" and "storage" are used interchangeably herein and refer to any physical component that can retain or store information (that can be later retrieved) such as digital data on a temporary or permanent basis, typically for use in a computer or other digital electronic device. A memory can store computer programs or any other sequence of instructions, or data such as files, text, numbers, audio and video, as well as any other form of information represented as a string of bits or bytes. The physical means of storing information may be electrostatic, ferroelectric, magnetic, acoustic, optical, chemical, electronic, electrical, or mechanical. A memory may be in a form of Integrated Circuit (IC, a.k.a. chip or microchip). Alternatively or in addition, the memory may be in the form of a packaged functional assembly of electronic components (module). Such module may be based on a PCB (Printed Circuit Board) such as PC Card according to Personal Computer Memory Card International Association (PCMCIA) PCMCIA 2.0 standard, or a Single In-line Memory Module (SIMM) (or DIMM) which is standardized under the JEDEC JESD-21C standard. Further, a memory may be in the form of a separately rigidly enclosed box such as hard-disk drive.

Semiconductor memory may be based on Silicon-On-Insulator (SOI) technology, where a layered silicon-insulator-silicon substrate is used in place of conventional silicon substrates in semiconductor manufacturing, especially microelectronics, to reduce parasitic device capacitance and thereby improving performance. SOI-based devices differ from conventional silicon-built devices in that the silicon junction is above an electrical insulator, typically silicon dioxide or sapphire (these types of devices are called silicon on sapphire, or SOS, and are less common). SOI-Based memories include Twin Transistor RAM (TTRAM) and Zero-capacitor RAM (Z-RAM).

A memory may be a volatile memory, where a continuous power is required to maintain the stored information such as RAM (Random Access Memory), including DRAM (Dynamic RAM) or SRAM (Static RAM), or alternatively be a non-volatile memory which does not require a maintained power supply, such as Flash memory, EPROM, EEPROM and ROM (Read-Only Memory). Volatile memories are commonly used where long-term storage is required, while non-volatile memories are more suitable where fast memory access is required. Volatile memory may be dynamic, where the stored information is required to be periodically refreshed (such as re-read and then re-written) such as DRAM, or alternatively may be static, where there is no need to refresh as long as power is applied, such as RAM. In some cases, a small battery is connected to a low-power consuming volatile memory, allowing its use as a non-volatile memory.

A memory may be read/write (or mutable storage) memory where data may be overwritten more than once and typically at any time, such as RAM and Hard Disk Drive (HDD). Alternatively, a memory may be an immutable storage where the information is retained after being written once. Once written, the information can only be read and typically cannot be modified, sometimes referred to as Write Once Read Many (WORM). The data may be written at the time of manufacture of the memory, such as mask-programmable ROM (Read Only Memory) where he data is written into the memory a part of the IC fabrication, CD-ROM (CD—Compact Disc) and DVD-ROM (DVD—Digital Versatile Disk, or Digital Video Disk). Alternately, the data may be once written to the "write once storage" at some point after manufacture, such as Programmable Read-Only Memory (PROM) or CD-R (Compact Disc-Recordable).

A memory may be accessed using "random access" scheme where any location in the storage can be accessed at any moment in typically the same time, such as RAM, ROM or most semiconductor-based memories. Alternatively, a memory may be of "sequential access" type, where the pieces of information are gathered or stored in a serial order, and therefore the time to access a particular piece of information or a particular address depends upon which piece of information was last accessed, such as magnetic tape based storage. Common memory devices are location-addressable, where each individually accessible unit of data in storage is selected using its numerical memory address. Alternatively, a memory may be file-addressable, where the information is divided into files of variable length, and a file is selected by using a directory or file name (typically a human readable name), or may be content-addressable, where each accessible unit of information is selected based on the basis of (or part of) the stored content. File addressability and content addressability commonly involves additional software (firmware) or hardware or both.

Various storage technologies are used for the medium (or media) that actually holds the data in the memory. Commonly in use are semiconductor, magnetic, and optical mediums. Semiconductor based medium is based on transistors, capacitors or other electronic components in an IC, such as RAM, ROM and Solid-State Drives (SSDs). A currently popular non-volatile semiconductor technology is based on a flash memory, and can be electrically erased and reprogrammed. The flash memory is based on NOR or NAND based single-level cells (SLC) or multi-level cells (MLC), made from floating-gate transistors. Non-limiting examples of applications of flash memory include personal and laptop computers, PDAs, digital audio players (MP3 players), digital cameras, mobile phones, synthesizers, video games consoles, scientific instrumentation, industrial robotics and medical electronics. The magnetic storage uses different types of magnetization on a magnetically or ferromagnetic coated surface as a medium for storing the information. The information is accessed by read/write heads or other transducers. Non-limiting examples of magnetic-based memory are Floppy-disk, magnetic tape data storage and HDD. In optical storage typically an optical disc is used, that stores information in deformities on the surface of a circular disc, and the information is read by illuminating the surface with a laser diode and observing the reflection. The deformities may be permanent (read only media), formed once (write once media) or reversible (recordable or read/write media). Non-limiting examples of read-only storage, commonly used for mass distribution of digital information such as music, audio, video or computer programs, include CD-ROM, BD-ROM (BD—Blu-ray Disc) and DVD-ROM. Non-limiting examples of write once storage are CD-R, DVD-R, DVD+R and BD-R, and non-limiting examples of recordable storage are CD-RW (Compact Disc-ReWritable), DVD-RW, DVD+RW, DVD-RAM and BD-RE (Blu-ray Disc Recordable Erasable). Another non-limiting example is magneto-optical disc storage, where the magnetic state of a ferromagnetic surface stores the information, which can be read optically. 3D optical data storage is an optical data storage, in which information can be recorded and/or read, with three-dimensional resolution.

A storage medium may be removable, designed to be easily removed from, and easily installed or inserted into, the computer by a person, typically without the need for any tool and without the need to power off the computer or the associated drive. Such capability allows for archiving, for transporting data between computers, and for buying and selling software. The medium may be read using a reader or player that reads the data from the medium, or may be written by a burner or writer, or may be used for writing and reading by a writer/reader commonly referred to as a drive. Commonly in the case of magnetic or optical based mediums, the medium has the form factor of a disk, which is typically a round plate on which the data is encoded, respectively known as magnetic disc and optical disk. The machine that is associated with reading data from and writing data onto a disk is known as a disk drive. Disk drives may be internal (integrated within the computer enclosure) or may be external (housed in a separate box that connects to the computer). Floppy disks, that can be read from or written on by a floppy drive, are a non-limiting example of removable magnetic storage medium, and CD-RW (Compact Disc-ReWritable) is a non-limiting example of a removable optical disk. A non-volatile removable semiconductor based storage medium is commonly in use and is referred to as a memory card. A memory card is a small storage device, commonly based on flash memory, and can be read by a suitable card reader.

A memory may be accessed via a parallel connection or bus (wherein each data word is carried in parallel on multiple electrical conductors or wires), such as PATA, PCMCIA or EISA, or via serial bus (such as bit-serial connections) such as USB or Ethernet based on IEEE802.3 standard, or a combination of both. The connection may further be wired in various topologies such as multi-drop (electrical parallel), point-to-point, or daisy-chain. A memory may be powered via a dedicated port or connector, or may be powered via a power signal carried over the bus, such as SATA or USB.

A memory may be provided according to a standard, defining its form factor (such as its physical size and shape) and electrical connections (such as power and data interface). A standard-based memory may be easily inserted to, or removed from, a suitable corresponding slot (a.k.a. expansion slots) of a computer or other digital device. In one non-limiting example, a memory card using a PC Card form factor according to PCMCIA 2.0 (or JEIDA 4.1) is used, suitable for mounting into a corresponding PCMCIA-compatible slot, supporting 16 or 32-bit width interface, and connected via 68 pins connectors. Similarly, CardBus according to PCMCIA 5.0 may be used. In one non-limiting example, the memory is in the form of SD (Secure Digital) Card, based on standard by SD Card Association (SDA), which is commonly used in many small portable devices such as digital video camcorders, digital cameras, audio players and mobile phones. Other types of memory cards may be equally used, such as CompactFlash (CF), MiniSD card, MicroSD Card, and xD-Picture Card.

In another non-limiting example, a memory may be provided as a USB drive (such as USB Flash drive), which is a portable enclosed card that plugs into a computer USB port and communicates with a USB host. Such flash-based memory drives are commonly referred to as "thumb drives", "jump drives" and "memory sticks". Such USB mass storage devices and others are described in "Chapter 1: Mass Storage basics", downloaded October 2011 from: http://www.lvr.com/files/usb_mass_storage_chapter_1.pdf, which is incorporated in its entirety for all purposes as if fully set forth herein. In another non-limiting example, the memory is designed to fit into a drive bay in a computer enclosure. Commonly such drive bays are standard-sized, and used to store disk drives. The drives may be usually secured with screws or using a tool-less fasteners. A current popular standard is the 3.5 inches (3.5") bays, which dimensions are specified in SFF standard specifications SFF-8300 and SFF-8301, which were incorporated into the EIA (Electronic Industries Association) standard EIA-470.

Traditionally, computer related storage was categorized to main memory, secondary and tertiary storages, having different latency (access time), capacity, and size. The main memory (or primary memory or internal memory) referred to the memory that was directly accessible by the CPU, and typically stored the program to be executed by the processor. The secondary storage (or external memory or auxiliary storage) referred to a memory which was not directly accessible to the CPU and thus required input/output channels, commonly offering larger storage capacity than the main memory. The tertiary storage involved mass storage media, commonly associated with a dismount removable media, used for archiving rarely accessed information. The latency of accessing a particular location is typically nanoseconds for primary storage, milliseconds for secondary storage, and seconds for tertiary storage. The capacity of a memory is commonly featured in bytes (B), where the prefix 'K' is used to denote kilo=$2^{10}$=$1024^1$=1,024, the prefix 'M' is used to denote mega=$2^{20}$=$1024^2$=1,048,576, the prefix 'G' is used to denote giga=$2^{30}$=$1024^3$=1,073,741,824, and the prefix T is used to denote tera=$2^{40}$=$1024^4$=1,099,511,627,776.

A memory may be Direct-attached Storage (DAS), where the memory is directly connected to a host, computer, server, or workstation, commonly without a network in between. Common examples involve a number of hard disk drives (HDD) connected to a processor or a computer through a Host Bus Adapter (HBA). Commonly serial and point-to-point connections are used, such as SATA, eSATA, SCSI, SAS and Fibre Channel. Alternatively, a memory can be part of a Network-attached Storage (NAS), wherein a self-contained file level storage (typically arranged as a server) is connected to a network, providing data sharing to other devices (such as heterogeneous clients), commonly via a network device such as a hub, switch or router. NAS is specialized for its task by its hardware, software, or both, and thus provides faster data access, easier administration, and simple configuration. NAS is typically associated with a LAN, and commonly provides an Ethernet interface based on IEEE802.3 standard may be used such as 10/100BaseT, 1000BaseTfrX (gigabit Ethernet), 10 gigabit Ethernet (10GE or 10GbE or 10 GigE per IEEE Std 8023ae-2002as standard), 40 Gigabit Ethernet (40GbE), or 100 Gigabit Ethernet (100 GbE as per Ethernet standard IEEE P802.3ba). In another alternative, a memory may be part of a Storage Area Network (SAN), which is a high-speed (commonly dedicated) network (or sub-network) for sharing storage devices, such as disk arrays, tape libraries and optical jukeboxes. The SAN typically allows multiple computers or servers to access multiple storage devices using a network such as WAN or LAN. SAN often utilizes a Fibre Channel fabric topology, commonly made up of a number of Fibre Channel switches.

Molecular memory uses molecular species as the data storage element. The molecular component can be described as a molecular switch, and may perform this function by any of several mechanisms, including charge storage, photochromism, or changes in capacitance. In a molecular memory device, each individual molecule contains a bit of data, leading to massive data capacity.

Blu-ray Disc (official abbreviation BD) is an optical disc storage medium designed to supersede the DVD format, where blue laser is used to read the disc, allowing information to be stored at a greater density than is possible with the longer-wavelength red laser used for DVDs. The disc diameter is 120 mm and the disc thickness is 1.2 mm of plastic optical disc, the same size as DVDs and CDs. Blu-ray Discs contain 25 GB (23.31 GiB) per layer, with dual layer discs (50 GB) being the norm for feature-length video discs. Triple layer discs (100 GB) and quadruple layers (128 GB) are available for BD-XL Blu-ray re-writer drives. The Blu-ray technology and its uses are described in the White Paper "Blu-ray Disc Format, 4. Key Technologies", by Blu-ray Disc Founders, August 2004, in the brochure "Blu-ray Technology—DISCover the infinite storage media", by DISC Archiving Systems B.V., 2010, and in Whitepaper "Sustainable Archival Storage—"The Benefits of Optical Archiving"", by DISC Archiving Systems B.V., downloaded from www.disc-group.com, which are all incorporated in their entirety for all purposes as if fully set forth herein.

Today, Hard Disk Drives (HDD) are used as secondary storage in general purpose computers, such as desktop personal computers and laptops. An HDD is a non-volatile, random access digital data storage device, featuring rotating rigid platters on a motor-driven spindle within a protective enclosure. The enclosure may be internal to the computer system enclosure or external. Data is magnetically read from, and written to, the platter by read/write heads that floats on a film or air above the platters. The HDDs are typically interfaced using high-speed interfaces, commonly of serial type. Common HDDs structure, characteristics, operation, form factors and interfacing is described in "Hard-Disk Basics" compiled from PCGUIDE.COM by Mehedi Hasan, which is incorporated in its entirety for all purposes as if fully set forth herein. Most SSDs include a controller that incorporates the electronics that bridge the NAND memory components to the host computer. The controller is an embedded processor that executes firmware-level code and is one of the most important factors of SSD performance. Functions performed by the controller include Error correction (ECC), Wear leveling, Bad block mapping, Read scrubbing and read disturb management, Read and write caching, and Garbage collection. Information about SSD technology, marketing and applications are provided in Martin B., Dell "DELL Solid State Disk (SSD) Drive—Storage Solutions for Select Poweredge Server", May 2009, in Janukowicz J., Reisel D., White-Paper "MLC Solid State Drives: Accelerating the Adoption of SSDs", IDC #213730, September 2008, and in Dufrasne B., Blum K, Dubberke U., IBM Corp. Redbooks Redpaper "DS8000: Introducing Solid State Drives", 2009, which are all incorporated in their entirety for all purposes as if fully set forth herein.

The connection of peripherals and memories to a processor may be via a bus. A communication link (such as Ethernet, or any other LAN, PAN or WAN communication link) may also be regarded as bus herein. A bus may be an internal bus (a.k.a. local bus), primarily designed to connect a processor or CPU to peripherals inside a computer system enclosure, such as connecting components over the motherboard or backplane. Alternatively, a bus may be an external bus, primarily intended for connecting the processor or the motherboard to devices and peripherals external to the computer system enclosure. Some buses may be doubly used as internal or as external buses. A bus may be of parallel type, where each word (address or data) is carried in parallel over multiple electrical conductors or wires; or alternatively, may be bit-serial, where bits are carried sequentially, such as one bit at a time. A bus may support multiple serial links or lanes, aggregated or bonded for higher bit-rate transport. Non-limiting examples of internal parallel buses include ISA (Industry Standard architecture); EISA (Extended ISA); NuBus (IEEE 1196); PATA—Parallel ATA (Advanced Technology Attachment) variants such as IDE, EIDE, ATAPI, SBus (IEEE 1496), VESA Local Bus (VLB), PCI and PC/104 variants (PC/104, PC/104 Plus, PC/104 Express). Non-limiting examples of internal serial buses include PCIe (PCI Express), Serial ATA (SATA), SMBus, and Serial Peripheral Bus (SPI) bus. Non-limiting examples of external parallel buses include HIPPI (HIgh Performance Parallel Interface), IEEE-1284 ('Centronix'), IEEE-488 (a.k.a. GPIB—General Purpose Interface Bus) and PC Card/PCM-CIA. Non-limiting examples of external serial buses include USB (Universal Serial Bus), eSATA and IEEE 1394 (a.k.a. FireWire). Non-limiting examples of buses that can be internal or external are Futurebus, InfiniBand, SCSI (Small Computer System Interface), and SAS (Serial Attached SCSI). The bus medium may be based on electrical conductors, commonly copper wires based cable (may be arranged as twisted-pairs) or a fiber-optic cable. The bus topology may use point-to-point, multi-drop (electrical parallel) and daisy-chain, and may further be based on hubs or switches. A point-to-point bus may be full-duplex, providing simultaneous, two-way transmission (and sometimes independent) in both directions, or alternatively a bus may be half-duplex, where the transmission can be in either direction, but only in one direction at a time. Buses are further commonly characterized by their throughput (data bit-rate), signaling rate, medium length, connectors and medium types, latency, scalability, quality-of-service, devices per connection or channel, and supported bus-width. A configuration of a bus for a specific environment may be automatic (hardware or software based, or both), or may involve user or installer activities such as software settings or jumpers. Recent buses are self-repairable, where spare connection (net) is provided which is used in the event of malfunction in a connection. Some buses support hot-plugging (sometimes known as hot swapping), where a connection or a replacement can be made, without significant interruption to the system or without the need to shut-off any power. A well-known example of this functionality is the Universal Serial Bus (USB) that allows users to add or remove peripheral components such as a mouse, keyboard, or printer. A bus may be defined to carry a power signal, either in separate dedicated cable (using separate and dedicated connectors), or commonly over the same cable carrying the digital data (using the same connector). Typically dedicated wires in the cable are used for carrying a low-level DC power levels, such as 33 VDC, 5 VDC, 12 VDC and any combination thereof. A bus may support master/slave configuration, where one connected node is typically a bus master (e.g., the processor or the processor-side), and other nodes (or node) are bus slaves. A slave may not connect or transmit to the bus until given permission by the bus master. A bus timing, strobing, synchronization, or clocking information may be carried as a separate signal (e.g. clock signal) over a dedicated channel, such as separate and dedicated wired in a cable, or alternatively may use embedded clocking (a.k.a. self-clocking), where the timing information is encoded with the data signal, commonly used in line codes such as Manchester code, where the clock information occurs at the transition points. Any bus or connection herein may use proprietary specifications, or preferably be similar to, based on, substantially or fully compliant with an industry standard (or any variant thereof) such as those referred to as PCI Express, SAS, SATA, SCSI, PATA, InfiniBand, USB, PCI, PCI-X, AGP, Thunderbolt, IEEE 1394, FireWire and Fibre Channel.

Fibre Channel, or FC, is a gigabit-speed network technology primarily used for storage networking, and has recently become the standard connection type for storage area networks (SAN) in enterprise storage. Fibre Channel is standardized in the T11 Technical Committee of the Inter-National Committee for Information Technology Standards (INCITS), an American National Standards Institute (ANSI) accredited standards committee. Fibre Channel signaling can run on both twisted pair copper wire and fiber-optic cables. Fibre Channel Protocol (FCP) is a transport protocol (similar to TCP used in IP networks) that predominantly transports SCSI commands over Fibre Channel networks. There are three major Fibre Channel topologies, describing how a number of ports are connected together: Point-to-Point (FC-P2P), where two devices are connected directly to each other; Arbitrated loop (FC-AL) where all devices are in a loop or ring (similar to token ring networking); and Switched fabric (FC-SW), where devices or loops of devices are connected to Fibre Channel switches (similar conceptually to modern Ethernet implementations). Some Fibre Channel devices support SFP transceiver, mainly with LC fiber connector, while some 1GFC devices used GBIC transceiver, mainly with SC fiber connector. Fibre Channel is further described in "Fibre Channel Solutions Guide" by FCIA—Fibre Channel Industry Association (www.fibre-channel.org, September 2010), "Technology Brief—Fibre Channel Basics", by Apple Computer, Inc. (May 2006), and Weimer T. of Unylogix, "Fibre Channel Fundamentals"

(available for download from the Internet October 2011), which are all incorporated in their entirety for all purposes as if fully set forth herein.

InfiniBand is a switched fabric communications link used in high-performance computing and enterprise data centers. Its features include high throughput, low latency, quality of service and failover, and it is designed to be scalable. InfiniBand offers point-to-point bidirectional serial links intended for the connection of processors with high-speed peripherals such as disks. On top of the point-to-point capabilities, InfiniBand also offers multicast operations as well. It supports several signaling rates and links can be bonded together for additional throughput. The SDR serial connection's signaling rate is 2.5 gigabit per second (Gbit/s) in each direction per connection. DDR is 5 Gbit/s and QDR is 10 Gbit/s. FDR is 14.0625 Gbit/s and EDR is 25.78125 Gbit/s per lane. Lanes can be aggregated in units of 4 or 12, called 4× or 12×. A 12×QDR link therefore carries 120 Gbit/s raw, or 96 Gbit/s of useful data. As of 2009, most systems use a 4× aggregate, implying a 10 Gbit/s (SDR), 20 Gbit/s (DDR) or 40 Gbit/s (QDR) connections. InfiniBand uses a switched fabric topology, as opposed to a hierarchical switched network like traditional Ethernet architectures. Most of the network topologies are Fat-Tree (Clos), mesh or 3D-Torus. The InfiniBand technology is further described in the White Paper "Introduction to InfiniBand™", Mellanox technologies Inc., Document Number 2003WP Rev. 1.90, in the document by Grim P. of InfiniBand™ Trade Association: "Introduction to InfiniBand™ for End Users", 2010, and in the White Paper "An Introduction to InfiniBand—Bringing I/O up to speed" Rev. Number v1.1, by JNI Corporation, Jan. 25, 2002, which are all incorporated in their entirety for all purposes as if fully set forth herein.

Serial ATA (SATA or Serial Advanced Technology Attachment) is a computer bus interface for connecting host bus adapters to mass storage devices such as hard disk drives and optical drives. Serial ATA industry compatibility specifications originate from The Serial ATA International Organization (a.k.a. SATA-IO, serialata.org), and the specification defines three distinct protocol layers: physical, link, and transport. Serial ATA was designed to replace the older parallel ATA (PATA) standard (often called by the old name IDE), offering several advantages over the older interface: reduced cable size and cost (7 conductors instead of 40), native hot swapping, faster data transfer through higher signaling rates, and more efficient transfer through an (optional) I/O queuing protocol. SATA host-adapters and devices communicate via a high-speed serial cable over two pairs of conductors. In contrast, parallel ATA (PATA) used a 16-bit wide data bus with many additional support and control signals, all operating at much lower frequency. To ensure backward compatibility with legacy ATA software and applications, SATA uses the same basic ATA and ATAPI command-set as legacy ATA devices. Advanced Host Controller Interface (AHCI) is an open host controller interface published and used by Intel, which has become a de facto standard. It allows the use of the advanced features of SATA such as hotplugging and native command queuing (NCQ). If AHCI is not enabled by the motherboard and chipset, SATA controllers typically operate in "IDE emulation" mode, which does not allow features of devices to be accessed if the ATA/IDE standard does not support them. The SATA standard defines a data cable with seven conductors (3 grounds and 4 active data lines in two pairs) and 8 mm wide wafer connectors on each end. SATA cables can have lengths up to 1 meter (33 ft), and connect one motherboard socket to one hard drive. The SATA standard specifies a power connector that differs from the decades-old four-pin Molex connector found on pre-SATA devices. Like the data cable, it is wafer-based, but its wider 15-pin shape prevents accidental mis-identification and forced insertion of the wrong connector type. Standardized in 2004, eSATA (the 'e' standing for external) provides a variant of SATA meant for external connectivity. While it has revised electrical requirements and the connectors and cables are not identical with SATA, the protocol and logical signaling are compatible on the (internal) SATA level. SATA uses a point-to-point architecture. The physical connection between a controller and a storage device is not shared among other controllers and storage devices. SATA defines multipliers, which allows a single SATA controller to drive multiple storage devices. The multiplier performs the function of a hub; the controller and each storage device are connected to the hub. The SATA bus, protocol and applications are further described in "Serial ATA technology, Technology Brief, 4th edition", by Hewlett-Packard Development Company, L.P., TC1108815, October 2011, in white paper "External Serial ATA", by Silicon Image, Inc., September 2004, in Krotov I. Redpaper: "IBM System x Server Disk Drive Interface Technology", IBM Corp. Document REDP-4791-00, Oct. 10, 2011, "Serial ATA Advanced Host Controller Interface (AHCI)", Revision 1.0, downloaded from Intel website, October 2011, and white-paper "Serial ATA—A comparison with Ultra ATA Technology", downloaded from www.seagate.com on October 2011, which are all incorporated in their entirety for all purposes as if fully set forth herein.

PCI Express (Peripheral Component Interconnect Express), officially abbreviated as PCIe, is a computer expansion card standard designed to replace the older PCI, PCI-X, and AGP bus standards. PCIe has numerous improvements over the aforementioned bus standards, including higher maximum system bus throughput, lower I/O pin count and smaller physical footprint, better performance-scaling for bus devices, a more detailed error detection and reporting mechanism, and native hot plug functionality. More recent revisions of the PCIe standard support hardware I/O virtualization. The PCIe electrical interface is also used in a variety of other standards, most notably ExpressCard, a laptop expansion card interface. Format specifications are maintained and developed by the PCI-SIG (PCI Special Interest Group), a group of more than 900 companies that also maintain the Conventional PCI specifications. PCIe 3.0 is the latest standard for expansion cards that is available on mainstream personal computers. Conceptually, the PCIe bus is like a high-speed serial replacement of the older PCI/PCI-X bus an interconnect bus using shared address/data lines. A key difference between a PCIe bus and the older PCI is the bus topology. PCI uses a shared parallel bus architecture, where the PCI host and all devices share a common set of address/data/control lines. In contrast, PCIe is based on point-to-point topology, with separate serial links connecting every device to the root complex (host). Due to its shared bus topology, access to the older PCI bus is arbitrated (in the case of multiple masters), and limited to 1 master at a time, in a single direction. A PCIe bus link supports full-duplex communication between any two endpoints, with no inherent limitation on concurrent access across multiple endpoints. In terms of bus protocol, PCIe communication is encapsulated in packets. The work of packetizing and de-packetizing data and status-message traffic is handled by the transaction layer of the PCIe port (described later). Radical differences in electrical signaling and bus protocol require the use of a different mechanical form factor and expansion connectors (and thus, new motherboards and new adapter boards); PCI slots and PCIe slots are not interchangeable. The PCIe link between 2 devices can consist of anywhere from 1 to 32 lanes. In a multi-lane link, the packet data is striped across lanes, and peak data-throughput scales with the overall link width. The lane count is automatically negotiated during device initialization, and can be restricted by either endpoint. For example, a single-lane PCIe (×1) card can be inserted into a multi-lane slot (×4, ×8, etc.), and the initialization cycle auto-negotiates the highest mutually supported lane count. The link can dynamically down-configure the link to use fewer lanes, thus providing some measure of failure tolerance in the presence of bad or unreliable lanes. The PCIe standard defines slots and connectors for multiple widths: ×1, ×4, ×8, ×16, and ×32. As a point of reference, a PCI-X (133 MHz 64 bit) device and PCIe device at 4-lanes (×4), Gen1 speed have roughly the same peak transfer rate in a single-direction: 1064 MB/sec. The PCIe bus has the potential to perform better than the PCI-X bus in cases where multiple devices are transferring data communicating simultaneously, or if communication with the PCIe peripheral is bidirectional. A lane is commonly composed of a transmit pair and a receive pair, each of differential lines. Each lane is composed of 4 wires or signal paths, meaning conceptually, each lane is a full-duplex byte stream, transporting data packets in 8-bit 'byte' format, between the endpoints of a link, in both directions simultaneously. Physical PCIe slots may contain from one to thirty-two lanes, in powers of two (1, 2, 4, 8, 16 and 32). Lane counts are written with an x prefix (e.g., ×16 represents a sixteen-lane card or slot), with ×16 being the largest size in common use. A PCIe card fits into a slot of its physical size or larger (maximum ×16), but may not fit into a smaller PCIe slot (×16 in an ×8 slot). Some slots use open-ended sockets to permit physically longer cards and negotiate the best available electrical connection. The number of lanes actually connected to a slot may also be less than the number supported by the physical slot size. A non-limiting example is a ×8 slot that actually only runs at ×1. These slots allow any ×1, ×2, ×4 or ×8 cards, though only running at ×1 speed. This type of socket is called a ×8 (×1 mode) slot, meaning that it physically accepts up to ×8 cards, but only runs at ×1 speed. The advantage is that it can accommodate a larger range of PCIe cards without requiring motherboard hardware to support the full transfer rate. This keeps the design and implementation costs down. The PCIe uses double-sided edge-connector, and power is provided over the same connection. PCI Express Mini Card (also known as Mini PCI Express, Mini PCIe, and Mini PCI-E) is a replacement for the Mini PCI form factor, based on PCI Express. PCI Express Mini Cards are 30×50.95 mm. There is a 52 pin edge connector, consisting of two staggered rows on a 0.8 mm pitch. Each row has 8 contacts, a gap equivalent to 4 contacts, then a further 18 contacts. A half-length card is also specified 30×26.8 mm. Cards have a thickness of 1.0 mm (excluding components). AdvancedTCA is a PCIe variant providing a complement to CompactPCI for larger applications; supports serial based backplane topologies. AMC: a complement to the AdvancedTCA specification; supports processor and I/O modules on ATCA boards (×1, ×2, ×4 or ×8 PCIe). It has the connector bracket reversed so it cannot fit in a normal PCI Express socket, but is pin compatible and may be inserted if the bracket is removed. FeaturePak is a tiny expansion card format (43×65 mm) for embedded and small form factor applications; it implements two ×1 PCIe links on a high-density connector along with USB, I2C, and up to 100 points of I/O. Thunderbolt is a variant from Intel that combines DisplayPort and PCIe protocols in a form factor compatible with Mini DisplayPort. The PCIe is further described in the tutorial "PCI Express—An Overview of the PCI Express Standard", National Instruments, Published Aug. 13, 2009, in the White Paper "Creating a PCI Express™ Interconnect", Intel Corporation, Downloaded October 2011, in "PHY Interface for the PCI Express™ Architecture", Version 2.00, Intel Corporation 2007, and in Cooper S., One Stop Systems, Presentation "Utilizing PCI Express Technology", Downloaded October 2011, which are all incorporated in their entirety for all purposes as if fully set forth herein.

Serial Attached SCSI (SAS) is a computer bus based on a point-to-point serial protocol that replaces the parallel SCSI bus technology and uses the standard SCSI command set. SAS offers backwards-compatibility with second-generation SATA drives. SATA 3 Gbit/s drives may be connected to SAS backplanes, but SAS drives may not be connected to SATA backplanes. The T10 technical committee of the International Committee for Information Technology Standards (INCITS) develops and maintains the SAS protocol; the SCSI Trade Association (SCSITA) promotes the technology. SASA is based on full-duplex with link aggregation (4-ports wide at 24 Gbit/s) over 10 meters external cable, and may connect to 255 device port expanders. At the physical layer, the SAS standard defines the connectors and voltage levels. The physical characteristics of the SAS wiring and signaling are compatible with and have loosely tracked that of SATA up to the present 6 Gbit/s rate, although SAS defines more rigorous physical signaling specifications as well as a wider allowable differential voltage swing intended to support longer cabling. While SAS-1.0/SAS-1.1 adopted the physical signaling characteristics of SATA at the 1.5 Gbit/s and 3 Gbit/s rates, SAS-2.0 development of a 6 Gbit/s physical rate led the development of an equivalent SATA speed. According to the SCSI Trade Association, 12 Gbit/s is slated to follow 6 Gbit/s in a future SAS-3.0 specification.

A typical Serial Attached SCSI system consists of an initiator, a target, a Service Delivery Subsystem and expanders: An Initiator is a device that originates device-service and task-management requests for processing by a target device and receives responses for the same requests from other target devices. Initiators may be provided as an on-board component on the motherboard (as is the case with many server-oriented motherboards) or as an add-on host bus adapter. A Target is a device containing logical units and target ports that receives device service and task management requests for processing and sends responses for the same requests to initiator devices. A target device could be a hard disk or a disk array system. A Service Delivery Subsystem is the part of an I/O system that transmits information between an initiator and a target. Typically, cables connecting an initiator and target with or without expanders and backplanes constitute a service delivery subsystem. Expanders are devices that form part of a service delivery subsystem and facilitate communication between SAS devices. Expanders facilitate the connection of multiple SAS End devices to a single initiator port. An initiator may connect directly to a target via one or more PHYs. Nearline SAS or NL-SAS drives are enterprise SATA drives with a SAS interface, head, media, and rotational speed of traditional enterprise-class SATA drives with the fully capable SAS interface typical for classic SAS drives.

The components known as Serial Attached SCSI Expanders (SAS Expanders) facilitate communication between large numbers of SAS devices. Expanders contain two or more external expander-ports. Each expander device contains at least one SAS Management Protocol target port for management and may contain SAS devices itself. For example, an expander may include a Serial SCSI Protocol target port for access to a peripheral device. An expander is not necessary to interface a SAS initiator and target but allows a single initiator to communicate with more SAS/SATA targets. Edge expanders can do direct table routing and subtractive routing. A fanout expander can connect up to 255 sets of edge expanders, known as an edge expander device set, allowing for even more SAS devices to be addressed. The subtractive routing port of each edge expanders will be connected to the PHYs of a fanout expander. The SAS is further described in White Paper "serial Attached SCSI and Serial Compatibility", Intel Corporation Doc. 0103/OC/EW/PP/1K—254402-001, 2002, in the Product Manual "Serial Attached SCSI (SAS) Interface Manual", Publication Ser. No. 10/029,3071, Rev. B, Seagate Technology LLC, May 2006, and in Technology Brief, $4^{th}$ edition, "Serial Attached SCSI technologies and architectures", Hewlett-Packard Development Company, L.P., TC0000772, August 2011, which are all incorporated in their entirety for all purposes as if fully set forth herein.

USB (Universal Serial Bus) is an industry standard developed in the mid-1990s that defines the cables, connectors and protocols used for connection, communication and power supply between computers and electronic devices. USB was designed to standardize the connection of computer peripherals, such as keyboards, pointing devices, digital cameras, printers, portable media players, disk drives and network adapters to personal computers, both to communicate and to supply electric power. It has become commonplace on other devices, such as smartphones, PDAs and video game consoles. USB has effectively replaced a variety of earlier interfaces, such as serial and parallel ports, as well as separate power chargers for portable devices. A USB system has an asymmetric design, consisting of a host, a multitude of downstream USB ports, and multiple peripheral devices connected in a tiered-star topology. Additional USB hubs may be included in the tiers, allowing branching into a tree structure with up to five tier levels. A USB host may have multiple host controllers and each host controller may provide one or more USB ports. Up to 127 devices, including the hub devices (if present), may be connected to a single host controller. USB devices are linked in series through hubs. There always exists one hub known as the root hub, which is built into the host controller. A physical USB device may consist of several logical sub-devices that are referred to as device functions. A host assigns one and only one device address to a function.

USB device communication is based on pipes (logical channels). A pipe is a connection from the host controller to a logical entity, found on a device, and named an endpoint. Because pipes correspond 1-to-1 to endpoints, the terms are sometimes used interchangeably. A USB device can have up to 32 endpoints: 16 into the host controller and 16 out of the host controller. The USB standard reserves one endpoint of each type, leaving a theoretical maximum of 30 for normal use. USB devices seldom have this many endpoints. There are two types of pipes: stream and message pipes, depending on the type of data transfer isochronous transfers, at some guaranteed data rate (often, but not necessarily, as fast as possible) but with possible data loss (e.g., real-time audio or video), interrupt transfers, relating devices that need guaranteed quick responses (bounded latency) (e.g., pointing devices and keyboards), bulk transfers, where large sporadic transfers using all remaining available bandwidth, but with no guarantees on bandwidth or latency (e.g., file transfers), and control transfers, typically used for short, simple commands to the device, and a status response, used, for example, by the bus control pipe number 0. Endpoints are grouped into interfaces and each interface is associated with a single device function. An exception to this is endpoint zero, which is used for device configuration and which is not associated with any interface. A single device function composed of independently controlled interfaces is called a composite device. A composite device only has a single device address because the host only assigns a device address to a function.

The USB 1.x and 2.0 specifications provide a 5 V supply on a single wire from which connected USB devices may draw power. The specification provides for no more than 5.25 V and no less than 4.75 V (5 V±5%) between the positive and negative bus power lines. For USB 3.0, the voltage supplied by low-powered hub ports is 4.45-525 V. A unit load is defined as 100 mA in USB 2.0, and 150 mA in USB 3.0. A device may draw a maximum of 5 unit loads (500 mA) from a port in USB 2.0; 6 (900 mA) in USB 3.0. There are two types of devices: low-power and high-power. A low-power device draws at most 1 unit load, with minimum operating voltage of 4.4 V in USB 2.0, and 4 V in USB 3.0. A high-power device draws the maximum number of unit loads permitted by the standard. Every device function initially as low-power, but the device may request high-power and will get it if the power is available on the providing bus. Some devices, such as high-speed external disk drives, require more than 500 mA of current and therefore cannot be powered from one USB 2.0 port. Such devices usually come with a Y-shaped cable that has two USB connectors to be plugged into a computer. With such a cable a device can draw power from two USB ports simultaneously. A bus-powered hub initializes itself at 1 unit load and transitions to maximum unit loads after it completes hub configuration. Any device connected to the hub will draw 1 unit load regardless of the current draw of devices connected to other ports of the hub (i.e. one device connected on a four-port hub will draw only 1 unit load despite the fact that more unit loads are being supplied to the hub). A self-powered hub will supply maximum supported unit loads to any device connected to it. In addition, the VBUS will present 1 unit load upstream for communication if parts of the hub are powered down.

USB supports the following signaling rates (the terms speed and bandwidth are used interchangeably, and "high-" is alternatively written as "hi-"). A low-speed rate of 1.5 Mbit/s (~183 kB/s) is defined by USB 1.0. It is very similar to full-bandwidth operation except each bit takes 8 times as long to transmit. The full-speed rate of 12 Mbit/s (~1.43 MB/s) is the basic USB data rate defined by USB 1.0. All USB hubs support full-bandwidth. A high-speed (USB 2.0) rate of 480 Mbit/s (~57 MB/s) was introduced in 2001. All hi-speed devices are capable of falling back to full-bandwidth operation if necessary; i.e., they are backward compatible with USB 1.1. Connectors are identical for USB 2.0 and USB 1.x. A SuperSpeed (USB 3.0) provides a rate of 5.0 Gbit/s (~596 MB/s). USB 3.0 connectors are generally backwards compatible, but include new wiring and full duplex operation. USB signals are transmitted on a twisted-pair data cable with 90Ω±15% characteristic impedance, labeled D+ and D−. Prior to USB 3.0, half-duplex differential signaling was used to reduce the effects of electromagnetic noise on longer lines. Transmitted signal levels are 0.0 to 03 volts for low and 2.8 to 3.6 volts for high in full-bandwidth and low-bandwidth modes, and −10 to 10 mV for low and 360 to 440 mV for high in hi-bandwidth mode. In FS mode, the cable wires are not terminated, but the HS mode has termination of 45Ω to ground, or 90Ω differential to match the data cable impedance, reducing interference due to signal reflections. USB 3.0 introduces two additional pairs of shielded twisted wire and new, mostly interoperable contacts in USB 3.0 cables, for them. They permit the higher data rate, and full duplex operation. The USB is further described in "Universal Serial Bus 3.0 Specification", Revision 1.0, Jun. 6, 2011, downloaded from www.usb.org, and in Peacock C., "USB in a Nutshell", $3^{rd}$ Release, November 23, which are all incorporated in their entirety for all purposes as if fully set forth herein.

It is useful to protect users and data from unauthorized use or access. In one non-limiting example, user data or other confidential information may be left on disk drives removed from computers and storage systems, such as at systems end-of-life. For example, there is a legal requirement, according to the federal standard NIST 800-88: "Guidelines for Media Sanitization", September 2006, for erasing (sanitizing) records, and as described in the Ponemon Institute document "Fourth Annual US Cost of Data Breach study", January 2009, which are both incorporated in their entirety for all purposes as if fully set forth herein.

Such sanitization techniques use non destructive actions, such as deleting files and block erase (such by formatting or overwriting by external dedicated software, for example as required by DOD 5220), while other techniques use destructive means such as physical drive destruction and disk drive degaussing. When using physical drive destruction, disks removed from disk drives are broken up or ground into microscopic pieces. Similarly, degaussers may be used to erase magnetic data on disk drives, while creating high intensity magnetic fields that erase all magnetic recordings in a hard disk drive (or magnetic tape). A non-destructive means include in-drive encryption using an encryption key. Various sanitization requirements and schemes of disk drives, as well as limitations of the various schemes, are described in Hughes G., Coughlin T., "Tutorial on Disk Drive Data Sanitization" (September 2006), in Edelstein R., Converge Net Inc., "The Limitation of Software Based Hard Drive sanitization—The Myth of a Legacy Technology" (September 2007), in Edelstein R., Converge Net Inc., "Data Loss Prevention: Managing the Final Stage of the Data Life Cycle Model—A Perspective on Decommissioning Storage Technology" (May 2007), in Hughes G. F. and Commins D. M. of University of California, Coughlin T. of Coughling Associates, "Disposal of Disk and Tape Data by secure sanitization", Co-published by the IEEE Computer and Reliability Societies (IEEE Security & Privacy pg. 29-34, July/August 2009), which are all incorporated in their entirety for all purposes as if fully set forth herein.

In consideration of the foregoing, it would be an advancement in the art to provide an improved networking or storage security method and system that is simple, secured, cost-effective, faithful, reliable, easy to use or sanitize, has a minimum part count, minimum hardware, and/or uses existing and available components, protocols, programs and applications for providing better security and additional functionalities, and provides a better user experience.

SUMMARY

A method for improving the security of transferring a message composed of a succession of message elements from a sender to a recipient over multiple paths in the Internet, and an apparatus for executing the method are described. The intermediate servers are serving as interposition relay servers that act as a link between the sender and recipient, and passes along the data therebetween. The sender, the recipient and the servers are each associated with an IP (Internet Protocol) address for being addressable in the Internet, the method executed by the sender comprising the steps of partitioning the message into a plurality of message slices according to a slicing scheme, each message slice containing one or more of the message elements, associating each message slice with an intermediate server according to an associating scheme, and sending each message slice together with the IP address of the recipient to the server associated with the message slice. Each message may use a different slicing scheme and a different associating scheme. One or all of the plurality of intermediate servers executes the steps of receiving and identifying a message slice and the IP address of the recipient, and sending the message slice with the IP address to the recipient or to another intermediate server. The recipient executes the steps of receiving and identifying a plurality of the message slices, and reconstructing at least part of the original message as it existed before the partitioning step by the sender.

The sender method steps may be preceded by the step of determining the number of message slices to use for the message partitioning, followed by the step of partitioning the message into the determined number of message slices. The number of message slices to use for the message partitioning may be a random number. The sender method steps may be preceded by the step of determining the number of message elements in each of the message slices used for the message partitioning, followed by the step of partitioning the message into message slices each having the determined number of message elements. The message slices may have the same or distinct number of message elements. The number of message elements included in each of the message slices may be a random number. The slicing scheme may be based on a non-overlapping partitioning, wherein each of the message elements is included in a single message slice, or an overlapping partitioning, wherein each of the message elements is included in two or more message slices.

The slicing scheme may be based on sequential partitioning, where the message elements in one or more of the message slices follow one another the same as in the message, or non-sequential partitioning, where the message elements in one or more of the message slices do not follow one another the same as in the message. The slicing scheme may be based on interval sequential partitioning, where the message elements in one or more of the message slices are separated by at least one intervening element in the message.

Each of the message elements may be a bit, a nibble, a byte or a multi-byte word, and may represent a number or a character. The sender method may be preceded by a step of padding the message, or padding one or more of the message slices after the partition. The slicing scheme may involve partitioning that is based on the current date or the current TOD (Time-of-Day).

The slicing scheme or any other information about the partitioning may be sent together with one or more of the message slices. Further, information about a message slice is sent together with another slice. The order of sending the message slices may be random, or based on the order of the first message element in each message slice of the message.

The method of the sender may be preceded by the step of encrypting the message before the partitioning, and partitioning is executed on the encrypted message, and the step of decrypting the reconstructed message follows the method steps at the recipient. Further, the method of the sender may be preceded by the step of encrypting at least part of the message slices after the partition at the sender or at an intermediate server, and the step of decrypting or encrypting a message slice may precede the sending of the message slice at the intermediate server. Further, the step of decrypting at least part of the message slices may precede the reconstruction of the message at the recipient.

The intermediate servers may be located in geographically disparate locations, such as different cities, different states, different countries or different continents. One or more of the intermediate servers may further execute the steps of storing the message slice, the IP address of the sender or the IP address of the recipient.

The sender or an intermediate server method may further be preceded by the step of storing a list composed of a succession of IP addresses available as source IP addresses for use by the associating scheme. The associating scheme may associate a packet including a message slice to each of the IP addresses in the list, such that a distinct source IP address is associated with each message slice. The associating scheme may associate the entire or part of the source IP addresses in the list with a packet including a message slice. The associating scheme may sequentially or randomly associate the source IP address in the list with the succession of packets including the message slices. The source IP addresses may be selected for association from the list randomly, based on the former selection for a message or message slice, or based on the current date or the current TOD (Time-of-Day).

The sender, the recipient, or an intermediate server may be a dedicated device or part of a device, and may comprise a memory, and a processor configured by the memory to perform the sender, recipient, or intermediate server method. A sender may be part of the computer wherein the message to be sent is originated, or connected for receiving the message to be sent from another computer via a network such as a LAN or Intranet, commonly used in an enterprise or other business entity. The sender or the receiver (or the intermediate server) may be co-located or integrated with a computer, router (e.g., NAT-enabled router), a gateway or a firewall (e.g., sharing an enclosure, an Internet connection, a LAN connection, an IP address, a processor or a peripheral device), and connected between a LAN and the Internet.

The intermediate servers may be dedicated servers, or may be integrated with other servers (e.g., sharing an enclosure, an Internet connection, a LAN connection, an IP address, a processor or a peripheral device), having a specific distinct functionality, such as a web server, online gaming server, instant messaging server, a database server, a mail server, a FTP file transfer server, e-mail server, audio/video streaming server, a DHCP server, or a DNS server. As part of such integration, the intermediate server shares with the other server an enclosure, an Internet connection, an IP address, a processor, or a peripheral device. Further, part or all of the communication (such as transfer of packets containing message slices) between the sender, the recipient, and the intermediate servers may be based on the source routing technique, either strict or LSRR, or based on onion routing, such as the Tor technique.

Each or all of the intermediate servers may execute a method for relaying a message from a sender to a recipient. The sender and the recipient are each associated with an IP (Internet Protocol) for being addressable in the Internet, and the method executed by an intermediate server includes the steps of receiving from the sender a packet which includes as a payload the message and the recipient IP address, followed by extracting and identifying the message, the sender IP address and the recipient IP address from the received packet, followed by sending the message together with the sender IP address to the recipient or to an intermediate server. In the case wherein part of the message is encrypted, the method may further include the step of decrypting the message after receiving it. Further, the method may further include the step of encrypting the message before sending it.

In one aspect, the message is composed of a succession of message elements, and the method executed by one or all of the intermediate servers further includes the steps of partitioning the message into a plurality of message slices, each message slice containing one or more of the message elements, and sending each message slice together with the IP address of the sender to the recipient or to another intermediate server.

The method may be used for real-time applications or services, and for the delivery of audio or video information, such as VoIP, video conferencing, IPTV or Internet telephony service. The slicing scheme or the associating scheme may be random and based on a random number, which may be based on a physical process or on an algorithm for generating pseudo-random numbers.

An intermediate server, or all of them, may further execute the steps of partitioning the received message slice into a plurality of sub-slices, each sub-slice containing one or more of the message elements, and sending the sub-slices with the IP address of the recipient to another intermediate server or to the recipient.

The sender steps or the recipient steps may be executed by a dedicated software module, or integrated with the application involved in generating the message to be sent or using the received message. The same software module or the same hardware may serve as both the sender and the intermediate server, wherein the sender steps and the intermediate server steps are respectively executed by a single software module or executed by the same processor. The same software module or the same hardware may serve as both the recipient and the intermediate server, wherein the recipient steps and the intermediate server steps are respectively executed by a single software module or executed by the same processor.

The slicing scheme and the associating scheme may be determined at the sender, or the sender method may be preceded by the step of receiving and storing the slicing scheme. The slicing scheme and the associating scheme may be received via the Internet from the recipient, from one of the intermediate servers or from another server. The slicing scheme and the associating scheme may be periodically received, at random or based on a date or on TOD. A slicing may be used in storing a message in multiple memories.

A CAPTCHA may be used to improve the communication security. The CAPTCHA may be added to, integrated with, embedded in or a part of a message or a message slice. In one example, the message or a portion thereof may be embedded in a CAPTCHA, such as using the characters of a message (or a message slice) as the basis for generating CAPTCHA image. In another example, the CAPTCHA includes part or all of the information required to decrypt the received message or slice. A CAPTCHA may include information about a key public or private) used for encryption. In one example, the CAPTCHA may include information about the slicing scheme or any other information involving the reconstruction of the sent message.

In one aspect scrambling and de-scrambling schemes are used for encrypting and decrypting a digital data content written onto a memory (or memories) or storage (or storages). The memory (or storage) physical means may be based on electrostatic, ferroelectric, magnetic, acoustic, optical, chemical, electronic, electrical, or mechanical storage medium. The memory may semiconductor (a.k.a. Solid-state) based, and in the form of a chip, IC, module, ICs mounted on a PCB, memory card, or a rigidly enclosed box. The memory may be volatile or non-volatile, and may be of static or dynamic types. The memory may be written more than once at any time, or may be written once, as part of the manufacturing process or afterwards (e.g. by the user using a dedicated equipment, or as part of an electronic circuit as part of normal operation). The memory may use random or sequential access. Further, the memory may be location-addressable or file-addressable or content-addressable. The memory may employ a non-removable medium, or a removable medium associated with a suitable writer/reader (or read-only) drive. A memory may be accessed using a parallel or serial connection or bus, and may be powered from a dedicated connection or from the bus connection. The memory is commonly characterized by its capacity and access time, and may be designed as portable or as in-computer enclosure. The memory may be a DAS, or part of NAS or SAN.

Any connection herein, such as the connection of peripherals in general, and memories in particular to a processor, may use a bus. A communication link (such as Ethernet, or any other LAN, PAN or WAN communication links may also be regarded as buses herein. A bus may be an internal bus, an external bus or both. A bus may be a parallel or a bit-serial bus. A bus may be based on a single or on multiple serial links or lanes. The bus medium may electrical conductors based such as wires or cables, or may be based on a fiber-optic cable. The bus topology may use point-to-point, multi-drop (electrical parallel) and daisy-chain, and may further be based on hubs or switches. A point-to-point bus may be full-duplex, or half-duplex. Further, a bus may use proprietary specifications, or may be based on, similar to, substantially or fully compliant to an industry standard (or any variant thereof), and may further be hot-pluggable. A bus may be defined to carry only digital data signals, or may also defined to carry a power signal (commonly DC voltages), either in separated and dedicated cables and connectors, or may carry the power and digital data together over the same cable. A bus may support master/slave configuration. A bus may carry a separated and dedicated timing signal or may use self-clocking line-code.

In one aspect, an address scrambler that is connectable between a processor (directly connected or via a bus) and the memory (directly connected or via a bus) or memories is disclosed. When addressing the memory, the address scrambler converts the address word to another address word according to a conversion scheme, which may be a one-to-one mapping scheme. Alternatively or in addition, a data scrambler is connected between a processor (directly connected or via a bus) and the memory (directly connected or via a bus). When writing to the memory, the data scrambler converts the data word to be written to another data word according to a conversion scheme, which may be a one-to-one mapping scheme. When reading from the memory, the inverse conversion scheme may be applied to the data word read from the memory, in order to reconstruct the original word written. Each of the data and address scramblers may be connections-based, where the significance of the address or data bits in the address or data words respectively is changed. Each of the data and address scramblers may be based on any combinational logic that may be based on discrete logic gates, ASICs, PLDs, memory, processor or any combination thereof. The memory may be a non-removable or a removable medium type, where the written information on the medium is scrambled (using address or data scrambling or both), and thus cannot be eligibly read without passing through the suitable de-scrambling scheme.

The scrambling scheme (or any of the scramblers or both) may be one-time set or programmed, such as in manufacturing, or by the user using a dedicated programmer or on-board programming during regular system operation. Alternatively or in addition, the scrambling scheme may be field changed and overwritten/programmable in the field, such as by the processor accessing the memory. Further, the scramblers may be volatile or non-volatile. Each of the scramblers (or both) may include a random number generator, used to write a random number in defined parts of the memory, such as during write cycles.

Both data and address scramblers may be simultaneously used in accessing the same memory. The scrambler may use same, similar or different scrambling schemes, handle same or different bus widths, and may be based on the same or different implementations and component types. The two scramblers may be integrated together to share the same enclosure, mechanical support, connectors, power sources, interfaces or support circuitry. In the case where the address word, the data word, or both, are carried using a bit-serial connection or communication such as serial bus, the address (or data) word from the processor is first extracted, then the address (or data) word is identified and converted, and then inserted back to the serial stream connected to the memory. The conversion may use converting the serial address (or data) word to parallel, converting to another parallel address (or data) word according to a conversion scheme, and the parallel converted word is then serialized and combined over the bit-serial connection or communication.

An adapter may include a data scrambler, address scrambler, or both, as well as encryption, and interfaces required for connecting to the processor (directly or via a bus) and to the memory (directly or via a bus). The adapter, or any part thereof, may include passive or power consuming (active) electronic circuits. The adapter, or any part thereof, may be powered from the power source (AC or DC) or the power supply powering the processor, from the power source (AC or DC) or the power supply powering the memory or both. Alternatively, the adapter (or any part thereof) may be powered from a separate or a dedicated power source or power supply. Alternatively, the adapter (or any part thereof) may be powered via the bus or other connection to the processor, and may also power feed the memory directly or via the connection or bus. Alternatively, the adapter may be powered from a separate or a dedicated power source or power supply. Alternatively, the adapter may be powered via the bus or other connection to the memory, and may also power feed the processor directly or via the connection or bus. The powering via a connection (such as a connector) or bus may use a dedicated cable, where the cable is having power-dedicated wires or conductors, or by using power and data carried over the same wires such as by using FDM or phantom scheme. In the case of using FDM, the adapter includes circuits for splitting the power and data signals, such as a power-pass filter substantially passing the power signal and substantially stopping the data signal, working together with a data-passing filter substantially passing the data signal and substantially stopping the power signal. Alternatively, a capacitor connected to a transformer center-tap may be used for separating the power and data signals. In the case of phantom scheme, two transformers may be used, passing the data signal (or signals) between the primary and secondary windings or the transformers, while the power is accessed at the transformers center-taps. The adapter may use a dedicated power connector for receiving power thereof, or may use a connector that connect to a cable (such as a bus cable) carrying both power and data over the same cable.

Further, the adapter (or any part thereof) may be used to supply power to a device connected to it, such as a memory. Such powering may be via a connection or bus that use a dedicated cable, or by using the same cable and having power-dedicated wires or conductors, or by using power and data carried over the same wires such as by using FDM or phantom scheme. In the case of using FDM, the adapter includes circuits for combining the power and data signals, such as a power-passing filter substantially passing the power signal and substantially stopping the data signal, working together with a data-passing filter substantially passing the data signal and substantially stopping the power signal. Alternatively, a capacitor connected to a transformer center-tap may be used for combining the power and data signals. In the case of phantom scheme, two transformers may be used, passing the data signal (or signals) between the primary and secondary windings or the transformers, while the power is supplied at the transformers center-taps.

Adapters may be provided (or manufactured) where each one includes a distinct address scrambling scheme, distinct data scrambling scheme, or both. Alternatively, adapters may be provided (or manufactured) in pairs or other groups sharing the same scrambling scheme.

An adapter or an address/data scrambler (or any part thereof) may be implemented by software or firmware, hardware or a combination of both. The hardware may be a separate physical entity, implemented in the form of a die, an IC, a box-shaped enclosure, or a PCB carrying ICs and other electronic components (such as plug-in or removable module). Alternatively or in addition, the circuits and functionalities may be integrated with a processor, a memory or an intermediate device, such as hub, switch, router or bus expander. In the case of a separate physical entity, the electrical connections can make use of standard expansion or bus connectors, including edge connectors. Each connection may be keyed and preferably supports hot-plugging.

In one aspect, an adapter for connecting to a processor and to a location-addressable memory capable of storing data words in an address space is disclosed. The memory may be connectable to the processor via a bus of a first type, and the adapter may comprise a first port connectable to a first bus of the first type; a first interface coupled to the first port for receiving a first data word associated with an address in the address space; a second port connectable to a second bus; a second interface coupled to the second port for transmitting a second data word associated with the address; and a scrambler connected between the first and second interfaces for converting the first data word to the second data word, distinct from the first data word; and wherein one of the first and second buses is connectable to a processor and the other is connectable to a memory.

In one aspect, an adapter for connecting to a processor and to a memory (such as location-addressable memory) having an address space is disclosed. The memory is connectable to the processor via a bus of a first type. The adapter comprising a first port connectable to a first bus of the first type for connecting to the processor, a first interface coupled to the first port for receiving a first address word in the address space from the processor; a second port connectable to a second bus for connecting to the memory; a second interface coupled to the second port for transmitting a second address word in the address space to the memory; and a scrambler connected between the first and second interfaces for converting the first address word to a second address word distinct from the first address word. The first address word may be converted to the second address word using a one-to-one mapping, and the scrambler may be based only on electrical connections. Each of the first and second address words may define a sequence of bits, and the conversion may include re-arranging the sequence of at least two bits of the address words. Each of the first and second address words may comprise multiple bits, and a level of significance may be associated with each of the bits, and the conversion may include changing the significance level of at least two bits in the address words.

The scrambler may be based on logic gates implementing a Boolean function, such as discretely packaged logic gates, PLD, memory or a processor. The conversion may be according to a pre-set conversion scheme, which may be is programmable by the processor. The scrambler may be coupled to the first bus for being addressed by the processor. The second bus type may be of the same type of the first bus, or may be of a type that is distinct from the first bus type. The adapter may include the memory, and the memory may be based on electrostatic, ferroelectric, magnetic, acoustic, optical, chemical, electronic, electrical, or mechanical storage medium, or any combination thereof. The memory is file-addressable or content-addressable, and may be part of a NAS or a SAN. The memory may be a once written memory, and may be connectable to the processor to be read from, or written to, via the second bus, which may be a parallel bus or a bit-serial bus.

The adapter may comprise a power supply having a power port couplable to be powered from a power source, where the power supply is having one or more DC outputs for powering at least part of the memory. The adapter may comprise a power connector for connecting to the power source, and the power port may be coupled to the power connector. The second bus may be based on a cable carrying a power signal, and the adapter may further comprise a bus connector for connecting to the cable, and the power port may be coupled to the bus, and connected for powering the power supply from the power signal.

The memory may be a random-accessed or a sequential-accessed memory, and may be location-based, randomly-accessed, and can be written multiple times. The memory may be volatile and based on semiconductor storage medium, such as: RAM, SRAM, DRAM, TTRAM and Z-RAM. The memory may be non-volatile and based on semiconductor storage medium, such as ROM, PROM, EPROM or EEROM, and may be Flash-based, such as SSD drive or USB 'Thumb' drive. The memory may be based on non-volatile magnetic storage medium, such as HDD. The memory may be based on an optical storage medium that is recordable and removable, and may include an optical disk drive. The storage medium may be: CD-RW, DVD-RW, DVD+RW, DVD-RAM BD-RE, CD-ROM, BD-ROM or DVD-ROM. The adapter or the memory (or both) form factor may be an IC, a PCB on which one or more ICs are mounted, or a box-shaped enclosure.

The adapter may further comprise an encryptor/decryptor functionality that is using an encryption scheme that is coupled between the first and second interfaces, for encrypting and decrypting digital data between the first and second buses. The encryption scheme may be based on AES 128, 192 or 256 bits.

The first bus or the second bus (or both) may each be based on a PAN, a LAN or a WAN communication link. The first bus or the second bus (or both) may each be based on Ethernet and may be substantially compliant with IEEE 802.3 standard, and be based on one out of: 100BaseT/TX, 1000BaseT/TX, 10 gigabit Ethernet substantially (or in full) according to IEEE Std 802.3ae-2002as standard, 40 Gigabit Ethernet, and 100 Gigabit Ethernet substantially according to IEEE P8023ba standard. The first bus or the second bus (or both) may each be based on a multi-drop, a daisy-chain topology, or a point-to-point connection, use half-duplex or full-duplex, and may employs a master/slave scheme. The first bus or the second bus (or both) may each be a wired-based, point-to-point, and bit-serial bus, wherein a timing, clocking or strobing signal is carried over dedicated wires, or using a self-clocking scheme. Each of the buses (or both) may use a fiber-optic cable as the bus medium, and the adapter may further comprise a fiber-optics connector for connecting to the fiber-optic cable.

Each of the buses (or both) may use conductors such as a bus cable including multiple wires, and the adapter may further comprise a bus connector for connecting to the bus cable. The bus cable may carry one or more DC or other power signals, over dedicated wires or over the same wires carrying the digital data. The adapter may comprise a power/data splitter arrangement having first, second and third ports, wherein only the digital data signal is passed between the first and second ports, and only the power signal is passed between the first and third ports, and wherein the first port is coupled to the bus connector. The power and digital data signals may be carried using FDM, where the digital data signal is carried over a frequency band above and distinct from the power signal. The power/data splitter may comprise an HPF coupled between the first and second ports, and a LPF coupled between the first and third ports, or a transformer and a capacitor connected to the transformer windings. The power and digital data signals may be carried using phantom scheme substantially according to IEEE 802.3af-2003 or IEEE 802.3at-2009 standards, and the power/data splitter may comprise at least two transformers having a center-tap connection.

The adapter may at least in part supply one or more power signals are DC type carried over dedicated wires or carried over the same wires carrying digital data. The adapter may comprise a power/data combiner arrangement having first, second and third ports, wherein only the digital data signal is passed between the first and second ports, and only the power signal is passed between the first and third ports, and wherein the first port is coupled to the bus connector. The power and digital data signals may be carried using FDM, where the digital data signal is carried over a frequency band above and distinct from the power signal, and the power/data combiner may comprise an HPF between the first and second ports and a LPF between the first and third ports. The power/data combiner may comprise a transformer and a capacitor connected to the transformer windings. The power and digital data signals may be carried using a phantom scheme substantially according to IEEE 8023af-2003 or IEEE 802.3at-2009 standards, and the power/data combiner may comprise at least two transformers having a center-tap connection.

The adapter may be implemented as a separate physical entity, such as in the form of a die, an IC, a box-shaped enclosure, or a PCB carrying ICs and other electronic components, a plug-in card or a removable enclosure. The adapter may be integrated with the memory, integrated with the processor, or with an intermediate device, such as a hub, a switch, a router or a bus expander.

Each of the buses may be based on a cable, and the respective first port or second port may be a connector connectable to the cable. The cable may include conductive wires or may be a fiber-optic cable. The first interface or the second interface may comprise a transmitter and a receiver coupled to the connector for respectively transmitting to, and receiving from, the cable. The transmitter may use differential signaling, emphasis shaping, or self-clocking line-code, and may employ error detection, alignment, clock-correction or channel-bonding. The receiver may use equalization, impedance matching termination, or PLL, and may use decoding and detecting encoding-based errors. The first bus may be a serial bus, and the adapter may comprise a serializer and de-serializer coupled between the first interface and the scrambler, for converting to parallel the digital data received from the first interface and for serializing the digital data received from the scrambler. The second bus may be a serial bus, and wherein the adapter further comprises a serializer/de-serializer coupled between the second interface and the scrambler, for converting to parallel the digital data received from the second interface and for serializing the digital data received from the scrambler.

The adapter may be integrated with the processor or the memory, and may comprise a component shared with the processor or the memory. The adapter may comprise a single enclosure housing the first and second ports, the first and second interfaces and the scrambler, and the enclosure may further house the processor or the memory. The adapter may comprise a power supply for powering at least part of the adapter, and the power supply may be connected to also power the processor or the memory. The adapter may comprise components mounted on a substrate (such as a PCB), and the substrate may be used to also support the processor or the memory.

In one aspect, a set of two or more adapters is disclosed, wherein both adapters use scramblers having the same scrambling schemes. The adapters may be are mechanically attached, mechanically detachable or both. The adapter may be formed as a plug-in and removable unit with the memory or a computer including the processor. The adapter may be used for DRM, allowing access or authentication to a scrambled software.

In one aspect, information is stored in multiple memories. The information is overlapping or non-overlapping split into multiple portions stored in the multiple memories. The splitting may be address based, data (such as data word) based, or both. The address space required is overlapping or non-overlapping split between the memories, where each address is associated with an address (or multiple addresses) in the memories using a mapping scheme. The mapping may be sequential or non-sequential. Alternatively or in addition, the data word to be stored is overlapping or non-overlapping split between the memories using a mapping scheme. The locations in the memories not used may be filled with random data.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope:

FIG. 9a illustrates schematically a simplified flow chart of part of a method for single hop relaying a message slice;

FIG. 9b illustrates schematically a simplified flow chart of part of a method for multi-hop relaying a message slice;

DETAILED DESCRIPTION

Figure 1A:
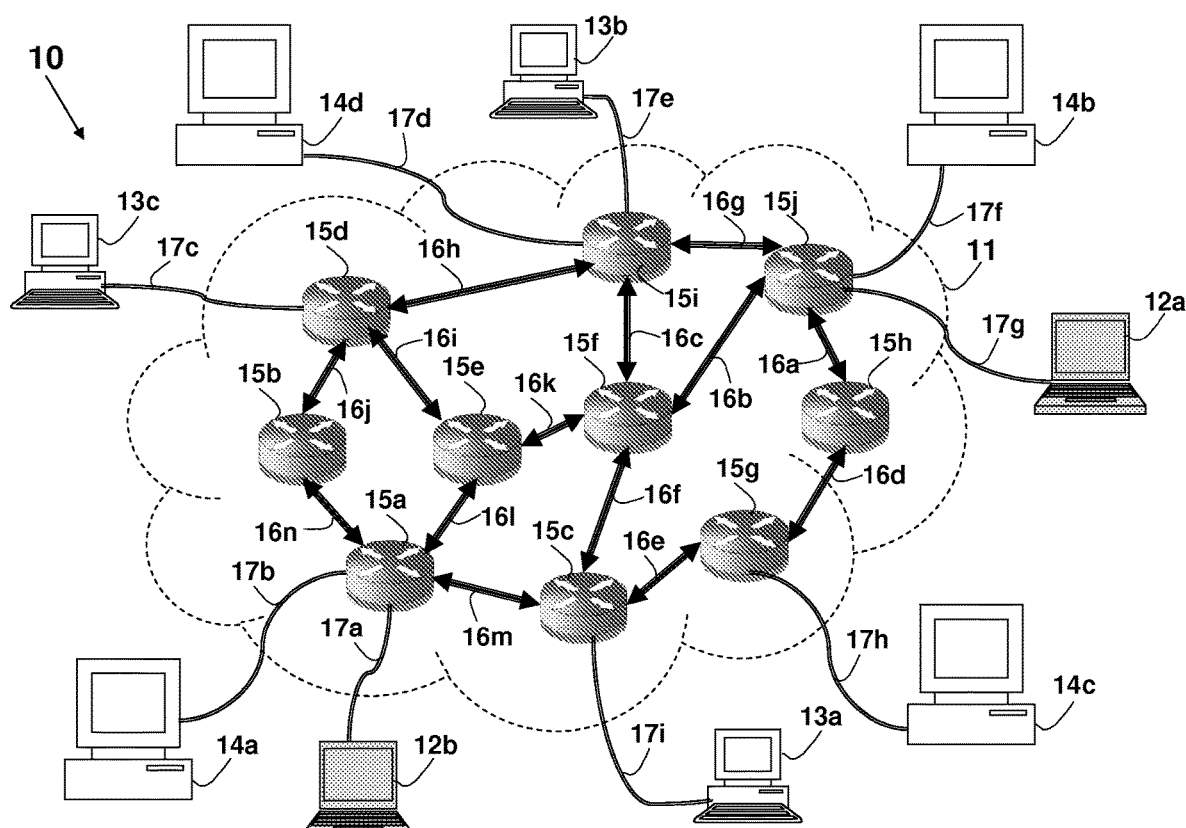
FIG. 1a depicts schematically the Internet and computers connected to the Internet.
Figure 1B:
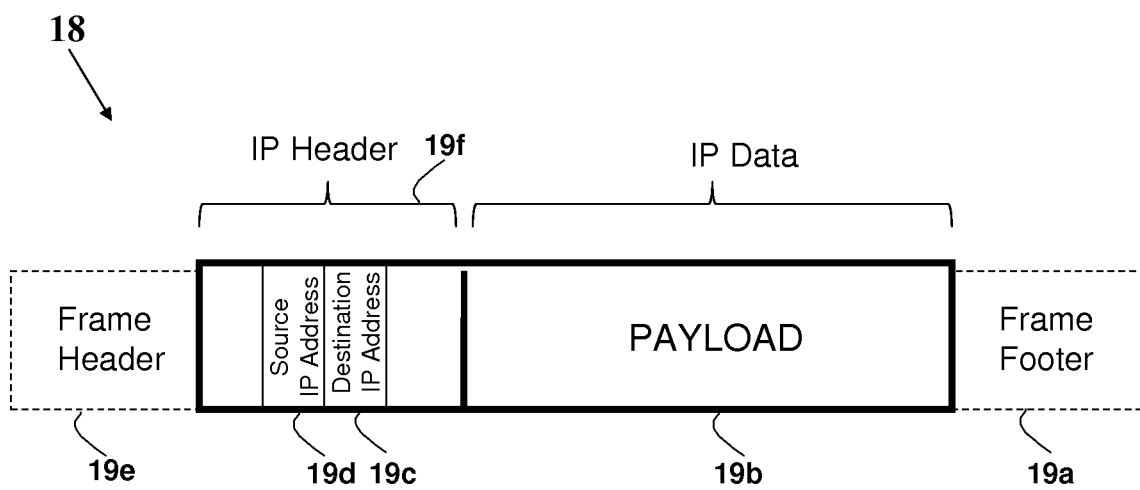
FIG. 1b illustrates an example of a construction of an IP-based packet.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and devices. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

In one aspect, a message to be transmitted via the Internet is first sliced into one or more parts ('slices'). Each message slice is combined with the ultimate destination address, and slicing information. The modified message encapsulating the slice of the message and the ultimate destination address is sent as one or more packets to a relay server on the Internet, which is not necessarily associated with the ultimate destination device. The relay server may then identify the ultimate destination and forward the message slice to the ultimate destination (with the source address encapsulated into the packets), or alternatively send the message to another relay server, which will repeat the process.

Figure 2:
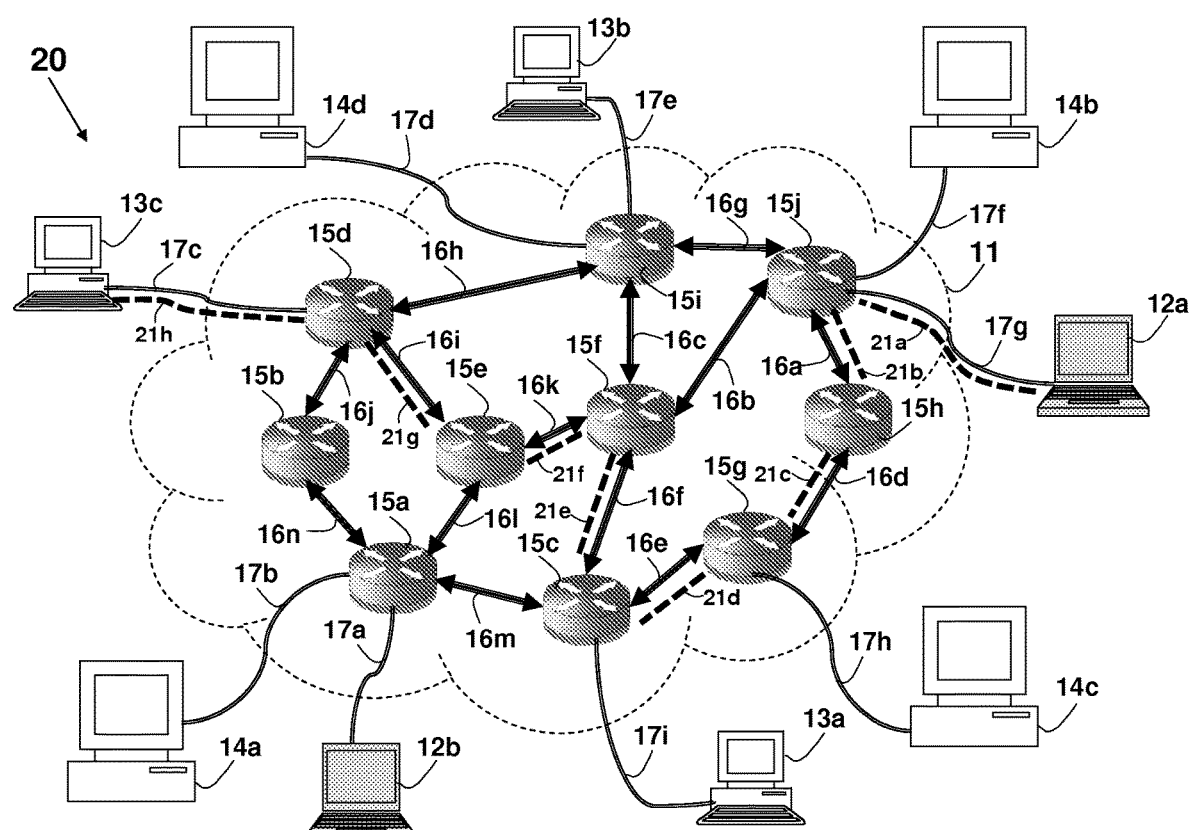
FIG. 2 depicts schematically the transfer of data over the Internet.

In one non-limiting example, the laptop 12a ('sender') wishes to send a message to the desktop computer 13c ('receiver' or 'recipient') via the Internet 11 as shown in FIG. 2 above. For example, as part of a commercial commerce transaction the credit card number "9182 8374 6547" is to be exchanged between the purchasing client at laptop 12a and the store desktop computer 13c. First, the credit card number is sliced into three parts: slice #1 being "9182", slice #2 being "8474" and slice #3 consisting of "6547". The slice #1, combined with the destination 13c IP address and the number '1' as identifying the slice, is sent as a regular packet to the server 14b, functioning as a relay server. For example, as shown in system 30 in FIG. 3a, the packet or packets may use the path 31a as using the link 17g for transporting the packets to the router 15j, and path 31b for transferring the packets from the router 15j to the server 14b over link 17f. It should be noted that the destination computer 13c ('receiver' or 'recipient') IP address or any other identification of the destination are not encapsulated within the payload of the sent packets, and not as part of the header of the packets. Upon proper receipt of the packets from the source laptop 12a, the relay server 14b decodes the destination address from the packets payload, adds the source address to the message received (if required) and pass along the newly formed message as packets to the destination computer 13c over the Internet. For example, the packets may use the paths 31c, 31d, 31e and 31f over the respective communication links 17f, 16g, 16h and 17c, forming a communication path from the server 14b, via routers 15j, 15l and 15d to the destination 13c, as shown in network 30 of FIG. 3a.

Similarly, the slice #2, combined with the destination 13c IP address and the number '2' as identifying the slice, is sent as regular packets to another server 14d (preferably different from the relay server 14b used for handling slice #1), functioning as a relay server. The packets relating to slice #2 are transported using the paths 33a, 33b and 33c respectively using communication links 17g, 16g and 17d, via routers 15j and 15i, as shown in network 32 in FIG. 3b. The relay server 14d retransmits the received message (which includes slice #2), encapsulated as packets payload together with the source 12a IP address, to the destination 13c, for example using paths 33d, 33e, and 33f over the respective communication links 17d, 16h and 17c, via routers 15i and 15d.

In a similar manner, the slice #3, combined with the destination 13c IP address and the number '3' as identifying the slice, is sent as regular packets to another server 14c (preferably different from the relay servers 14b and 14d respectively used for handling slices #1 and #2), functioning as a relay server. The packets relating to slice #3 are transferred using the paths 35a, 35b, 35c, and 35d respectively using communication links 17g, 16a, 16d, and 17h, via routers 15j, 15h, and 15g, as shown in network 34 in FIG. 3c. The relay server 14c retransmits the received message (which includes slice #3), encapsulated as packets payload together with the source 12a IP address, to the destination 13c, for example using paths 35e, 35f, 35g, 35h, 35i and 35j over the respective communication links 17h, 16e, 16m, 16n, 16j and 17c, via routers 15g, 15c, 15a, 15b and 15d.

The destination computer 13c in turn receives and identifies the three messages including the IP address of laptop 12a as the source for these three messages. Further, the slices "8374", "6547" and "9182" (respectively received from encryption routers 14b, 14d and 14c) are then decoded together with their respective identifications "2", "3" and 1", thus enabling the destination to reconstruct faithfully the original message as "9182 8374 6547".

Figure 3A:
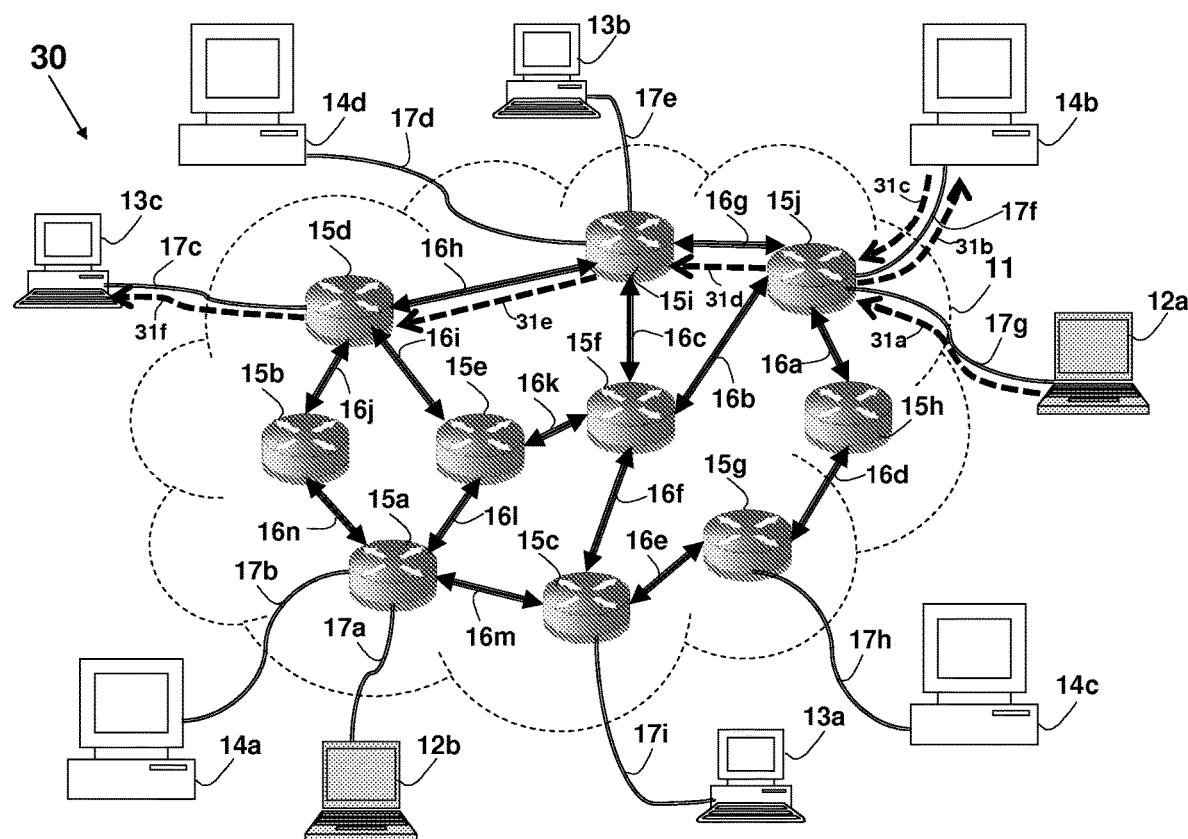
FIGS. 3a, 3b and 3c depict schematically the path of message slices over the Internet in a first example.
Figure 3B:
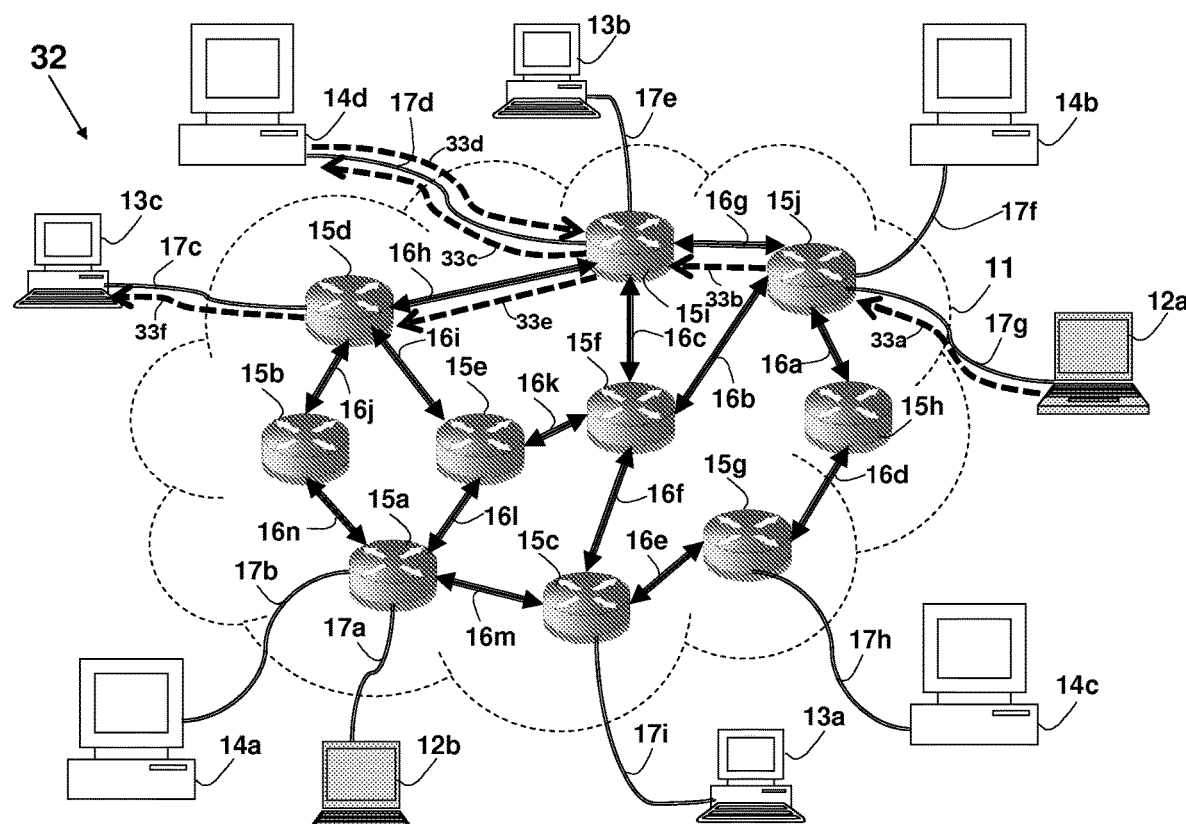
Figure 3C:
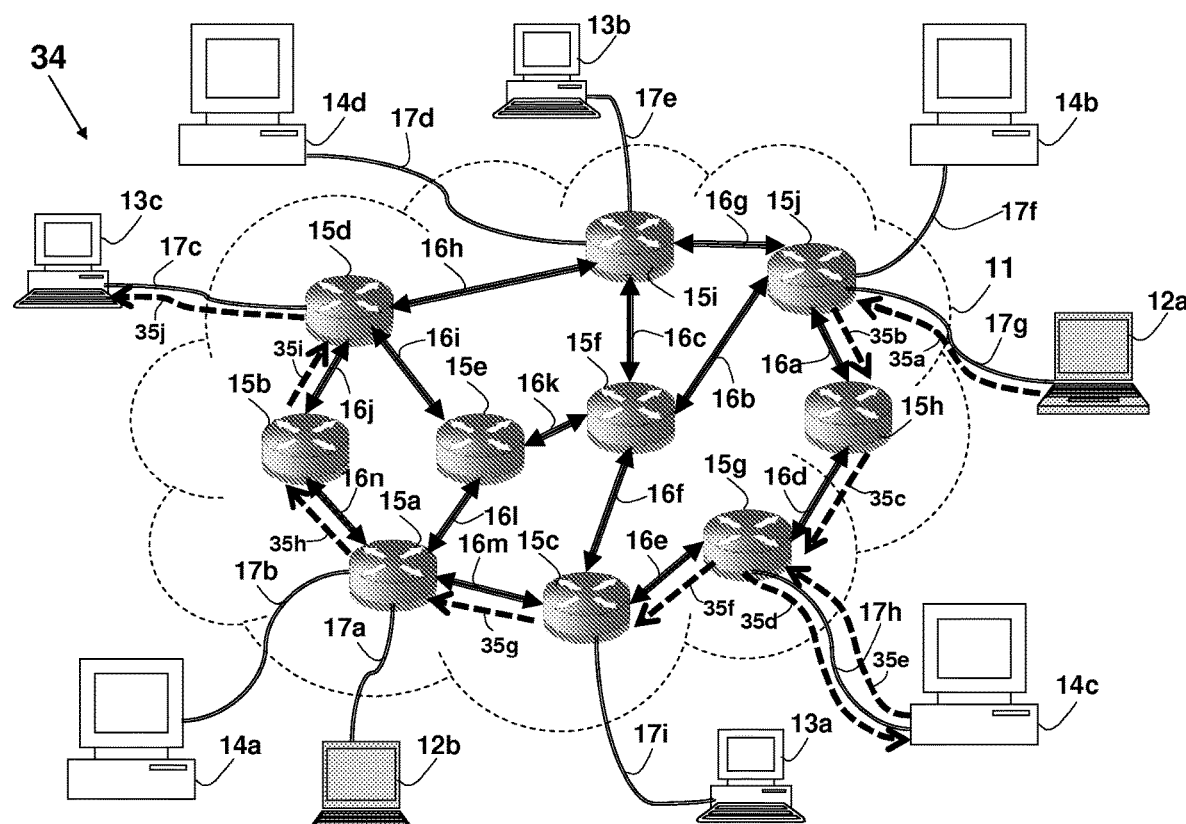

While in the non-limiting example shown in FIGS. 3a-c above, a single relay server was used in each path of a slice of the message (single 'hop'), in one aspect a plurality of relay servers (forming multiple hops) may be used in one or more slice-related paths between a source and destination. A non-limiting example of using two relay servers 14c and 14a are shown in network 40 in FIG. 4. A specific slice-related message is shown to be transported from the source laptop 12a first to the relay server 14c using paths 41a, 41b, 41c and 41d over the respective communication links 17g, 16a, 16d, and 17h via routers 15j, 15h and 15g. The slice-related message is then routed to the relay server 14a using paths 41e, 41f, 41g and 41h over the respective communication links 17h,16e,16m and 17b, via the respective routers 15g, 15c and 15a. In turn, the relay server 14a re-transmits the slice and its appended information to the destination desktop computer 13c using paths 41i, 41j, 41i, 41k and 41l over the respective communication links 17b, 16n, 16j and 17c, via routers 15a, 15b and 15d.

As shown in FIGS. 3a-c above, with the exception of communication links 17g and 17c, the various slices are transported over different paths, with minimum overlapping paths. Hence, any single point of interception or eavesdropping on the Internet 11 will not be able to monitor or intercept the whole message, but at most puts a single slice (or less probably few slices) in danger. It should be noted that the message slicing described herein is distinct from the fragmentation used as part of the regular packet handling in various protocols, in order to adjust the size of packets for adapting to the various technologies used for the transmission. Commonly, an MTU (Maximum Transmission Unit) is used to characterize the network or interface capability to handle long datagrams, and thus a large size message may be segmented into multiple packets each limited by the MTU parameter. Hence, a datagram containing a slice may be fragmented into multiple packets in the case where the MTU limitation is to be exhausted.

Preferably, the relay servers 14a, 14b, 14c and 14d described in the above non-limiting example are geographically disparate, in order to increase the probability of introducing different and remote paths in the Internet for the various slices. Further, the source computer 12a and the destination computer 13c may each be at geographical locations distant from the relay servers. In one non-limiting example, based on the Internet being a worldwide network, the servers may be located in different continents, such as a relay server 14a in Europe, a relay server 14b in Asia, a relay server 14c in North-America, and a relay server 14d in Australia. Further, the source computer 12a may be in Africa and the destination computer 13c located in South-America. In another preferred configuration, the servers may be located in different countries, such as the relay server 14a in Canada, the relay server 14b in Mexico, and the relay server 14c in the US. Similarly, distant locations in the same country may be used, such as one relay server at the East-Coast and one at the West-Coast of North-America.

In one aspect, communication security is enhanced since no packets in the Internet are transported containing (in the IP header) both IP addresses of the source computer 12a and the destination computer 13c. Packets sent from the source computer 12a to the first hop (one of the relay servers 14) include the IP address of the source computer 12a and the IP address of the relay server acting as a temporary destination. However, the IP address of the ultimate destination computer 13c is embedded in the payload, thus hidden from routers and other devices in the path, that are typically handling and processing only the packet header. Similarly, the packets reaching the destination computer 13c include the IP address of the ultimate destination computer 13c and the IP address of the relay server acting as an intermediate destination; however the IP address of the source computer 12a is hidden in the payload, and cannot easily be exposed. Hence, any interception or eavesdropping on the Internet 11 cannot identify the communication packets exchanged between the actual computer source 12a and the ultimate destination 13c by analyzing the IP header of the packets.

Encryption algorithms used for security over the Internet commonly involves the exchange of encryption related information and other handshaking before the actual transmission of the message is taking place. One non-limiting example is the exchange of public-key in the RSA algorithm or any other public-key based cryptography. Such prior communication enhances the communication vulnerability for interception. Since the slicing scheme may be known in advance to the ultimate destination, the method described herein is not inherently based on exchanging any information between the sender and the ultimate destination prior to sending of a message, thus simplifying the transmission process and improving the message transfer security.

Further, since there is no direct IP-Layer communication between the source computer and the ultimate destination computer, the mere fact that there is a communication between these computers (or the timing or the frequency of the communication) is kept confidential, and the privacy is improved. Further, the method provides a strong degree of unlinkability, where an eavesdropper cannot easily determine the sender and the receiver/recipient, of a given message, or part of a message. Conversely, common end-to-end encryption schemes (such as the RSA algorithm) are based on the exchange of the public key and the encrypted message between the end devices, revealing the existence of such communication.

In some cases, encryption or any other manipulation of a message may not be suitable. For example, it may be required for legal purposes to provide non-repudiation of a message (e.g., e-mail). The method described herein provides a mechanism for secure delivery of the native message, without any altering of, tampering with or manipulating the message (except for its slicing). Hence, it may be used as a substitute (or as addition) for digital signature or any other authentication method, providing a non-repudiation capability. Further, the relay servers used to carry a message may store a replica of the message slices relayed through them, allowing a simple way to prove a message delivery, yet obviating from having the whole message stored in a single location other than the ultimate destination computer. Further, the method described herein makes use of existing protocols, and does not interfere with any Layer 4, Layer 3 or any lower layers, thus enabling the use of any existing and standard hardware, programs, protocols and applications.

The method described herein further improves the authentication of the communication between the source computer and the ultimate destination computer, thus improving the protection against spam, forgery and fraud. The recipient computer expects messages from the source computer to arrive in slices from multiple relay servers. Hence, a packet arriving directly from the source computer (e.g., having the IP address of the source computer in the IP header), or a packet including a complete message, are suspected and not verified as being a genuine message actually sent by the source computer. Further, in some embodiments the slicing of the message into message slices should conform to an agreed upon slicing scheme known to the ultimate destination computer, and thus a message that is wrongly sliced (not according to the agreed upon slicing scheme) is suspected not to be sent by the source computer.

Figure 5:
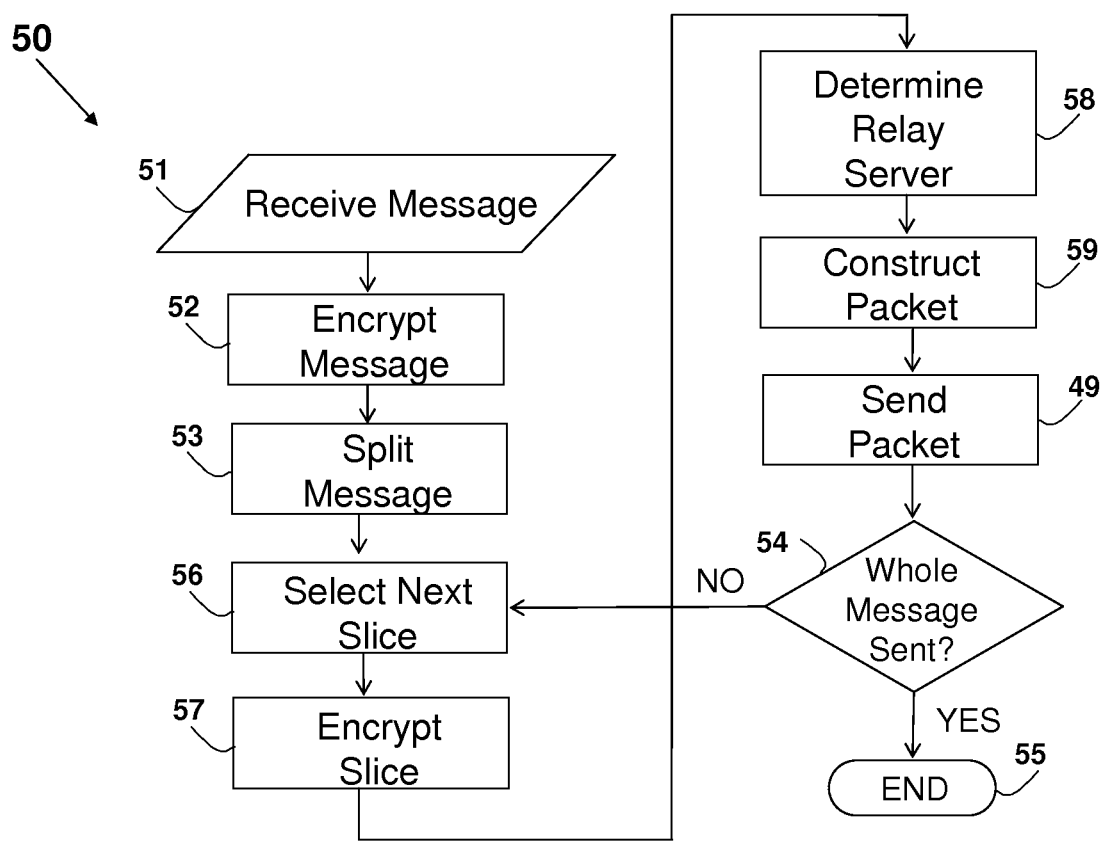
FIG. 5 illustrates schematically a simplified flow chart of part of a method for slicing, packetizing, and sending a message.

The source computer originating the message transmission (such as computer 12a in the above non-limiting example) generally executes the flow chart 50 shown in FIG. 5. The first step 51 'Receive Message' involves receiving the message to be sent. The message may be obtained directly from a user, such as a user typing the message on a keyboard being part of, or connected to, the source computer. Alternatively, the message may be received by another application running on the same computer or in another connected computer. While the message exampled above in FIGS. 3a-3c involved the numbers of a credit card for commercial transaction over the Internet, the message may include any type of data, and be used for any type of application. The message may include any collection of numbers, characters, images or any other types of symbols. A message may include one or more of strings (at any length), including characters that may represent letters, numerical digits, punctuation marks and control characters. Common characters use the ASCII (American Standard Code for Information Interchange) standard, which includes definitions for 128 characters, each using 7 or 8 bits per character.

Optionally a step 52 'Encrypt Message' may be executed, where the message is encrypted in order to add an additional level of security to the message delivery mechanism. Alternatively, the message is not encrypted, and the security of the delivery is based on other or none security means, together with the splitting and using of different paths described herein.

In a step 53 'Split Message' the message content is split into multiple parts ('slices'). For example, the credit card number "9182 8374 6547" may be split into three non-overlapping parts as described above, being "9182", "8374" and "6547". In another non-limiting example, the message may be split into overlapping parts, wherein parts of the message are included in more than a single slice. For example, the credit card number "9182 8374 6547" may be split into the slices set "9182 8374", "8374 6547", and "6547 9182" or the alternative set "47918283", "82837465", and "74654791", where each part includes half of the 'former' slice and half of the 'next' slice (using the cyclic approach, where the last digit is considered to be before the first one). In such an arrangement, any two slices out of three includes the whole message, and as such allows for reconstruction of the sent message even in the case where one of the slices was lost.

Any number of slices may be used, and the security of the whole message is improved as more slices are used. For example, the message may be split to the bits level, and each bit will be carried as a slice in a separate packet. Referring to the above non-limiting example where the message is the credit card number to be sent as message "9182 8374 6547", and assuming three slices, where each digit is represented as 8-bit (byte), the number of bits is 8*12=96, hence 96 packets may be sent, each including a single bit. Similarly, four-bit aggregation (nibble) may be used, reducing the packet in the above non-limiting example to 24 packets per the message (96/4=24). Further, 8-bits aggregation (byte) or character-based splitting may equally be used.

The number of slices can alternatively (or in addition) be dependent upon the number of relay servers available or chosen for the transmission of the message. For example, in the case wherein the message is to be transmitted to three relay servers (such as relay servers 14b, 14d and 14c used in the non-limiting example of FIGS. 3a-3c above), 3 slices per message are used, where each slice is transmitted via a different relay server. Further, any multiplication of the number of relay servers to be used may equally be the number of slices. For example, in the case where the message is to be transmitted to three relay servers, the number of slices may be 6, 9, or 12, where each relay server respectively handles 2, 3, or 4 slices.

Further, the splitting may not keep the integrity or the order of the original message. For example, the message internal sequence may not be retained. In one non-limiting example, a slice may include parts of the message having fixed (or variable) slicing intervals. Referring to the above non-limiting example where the message is the credit card number to be sent as a message is "9182 8374 6547", and assuming three slices, the message may be split into the slices set "9275", "1844", and "8367", having a step ('distance') of three places (two digits) between each any two digits in the slices. Similarly, assuming the message to be sent includes three octets (bytes) of bits, being "01010101 11110000 00111100", using two bit intervals forms the slices set "01010011", "10110010", and "01110010". Other forms of interlacing may be equally used. Such non-sequential form provides improved security since no slice includes any meaningful or eligible information, and thus cannot be identified even as part of a message if intercepted. Similarly, the non-sequential slicing may use combining non-adjacent bits, nibbles, bytes, characters, and strings into the slices.

The splitting non-limiting examples above involved splitting into equal length of slices. Referring to the above non-limiting example where the message is the credit card number to be sent as a message is "9182 8374 6547", the message was exampled to split into three non-overlapping parts, being "9182", "8374" and "6547". In this non-limiting example, all three slices include exactly 4 digits. However, non-equal length of data slicing may as well be used. For example, the above message may be split into three slices being "9", "182 8374 65", and "47", respectively having 1, 9 and 2 digits. In the case of sequential slicing, the destination may still easily reconstruct the original message based on the slice numbering mechanism.

Padding may be included as part of the slicing scheme. For example, referring to above non-limiting example where the message is the credit card number to be sent as a message is "9182 8374 6547", and the slicing scheme involves slicing into 3 non-overlapping slices of 5 numbers each, the message may be padded by adding characters in the beginning of the message, or at the end, or both. The added characters may have no impact on the message such as adding 'SPACE' characters, or adding non-numbers characters to the numbers based message. For example, the characters T or '@' may be added, amending the message to be "@@9182 8374 6547@", and the 3 slices are in such a case "@@918", "28374" and "6547@". Equal length slices results in equal length packets, thus if intercepted, the packet or the slice length provides no information about the location of the slice in the message. Alternatively (or in addition), the padding scheme may include adding characters or other information any place in the message or slice, not limited to the beginning or end of the message or slice.

In another non-limiting example, padding is used in order to reduce the eligibility of the slices if intercepted. Preferably, padding is added in a random manner (e.g., random characters or random placing or both) known only to the ultimate destination computer, thus allowing it to reconstruct the original message by removing the added characters or elements.

Sharing the information about the padding scheme used (for allowing the destination to faithfully recover the original message) may be an integral part of the coordination of the slicing scheme. In one non-limiting example, the slices carry the padding information in the slices. Each packet may include the padding information of the slice included in that packet. Alternatively, a packet includes information about the padding of the other slices. For example, the first character of a slice (or anywhere else in the packet) includes the character used for padding in another slice. The first slice will include the character of the second slice, the second slice will include the character of the third slice, and the third slice will include the character of the first slice. For example, referring to the above non-limiting example where the message is the credit card number to be sent as a message is "9182 8374 6547" and is required to be sent as non-overlapping 3 slices of 6 characters each, the slices may be "@918*2", "#@8374" and "*654 #7".

After the various slices are determined as part of the slicing mechanism in step 'Split Message' 53, the slices are sequentially and individually handled, based on a pre-determined order (or randomly). In a 'Select Next Slice' step 56, a single slice out of the available slices to be sent is selected to be handled first. For example, the slice including the first part of the message (e.g., the first character or first bit) may be chosen as the first to be handled, sequentially followed by the other slices. Alternatively, a reverse order may be used, where the slice including the last part of the message (e.g., the last character or last bit) may be chosen as the first to be handled and transmitted. Preferably, the slices are handled (and sent) in a random order. In an optional 'Encrypt Slice' step 57, the slice may be encrypted. It should be noted that this step 57 is distinct from step 52, where the latter involved encrypting the message as a whole block, while step 57 involves encrypting only a part (a single slice) of the message. The encryption in the 'Encrypt Slice' step 57 can be used as an addition or as an alternative to the whole message encryption of 'Encrypt Message' step 52. In a 'Determine Relay server' step 58 the relay server serving as the intermediate node for delivery of the currently selected slice. For example, in the above example shown in FIG. 3a, it was determined that the relay server 14b will be used for the first slice to be sent. It should be noted that a single relay server per message may equally be used, where all the slices are transported via the single relay server.

In order to determine the relay server to use for each slice in 'Determine Relay server' step 58, the source computer holds a list of the IP addresses of the available relay servers that can be used. For each message to be sent, the source computer can select to use all or part of the pool of the available relay servers. Further, the source computer may decide to use only part of the available relay servers for all the messages to be sent. In addition, the source computer may decide to use the same set of relay servers (which may be the all or part of the available ones) for all messages to be sent, or to use a different set of relay servers for each message sent. The selection of relay server to use may be sequential or otherwise orderly planned, or alternatively be a random selection. The selection may further be based on information relating to the relay servers. In one non-limiting example, the location of the relay servers may be used to determine which servers to use. For example, only relay servers which are geographically located outside the country (or continent) in which the source computer is located may only be selected. Similarly, only relay servers which are geographically located outside the country (or continent) in which the ultimate destination computer is located may only be selected. Other information such as past information regarding traffic through the relay servers or other communication related information may be used.

As a non-limiting example, assuming that 5 relay servers are available for use to a source computer, designated as 'A', 'B', 'C', 'D' and 'E'. The source computer may select to use the whole set ('ABCDE') or only part of the set such as ('ABDE'). In the latter case, no slice will be forwarded to the relay server 'C' for any message to be sent. Further, the source computer may decide to use the entire set for any message sent, hence any message will be split into at least 5 slices, carried through the 5 relay servers ('ABCDE'), wherein at least one slice is transferred via each relay server. Alternatively (or in addition), the source computer chooses to split the set of servers into two or more overlapping or non-overlapping groups. For example, three non-overlapping sub-sets will be formed, being 'AB', 'CD' and E. A first message will use the 'AB' sub-set, a second message will use the 'CD' sub-set, and a third message will use the 'E' relay server, and so on. In another embodiment, the slices will use the relay server in an orderly way (disregarding the messages forming the slices), where a first slice will use a relay server 'A', a second slice the relay server 'B', and so on, using the cyclic order so that the relay server 'A' will be used again after the relay server 'E' is used. In case of using a random slice based selection, a first slice message may draw the relay server 'A', the next one may draw the relay server 'D', and so on. In case of using random message based selection, a first message may draw the relay servers 'AD', a next one may draw the relay server 'BDE', and so on.

In another embodiment, the source computer stores only a single relay server IP address, and the first slice is sent to this relay server. Upon receiving the packet from the source computer, the encryption computer sends to the source computer the IP address and any other information required relating to the next relay server to use. The process is repeated in the second relay server, sending to the source computer the third relay server to use and so forth. In the next message to be sent, the process may be initiated by using the first relay server that was used for the former message, or preferably the first slice of the next message will use the relay server whose identity was received after the last slice of the former message was sent.

Figure 7:
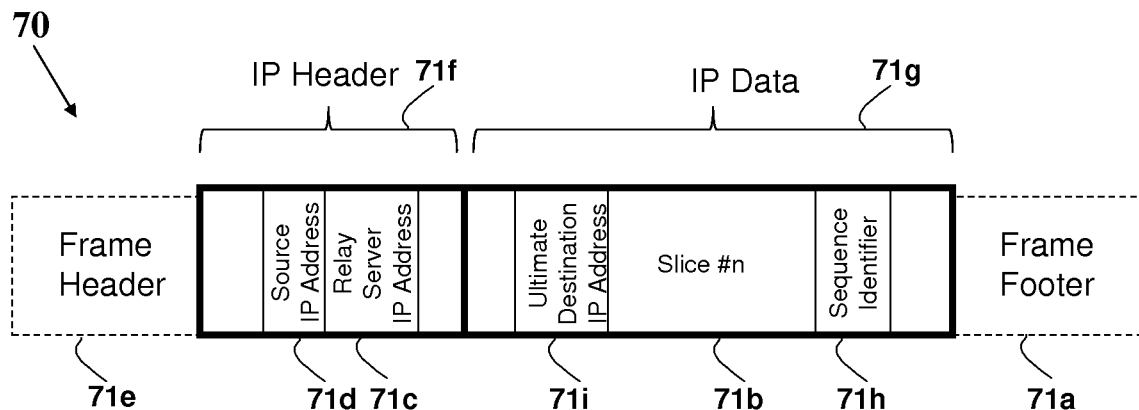
FIG. 7 illustrates an example of a construction of an IP-based packet carrying a message slice.

The packet to be sent to the determined relay server which includes the selected slice is prepared in a 'Construct Packet' step 59. A non-limiting example of a packet 70 is shown in FIG. 7. The IP Header field 71f includes in the destination field 71c the IP address of the relay server determined in the 'Determine Relay server' step 58, and in the source field 71d the IP address of the computer transmitting the selected slice. For example, in the above example shown in FIG. 3a, the IP address of the laptop 12a will be used as the 'Source IP Address' and the IP address of the relay server 14b will be used as the 'Destination IP Address'. The IP Data field 71g will include the selected slice in field 'Slice #n' 71b (that may be encrypted in the case the data was encrypted in the 'Encrypt Slice' step 57 or in the 'Encrypt Message' step 52, or both). Further, the IP Data field 71g contains information in the field 'Sequence Identifier' 71h regarding the slicing mechanism for allowing the receiving entity to reconstruct the message from the received slices. For example, in the case of slicing based on sequential order, the number of this slice in the whole message is provided. The IP Data field 71g further contains in the field 'Ultimate Destination IP Address' 71i the IP address of the computer on the Internet which is the ultimate destination for the whole message, such as the IP address of the computer 13a in the example in FIG. 3a above. The 'Frame Footer' field 71a and the 'Frame Header' field 71e are added to the packet as required. Hence the constructed packet will be transported over the Internet from the sender computer to a relay server as the first hop, while including all the required information for reconstructing the message out of its slices and about the final destination.

In a 'Send Packet' step 49, the packet that was prepared in the 'Construct Packet' step 59 is actually sent by the source computer to the Internet, where the packet 70 starts its way towards the specified relay server.

In a 'Whole Message Sent?' step 54 the status of the slices is checked. In the case all the slices forming a message were handled and sent, the message related activity is ended in the 'END' step 55. If not all the slices were handled, a slice that was not yet selected is selected to be handled in the 'Select Next Slice' step 56, and being handled as described above. Hence, the process will be repeated for all the available slices until all the slices of the message received in 'Receive Message' step 51 are sent encapsulated as packets. While the flow chart 50 suggests that a packet containing a slice is transmitted before another slice is selected for handling, the arrangement equally relates to preparing all slices first and afterwards sending all the packets containing those slices.

In the flow chart 50 described above, following the message slicing in the 'Split Message' step 53, one slice is chosen at a time and sent in a packet in the 'Send packet' step 49. Alternatively (or in addition), few or all of the packets, including the slices, are first stored, and afterwards sent in an orderly manner, or preferably in a random manner. In the latter case, the sequence of sending the packet provides no information regarding the order of the slices in the original packet.

The relay server serving as an intermediate node (such as server 14b in the above example shown in FIG. 3a) generally executes the flow chart 90 shown in FIG. 9a. The first step 91 'Receive Packet' involves receiving the packet 70 prepared by the source computer in the 'Construct Packet' step 59 and sent in the 'Send Packet' step 49. In the case wherein a part of, or the entire packet, is encrypted (for example for added security), the encrypted data is decrypted in the 'Decrypt Packet' step 92. In particular, if the 'Ultimate Destination IP Address' field 71i is encrypted, this field is preferably decrypted in order to allow proper sending of the slice to the required ultimate destination. The various fields included in the packet are identified in an 'Identify Fields' step 93. In particular, the IP address 71i of the ultimate destination is identified in a 'Determine Ultimate Destination' step 94.

Figure 8:
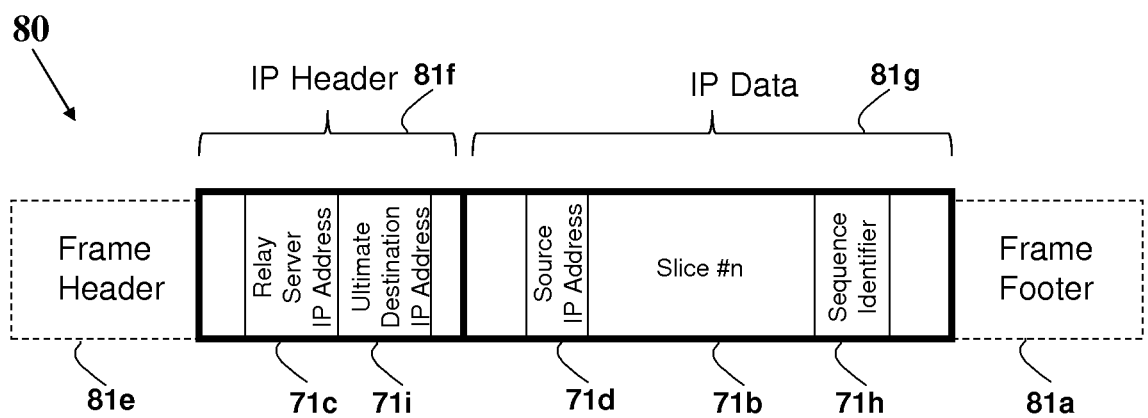
FIG. 8 illustrates an example of a construction of an IP-based packet carrying a message slice.

Next, a packet 80 shown in FIG. 8 is constructed by the relay server as part of a 'Construct Packet' step 95. The packet 80 contains an IP Header 81f which includes the 'Relay server IP Address' 71c as identifying the packet sender, and the 'Ultimate Destination IP Address' field 71i identifying the message ultimate receiver. The original message IP address may also be included in the IP Data field 81g, as the 'Source IP Address' 71d, intended to be used by the ultimate message destination in order to identify the message originator. The 'Frame Footer' field 81a and the 'Frame Header' field 81e are added as required, to form an eligible packet that can be routed via the Internet. The packet 80 is then sent to the Internet in a 'Send Packet' step %, and thus completing the relaying of the slice in an 'END' step 97.

Figure 6:
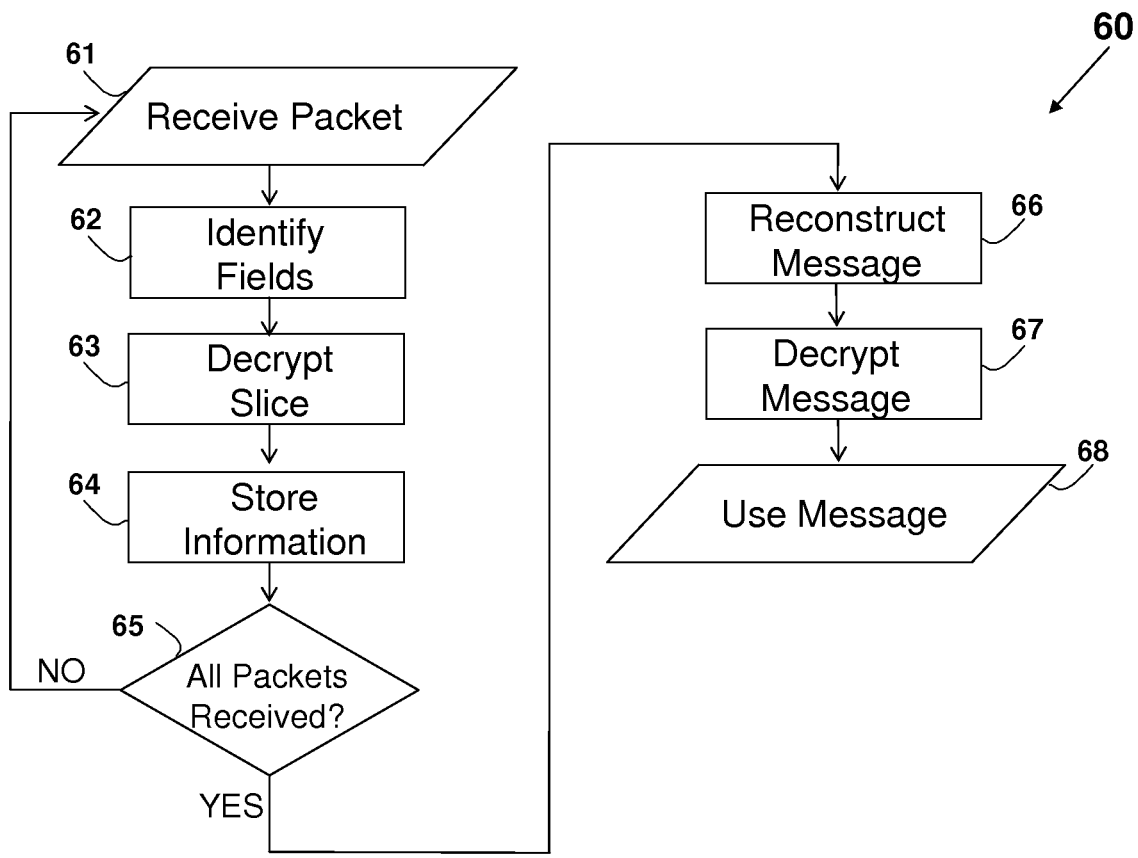
FIG. 6 illustrates schematically a simplified flow chart of part of a method for receiving and reconstructing a message.

The computer, serving as the message destination node (such as desktop computer 13c in the above example in FIG. 3a), generally executes the flow chart 60 shown in FIG. 6. The first step 61 'Receive Packet' involves receiving the packet 80 prepared by the encryption router in the 'Construct Packet' step 95 and sent in 'Send Packet' step 96 in FIG. 9a, follows by identifying the various fields of packet 80 in a 'Identify Fields' step 62. In the case the slice was encrypted in the 'Encrypt Slice' step 57 (in FIG. 5); the mating decrypting algorithm is executed in the 'Decrypt Slice' step 63, in order to recover the original slice. The slice and all other related information carried in the packet 80 are stored as part of a 'Store Information' step 64. In the case that only part of the slices were received, or in case the received slices cannot be used for forming the original message when checked as part of a 'All Packets Received?' step 65, the destination computer reverts to wait in order to receive the rest of the packets required for reconstructing the original message in the 'Receive Packet' step 61. In the case that all the packets relating to a specific message are received, the various slices are properly combined in order to reconstruct the original message in a 'Reconstruct Message' step 66. The mating or reversing process to the splitting process used in the 'Split Message' step 53 (in FIG. 5) is executed in order to recover the original message before the splitting. In the case that the whole message was encrypted in the 'Encrypt Message' step 52 (in FIG. 5), the mating decrypting algorithm is executed in the 'Decrypt Message' step 67, in order to recover the original pre-encryption message. The recovered message may be used by the destination computer in a 'Use Message' step 68.

Figure 10:
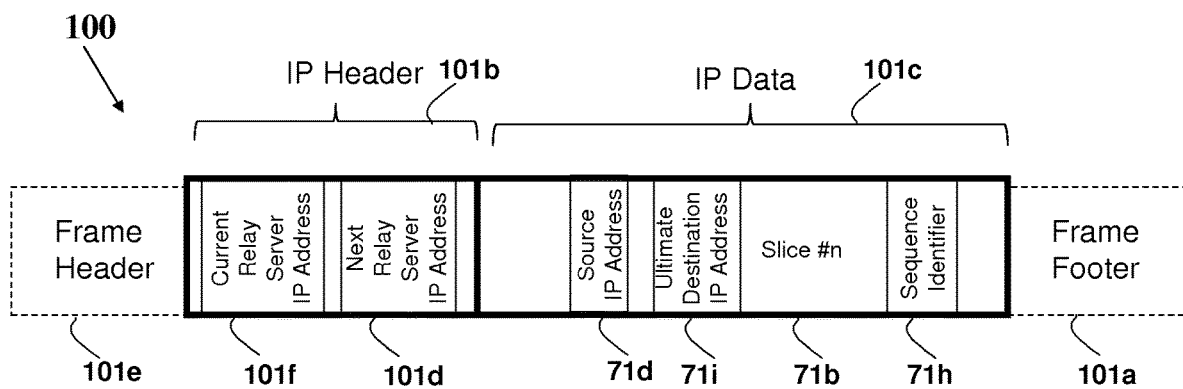
FIG. 10 illustrates an example of a construction of an IP-based packet carrying a message slice in multi-hop relaying.

While it has been exampled in FIGS. 5-9a above for the case wherein a single relay server is used for a slice delivery mechanism, the arrangement equally applies to using two or more relay servers for the transfer of a single slice from a source computer to a destination computer. The providing of additional hops in the transport mechanism improves the communication security. For example, since the packets are delivered over the Internet having in the IP header which is neither the IP address of the source nor the ultimate destination, the packets are less vulnerable to IP addresses based interception. A non-limiting example of delivery of a slice using two relay servers is described in FIG. 4 above. The computer, serving as the relay server (such as the relay server 14c in the above example in FIG. 4), generally executes the flow chart 98 shown in FIG. 9b, which is based on the flow chart 90 shown in FIG. 9a. In such a case, the intermediate relay server sends the packet including a slice not directly to the ultimate destination (such as desktop computer 13c in FIG. 4 example), but rather to another intermediate relay server (such as relay server 14a in FIG. 4 example). After determining the relay server to be used for the next hop in a 'Determine Next Relay server' step 99, a packet 100 shown is FIG. 10 is composed in a 'Construct Packet' step 95. This packet contains in its IP Header 101b the 'next' relay server IP address in the 'Next Relay server IP Address' field 101d (as the packet destination), and the current relay server IP address as the source address in the 'Current Relay server IP Address' field 101f. The IP data 101c of the packet 100 contains both the 'Source IP Address' field 71d (as in packet 80) and the 'Ultimate Destination Address IP Address' field 71i (as in packet 70). The 'Frame Footer' field 101a and the 'Frame Header' field 101e are added as required to form an eligible packet that can be routed via the Internet, and the formed packet 100 is then sent in 'Send Packet' step %, ending the retransmission process in the 'END' step 97. The flow chart 98 is repeated in all intermediate relay servers serving as hops for a slice, except the 'last' relay server which sends the slice to the ultimate destination, and thus executing flow chart 90 described above.

A relay server may serve one or multiple source computers, and may be used for relaying a single slice or multiple slices of a message. Preferably, the anonymity and untraceability may be improved and better protection against traffic analysis can be provided by padding all outgoing packets to a constant length, fixing a constant sending rate by sending null or dummy packets, and other means of unifying the forwarded packets. Further, the slices-including packets from the various computer sources (or from other relay servers in case of multi-hop) may be scrambled and forwarded in an order not based on the input order, such as by randomly selecting the packets to be relayed. Other techniques such as Chaum mixes may be used or the purpose of non-repeating and hiding the correspondences between input and output packets. Further, a relay server may combine multiple slices originated from multiple senders (source computers or other relay servers) to a single message or packet, which is sent to another relay server which then split it into separated slices, making it difficult to attacker to perform traffic analysis.

The arrangement was exampled above for the case wherein a message is split into multiple slices. Alternatively, a message may not be partitioned and sent as a single slice in a single packet. In one embodiment, all the messages are sent over the Internet without being sliced. In another embodiment, the number of slices per a message is variable. For example, the number of slices of a message is randomly being selected per message, where a single slice (number of slices=1) may be selected for a message. In such a case the communication security is enhanced since the packet including the non-partitioned message is carried in the Internet using packets without an IP header containing both the IP address of the source and the ultimate destination, and thus offering a higher degree of security.

In order for the ultimate destination computer to reconstruct the received slices, the method and the parameters used for the slicing mechanism should be known to it. For example, the destination computer should know if a non-overlapping or an overlapping partition is used. If non-overlapping splitting is used, such as using sequential and equal-length character-based slicing where each slice includes one or more characters, the ultimate destination computer needs to know how many slices are forming the original message, or how many characters are included in each slice. In the example above of the credit-card number containing twelve characters which are split into three slices having four characters each, the ultimate destination computer needs to know that three slices are forming the original credit-card number. Alternatively (or in addition), the ultimate destination computer needs to know that each slice contains exactly four characters out of the twelve characters consisting of the original message.

In one embodiment, the splitting mechanism is fixed and is not changed over time or per message. All messages sent by all sources are using the same mechanism, which is also known in advance to all the ultimate destination computers. For example, the splitting mechanism for all messages to-be-sent may consist of splitting into 3 non-overlapping slices. Hence, all the ultimate destination computers will receive exactly three packets containing exactly three slices, thus receiving three packets/slices enables the composing of the original message from its three parts.

In an alternative embodiment, messages are delivered in the network using different splitting schemes, using different parameters for same splitting schemes or both. In one non-limiting example, each of the potential sources is assigned a splitting scheme or a parameter of a specific splitting scheme. For example, some of the source computers in the network will only use sequential slicing, while others may use non-sequential slicing. Further, some of the source computers assigned to use sequential slicing will only use a specific number of slices, while the others will only use a different number of slices per message. For example, some may use 3 slices per message while others will only use 4 slices per message. The potential ultimate destination computers have a look-up table which associates for each source computer (e.g., identified by its IP address) the splitting scheme and parameter used by this source computer. Hence, in the example shown above in FIGS. 3*a-c*, the destination computer 13*c* will identify the source computer 12*a* (by its IP address) upon receiving the first packet associated with it. In this example, the look-up table stored in the destination computer 13*c* associates sequential, non-overlapping, and 3 slices per message to this specific source computer 12*a*, hence the destination computer 13*c* waits until the entire 3 packets (including 3 slices) are received, and then the slices are sequentially combined to form the original message.

In an alternative embodiment, the source computer independently selects which using splitting scheme to use, or which parameter to use for the selected splitting scheme, or both. These selections are not coordinated with any ultimate destination computer or with any other entity in the network. The selection of which splitting scheme to use or the parameter to be used (or both) may be fixed and unchanged over time or relating to any specific message. Alternatively, the selection may be message dependent. In one embodiment, the source computer may select, for each message to be sent, the slicing scheme or the parameter to use in a scheme (or both) from a list of options. The selection may be based on randomness, wherein the slicing method or the parameter to be used (or both) are randomly selected from the options space. Alternatively (or additionally), the selection may make use of the numbering of the messages to be sent. For example, the first message will use a specific slicing scheme, the next message will use another predetermined slicing method and the next one will use a distinct third slicing method. The selection may be cyclic covering part or all of the set of possible slicing schemes or parameters (or both). In another alternative, the selection is based on the message ultimate destination, where a different slicing scheme (or parameters or both) is associated with each potential ultimate destination. In yet another alternative, the user of the source computer or another application executed in this computer selects the slicing scheme or parameter. For example regarding the above example of the 12-digit credit card number, the user who enters the credit card number may be asked to determine the number of slices to use for this message. In yet another alternative, the selection is based on timing measuring, such as time-of-day (TOD). For example, one selection will be used on a daily basis from 2.00 AM to 3.00 AM, a different selection from 3.00 AM to 4.00 AM and so on, cycling in a 24-hour day. Similarly, each day of the week may use different selection. Any combination of the above schemes may be equally used.

In the case where the source computer independently selects a slicing scheme or a parameter in a specific slicing scheme (or both), it is required that this selection is coordinated with the ultimate destination computer. Such coordination allows the latter to adequately combine the received slices by reversing the slicing process in order to faithfully reconstruct the original message sent by the source computer. In one embodiment, the information about the slicing scheme used is encapsulated together with the slices in the slice-containing packets sent. In one non-limiting example, the packet 70 shown in FIG. 7 contains in the IP Data 71g (and further in the IP Data 81g in packet 80) an additional field including the required information regarding the slicing scheme. Hence, upon the receiving of packets, the ultimate destination computer decodes the slicing scheme information and uses it to reconstruct the original message sent. The slicing information may be contained in a single packet, such as the first packet to be sent, or the packet including the slice having the first piece of data of the message. Similarly, the last packet to be sent or the packet including the slice having the last piece of data of the message may be used for carrying the slicing scheme information. Alternatively, the slicing scheme information may be repeated in all packets sent, allowing the ultimate destination computer to decode the slicing scheme from any of the received packets. Preferably, the information regarding the slicing scheme is split and carried (non-overlapping or overlapping) over few packets, or over all the packets sent carrying the message. Such split provides the advantage that even in the case that one or multiple packets are intercepted; the slicing scheme cannot be obtained by the interceptor, thus offering a higher degree of security for the message delivery.

In an alternative embodiment, the coordination between the message sender (the source computer) and the receiver (the ultimate destination computer) regarding the slicing scheme uses a dedicated packet including the required information. In this case, sending the packets including message slices is preceded by sending a dedicated packet (not including any part of the message) alerting the ultimate destination computer regarding the slicing scheme used for the message upcoming in the next packet or packets. Preferably, such message will be relayed through a relay server (similar to a slice carrying packet) to improve its delivery security. Alternatively (or in addition), such dedicated slicing scheme information packet is sent after all the slice-carrying packets are transmitted or between the slice-carrying packets.

In yet another embodiment, the slicing scheme to be used (or the parameter used or both) is determined independently by the ultimate destination computer. All the techniques described above regarding selection of a slicing scheme by the source computer can equally be used by the ultimate destination computer. Upon making the proper selection of a slicing scheme, the selection is to be notified to the source computer, which in turn executes the scheme on the message to be sent. The slicing scheme to be used may be sent to the source computer when the ultimate destination computer becomes aware that a message is about to be sent to it from the source computer. In one non-limiting example, the source computer notifies the ultimate destination computer that a message intended for it has been received, and the ultimate destination computer replies with the slicing scheme to be used for this message. Alternatively (or additionally), the ultimate destination computer may periodically (e.g., once a day or every hour) and automatically (without waiting from any external trigger) send to the source computer information about the slicing scheme to be used. In the case wherein the ultimate destination computer expects messages from multiple source computers, the same slicing scheme may be used for all those source computers, or alternatively a different slicing scheme may be used for each source computer.

In one embodiment, the slicing scheme is centrally controlled, as an alternative or in addition to the selection by the source or ultimate destination computers. In this case, a server connected to the Internet is functioning as the 'manager' of the slicing method. It can be a dedicated server, such as server 14a in FIGS. 3a-3c above, which is not involved in the message delivery as a relay server, or alternatively a relay server can double as the manager, such as the relay server 14b. The manager selects the slicing scheme (or slicing parameters or both) to be used by part or all of the source and ultimate destination computers. The selecting of the slicing scheme may use any of the methods described above, such as the selection by source or destination computers. After a slicing scheme is selected, it is shared with the source computers or the ultimate destination computers or both. The same slicing scheme may be used for all source and ultimate destination computers connected. Alternatively (or in addition), the various computers will grouped into multiple groups, each group include one or more source computer and one or more ultimate destination computer, which are involved in message delivery. The manager may assign a different slicing scheme for each group for improved security. Further, few managers may be employed, each associated with a different group.

In one non-limiting example, the manager sends the updated slicing scheme to be used periodically to all or a group of the source and ultimate destination computers. For example, such delivery may take place once a day or every hour. Alternatively and preferably, the periods between consecutive transmissions have random length. In another example, prior to slicing a message, a source computer sends a request for a slicing scheme to the manager, which in turn replies with a selected slicing scheme to be used. The ultimate destination is notified of the slicing scheme used by the source computer as described above. Alternatively, the ultimate destination computer communicates with the manager before the reconstructing of the original message from its slices, in order to be notified by the manager which slicing scheme was used by the source computer for splitting.

Figure 4:
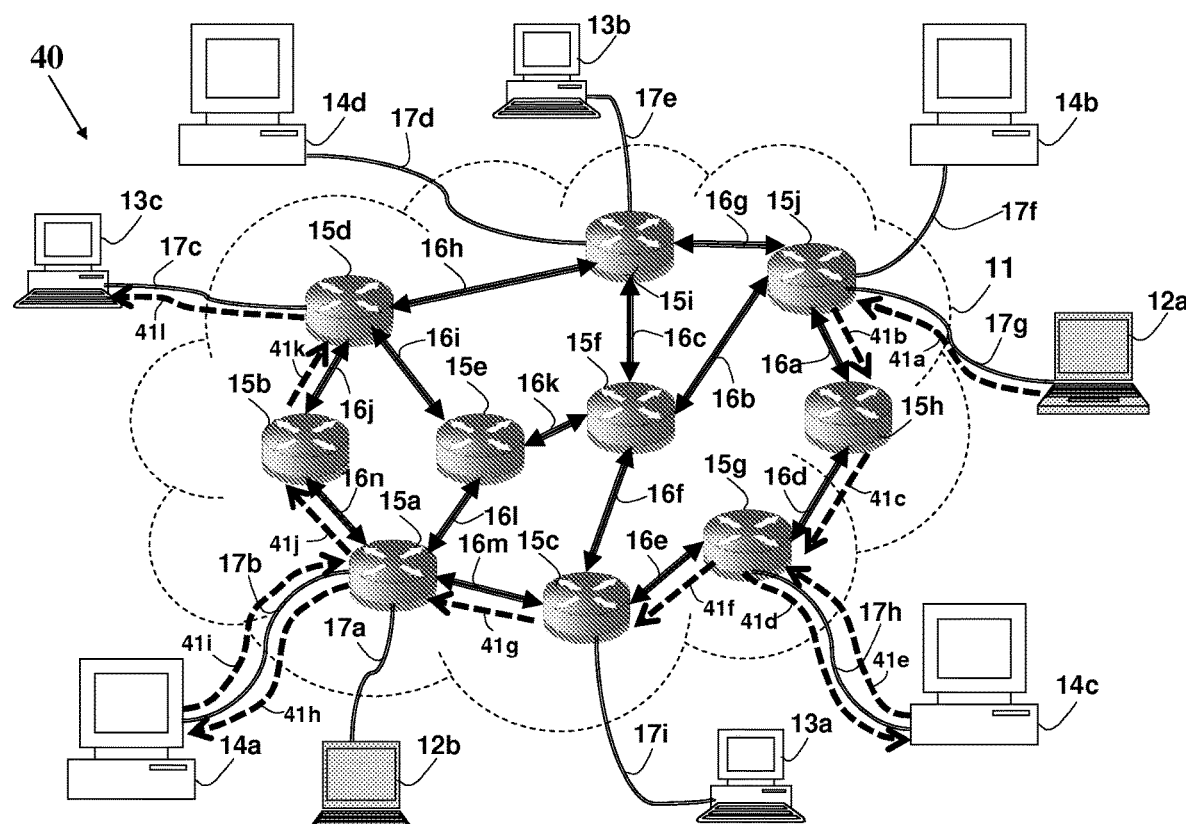
FIG. 4 depicts schematically the path of a message slice over the Internet in a second example.

As shown in FIG. 4 above, the security of the message delivery may be improved by using multi-hop relaying, wherein a slice in a packet is transported via multiple relay servers before reaching the ultimate destination computer. In one embodiment, the number of hops of a slice is set by the source computer. In such a case, the packet sent further includes in the 'IP Data' field 71g of packet 70 a field of "Hops Left", serving as a counter for counting the number of left hops. A similar field will be embedded in the 'IP Data' field 101c of packet 100, which is sent from one relay server to the 'next' one. Each relay server receiving the packet decrements the "Hops Left" counter by one before sending it further, thus this counter is gradually decremented through the packet path. If the result after decrementing by one is zero (hence the counter was received as one), the relay server sends the packet to the ultimate destination computer. If not, the packet is sent (with the counter decreased by one) to another relay server.

The number of hops to be used by a source computer may be fixed, changed for each slice or for each message, or any combination thereof. Further, the number of hops may be centrally controlled as part of the slicing scheme by a manager server as described above, or may be independently determined by the source computer. Preferably, the number of hops is randomly selected for each slice or message sent.

In one embodiment, the number of hops of a slice is determined by a relay server. For example, the relay server that receives a slice from a source computer determines the number of hops for this slice. The selection of the number of hops may use the same schemes described above regarding such selection in the source computer. In an alternative embodiment, a relay server randomly and independently makes the decision whether to send the slice to another relay server or to the ultimate destination computer. In such a case, there is no information anywhere in the network regarding the number of hops of a slice, adding to its security. For example, all the relay servers randomly make this decision with a probability of 50% (50% probability of sending to another relay server and 50% probability of sending to the ultimate relay server). Statistically, a slice will be forwarded to the ultimate destination after a single hop with a probability of 50%, after 2 hops with a probability of 75%, after 3 hops with a probability of 87.5% and so forth.

Encryption may be added to enhance the security of the message delivery. In one non-limiting example, the message is encrypted before the slicing, as shown in 'Encrypt Message' step 52 in FIG. 5. Such encryption may involve only the message, or in addition the appended information such as the IP address of the ultimate destination computer. The encryption allows the message slices to be unintelligible when carried over the Internet, still enabling the ultimate destination to decrypt the original message after combining the received message slices as described in 'Decrypt Message' step 67 shown in FIG. 6, thus recovering the original message before its encryption. Alternatively, or in addition, a message slice may be encrypted before encapsulation into a packet, as described in 'Encrypt Slice' step 57. Such encryption allows the message slices to be unintelligible when carried over the Internet, still enabling the ultimate destination to decrypt the original message slice after receiving it as described in 'Decrypt Slice' step 63 shown in FIG. 6, thus recovering the original message slice before its encryption. In one non-limiting example, the encryption of either the whole message or of the message slices is not changed or tampered throughout the delivery process, allowing for end-to-end encryption. Any type of encryption may be used, preferably end-to-end encryption such as the RSA algorithm described above. In an exemplary scenario, the encryption method used is changed from message to message, or preferably from slice to slice. In the latter case, the same encryption method may be used. Preferably, a parameter of the encryption method used may be changed from slice to slice. For example, a different private key or a different public key (or both) may be used for each slice sent (or for each message sent). In such a case, knowing the encryption method used or a parameter used for one slice (or message) still proved the other slices (or other messages) intact and less vulnerable.

In one embodiment, a packet carrying a slice further includes information about the encryption method (or parameter) of another slice. In the example of splitting a message into 3 slices, the first slice includes information about the encryption of the second slice, the second slice includes information about the encryption of the third slice and the third slice includes information about the encryption of the first slice. Hence, intercepting of only a single slice provides no simple ability to decipher the slice, since this slice encryption information is carried by another slice. The ultimate destination computer, upon receiving of all the packets carrying all the slices, can use the embedded information to decrypt whole slices into the original slices, thus allowing for reconstructing the original message.

In one non-limiting example, only part of the slice or the message path over the Internet is encrypted. For example, the encryption involves only the communication path between the message sender and the relay server. Such encryption may involve only the message slice, or in addition the appended information such as the IP address of the ultimate destination computer, the slicing scheme related information or the IP address of the source computer. Alternatively or in addition, the encryption involves only the communication path between the relay server and the ultimate destination. In the case of using multi-hops, the encryption may involve only the communication path between the relay servers. In a preferred embodiment, a different encryption is used for each segment of the slice delivery path. The different encryption may include different algorithms, or different parameters (e.g., public key, private key or both) of the same encryption algorithm. In such a configuration, a first encryption mechanism is used between the message originator and the first (or the only) relay server. The relay server decrypts the packet including the slice and other information, as described in 'Decrypt Packet' step 92 in FIGS. 9*a* and 9*b*. Before transmitting the slice to the next hop, being another relay server or the ultimate destination, the decrypted slice is encrypted again using a different encryption scheme, and only then sent in 'Send Packet' step % in FIGS. 9*a* and 9*b*. Using a different encryption scheme for each segment of the communication improves the delivery security.

Alternatively or in addition, part or all of the slice paths over the Internet are encrypted or otherwise secured, using standard or proprietary end-to-end encryption based protocols. In one non-limiting example, the encryption involves only the communication path between the message sender and the relay server, where the source computer and the relay servers are the endpoints of the protocol. In another non-limiting example, the encryption involves only the communication path between the ultimate destination computer and the relay server, where the ultimate destination computer and the relay servers are the endpoints of the protocol. In the case of multi-hop structure, the communication path involves the communication between two relay servers. The message to be encrypted related to the message slice carried, which may be appended by the IP addresses or the source computer, the ultimate destination computer, and slicing scheme related information. Secured protocols used may be Layer 4 or upper layers such as SSL, TLS and SSH, or Later 3 and lower layers such as IPsec.

Any device which is IP addressable in the Internet and can execute the flow chart 90 in FIG. 9*a* or the flow chart 98 in FIG. 9*b* may serve as a relay server. A relay server may be a dedicated device mainly (or only) involved in relaying the message slices. Further, a relay server may be involved with another server or servers, such as a mail server, database server, web server, FTP server or proxy server. The relay server may be collocated with another server (of a different type), or can be integrated with it. In the latter case, the two servers may share hardware resources such as an enclosure, a processor, storage, and peripherals. Similarly, an Internet connection and an IP address may be shared. Preferably, the relay servers are used together with servers having disparate geographical locations. Further, while relay servers were exampled in FIGS. 3*a*-4 as devices which are distinct from the source computer or the ultimate destination computer, it should be noted that any desktop, laptop or workstation computer may serve as a relay server by executing the flow chart 90 in FIG. 9*a* or the flow chart 98 in FIG. 9*b*. Further, such computer may run client programs or applications. Furthermore, any computer serving as source computer or as an ultimate destination computer may also serve as a relay server, relaying communication between other source computers or other ultimate destination computers. For example, laptop 12*a* in FIGS. 3*a*-3*c* is a source computer, that can also serve as a relay server for a message sent from laptop 12*b* as a sender to desktop computer 13*b* acting as the recipient. Preferably, laptop 12*a* serves simultaneously as both a source computer and as a relay server, such that packets sent to and from this computer cannot be easily interpreted if intercepted, since two different messages are involved.

Any device which is IP addressable in the Internet and can execute the flow chart 50 in FIG. 5 may serve as the source device of the message. A source computer (being desktop computer, laptop computer or a workstation computer) may be a dedicated device mainly (or only) involved in sending the message. Further, a source device or source computer may be involved with another program or application, and with any program being client or server software. The source computer may be collocated or integrated with another computer or any other processing device. The two programs may share hardware resources such as an enclosure, a processor, storage and peripherals. Similarly, an Internet connection and an IP address may be shared. Further, the flow chart 50 in FIG. 5 may be integrated into another application or program, for example the application creating the message to be sent, such as a Web browser and email applications, and not available to other applications or programs. Alternatively, the flow chart 50 in FIG. 5 may be an individual module operating as an independent process, program or application, which is separated from the application originating the message, and specifically used when called for by a user or by another application. Alternatively, the source computer functionality is a function provided by a kernel unit of an operating system (OS).

Any device which is IP addressable in the Internet and can execute the flow chart 60 in FIG. 6 may serve as the ultimate destination device of the message. An ultimate destination computer (being desktop computer, laptop computer or a workstation computer) may be a dedicated device mainly (or only) involved in receiving the message. Further, an ultimate destination computer may be involved with another program or application, and with any program being client or server software. The two programs may share hardware resources such as an enclosure, storage, a processor and peripherals. Similarly, an Internet connection and an IP address may be shared. The ultimate destination computer may be collocated or integrated with another computer or any other processing device. Further, the flow chart 60 in FIG. 6 may be integrated into another application or program, for example the application creating the message to be sent, such as a Web browser and email applications. Alternatively, the flow chart 60 in FIG. 6 may be an individual module, program or application, which is separated from the application originating the message, and specifically used when called for by a user or by another application. Alternatively, the source computer functionality is a function provided by a kernel unit of an operating system (OS).

In one aspect, a relay server (or all the relay servers involved in a message delivery) may further partition the slice into more (e.g., smaller) sub-slices. These sub-slices may be sent to the recipient similar to the way the slice is to be delivered, to be combined with the other slices at the ultimate destination computer. In this scenario, the flow chart 50 in FIG. 5 is executed by the relay server, wherein the message involved is the message slice to be further sliced (that may be appended with IP addresses of the source computer or the ultimate destination computer or both, and related slicing scheme). Alternatively, or in addition, the sub-slices are sent through other relay servers to a relay server acting as an intermediate destination, which reconstructs the original slice from its sub-slices, and the reconstructed message slice is handled then as a regular message slice. In the latter scenario, the flow chart 60 in FIG. 6 is executed by the relay server, wherein the message involved to be reconstructed is the message slice that was further sliced (that may be appended with the IP addresses of the source computer or the ultimate destination computer or both, and related slicing scheme). The slicing scheme or the routing scheme (or both) used may be the same as the ones used by the source computer, or alternatively distinct schemes may be used. In general, all slicing schemes and routing schemes described may be used for delivering the sub-slices.

As described above, randomness may be used in order to increase the security of the message or slice delivery, by affecting a facility, feature or otherwise, thus making it harder for interpreting by an interceptor. Randomness is commonly implemented by using random numbers, defined as a sequence of numbers or symbols that lack any pattern and thus appear random, are often generated by a random number generator. Randomness for security is also described in IETF RFC 1750 "Randomness Recommendations for Security" (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

While some arrangements are exampled above regarding the Internet, it is apparent that the disclosure equally applies to any network such as a LAN (Local Area Network), a WAN (Wide Area Network), or a MAN (Metropolitan Area Network). Further, the arrangement equally applies to any digital data network connecting multiple devices, wherein multiple distinct communication paths may be formed between a sender and a receiver of the message. Further, non-packet based networks and networks which use protocols other than IP (e.g., cell-based networks such as ATM) may equally use the arrangement. In addition, while IP addresses have been exampled herein for identification of the entities involved in the communication (such as the source and ultimate destination computers and the intermediate servers), any other type of addresses or identifiers (involving any of the OSI layers) may be equally used. For example, MAC (Medium Access Control) address may be used as an alternative or in addition to the IP address.

The applications that can use the arrangement include Electronic Mail (E-Mail) and electronic commerce such as banking, shopping, products, or services purchase. Further, the arrangement may be used for carrying sensitive information such as passwords and public (or private) encryption keys. Messages carried according to the arrangement may include voice, text, images, video, facsimile, characters, numbers or any other digitally represented information. In one aspect, the messages are carrying multimedia information, such as audio or video. The multimedia is carried as part of a one-way or interactive audio or video service. The arrangement may be equally used for carrying any real-time or near-real-time information. The carried audio may be speech or music, and may serve telephony such as VoIP or an Internet radio service. Similarly, the carried video may be part of video services over the Internet such as video conferencing and IPTV (IP Television).

There is a growing widespread use of the Internet for carrying multimedia, such as video and audio. Various audio services include Internet-radio stations and VoIP (Voice-over-IP). Video services over the Internet include video conferencing and IPTV (IP Television). In most cases, the multimedia service is a real-time (or near real-time) application, and thus sensitive to delays over the Internet. In particular, two-way services such a VoIP or other telephony services and video-conferencing are delay sensitive.

Figure 11:
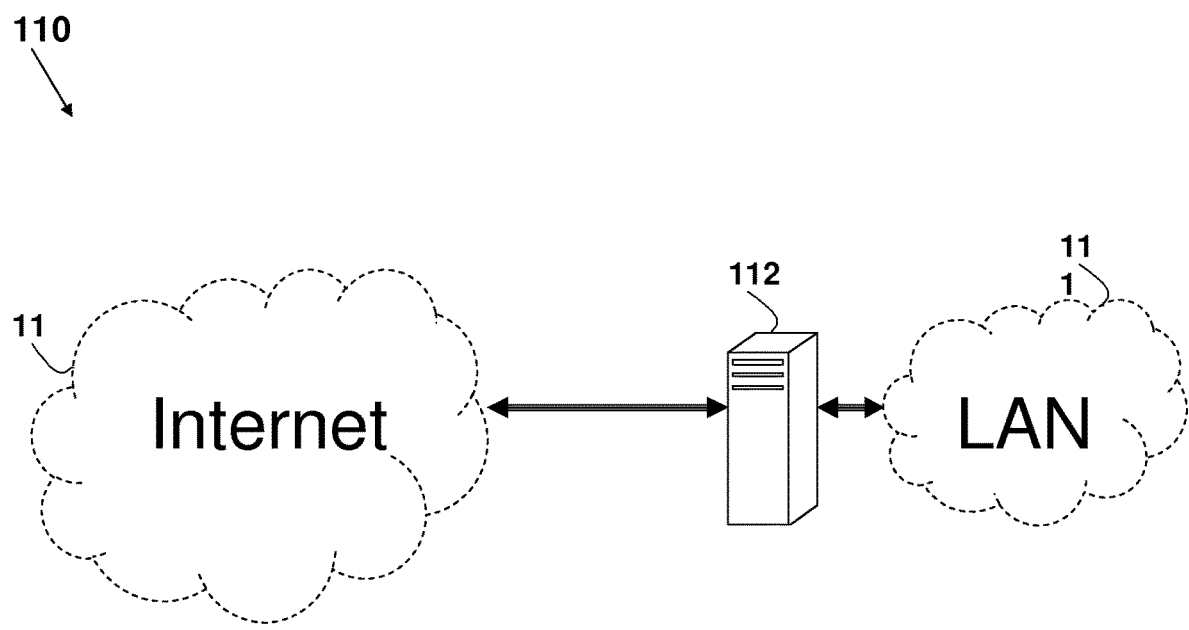
FIG. 11 depicts schematically a firewall device connected between the Internet and a LAN.

A firewall is known in the art implemented as a hardware or as a software (or a combination thereof) device that connects two networks, and is designed to block unauthorized access while permitting authorized communication. A typical configuration is shown as system 110 in FIG. 11, wherein the firewall device 112 is connected between the public Internet 11 and a LAN 111, the latter is commonly an Intranet, or any other administered, internal, trusted or private network. All messages entering or leaving the Intranet pass through the firewall, which inspects each message and blocks those that do not meet the specified security criteria and rules. Firewalls can operate at the network layer or at the application layer, and commonly use techniques such as packet filtering and application gateway functionalities.

Figure 12:
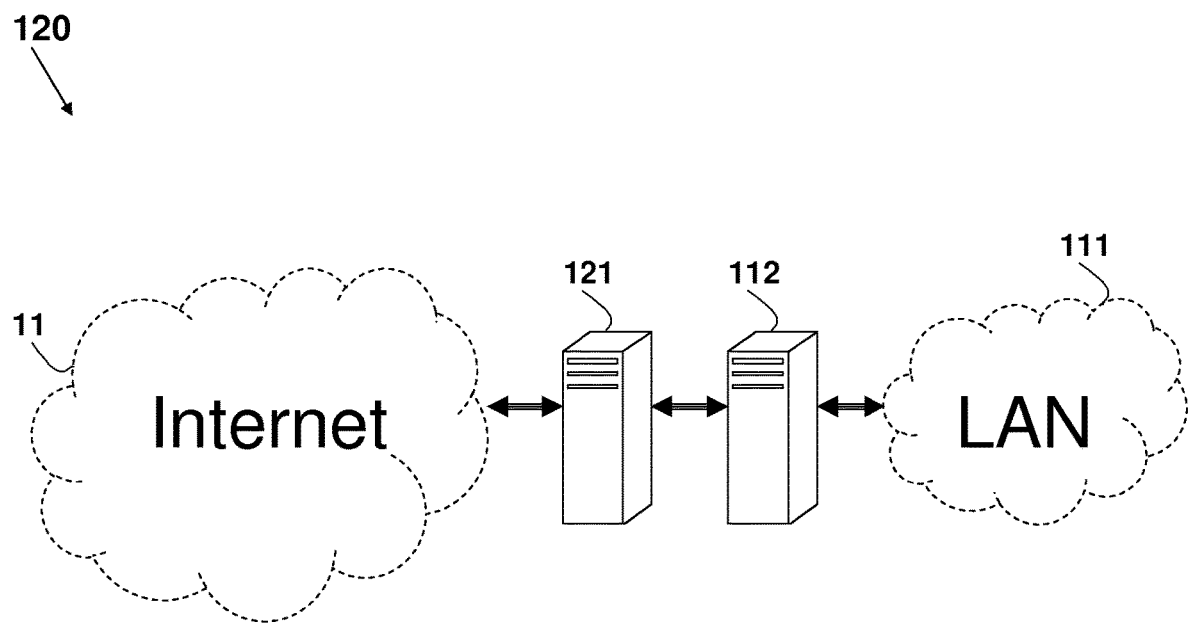
FIG. 12 depicts schematically a firewall device and another device connected between the Internet and a LAN.

A source computer or all or part of its associated functionality may be similarly placed between two networks, as exampled in system 120 in FIG. 12. The device 121 is connected between the external public Internet network 11 and the Intranet or LAN 111, and can be co-located with the firewall 112. Any packets outgoing from the LAN 111 are inspected by the device 121, acting as a source computer. All of the outgoing packets are treated as messages to be split as part of the flow chart 50 in FIG. 5, executed in the computer 121. Alternatively, only part of the outgoing packets are selected for further handling and are selected by applying specific rules, while the non-selected packets are passed transparently. For example, only packet destined to specific IP addresses may be handled. The IP packets as a whole may be treated as a message, or preferably may be analyzed for the payload and the destination of the IP, and accordingly processed. Further, the computer 121 may serve as an ultimate destination computer, executing the flow chart 60 in FIG. 6, or as both source and ultimate destination computers. In such configuration, there is no need for any changes or any added software or hardware as part of the LAN, and all hosts connected in the LAN 111 can use the secured communication offered by the computer 121. In one preferred embodiment, the source computer functionality or the ultimate destination computer functionality (or both) are integrated with a router, a gateway, or the firewall 112, resulting in a single device (or function) combining both the protection for communication from the Internet and secured communication for sending data to (and receiving data from) the Internet. The integration with the router, gateway or the firewall 112 may involve using the same Internet connection, using the same LAN connection, and sharing the same resources such as sharing an enclosure, a power source, a location, a processor, a storage/memory or connected peripherals. Similarly, a firewall may further include part or all of the functionalities of a relay server, or to function as both a relay server and a source computer, or to function as both a source computer, an ultimate destination computer and a relay server.

Figure 15A:
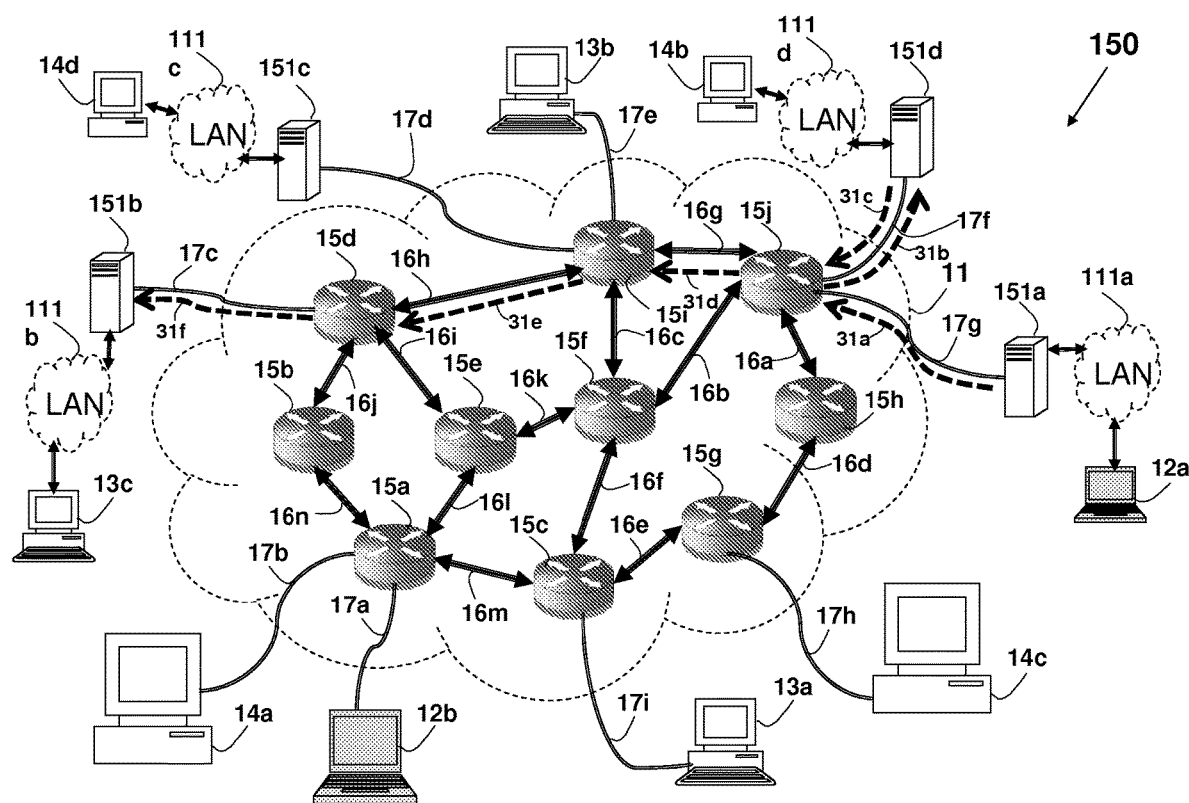
FIGS. 15a and 15b depict schematically the path of message slices over the Internet in an example where the same device is used as source computer, a relay server and a firewall.
Figure 15B:
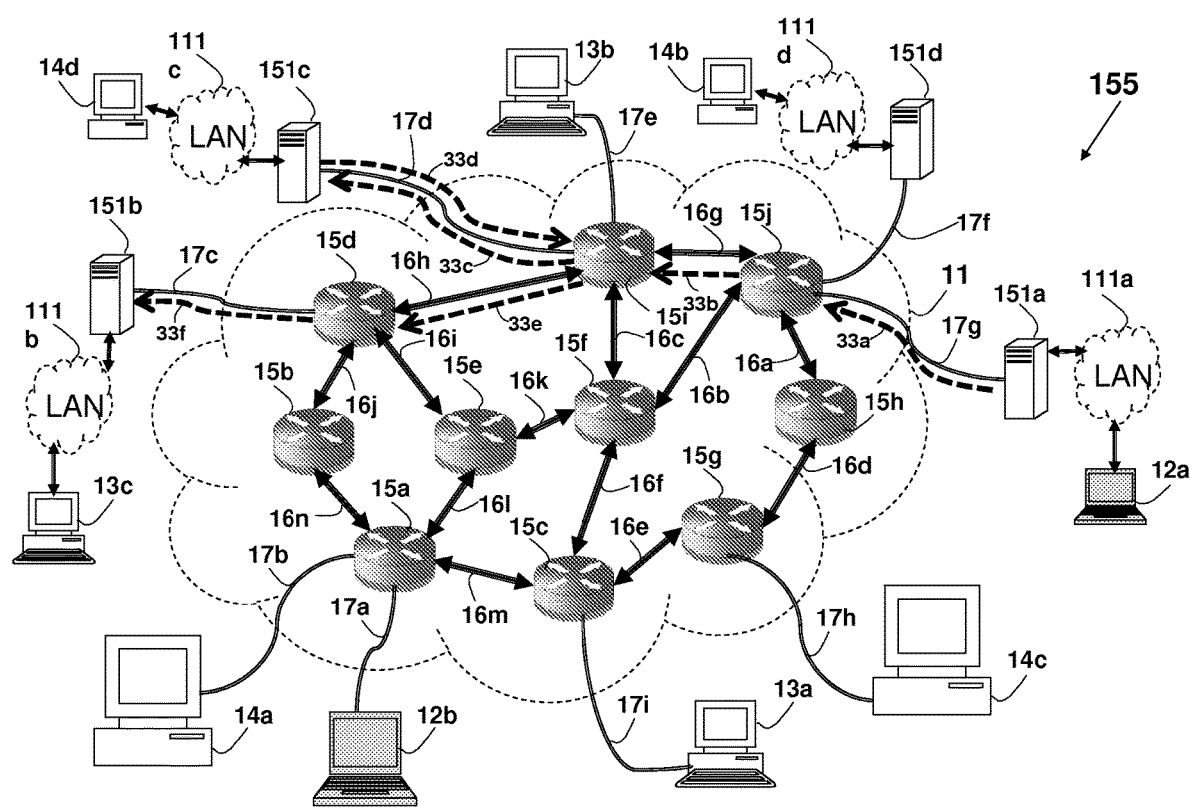
Figure 16:
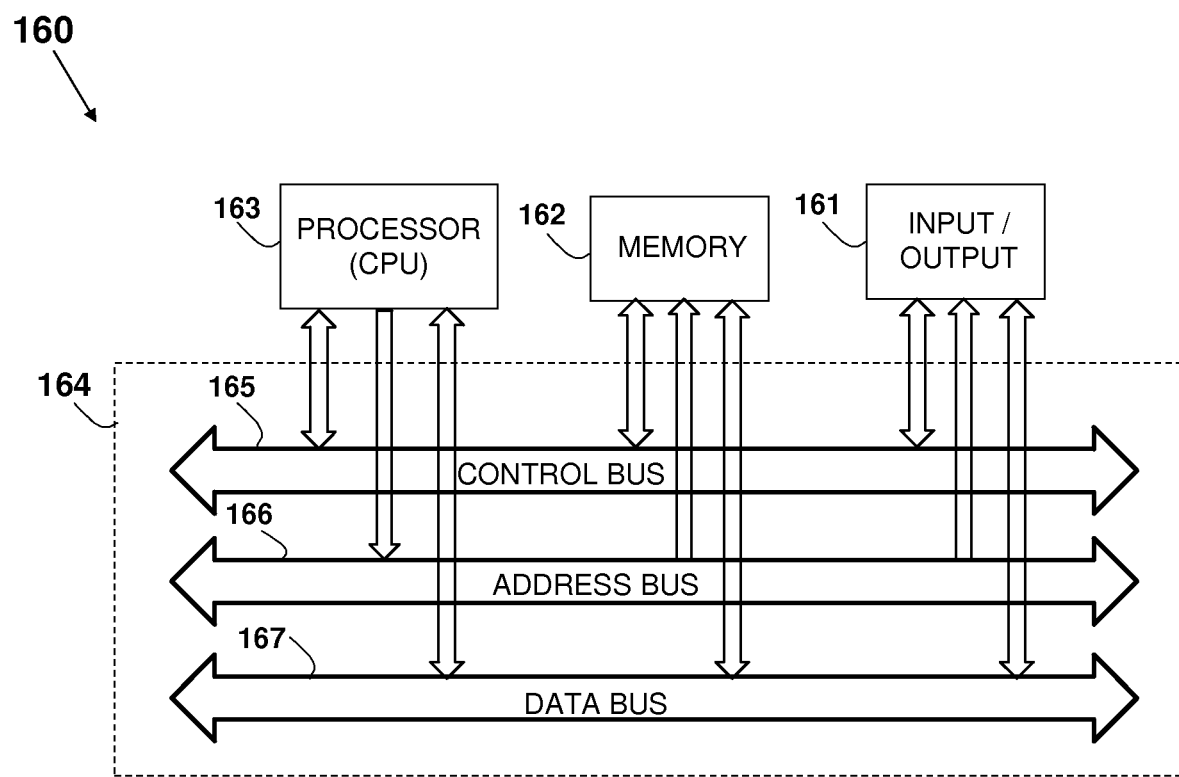
FIG. 16 illustrates a schematic electrical diagram of part of a computer system.

Referring now to FIG. 15*a* showing system 150, which correspond to the system 30 shown in FIG. 3*a*. The laptop computer 12*a* is shown connected to the Internet via LAN 111*a* and device 151*a*, for example located as part of an enterprise. As described above, device 151*a* may correspond to device 121 described in FIG. 12 above, or may be a source computer executing part or all of flow-chart 50 in FIG. 5. Computer 12*a* may be only the source of the message to be sent over the Internet, or may execute parts of flow-chart 50 in FIG. 5. Similarly, desktop computer 14*b* connects to the Internet via LAN 111*d* and device 151*d*, and desktop computer 14*d* connects to the Internet via LAN 111*c* and device 151*c*. Similarly, the destination computer 13*c* connects to the Internet via LAN 111*b* and device 151*b*. Similar to FIG. 3*a*, one of the slices is routed over the Internet, but relayed via the device 151*d* (serving as a relay server executing part or all of the flow charts 90 or 98) rather than via the desktop computer 13*b* as shown in FIG. 3*a*. Hence the device 151*d* is functioning both as a source computer and as a relay server, as well as other functionalities such as a firewall. Similarly system 155 is shown in FIG. 15*b* correspond system 32 in FIG. 3*b*, describing a slice routing wherein the device 151*c* serves as a relay server.

An Internet packet typically includes a value of Time-to-live (TTL) for avoiding the case of packet looping endlessly. The initial TTL value is set in the header of the packet, and each router in the packet path subtracts one from the TTL field, and the packet is discarded upon the value exhaustion. Since the packets containing the message slices are routed via different and disparately located relay servers, the TTL of the packets reaching the ultimate destination computer are expected to vary. Hence, in case of message slices arriving at the ultimate destination computer having similar TTL values (small TTL differences); this can serve as an indication of a spoofing or other type of masquerading.

A Network Address Translation (NAT) is known in the art as a process that allows a device (such as a router, gateway, computer and firewall) to act as an agent between the public network (such as the Internet) and a local, internal or private network. Using NAT, a single IP address represents the entire group of hosts in the internal network to an external entity. The NAT is described in RFC 1631 and in Cisco Systems, Inc. Document ID: 6450 (January 2006): "How NAT Works", which is incorporated in its entirety for all purposes as if fully set forth herein. Any of the entities involved in the arrangement, such as the flow chart 60 associated with the ultimate destination computer and flow chart 50 associated with the source computer, as well as the relay server functionality, may be co- or integrated with a computer, a router, a gateway or the firewall having NAT capability, resulting in a single device (or function) combining both the protection for communication from the Internet and secured communication for sending data to (and receiving data from) the Internet. The integration with the computer, router, gateway or the firewall may involve using the same Internet connection, using the same LAN connection, and sharing the same resources such as sharing an enclosure, a power source, a location, a processor, a storage/memory or connected peripherals. In such a case, the NAT process will slice the outgoing message according to the slicing scheme, and then assigns the IP to the outgoing packet. Similarly, when receiving the message slices, the message may be reconstructed before being sent to the destination computer.

Transport Layer protocols, such as TCP and UDP (User Datagram Protocol) specify a source and destination port number in the packet headers. A port number is a 16-bit unsigned integer, thus ranging from 0 to 65535. Port numbers using and their allocation are described in RFC 814, RFC 1078, RFC 1700 and RFC 3232. The port number may be used for providing information regarding the slicing scheme (e.g., such as the number of slices, slice numbering), the routing scheme, the encryption used, the source computer identity (such as IP address) or the ultimate destination identity. The port number may further be used for any coordination between the source computer, the ultimate destination computer, the relay servers and the manager.

In one aspect, the packets carrying the message slices are sent from the source computer (or the relay server involved in further message slices splitting) using multiple IP addresses as Source IP address in the field 71*d*. In such non-limiting example, the message slices intercepted or eavesdropped cannot be easily identified as originating from the source computer or as carrying part of the same message. The sender or an intermediate server method may further be preceded by the step of storing a list composed of a succession of available IP addresses that can be used by the source computer. As part of the routing scheme, an associating scheme may associate a message slice to each of the source IP addresses in the list, such that a distinct IP address is associated with each message slice. The associating scheme may associate part or all of the available IP addresses in the list with a packet including a message slice. The associating scheme may sequentially or randomly associate the IP addresses in the list with the succession of packets including the message slices. The IP addresses may be selected for association from the list based on a former selection for a message or message slice, or based on the current date or the current TOD (Time-of-Day). Once an IP address is selected for a packet including a message slice to be sent, this IP address is used in the packet IP header as the source IP, similar to the mechanism used for NAT. Further, the packet port field can be used in order to associate packets with a specific source computer or to associate a group of packets having slices of the same sent message.

In order to disguise the packets including the message slices, the source computer (as well as the relay servers) may hide these packets by sending dummy or null packets (containing no useful information or any meaningful data). The source computer and the relay servers may send such null packets before or after the sending of the actual message slices, between the message-slices carrying packets or a combination of the above. An eavesdropper thus intercepts a large amount of packets, which makes it complex to identify and sort the meaningful packets out of the total intercepted ones. The null packets may be destined for servers and other entities not related to the message delivery. Alternatively (or in addition), the null packets may be sent to available relay servers which are not associated with relaying the message slices.

The entities involved in the business aspects of the information device are exampled in system 30 in FIG. 3*a*. The vendor provides the relay servers 14*a*, 14*b*, 14*c* and 14*d*, and may be the actual operator of these servers. The users are the operators of the source computer 12*a* and the operator of the ultimate destination computer 13*c*, which execute the method as a program, application or process, either as independent dedicated program or integrated with another application. Purchasing the software may be through any distribution channels, such as wholesale or retail stores. However, the terms 'user' and 'owner' are used interchangeably hereinafter. Any distribution channel dealing with software, electronic or electrical appliances, in particular those channels involving distribution of software relating to communication equipment, may include the software as part of their product portfolio. In one case, the Information Service Provider (ISP) is involved in connecting the user to the Internet, and provides the security method described herein as an additional service.

In addition to the equipment cost, the costs associated with the operation of the information device are as follows: a. Communication service. The costs associated with the communication sessions. b. ISP, in the case of using the Internet. c. Information service. The costs associated with operating the relay servers. In general, billing the user for communication services by the provider may be: based on a. One-time fee; b. Flat fee for a period (e.g. monthly); c. per communication session; d. per lengths of communication sessions or messages; or any combination of the above.

A Next Generation Network (NGN) is a packet based network which can provide services including telecommunication services and able to make use of multiple broadband, Quality of Service (QoS)—enabled transport technologies and in which service-related functions are independent from underlying transport-related technologies. The NGN offers unrestricted access by users to different service providers. The NGN operator or any service provider using the NGN may offer anonymity or security services based on the method described herein.

Figure 14:
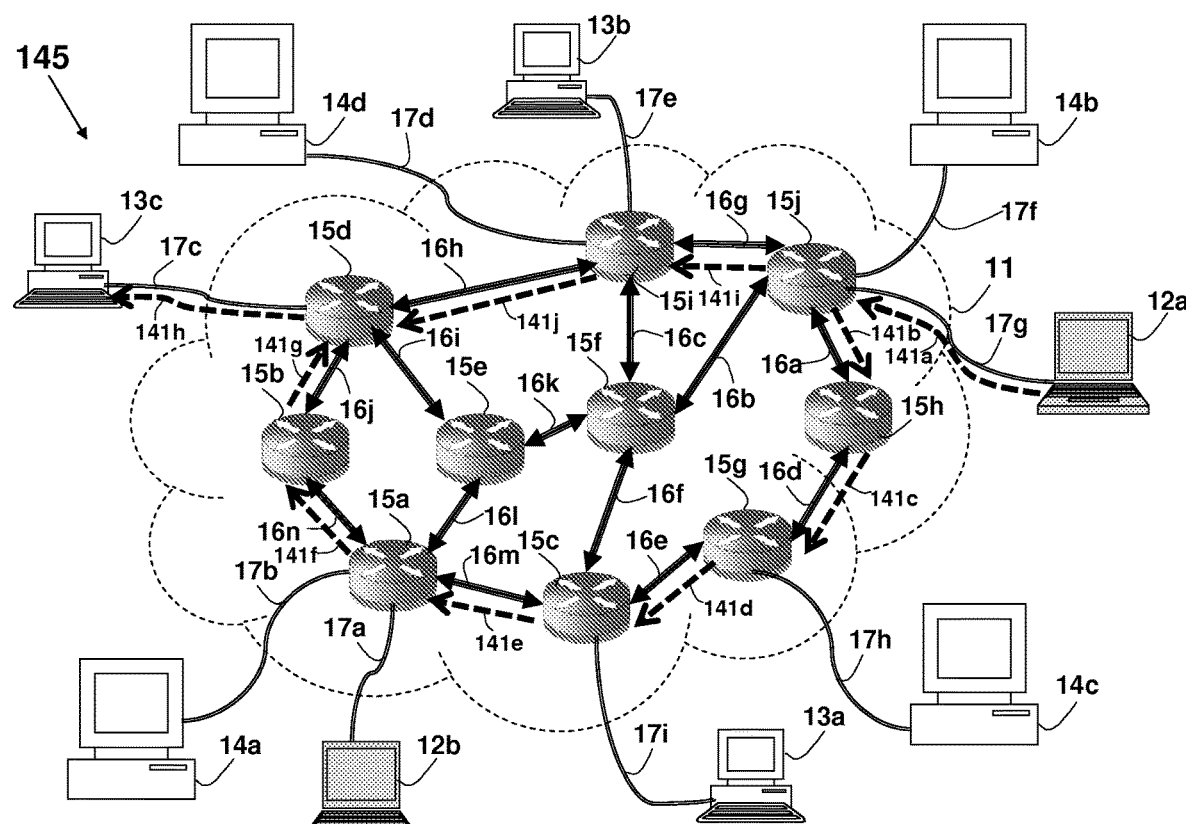
FIG. 14 depicts schematically the path of message slices over the Internet in an example.

In one aspect, source routing is used for transferring part or all of the slices encapsulated packets between the source computer and the relay servers, between the relay servers and the ultimate destination computer, between relay servers (in case of multi hop), and between the source computer and the ultimate destination computer. The latter is example in system 145 in FIG. 14, describing the paths of two slices from the source computer 12*a* and the ultimate destination computer 13*c*. A packet including one of the slices is routed using source routing in the path including 141*a*, 141*i*, 141*j* and 141*h* over the respective communication links 17*g*, 16*g*, 16*h* and 17*c*, while another slice is routed over the paths 141*a*, 141*b*, 141*c*, 141*d*, 141*e*, 141*f*, 141*g* and 141*h*, using the respective communication links 17*g*, 16*a*, 16*d*, 16*e*, 16*m*, 16*n*, 16*j* and 17*c*. Further, some of the packets containing slices may be routed using source routing, while other packets may be routed via relay servers. In the case the network topology is known, a strict source routing may be used, planned to minimize (or remove) any overlapping in the paths used by the different slices. In some cases, LSRR may be used, where one or more routers are specified such as to minimize the possibility of two slices using the same path or using overlapping parts of a path. In order to further improve the anonymity of the transfer of packets including message slices, an onion routing may be used. Such onion routing may use any of the onion routers available in the Internet. Further, one or all of the relay servers may further include the onion router functionality, such as removing a layer of encryption to uncover the routing instructions, and sending the message to the next router or to the ultimate destination computer. Further, the Tor technique may be used in such a system.

In one aspect the arrangement is used for security as part of cloud computing deployment. For example, messages exchanged between a cloud services provider and a user or as part of the cloud computing infrastructure. The cloud services may include Cloud Software as a Service (SaaS), Cloud Platform as a Service (PaaS) and Cloud Infrastructure as a Service (IaaS), and the method described herein may be used as part of the implementing security measures such as described in the publication "Security Guidance for Critical Areas of Focus in Cloud Computing V2.1", Prepared by the Cloud Security Alliance, December 2009, which is incorporated in its entirety for all purposes as if fully set forth herein. A secured distributed storage may be provided by using one aspect. In such application, a file, a message or any other data to be stored, is split as described herein, and transferred over the Internet (or any LAN or IP based network) to be stored in a plurality of servers. In the non-limiting example shown in FIGS. 3a-3c above, the servers 14b, 14d and 14c are providing storage space, for storing the slices of the message (or data) sent from the source computer 12a, preferably in addition to serving as relay servers. The ultimate destination computer 13c, or any other computer connected and allowed to have access to the stored data, can read the stored data from the storage/relay servers at any time. Assuming that the slicing is such that the slices stored in each such storage/relay server cannot be interpreted separately (but only after being combined based on the slicing scheme), any breach of security in any of the storage/relay servers may not result in any damage. In one non-limiting example, such secured distributed storage may be used for credit card or other e-commerce transactions, where the alphanumeric characters that represent the card or cardholder information (or part thereof, such as the last four digits) are split and stored in multiple relay servers. Afterwards, this sensitive information is replaced with the identification symbols ('token') containing the locations (IP addresses) of the relay servers storing the information, the location of the information (e.g., addresses) within the relay/storage servers, and the slicing scheme used to partition the information. Since the whole information required to bill the credit card is not located in a single location or a single database, it is more difficult for hackers to gain access to the sensitive data. Similarly, the described method and system may be applicable to any storage associated with any network, such as a SAN and a NAS.

In one non-limiting example, a cellular telephone set is serving as the source computer, the ultimate destination computer or both. The cellular set is serving as endpoint in a cellular network, such as Global System for Mobile communication (GSM), 2G, 2.5G, 3G and 3.5G, Enhanced Data rates for GSM Evolution (EDGE) or similar cellular networks. The voice, data (e.g. SMS—Short Message Service) or any other data to be sent is partitioned and is sent to different units in the network serving as relay server, relaying the voice or data sent to the destination unit. In one non-limiting example, the sending device is associated with multiple identifications, such as multiple telephone numbers, multiple Mobile Equipment Identifier (MEID) numbers, International Mobile Equipment Identity (IMEI) numbers, Electronic Serial Numbers (ESNs) or any other multiple identifiers in the cellular network (for example by using multiple SIMs). In one non-limiting example, the message is partitioned and sent from the sending device using different sender identifications, to a receiver unit having multiple different identifications in the network. Preferably, the data (or voice) is sent through different base-stations, for example by registering each identification number with a distinct base-station.

A method used today to ensure that a party accessing an information is human is called CAPTCHA (Completely Automated Public Turing Test to Tell Computers and Humans Apart) or Human Interactive Proofs. The idea behind CAPTCHAs is that there are tasks that humans are better at than computers. By providing a test easy for humans to solve but hard for computers, the likelihood that their users are humans is increased. Some commercially used CAPTCHAs often use a string of letters and digits randomly generated and morphed so they would be harder for Optical Character Recognition (OCR) or other pattern recognition algorithms to recognize. However, there are also limitations to how much the letters can be distorted and yet be recognizable to humans. Some CAPTCHA designs, like logic puzzles or "which shape does not belong," have the feel of intelligence tests. For many service providers it is not advisable to question their users' intelligence, especially when they want to have as many users as possible. Instead CAPTCHAs should be almost trivial for a person to solve. Further description, generating, analysis and applications of CAPTCHA are disclosed in the document by Von-Ahn L., Blum M., and Langford J.: "Telling Humans and Computers Apart Automatically", 'Communication of the ACM' Vol. 47, No. 2, February 2004, in the paper Von-Ahn L., Blum M., Hopper N. J. and Langford J.: "CAPTCHA: Using Hard AI Problems For Security", and in the document by Von-Ahn L., Maurer B., McMillen C., Abraham D., and Blum M.: "reCAPTCHA: Human-Based Character Recognition via Web Security Measures", SCIENCE Vol. 321 pp. 1465-1468, 12 Sep. 2008, in U.S. Pat. No. 7,200,576 to Steeves et al. entitled: "Secure online Transactions Using a CAPTCHA Image as a Watermark", in U.S. Patent Application 2009/0113294 to Sanghavi et al. entitled: "Progressive CAPTCHA", in U.S. Patent Application 2008/0127302 to Qvarfordt et al. entitled: "Motion and Interaction Based CAPTCHAs", in U.S. Patent Application 2011/0225633 to PAI entitled: "Data Processing Methods and Systems for Processing Data in an Operation having a Predetermined Flow Based on CAPTCHA Data, and Computer Program Products Thereof", in U.S. Patent Application 2007/0277224 to Osborn et al. entitled: "Method and Systems for Graphical Image Authentication", in U.S. Patent Application 2011/0197268 to Ravikumar et al. entitled: "CAPTCHAs That Include Overlapped Characters Projections on Virtual 3D Surfaces, and/or Virtual 3D Objects", and in U.S. Patent Application 2011/0208716 to Liu et al. entitled: "Image-Based CAPTCHA Exploiting Context in Object Recognition", which are all incorporated in their entirety for all purposes as if fully set forth herein.

The CAPTCHA may be used in addition or as alternative to the methods, arrangements and systems described herein. For example, using a CAPTCHA may improve the communication security by requiring a human to be part of the message reception. The CAPTCHA may be added to, integrated with, embedded in or a part of a message or a message slice. In one example, the message or a portion thereof may be embedded in a CAPTCHA, such as using the characters of a message (or a message slice) as the basis for generating CAPTCHA image. In another example, the CAPTCHA includes part or all of the information required to decrypt the received message or slice. A CAPTCHA may include information about a key public or private) used for encryption. In one example, the CAPTCHA may include information about the slicing scheme or any other information involving the reconstruction of the sent message.

Figure 13:
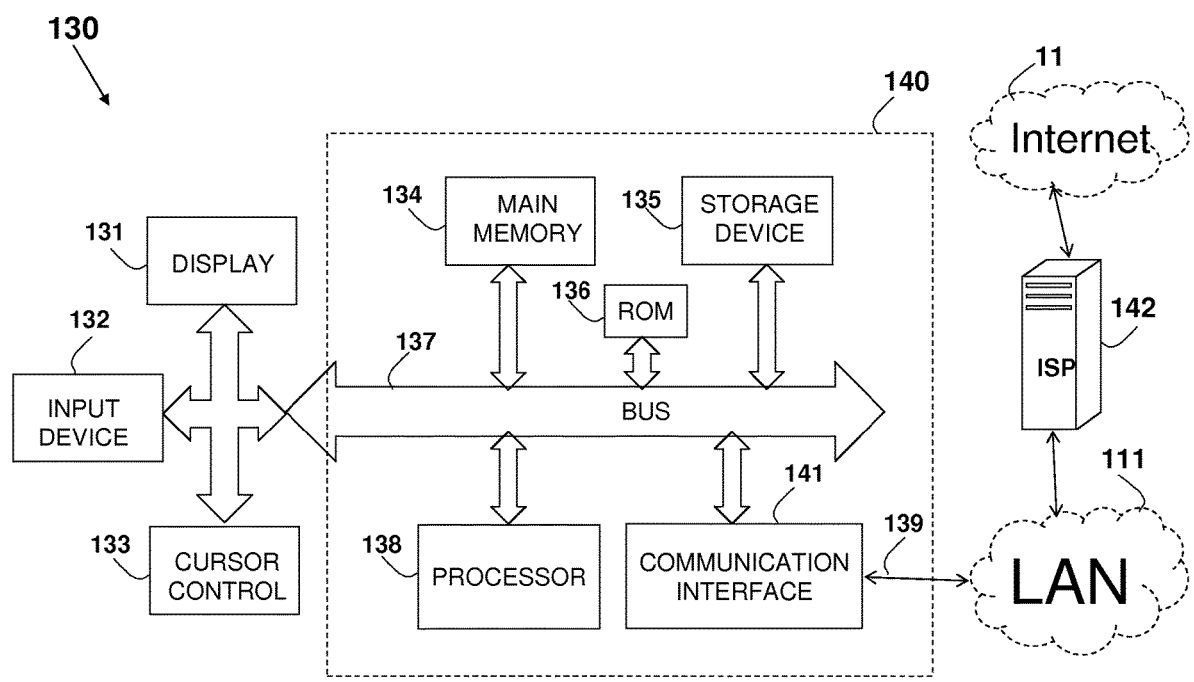
FIG. 13 illustrates schematically a general computer system connected to the Internet.

FIG. 13 is a block diagram that illustrates a system 130 including a computer system 140 and the associated Internet 11 connection upon which an embodiment may be implemented. Such configuration is typically used for computers (hosts) connected to the Internet 11 and executing a server or a client (or a combination) software. A source computer such as laptop 12a, an ultimate destination computer 13c and relay servers 14a-14d above, as well as any computer or processor described herein, may use the computer system configuration and the Internet connection shown in FIG. 13. The system 140 may be used as a portable electronic device such as a notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 13 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used. The computer system of FIG. 13 may, for example, be an Apple Macintosh computer or Power Book, or an IBM compatible PC. Computer system 140 includes a bus 137, an interconnect, or other communication mechanism for communicating information, and a processor 138, commonly in the form of an integrated circuit, coupled with bus 137 for processing information and for executing the computer executable instructions. Computer system 140 also includes a main memory 134, such as a Random Access Memory (RAM) or other dynamic storage device, coupled to bus 137 for storing information and instructions to be executed by processor 138. Main memory 134 also may be used for storing temporary variables or other intermediate information during execution of instructions to be executed by processor 138. Computer system 140 further includes a Read Only Memory (ROM) 136 (or other non-volatile memory) or other static storage device coupled to bus 137 for storing static information and instructions for processor 138. A storage device 135, such as a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk, is coupled to bus 137 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 140 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Computer system 140 may be coupled via bus 137 to a display 131, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display allows a user to view, enter, and/or edit information that is relevant to the operation of the system. An input device 132, including alphanumeric and other keys, is coupled to bus 137 for communicating information and command selections to processor 138. Another type of user input device is cursor control 133, such as a mouse, a trackball, or cursor direction keys for communicating direction information and command selections to processor 138 and for controlling cursor movement on display 131. This input device typically has two degrees of freedom in two axes, a first axis (e.g., x) and a second axis (e.g., y), that allows the device to specify positions in a plane.

The computer system 140 may be used for implementing the methods and techniques described herein. According to one embodiment, those methods and techniques are performed by computer system 140 in response to processor 138 executing one or more sequences of one or more instructions contained in main memory 134. Such instructions may be read into main memory 134 from another computer-readable medium, such as storage device 135. Execution of the sequences of instructions contained in main memory 134 causes processor 138 to perform the process steps described herein. In alternative embodiments, hard-wired circuitry may be used in place of or in combination with software instructions to implement the arrangement Thus, embodiments of the invention are not limited to any specific combination of hardware circuitry and software.

The term "computer-readable medium" (or "machine-readable medium") as used herein is an extensible term that refers to any medium or any memory, that participates in providing instructions to a processor, (such as processor 138) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise bus 137. Transmission media can also take the form of acoustic or light waves, such as those generated during radio-wave and infrared data communications, or other form of propagated signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 138 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infra-red transmitter to convert the data to an infra-red signal. An infra-red detector can receive the data carried in the infra-red signal and appropriate circuitry can place the data on bus 137. Bus 137 carries the data to main memory 134, from which processor 138 retrieves and executes the instructions. The instructions received by main memory 134 may optionally be stored on storage device 135 either before or after execution by processor 138.

Computer system 140 also includes a communication interface 141 coupled to bus 137. Communication interface 141 provides a two-way data communication coupling to a network link 139 that is connected to a local network 111. For example, communication interface 141 may be an Integrated Services Digital Network (ISDN) card or a modem to provide a data communication connection to a corresponding type of telephone line. As another non-limiting example, communication interface 141 may be a local area network (LAN) card to provide a data communication connection to a compatible LAN. For example, Ethernet based connection based on IEEE8023 standard may be used such as 10/100BaseT, 1000BaseT (gigabit Ethernet), 10 gigabit Ethernet (10GE or 10GbE or 10 GigE per IEEE Std 802.3ae-2002as standard), 40 Gigabit Ethernet (40 GbE), or 100 Gigabit Ethernet (100 GbE as per Ethernet standard IEEE P802.3ba), as described in Cisco Systems, Inc. Publication number 1-587005-001-3 (June 1999), "Internetworking Technologies Handbook", Chapter 7: "Ethernet Technologies", pages 7-1 to 7-38, which is incorporated in its entirety for all purposes as if fully set forth herein. In such a case, the communication interface 141 typically include a LAN transceiver or a modem, such as Standard Microsystems Corporation (SMSC) LAN91C111 10/100 Ethernet transceiver described in the Standard Microsystems Corporation (SMSC) data-sheet "LAN91C111 10/100 Non-PCI Ethernet Single Chip MAC+PHY" Data-Sheet, Rev. 15 (Feb. 20, 2004), which is incorporated in its entirety for all purposes as if fully set forth herein.

Wireless links may also be implemented. In any such implementation, communication interface 141 sends and receives electrical, electromagnetic or optical signals that carry digital data streams representing various types of information.

Network link 139 typically provides data communication through one or more networks to other data devices. For example, network link 139 may provide a connection through local network 111 to a host computer or to data equipment operated by an Internet Service Provider (ISP) 142. ISP 142 in turn provides data communication services through the world wide packet data communication network Internet 11. Local network 111 and Internet 11 both use electrical, electromagnetic or optical signals that carry digital data streams. The signals through the various networks and the signals on the network link 139 and through the communication interface 141, which carry the digital data to and from computer system 140, are exemplary forms of carrier waves transporting the information.

A received code may be executed by processor 138 as it is received, and/or stored in storage device 135, or other non-volatile storage for later execution. In this manner, computer system 140 may obtain application code in the form of a carrier wave.

Figure 17:
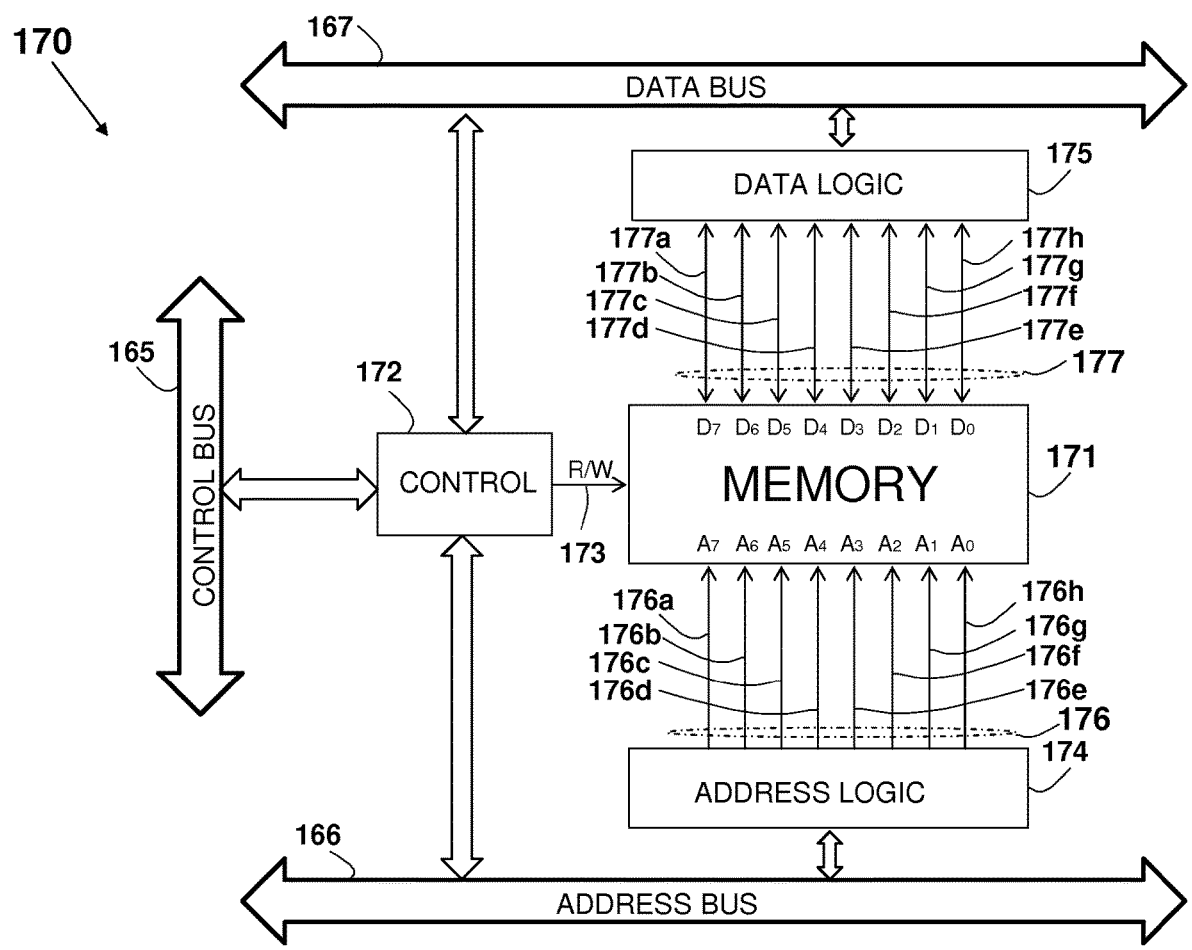
FIG. 17 illustrates a schematic electrical diagram of interfacing a memory as part of a computer system.

The concept of encryption and the scheme described above may also be used to improve the security relating to a digital data stored in a memory. The computer sub-system 170 shown in FIG. 17 above may employ encryption as shown in computer sub-system 180 shown in FIG. 18. An address scrambler 181 is added, coupled between address bus 176 obtained from the address logic 174 and the memory 171 address input ports. Any address word received via the address bus 181 is converted to another address word, and the converted address word is connected to the memory 171 via the address lines 182, comprising the converted address word carried as $A_7$ line 182a, $A_6$ line 182b, $A_5$ line 182c, $A_4$ line 182d, $A_3$ line 182e, $A_2$ line 182f, $A_1$ line 182g and $A_0$ line 182h (collectively referred to as address bus 182). Preferably, the address word conversion is based on one-to-one mapping to preserve distinctness, wherein every non-converted address word is converted to a one converted word, and each of the converted words is associated with one non-converted address word. In this way, the memory 171 retains its ability to store 256 8-bit data words. Hence, a sequential wiring of data to the memory 171 (using sequential addresses), may not result in sequential storing of the data. While the data can be written and read in the sub-system 180 as before (e.g., as in sub-system 170), the memory 171 as a separate device holds the data in a random order, not related to the writing or reading addresses assigned by the processor. Further, reading the data from the memory 171 requires the use or the knowledge of the address scrambler 181 mapping function.

In one non-limiting example, the address scrambler functionality is implemented by swapping or mixing the routing of the address word. A non-limiting example of such address scrambler 191 is shown connected to memory 171 in computer sub-system 190 shown in FIG. 19.

The address scrambler is formed by connecting input address lines to other address lines, not corresponding to the input ones. Each of the address lines is connected to an output address line which may not be the same. In the non-limiting example of FIG. 19, the input (before conversion) address line $A_7$ 176a is connected to the memory input line $A_5$ 182c, address line $A_6$ 176b is connected to the memory input line $A_3$ 182e, address line $A_5$ 176c is connected to the memory input line $A_7$ 182a, address line $A_4$ 176d is connected to the memory input line $A_4$ 12d, address line $A_3$ 176e is connected to the memory input line $A_0$ 182h, address line $A_2$ 176f is connected to the memory input line $A_1$ 182g, address line $A_1$ 176d is connected to the memory input line $A_6$ 182b, and address line $A_0$ 176h is connected to the memory input line $A_2$ 182f. While the address scrambler 191 is exampled where a single address line ($A_4$) is not being routed, it is apparent that none of the lines, as well as any number out of the lines, may not be routed. The address scrambler 191, connected between the bus 166 address logic 174 and the memory 171, convert any address word to another (one to one mapping), thus randomizing the location of the written data in the memory 171. Hence, address scrambler 191 is required in order to use the information stored in memory 171, either as a physical entity connected to the memory 171 while reading or by having the knowledge of the routing scheme implemented in the address scrambler 191.

The address scrambler 191 acts as both a scrambler and a de-scrambler. When writing to the memory 171, the address scrambler 191 acts as a scrambler, and support the encryption of the data written by converting to an address other than that carried over the bus 166, by changing the order of the address bits. When data is read from the memory 171, the address scrambler 191 effectively acts as a de-scrambler that provides access the correct data stored in the memory 171 in the pre-converted address. Hence, the term 'scrambler' herein refers to a scrambler, a de-scrambler or both.

The address scrambler 191 is used with an 8-bit width address bus, and thus includes 8 inputs and 8 outputs, connected in a one-to-one topology. The number of such possible mapping schemes is the factorial of 8, 8!=40,320.

Figure 19:
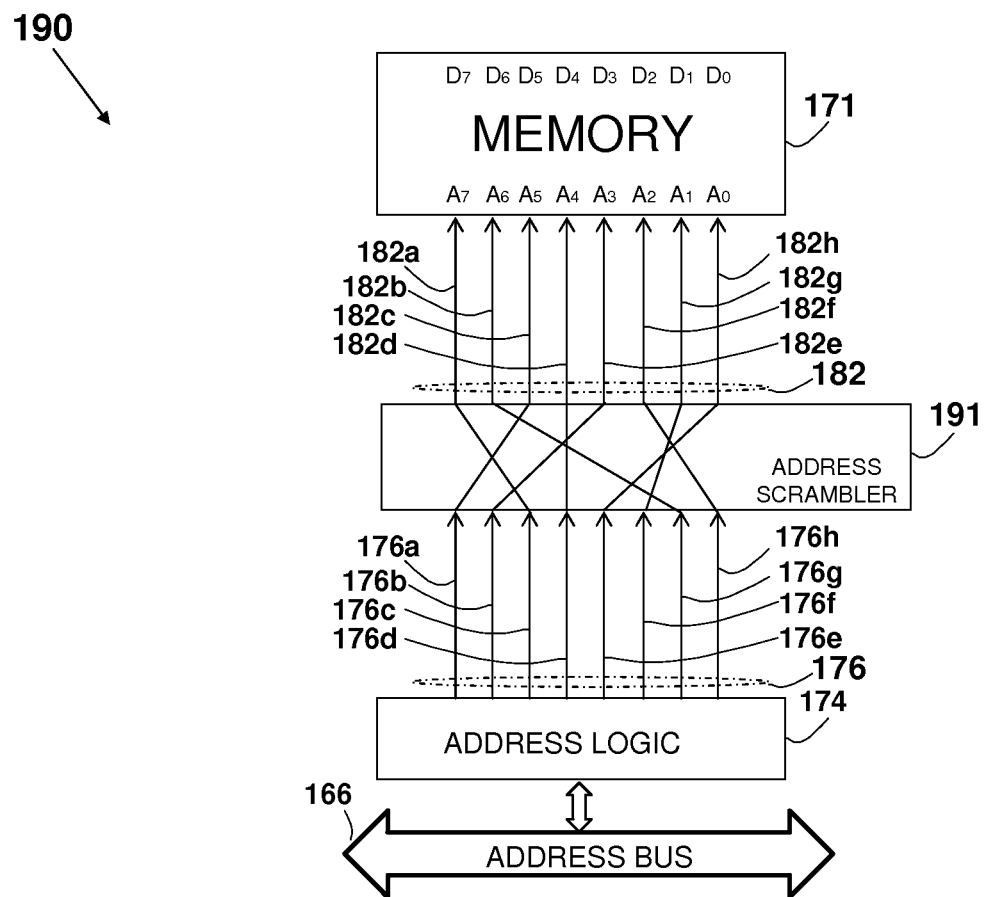
FIG. 19 illustrates a schematic electrical diagram of a connections-based address scrambler interfacing a memory.

Hence 40,320 different address scramblers such as the address scrambler 191 shown in FIG. 19 may be used, each offering a distinct mapping/routing scheme. An attacker trying to decrypt the content of an encrypt memory such as memory 171 shown in FIG. 19, will need to try 40,320 combinations in order to cover all possible mapping schemes. In the case of 16-bit width address bus, where the address scrambler maps 16 inputs to 16 outputs, the number of possible routing schemes is $16!=\sim 2.0922 \times 10^{13}$. Assuming checking each possible routing scheme requires 1 millisecond, checking whole possible options will last about $2 \times 10^{10}$ seconds (~1267.5 years). Similarly, 32-bit width address will result in approximately $32!=\sim 2.63 \times 10^3$ (~8.33× $10^{78}$ years), and 32-bit width address will result in approximately $64!=1.26 \times 10^{89}$ (~3.9×10 years).

A scrambler such as the address scrambler 191 is based on connections between inputs and outputs, using conductors such as wires or PCB traces. Such scrambler is simple and cheap, and can be easily manufactured or made. Further, such scrambler does not include any power consuming electronic components, hence does not require any connection to an electric power source. Further, such scrambler does not induce any latency in accessing the memory, and thus does not impact the computer or memory performance.

In one non-limiting example, the scrambler uses logic gates for the address conversion. A non-limiting example for such address scrambler 193 is shown in sub-system 192 in FIG. 19a. While in a passive scrambler such as the address scrambler 191 the addresses $00_H$ and $FF_H$ are retained and are not converted, regardless of the mapping scheme, logic based conversion is capable of mapping all addresses. In the non-limiting example of FIG. 19a, the input (before conversion) address line $A_7$ 176a is connected after converting via an inverter (NOT) gate 194c to the memory input line $A_5$ 182c, address line $A_6$ 176b is connected to the memory input line $A_3$ 182e, address line $A_5$ 176c is connected to the memory input line $A_7$ 182a, address line $A_4$ 176d is connected via inverter gate 194b to the memory input line $A_4$ 182d, and address line $A_3$ 176e is connected to the memory input line $A_0$ 182h. Similarly, address line $A_2$ 176f is connected to the memory input line $A_1$ 182g, address line $A_1$ 176d is connected to the memory input line $A_6$ 182b, and address line $A_0$ 176h is connected via inverter gate 194a to the memory input line $A_2$ 182f. While three inverter gates are shown, any number of inverter gates can be equally used. Further, while inverter gates are shown that has only one input, any type of gates, having any number of inputs may be equally used. Further, any combinatorial logic implementing any Boolean logic or algebra for mapping input address to an output address, preferably using one-to-one mapping, may be used. The logic block 197 may use discrete gates, memory, ASICs, PLDs, processors or any combination thereof. Such logic may be based on sum of products or product of sums, and may include Arithmetic Logic Unit (ALU), half-adders, full-adders, half-subtractors, full-subtractors, multiplexers, demultiplexers, encoders, decoders, inverters (NOT gates), AND gates, OR gates, XOR (exclusive-OR) gates, NAND (NOT-AND) gates, NOR (NOT-OR) gates, and XNOR (exclusive-NOR) gates. A non-limiting example is generic logic block 197, being part of the address scrambler 196 shown as part of sub-system 195 in FIG. 19b. Such a logic block 197 may be comprised of discrete standard off-the-shelf logic gates, commonly in the form of ICs each implementing a fixed logic function, connected together to form the Boolean function. Alternatively, the logic block 197 may be implemented using ASIC (Application-Specific Integrated Circuit), which is an IC customized in manufacturing to provide the required logic function. Preferably, the logic block 197 is based on a PLD (Programmable Logic Device), which is a generic term for IC that is manufactured with arrays of logic gates (commonly 'AND' and 'OR' gates, gate arrays, cells or macrocells), which can be programmed or reconfigured after manufacturing (e.g., by a user or in a laboratory), using a dedicated programmer, on-board programming or otherwise, to implement a desired logic function by creating the suitable connections within the device. Non-limiting examples of PLDs are PAL (Programmable Array Logic), GAL (Generic Array Logic), CPLD (Complex Programmable Logic Device), FPGA (Field-Programmable Gate Array). In another non-limiting example, the logic function of the logic block 197 is implemented using a dedicated processor (separated from the processor accessing the memory for using it), supported by a memory and logic gates. The PLD programmed interconnection arrangement may be volatile or preferably non-volatile. In the case where the pattern program onto a PLD is non-volatile, it can use any technology used for non-volatile memories, such as flash memory, EPROM or EEPROM cells, or attached battery.

In one non-limiting example, the memory is used in order to perform the address mapping. Such an arrangement is shown as sub-system 198 shown in FIG. 19c, disclosing a memory 199 being part of the address scrambler 196. The memory 199 is used to create the combinational logic function such as LUT (Look-Up Table), where the address over the bus 176 serves as the address of the memory 199, and the resulting data read from the memory 199 serves as the address to memory 171 over bus 182. The logic function required is first determined, and then programmed into the memory 199 to be used thereafter. Any type of memory having the required address bus (e.g., 8-bit width in memory 199) and the required data bus (e.g., 8-bit width in memory 199) may be used, preferably non-volatile. The content may be programmed in manufacturing, such as a ROM, or can be programmed using a dedicated programmer. In one non-limiting example, the memory 199 content is being written by the processor, for example as part of the computer initialization. In such a case, the memory 199 in address scrambler 196 is fully accessible via the address bus 166 via connection 1981 (and the required support logic) and via the data bus 167 via connection 1980 (and the required support logic), and is further accessible via the control bus 165 via the control logic 1982, and thus may use the R/W signaling over the line 1983. In such a configuration, the processor may access the memory 199 in a way similar to the way the memory 171 is accessed, and can thus write its content, as required. Similarly, such an arrangement may support on-board programming of a PLD-implemented logic 197. For example, the memory 199 may be part of such PLD or attached thereto, storing its configuration.

Figure 18:
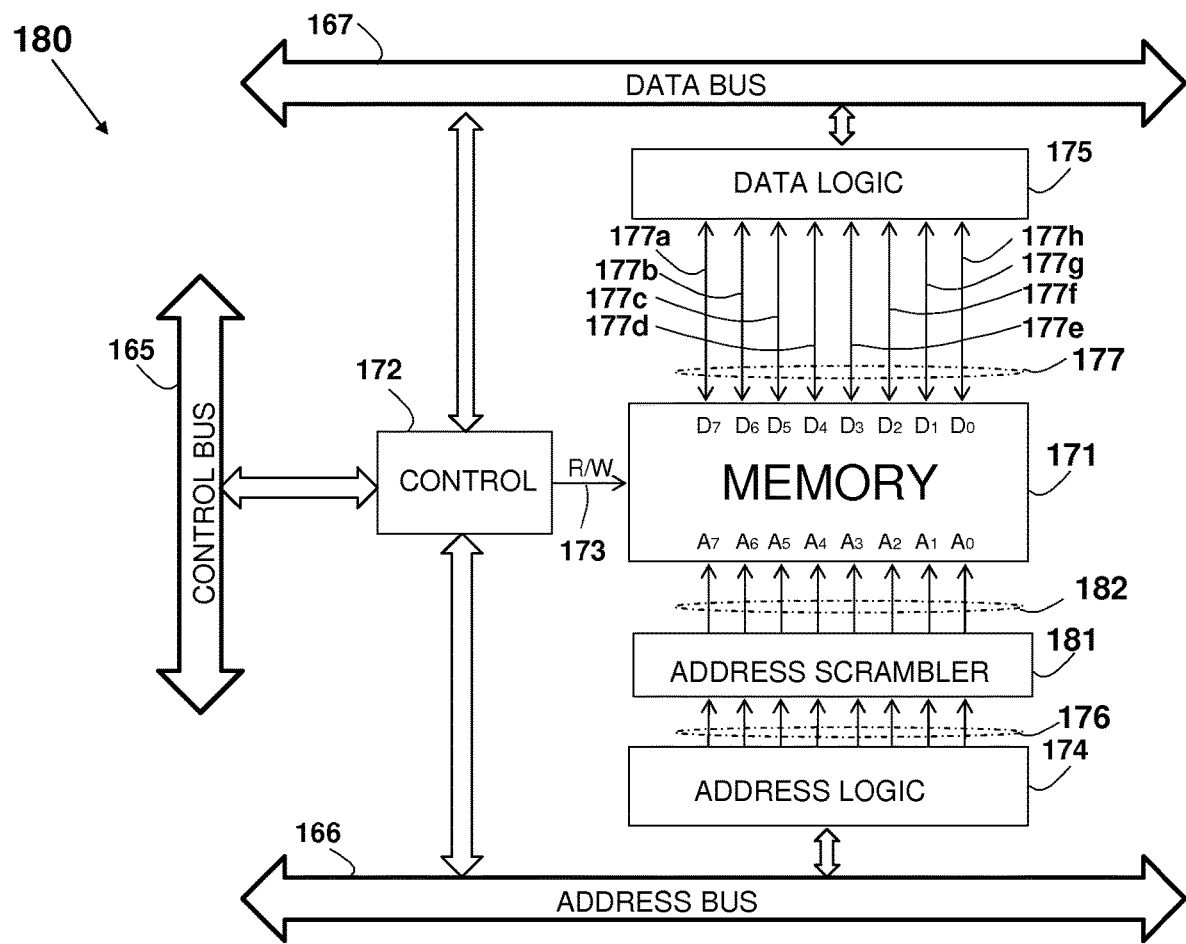
FIG. 18 illustrates a schematic electrical diagram of an address scrambler interfacing a memory.

In the case of logic or memory-based address mapping, any address word from the processor is preferably one-to-one mapped to same or another address, as exampled in FIGS. 18 and 19. In the case of 8-bit width address, the memory capacity may be $2^8=256$ addresses (address space), and an address scrambler implements an addressing conversion scheme that maps each of these addresses to another address in this address space. The total number of such addressing schemes is factorial $(2^8)!=256!=\sim 8.578 \times 10^{506}$. Similarly, 16-bit address bus allows for $(2^1)!=65,536!$, and 32-bit address space results in $(2^{32})!=4,294,967,296!$ possible addressing conversion schemes, hence making it difficult for an attacker to identify the scheme actually used, and thus offering a high degree of encryption.

While FIGS. 18 and 19 illustrated an address scrambler for manipulating the memory 171 address words, an encryption may involve the manipulation of the data word read from or written to the memory 171, or both, typically using one-to-one mapping. A data scrambler 201 is shown in sub-system 200 in FIG. 20, connected between the data bus 167 via the data logic 175 and bus 177, and the memory 171 via bus 202. Since typically the same data connections are used for both reading from, and writing to, a memory, the data scrambler 201 commonly supports the two-way signal transfer, directed from the bus 167 to the memory 171 in a 'Write to memory 171' cycle, and from the memory 171 to the data bus 167 in a memory 171 read cycles. While the data connections, such as bi-directional buses 175 and 202, and the memory 171 are exampled in FIG. 20 as having 8-bit word width ($D_7$-$D_0$), any other width size may be equally used.

In one non-limiting example, the data scrambler is implemented by routing the data lines and changing their respective locations in the data word, similar to the address scrambler 191 shown in FIG. 19. Such a non-limiting example of a data scrambler 211 is shown as part of sub-system 210 in FIG. 21. The data line $D_7$ of the data bus 177 (associated with the data bus 167) is connected to the data line $D_5$ of the memory 171 (via data bus 202). The data line $D_6$ of the data bus 177 is connected to the data line $D_3$ of the memory 171, the data line $D_5$ of the data bus 177 is connected to the data line $D_1$ of the memory 171, the data line $D_4$ of the data bus 177 is connected to the data line $D_7$ of the memory 171, the data line $D_3$ of the data bus 177 is connected to the data line $D_4$ of the memory 171, the data line $D_2$ of the data bus 177 is connected to the data line $D_0$ of the memory 171, the data line $D_1$ of the data bus 177 is connected to the data line $D_2$ of the memory 171, and the data line Do of the data bus 177 is connected to the data line $D_6$ of the memory 171. Since the connections are passive and have no direction, scrambling and de-scrambling (in the associated directions) is achieved. Similar to the above discussion regarding the address scrambler 191, there are 8!=40,320 variations of 8-bit wide data bus scrambling, 16!=~2.0922×10$^{13}$ for 16-bit wide data bus scrambling, 32!=~2.63×10$^{35}$ for 32-bit wide data bus scrambling, and 64!=1.26×10$^{89}$ for 64-bits width data bus scrambling. A scrambler such as the data scrambler 211 is based on connections between inputs and outputs, using conductors such as wires or PCB traces. Such scrambler is simple and cheap, and can be easily manufactured or made. Further, such data scrambler does not include any power consuming electronic components, hence does not require any connection to an electric power source. Further, such scrambler does not induce any latency in accessing the memory, and thus does not impact the computer or memory performance.

Figure 19A:
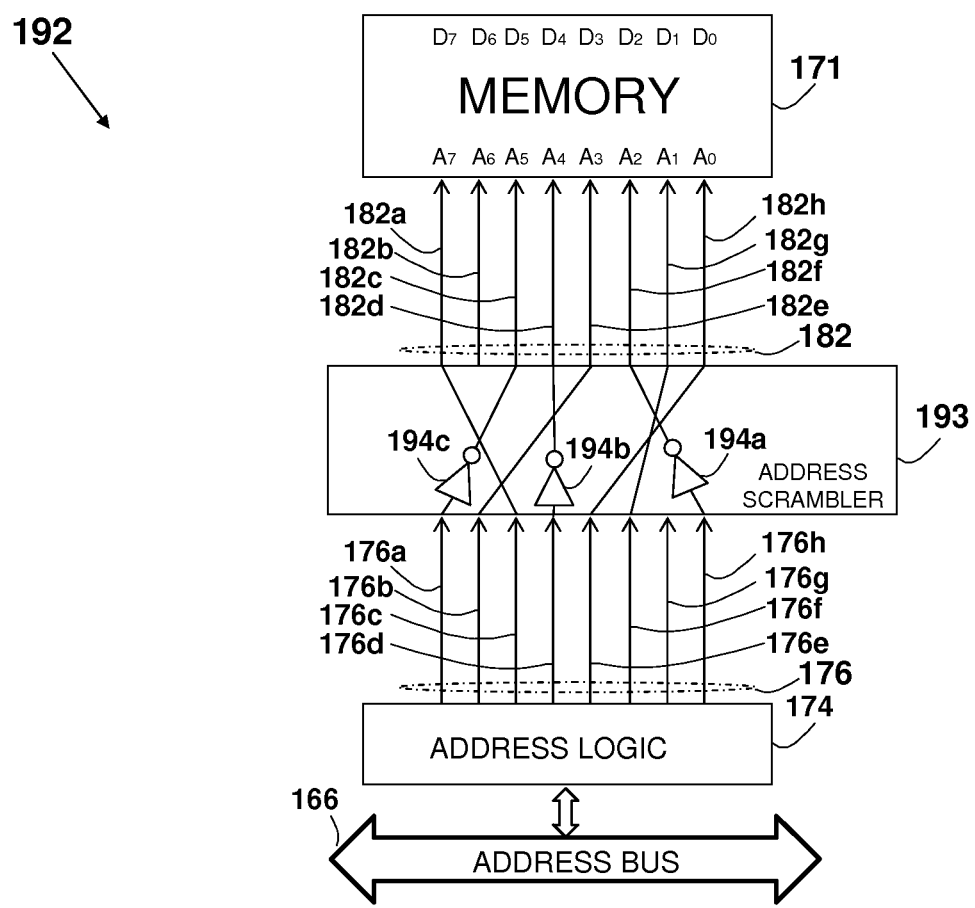
FIG. 19a illustrates a schematic electrical diagram of discrete logic gates based address scrambler interfacing a memory.
Figure 19B:
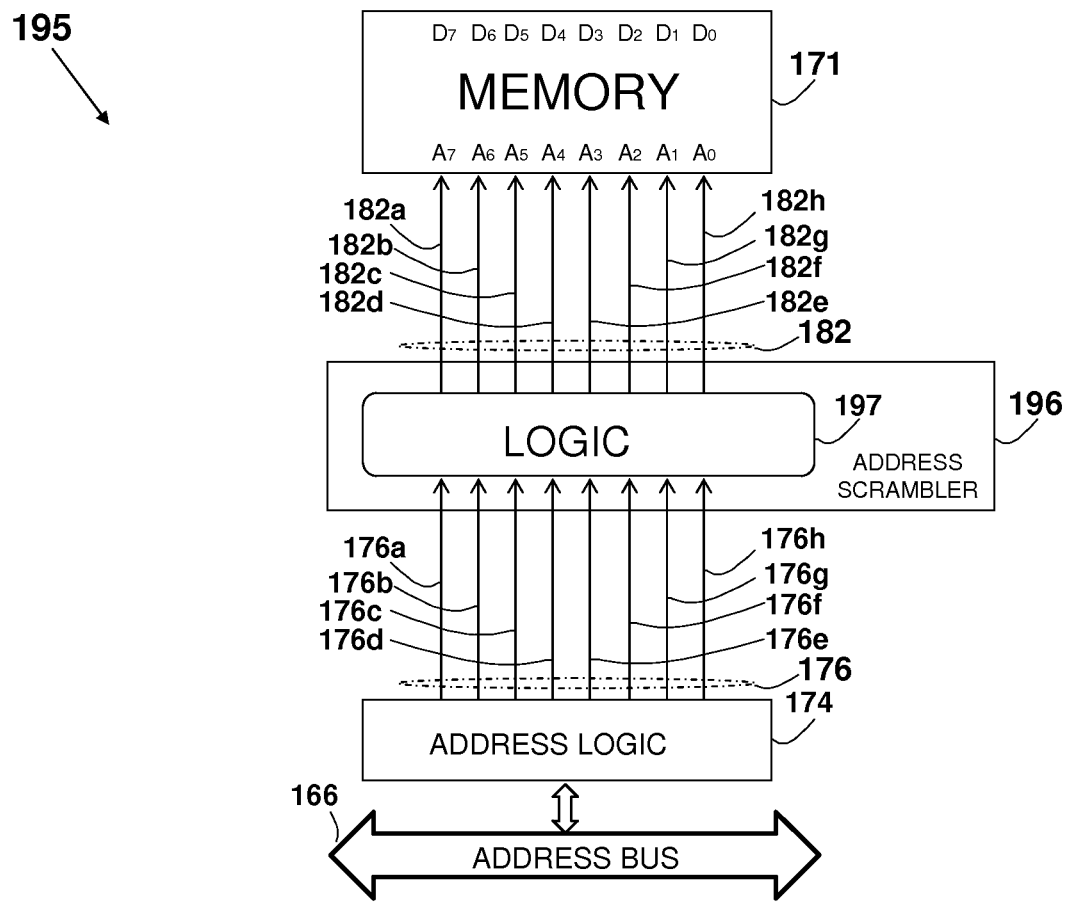
FIG. 19b illustrates a schematic electrical diagram of a general logic based address scrambler interfacing a memory.
Figure 19C:
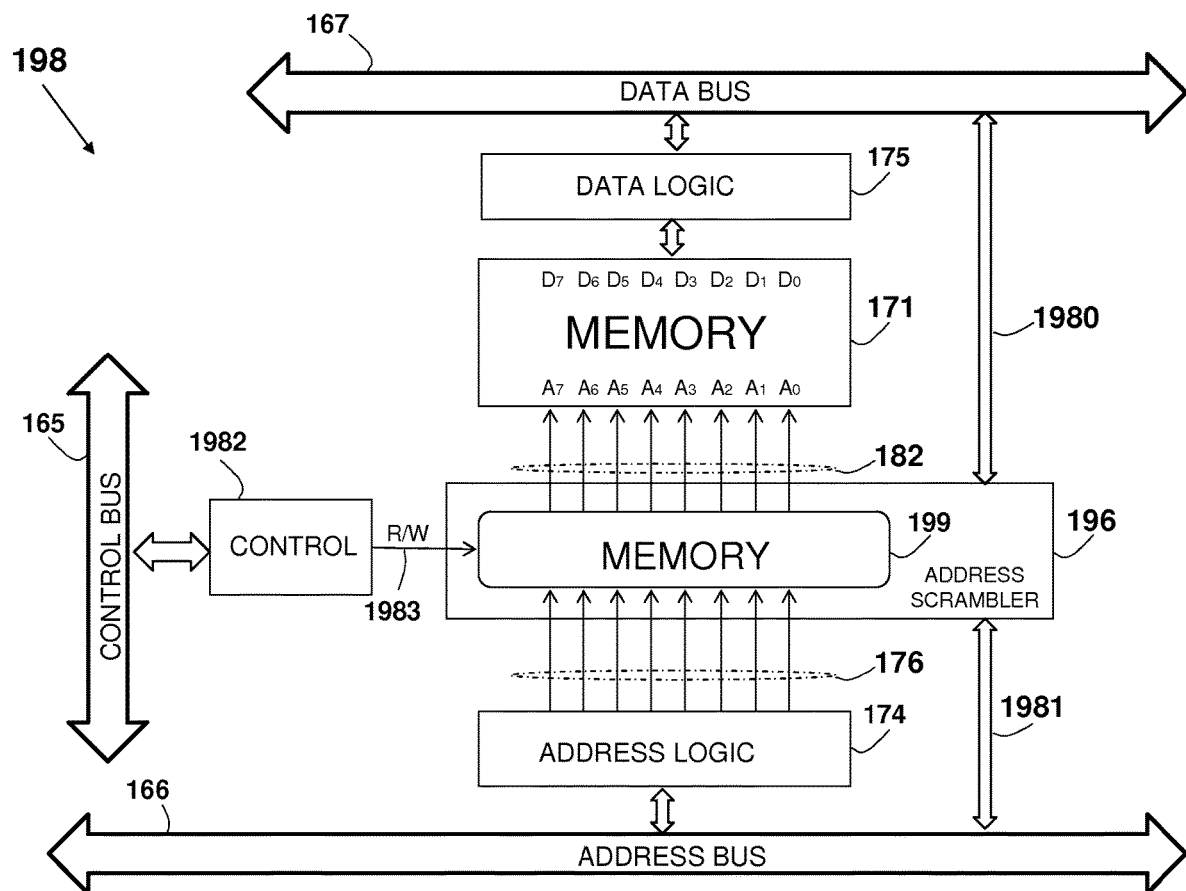
FIG. 19c illustrates a schematic electrical diagram of a memory based address scrambler interfacing a memory.

Similar to the logic gates based address scrambler 193 shown in FIG. 19a and the address scrambler 196 shown in FIG. 19b, a data scrambler may similarly be based on mapping one-to-one data based on logic circuitry. A non-limiting example of such data scrambler 213 is shown as part of sub-system 212 in FIG. 21a. The data written to the memory 171 is passed via the logic block 197a in the data scrambler 213, where the data is converted, in a similar way described above regarding the logic block 197 in address scrambler 196. Discrete logic gates, PLDs and other arrangements may be equally used, as described regarding the logic circuits of the address scrambler. The scrambled data is written to the memory 171 via the data lines 202. The logic block 197a is activated only in a writing cycle to the memory 171, as indicated by the R/W line 173 connected to the data scrambler 213, in parallel to the connection to the memory 171. In a memory 171 read cycles, the data read is passed unchanged to the data bus 167 (via the data logic 175), via the pass-thru connections 218. Since the data is stored as scrambled in the memory 171, the data read is scrambled, and the software executed by the processor accessing the memory 171 for using this data needs to be aware of the scrambling in order to properly use the read data word.

In another non-limiting example, two logic blocks are used, each for a different data flow direction. Such an arrangement is shown in a data scrambler 215, being part of sub-system 214 shown in FIG. 21b. The logic block 197a is used (as in sub-system 212) to convert the data being written to the memory 171, while the logic block 197b is used when data is read from the memory 171. The data scrambler 215 uses the appropriate logic block according to the R/W line 173, which indicates whether 'read from memory' or 'write to memory' operation are currently executed. Preferable, the logic block 197a serving the writing to memory 171, and the logic block 197b serving the reading from memory 171, are both one-to-one mapping and are exactly inverse function, such that if the logic block 197a maps the data word 'X' to the word 'Y' written to the memory 171, the logic block 197b maps back the data word 'Y' read from the memory 171 to the original data word 'X'. Hence, while the data is stored as encrypted in the memory 171, this is transparent to any software being executed by the processor. While two distinct logic blocks 197a and 197b are shown, a single logic block may be equally used, wherein a support logic circuitry route the input data to the data scrambler 215 (either from the memory 171 or from the data bus 167) to the logic block input, and similarly the output is routed to the data scrambler output (respectively either to the data bus 167 or to the memory 171).

Similar to the address scrambler 196 described above, the logic blocks 197a, the block 197b, or both, may be implemented using a memory. Such data scrambler 217 based on a memory 199 is shown as part of sub-system 216 in FIG. 21c. The memory 199 types and programming options described above regarding memory 199 as part of the address scrambler 196 may be equally applied to the memory 199 being part of the data scrambler 217. Either two memories may be used, one for each direction, similar to the two logic blocks described in data scrambler 215, or preferably a single memory may be used, supported by logic circuitry for properly routing the input/output of the memory based on the R/W line 173 status.

Similar to the above discussion regarding using address scrambler, in the case of 8-bit width data word and when memory or logic circuits (such as PLD) is used, the total number of such data scrambling schemes is factorial ($2^8$)!=256!=~8.578×10$^{506}$. Similarly, 16-bit data bus allows for ($2^{16}$)!=65,536!, and 32-bit data words results in ($2^{32}$)!=4, 294,967,296! possible conversion schemes, hence making it difficult for an attacker to identify the scheme actually used, and thus offering a high degree of encryption.

Figure 20:
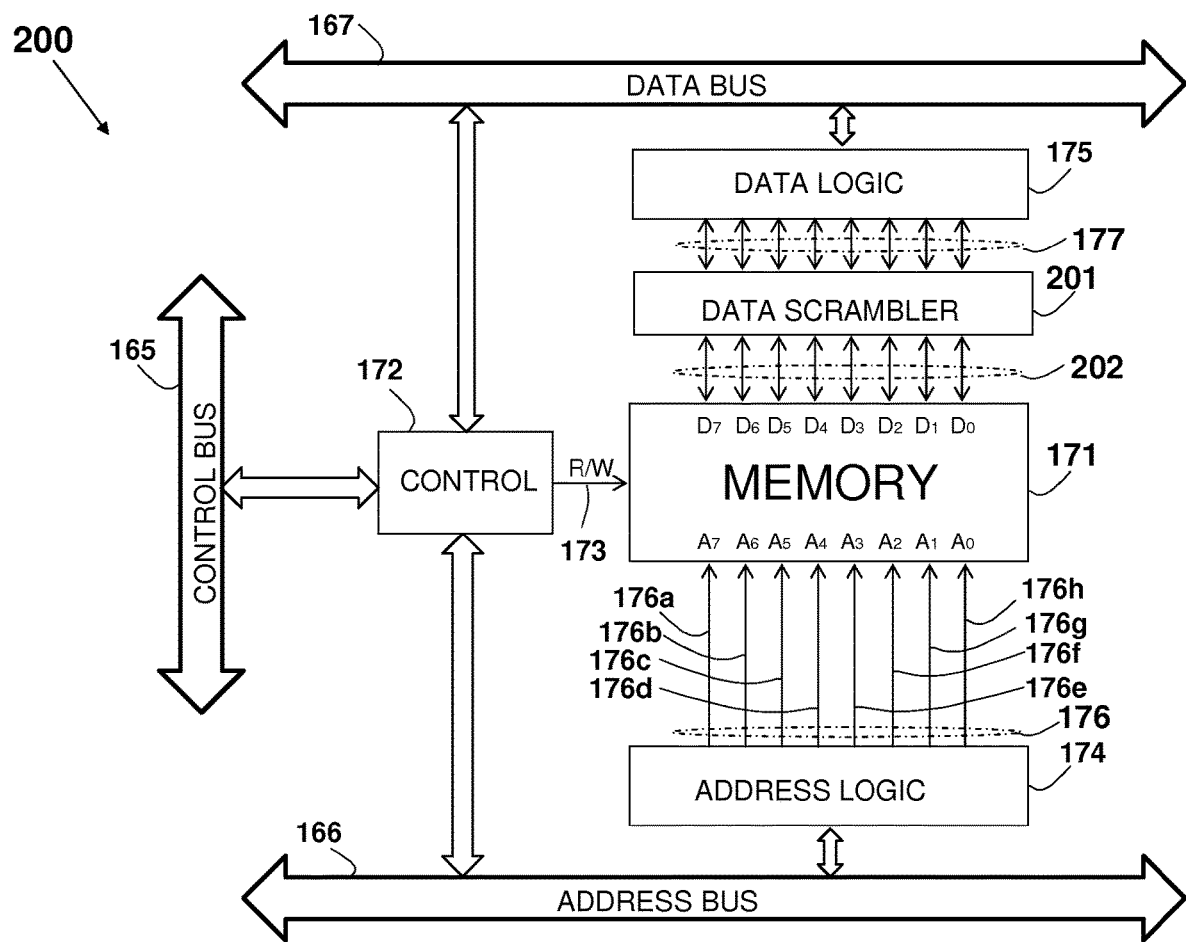
FIG. 20 illustrates a schematic electrical diagram of a data scrambler interfacing a memory.
Figure 21:
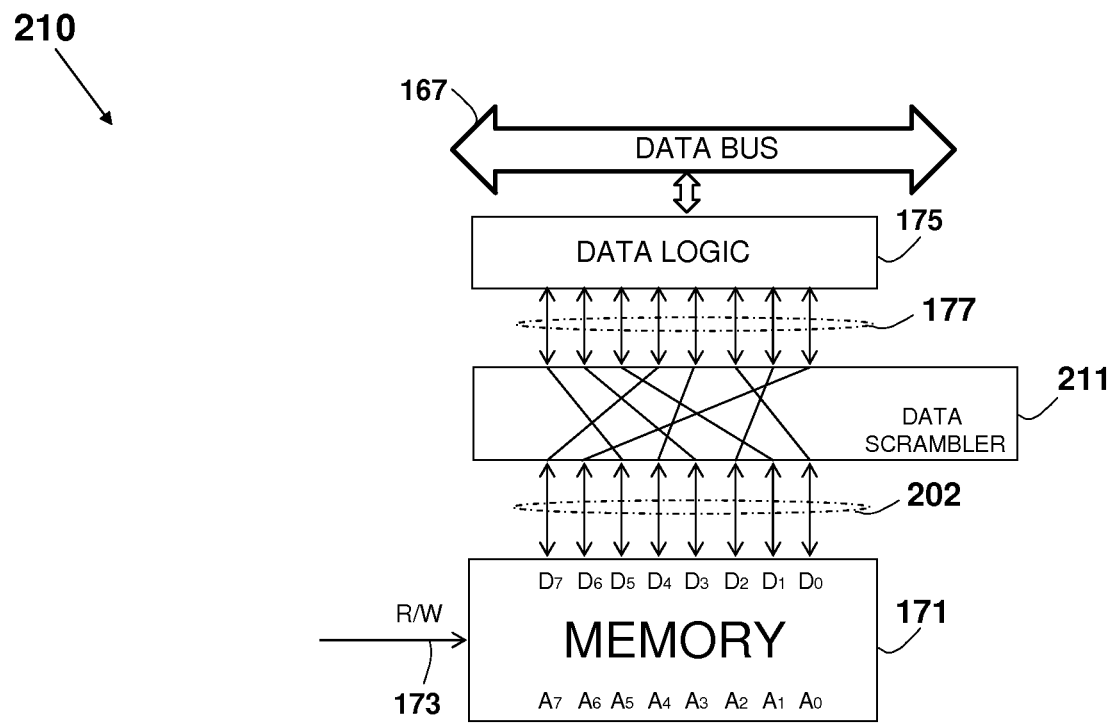
FIG. 21 illustrates a schematic electrical diagram of a connections-based data scrambler interfacing a memory.
Figure 21A:
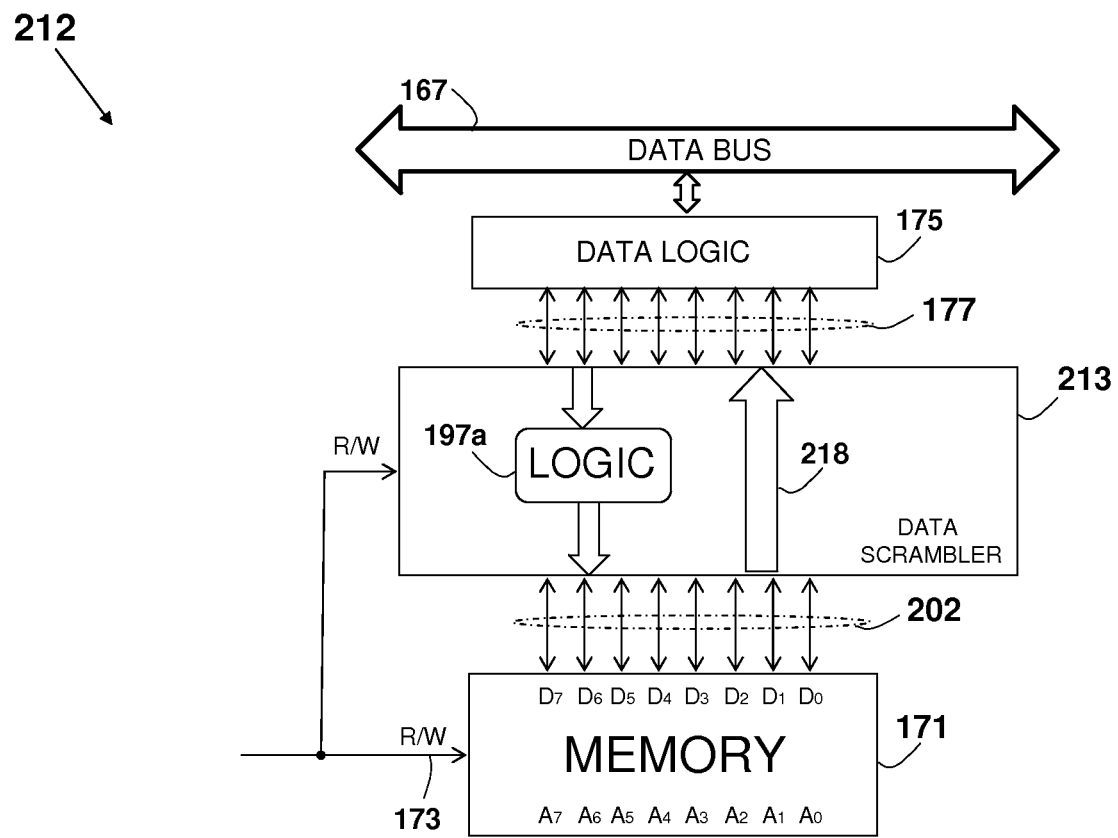
FIG. 21a illustrates a schematic electrical diagram of a one-way logic block based data scrambler interfacing a memory.
Figure 21B:
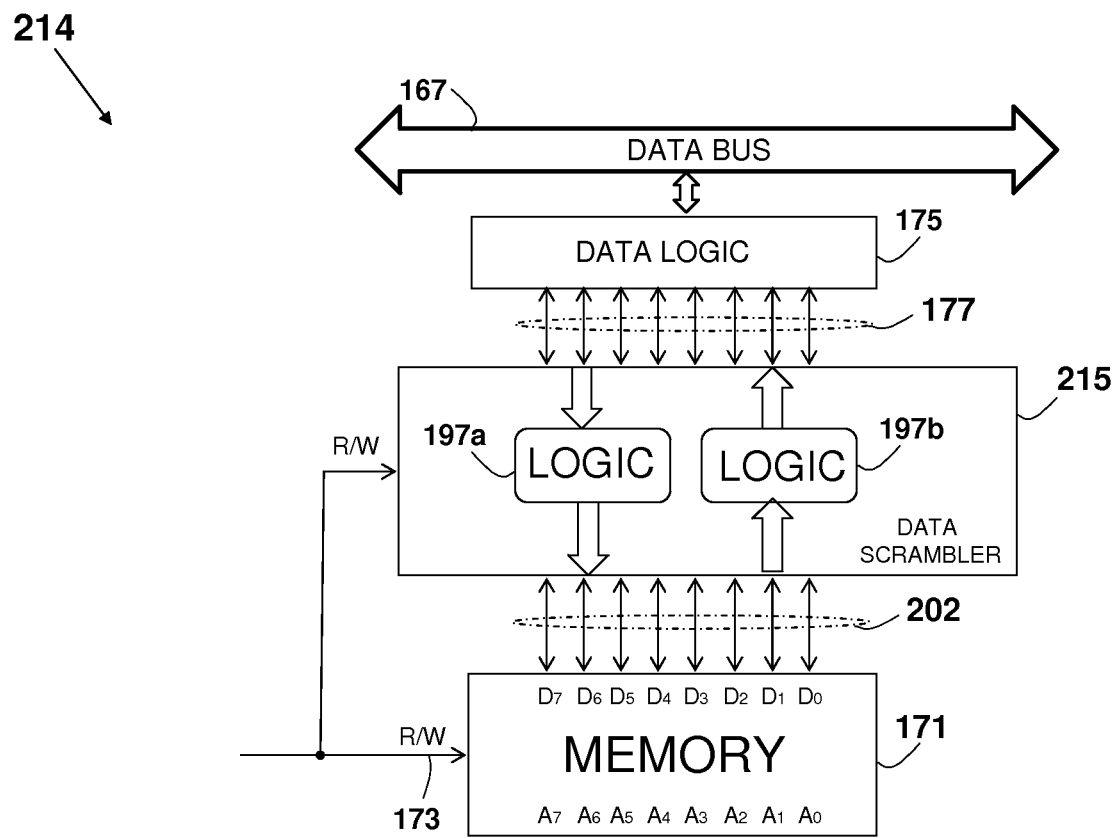
FIG. 21b illustrates a schematic electrical diagram of a two-way logic block based data scrambler interfacing a memory.
Figure 21C:
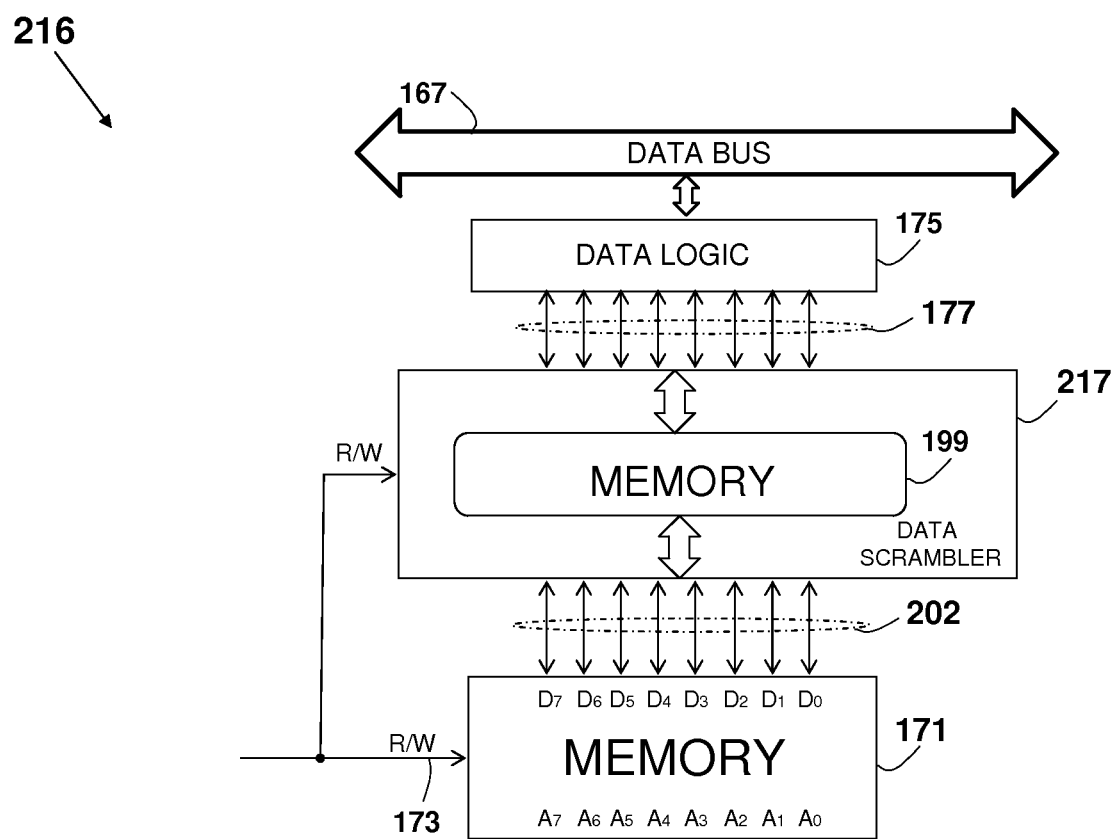
FIG. 21c illustrates a schematic electrical diagram of a memory based data scrambler interfacing a memory.
Figure 22:
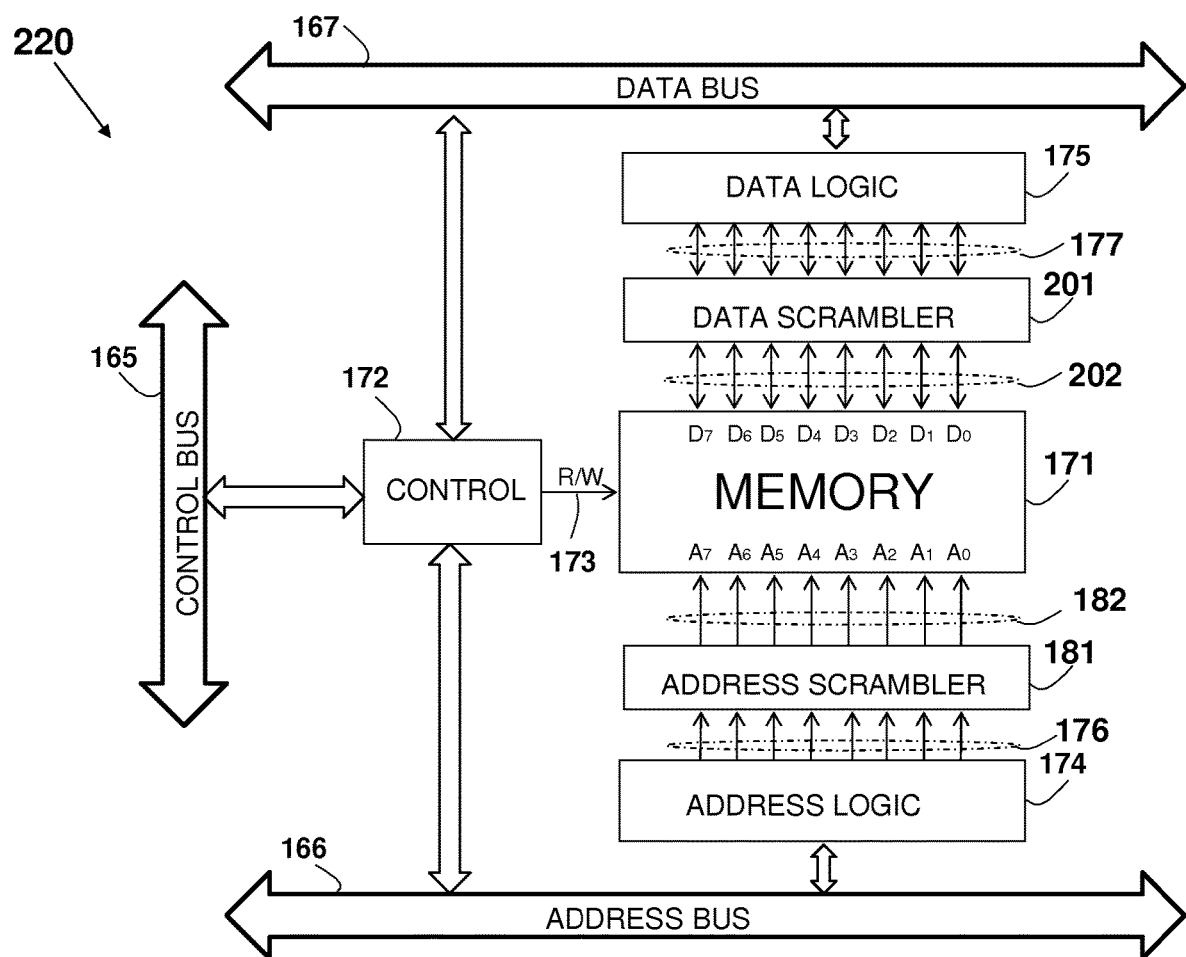
FIG. 22 illustrates a schematic electrical diagram of data and address scramblers interfacing a memory.

While FIGS. 18-19 above describe manipulating of the address words by the use of address scrambler, and FIGS. 20-21 above describe manipulating of the data words by the use of data scrambler, in one preferred embodiment both scramblers are used. Such a non-limiting example of sub-system 220 is shown in FIG. 22, describing the memory 171 being accessed via address scrambler 181 and data scrambler 201. The scrambling of the data and the scrambling of the address may be the same, similar or different, and may be fully independent from each other or may be dependent in some way. For example, the width of the data and address words may be the same (e.g. 16 bits), or may use different width (e.g. 8-bit data word width and 32-bit address word width). Similarly, the address scrambling may be passive and connection-only based, such as address scrambler 191 shown in FIG. 19, while the data scrambling may be memory-based or PLD-based, such as data scrambler 217 shown in FIG. 21c or data scrambler 215 shown in FIG. 21b. Further, the implementation arrangement may be the same, similar or different. For example, a data scrambler may use a memory based mapping while the address scrambler may use discrete logic gates. One advantage of such an arrangement is the increase in the total number of scrambling schemes, where in the case that the address scrambling may be implemented using Y possible schemes and the data scrambling may be implemented using Z possible schemes, the total number of obtained schemes using both scramblers is their multiplication Y x Z. For example, in the case where the address scrambler uses memory-based 8-bit width, offering $(2^8)!=256!\approx 8.578\times 10^{506}$ possible mapping arrangements, and where the data scrambler uses 8-bit connections-based mapping, offering 8!=40,320 variations, the total schemes using both data and address scrambling will be $\sim 40,320\times 8.578\times 10^{506}=\sim \mathbf{3.458\times 10^{511}}$.

Figure 21D:
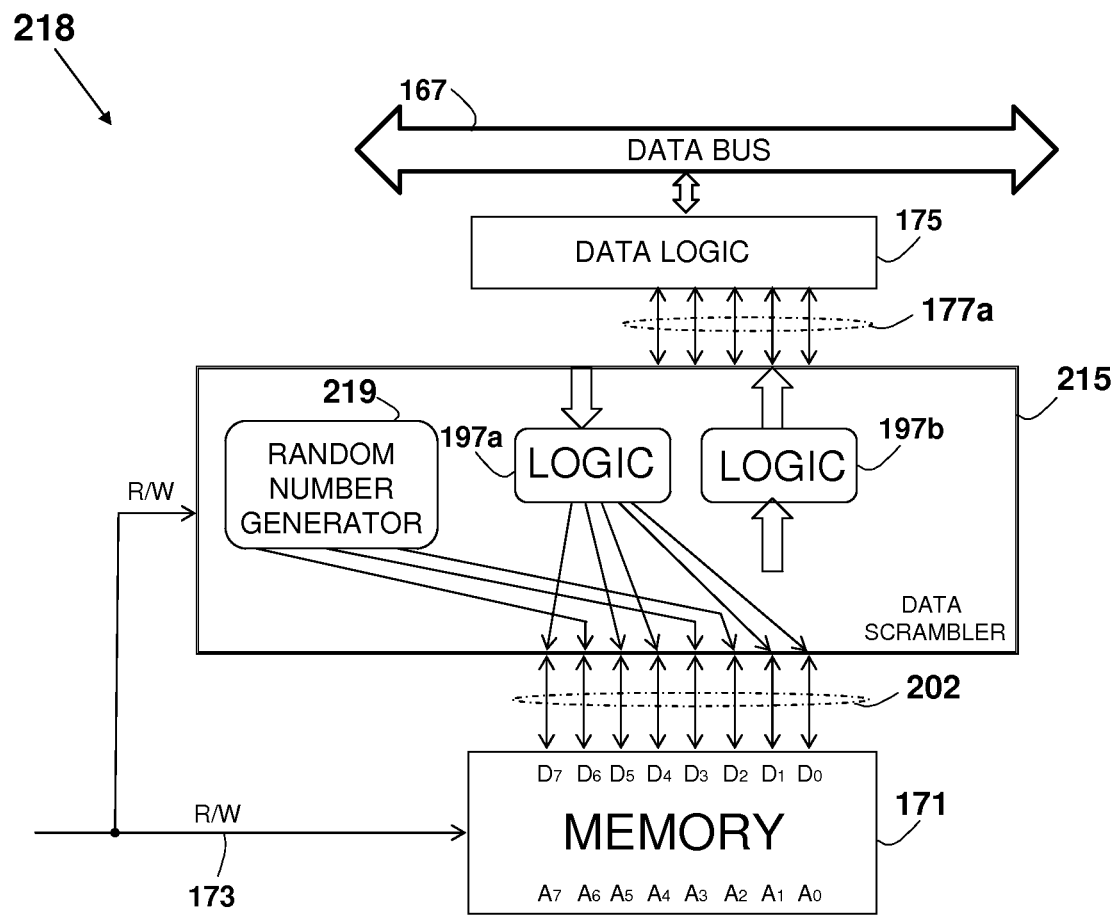
FIG. 21d illustrates a schematic electrical diagram of a data scrambler interfacing a memory, based on a two-way logic block and a random number generator combined.

Further encryption may be achieved by filling part of the memory 171 with random or meaningless information, as exampled in sub-system 218 shown in FIG. 21d, illustrating data scrambler 215 including a randomness capability. In this non-limiting example, the data bus is 5-bit wide while the memory 171 can store 8-bit wide data words. The 5-bit data words are bi-directionally carried over data bus 177a between the data bus 167 and the data scrambler 215. Part of the memory 171 data lines, namely the 5 bits $D_7$, $D_5$, $D_4$, $D_1$ and $D_0$ of the memory 171 are scrambled by the logic 197a as described before, using PLD, discrete gates, memory, processor or simple connections, providing a one-to-one mapping of the 5-bit data words. The other data bits, namely $D_6$, $D_3$ and $D_2$, are the output of the random number generator 219. In any memory 171 writing cycle, the 8-bit word written to the memory 171, is composed of 5 bits which are actual data, converted by the logic 197a, and 3 bits are random. An attacker without prior knowledge cannot easily separate the random bits from the real data bits. In 'reading from memory 171' cycle, the logic 197b convert back only the 5 data bits into the original data word, and passes it along to the data bus 167. While the number of bits used for randomizing in the non-limiting example of FIG. 21d is 3, it is clear that any number of bits may be equally used, using a random number generator having a suitable output width. Using large number of bits increases the memory content security, but reduces the effective capacity of the memory used.

The random signal generator 219 can be hardware based, using a physical process such as thermal noise, shot noise, nuclear decaying radiation, photoelectric effect or other quantum phenomena, or can be software based, using a processor executing an algorithm for generating pseudo-random numbers which approximates the properties of random numbers. A non-limiting example of random number generators is disclosed in U.S. Pat. No. 7,124,157 to Ikake entitled: "Random Number Generator", in U.S. Pat. No. 4,905,176 to Schulz entitled: "Random Number Generator Circuit", in U.S. Pat. No. 4,853,884 to Brown et al. entitled: "Random Number Generator with Digital Feedback" and in U.S. Pat. No. 7,145,933 to Szajnowski entitled: "Method and Apparatus for generating Random signals", which are incorporated in its entirety for all purposes as if fully set forth herein. The digital random signal generator 219 can be based on 'True Random Number Generation IC RPG100/RPG100B' available from FDK Corporation and described in the data sheet 'Physical Random number generator RPG100.RPG100B' REV. 08 publication number HM-RAE106-0812, which is incorporated in its entirety for all purposes as if fully set forth herein.

Figure 22A:
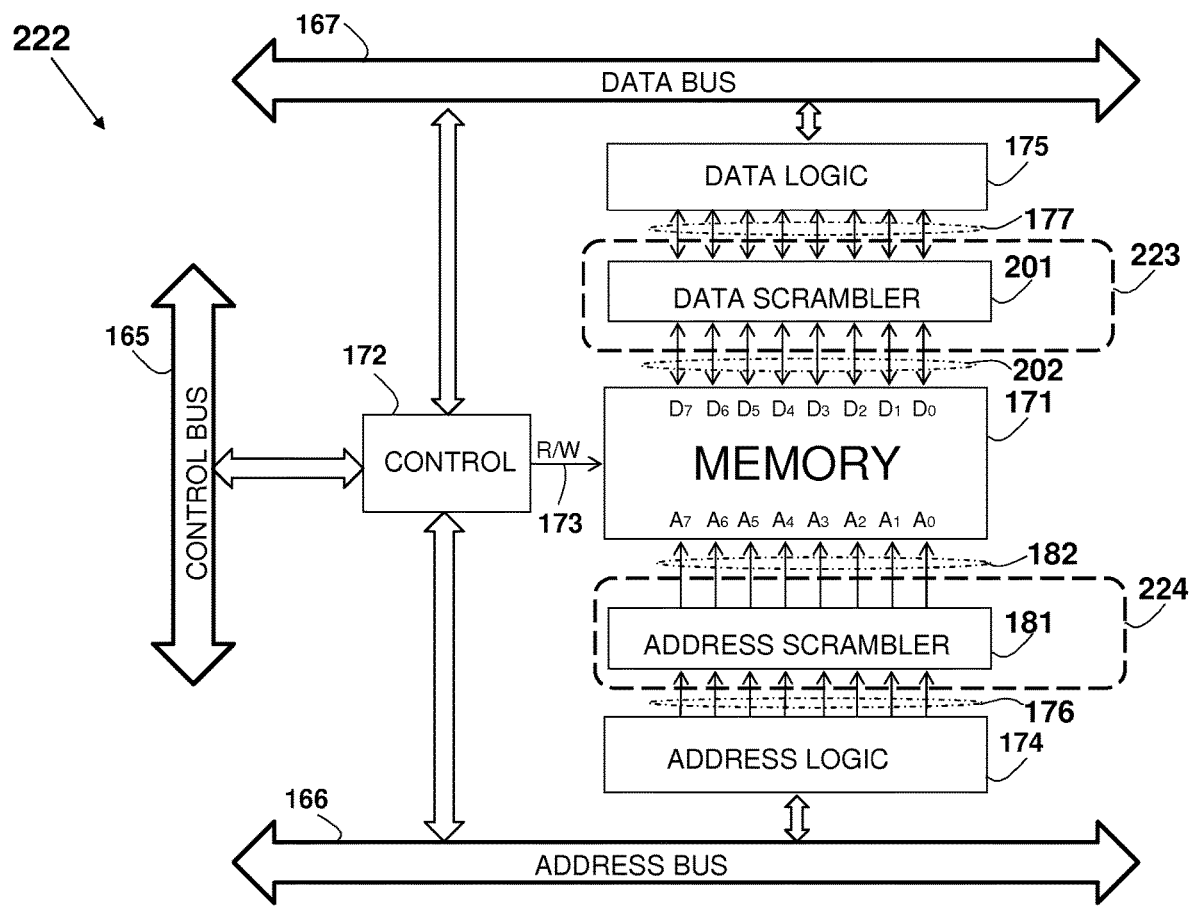
FIG. 22a illustrates a schematic electrical diagram of data and address scramblers interfacing a memory.

The data scrambling and the address scrambling related implementations (hardware or software) may be separated and independent, as shown in FIG. 22a disclosing a sub-system 222 including a data scrambler related functionality 223, which is based on the data scrambler 201, together with the supporting hardware such as bus interfaces. Similarly, sub-system 222 includes a data scrambler related functionality 224, which is based on the address scrambler 181, together with the suitable supporting hardware such as bus interfaces. In another non-limiting example, the data and address scramblers are not entirely separated, but may share various resources, such as power supply or power connection, mechanical support, various components or other shared circuits.

Figure 22B:
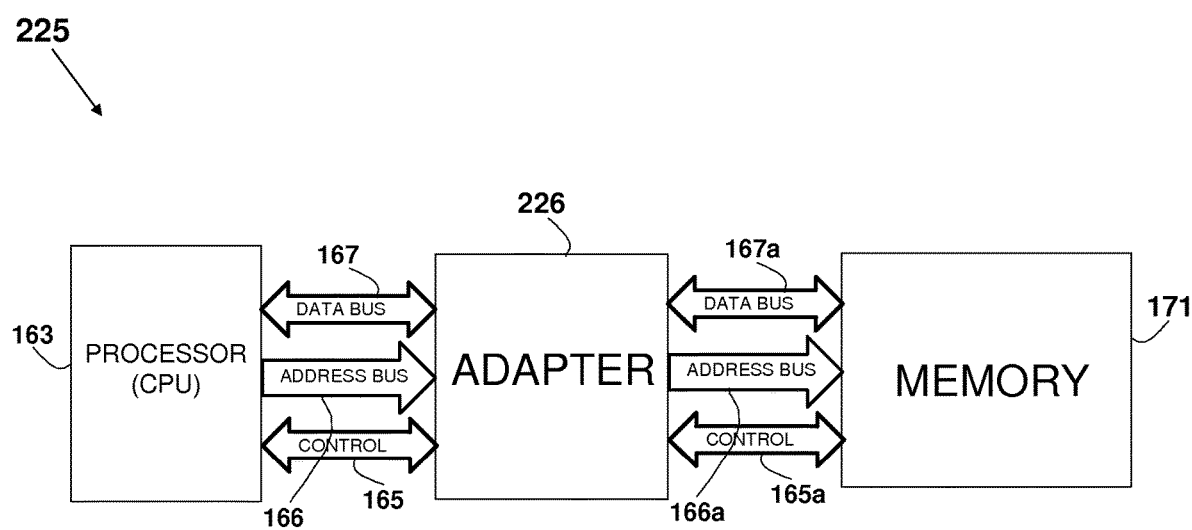
FIG. 22b illustrates a schematic electrical diagram of an adapter connected between a memory and a processor.

The general case is schematically shown as sub-system 225 in FIG. 22b. All the functionalities added in order to support scrambling or any other type of encryption is included in the adapter 226, which connects (directly or indirectly) to the processor 163 via the data bus 167, control bus 165 and the address bus 166 (which may be multiplexed as described above). The adapter 226 connects (directly or indirectly) to the memory 171 via the data bus 167a, the control bus 165a and the address bus 166a. Each of the buses may be pass-through or regenerated. Further, each of the buses may be parallel or serial type. Furthermore, a single bus carrying data, address and control (e.g. using TDM—Time Domain/Division Multiplexing), may as well be used for connecting the processor 163 to the adapter 226, for connecting the memory 171 to the adapter 226, or in both connections. The adapter may include only address scrambling functionality (such as address scrambler 181), only data scrambling functionality (such as data scrambler 201), or both functionalities. For example, in the case of data scrambling only, the address bus 166 may not be connected to the adapter 226, or passed-through without any manipulation via the adapter 226 to the memory 171. Further, the adapter 226 may only manipulate the information (e.g., data and/or address words) carried over the buses without changing or modifying their protocol or format, or may also convert between different formats or protocols.

Figure 22C:
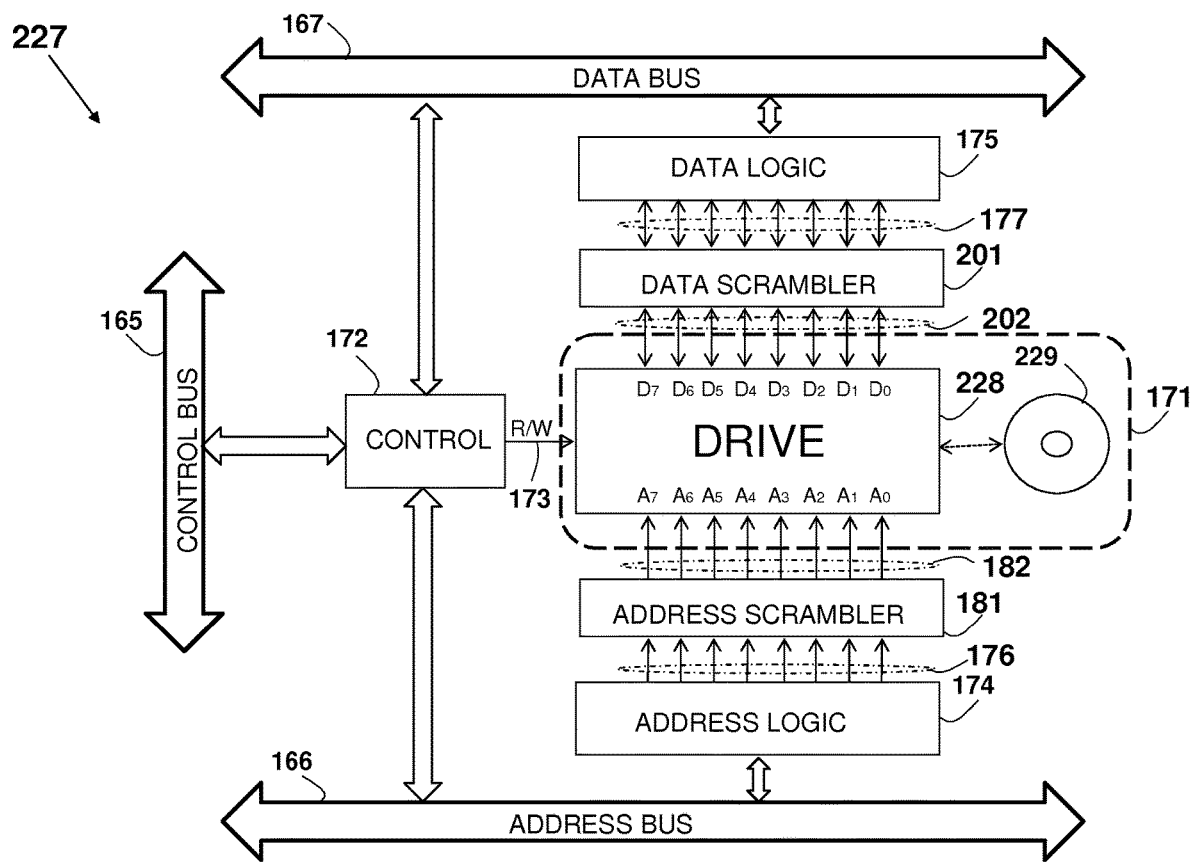
FIG. 22c illustrates a schematic electrical diagram of data and address scramblers interfacing a removable-medium memory.

Referring now to FIG. 22c, showing a sub-system 227 where the memory 171 is based on a drive 228 and a removable storage medium 229, and where both data scrambler 201 and address scrambler 181 are used. For example, the drive 228 may be a DVD recorder and the media 229 may be a DVD-R type disk. A data written onto the media 229 by the drive 228 is encrypted based on the address scrambling scheme implemented in the address scrambler 181 and in the data scrambling scheme implemented in the data scrambler 201. An attacker, having no prior information, is probably not able to easily decipher the encrypted information written on the media 229, due to the large number of possible scrambling schemes. However, reading the media 229 can easily be performed by the sub-system 227, or by having the knowledge regarding the scrambling schemes implemented in both the address scrambler 181 and the data scrambler 201.

Other non-limiting examples of addressing manipulation (such as scrambling) and accessing memory are described in U.S. Pat. No. 6,572,024 to Baldischweiler et al. titled:

"Memory Array with Address Scrambling", in U.S. Pat. No. 5,943,283 to Wong et al. entitled: "Address Scrambling in a Semiconductor Memory", in U.S. Pat. No. 5,765,197 to Combs entitled: "Method and System for Authentication of a Memory Unit for a Computer System", in U.S. Pat. No. 4,168,396 to Best entitled: "Microprocessor for Executing Enciphered Programs", and in U.S. Pat. No. 7,730,272 to Lee entitled: "Non-Volatile Memory Device and Method of Encrypting Data in the Same", which are incorporated in its entirety for all purposes as if fully set forth herein.

Figure 23:
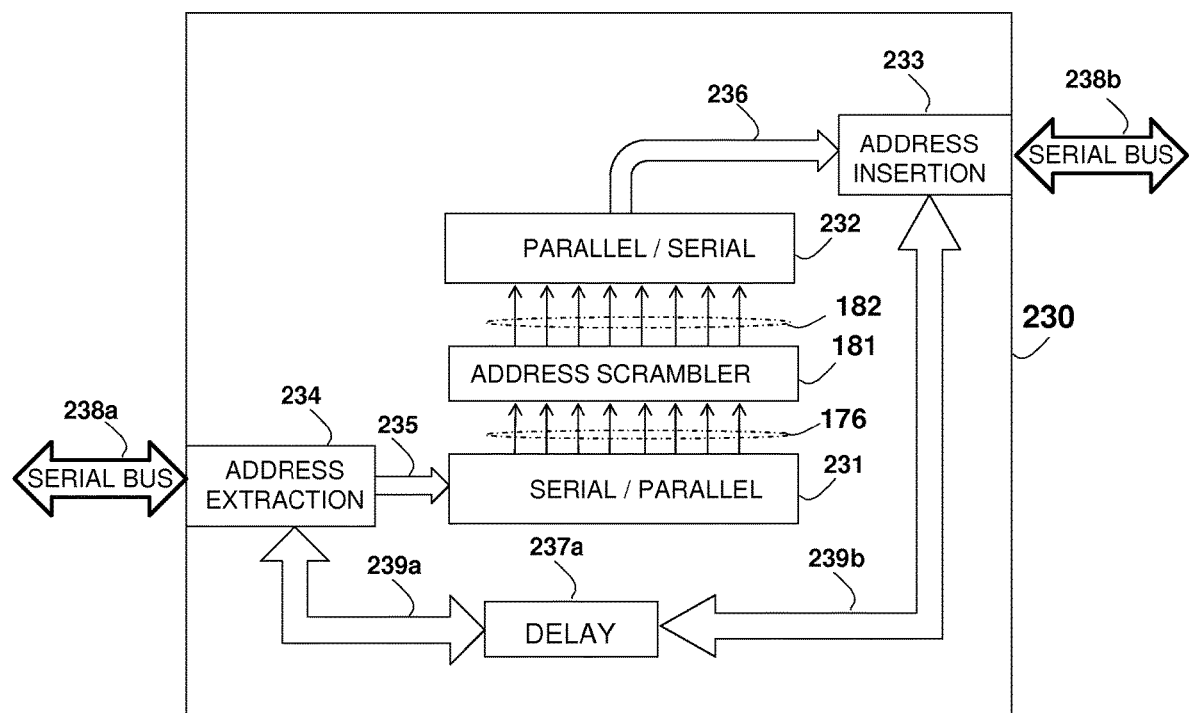
FIG. 23 illustrates a schematic electrical diagram of an address scrambler serially interfacing a memory.

In some cases the processor 163 connects to the memory 171 by a serial bus. The serial bus commonly carries time multiplexed serial address and data words. FIG. 23 shows an adapter 230 (corresponding to adapter 226 in FIG. 22b) for address scrambling in a serial bus environment. The serial bus 238a connects to the processor 163, allowing the access the memory 171 by an address word carried serially over the serial bus 238a. The address related bits are identified and de-multiplexed/extracted from the incoming serial stream by the address extraction block 234. The address bits in their serial form are connected to a serial/parallel block 231 via the connection 235. The address word is then converted to parallel by the serial/parallel block 231, and is presented over the bus 176. The address scrambler 181, which can be any type of scrambler as described herein, maps the address word received from the bus 176 to another address word (according to any address scrambling scheme), that is carried by the bus 182 to the parallel/serial block 232, which converts the parallel address word to a serial stream. The converted address word is then multiplexed/inserted into the outgoing stream by the address insertion block 233, replacing the original address that was carried over the serial bus 238a. The address word conversion to parallel and then to serial, and the mapping function may introduce a latency to the incoming address word in the bus 238a, and thus the non-address part of the incoming stream is routed to a delay block 237a via the connection 239a, which introduces a similar or equal delay to the rest of the information carried over the serial bus 238a. Hence, the address insertion block 233 combine/multiplex the converted address word with the rest of the stream being delayed, and the combined stream is output as part of the serial bus 238b, which is identical or similar to the incoming serial bus 238a, except for being delayed and including the converted address. The serial parallel block 231, and the parallel/serial block 232, are commonly implemented using a digital shift register, commonly employing a cascade of flip-flops sharing the same clock, allowing the stored bits to be shifted to one direction. The delay block 237a may be analog delay line including electrical components creating a time difference between input and output signals, or preferably may be based on a shift register or on a memory.

Figure 24:
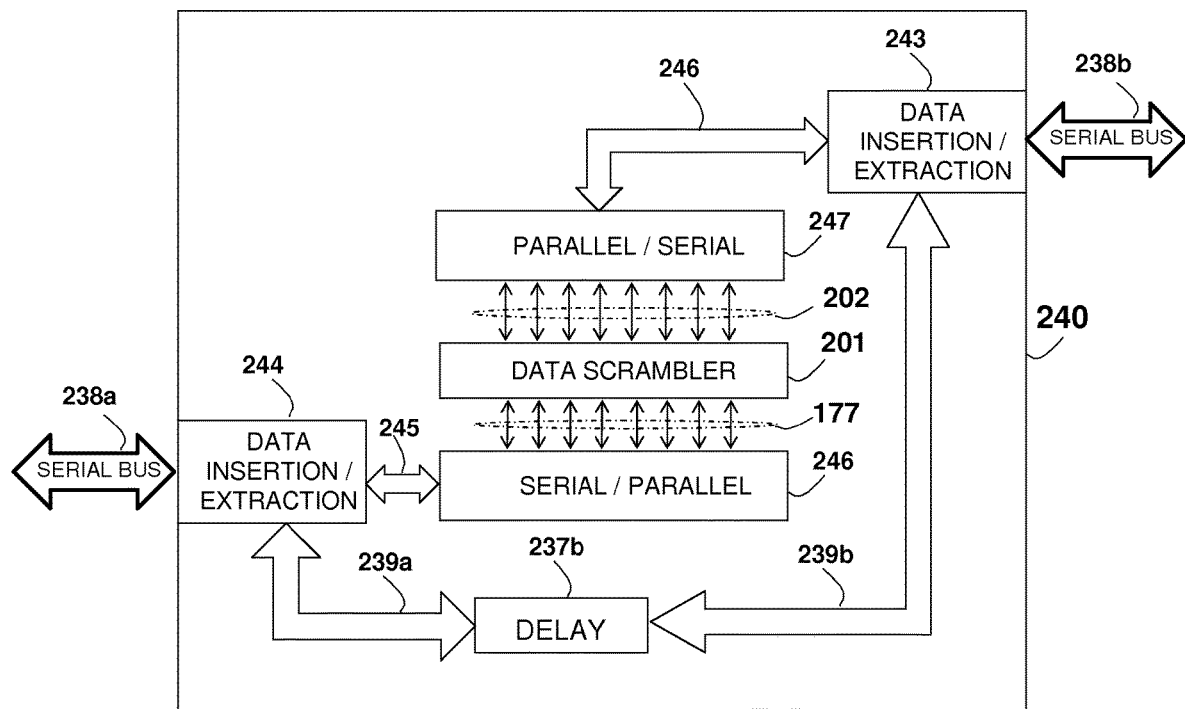
FIG. 24 illustrates a schematic electrical diagram of a data scrambler serially interfacing a memory.

Similarly, a data scrambling may be used in a serial bus environment. FIG. 24 shows an adapter 240 (corresponding to adapter 226 in FIG. 22b) for data scrambling in a serial bus environment. Similar to the address scrambling shown in FIG. 23, the serial data is extracted from the stream, converted to parallel, mapped into another data word, and inserted into the outgoing serial stream. However, since the data is bi-directional, directed from the processor 163 to the memory 171 is writing cycle, and from the memory 171 to the processor 163 is a read cycle, the corresponding data scrambling device 240 supports bi-directional data mapping. The serial bus 238a connects to the processor 163, allowing the writing to the memory 171 of a data word carried serially over the serial bus 238a. The data related bits are identified and de-multiplexed/extracted from the incoming serial stream by the data insertion/extraction block 244. The data bits in their serial form are connected to a serial/parallel block 246 via the connection 245. The data word is then converted to parallel by the serial/parallel block 246, and is presented over the bus 177. The data scrambler 201, which can be any type of scrambler as described herein, maps the data word received from the bus 177 to another data word (according to any data scrambling scheme), that is carried by the bus 202 to the parallel/serial block 247, which converts the parallel data word to a serial stream. The converted data word is then multiplexed/inserted into the outgoing stream by the data insertion/extraction block 243, replacing the original data that was carried over the serial bus 238a. The data word conversion to parallel and then to serial, and the mapping function may introduce a latency to the incoming data word in the bus 238a, and thus the non-data part of the incoming stream is routed to a delay block 237b via the connection 239a, which introduces a similar or equal delay to the rest of the information carried over the serial bus 238a. Hence, the data insertion/extraction block 243 combine/multiplex the converted data word with the rest of the stream being delayed, and the combined stream is output as part of the serial bus 238b, which is identical or similar to the incoming serial bus 238a, except for being delayed and including the converted data. This process is reversed in a read from memory 171 cycle, where the data read from the memory 171 that is carried over the incoming stream of serial bus 238b is extracted by the data insertion/extraction block 243, and then converted to parallel by the parallel/serial 247 (being a bi-directional component), thus being mapped back to the original data word by the bi-directional data scrambler 201. The data word is serialized by the bi-directional serial/parallel block 246, and then inserted into the data insertion/extraction block 244 to be multiplexed with the delay stream by the bi-directional delay 237b, where the multiplexed outgoing stream is sent over the serial bus 238a to the processor 163.

An adapter 226 may include only the serial-bus address scrambler 230, only the serial-bus data scrambler 240, or both. In the latter case, the data and address scrambling functionalities may be integrated, and thus may share any resources. For example, both circuits may share a power source, a power supply or a power connected. Similarly, other electronic circuits mat be shared and used for both functionalities. Further, the same connector or connectors, as well as interfaces and other support circuits may be used by both functionalities. Furthermore, the associated components implementing these functionalities may be housed in the same enclosure, or may be mounted to the same surface. In one non-limiting example, the hardware relating to both functionalities may be integrated onto a single substrate (e.g., silicon "die"), or as components mounted on the same PCB.

Using data or address scrambling according to one or more of the schemes described herein provides the advantage of encrypting the content stored in the memory 171. The encryption mechanism is independent and invisible from the processor 163, and is transparent to the software (or firmware) executed by the processor 163 (such as operating system), thus minimizing the risk of malware or virus attacking the encryption method. The encryption is further notably transparent to a user, and in most cases the scrambling scheme operation cannot be detected by the user. Using scrambling as described in some non-limiting examples herein requires only the connection of an adapter 226 (including the data, address or both scramblers hardware and related components). In some aspects, there may be is no need for any modifications or any changes in the processor 163 related hardware or any software being executed by the computer system. Similarly, in most cases there is no need for any modification to the memory 171 involved. Further, the computer system performance will not be degraded. At most, the address or data mapping operation of the scramblers may induce a negligible latency is accessing the memory 171.

An adapter 226 may be provided implementing a particular scrambling scheme, distinct from any other adapters, and this scheme is solely used for encrypting the content written into the memory 171. For example, each adapter 226 may be manufactured embedding a distinct scrambling scheme, different from all other manufactured devices. In such a case, the memory 171 content may be read (or otherwise decrypted) only by using the same adapter 226. A security measure is provided by physically separating the particular adapter 226 and the encrypted content memory 171. Even in the case an attacker gets hold on the memory 171 or its content, he may not decrypt the original content written into it without the suitable adapter 226 (or at least the scrambling scheme implemented in it). Similarly, even in the case an attacker gets hold on the particular adapter 226 (or its embedded scrambling scheme), he may not decrypt the original content written into the memory 171 without having access to the memory 171 itself (or to its content). Hence, when the memory 171 and the adapter 226 are physically separated or disassociated in any other way, the content is secured. However, the content may be easily and quickly read and decrypted by connecting the memory 171 to its suitable particular adapter 226. For example, the adapter 226 may be integrated with a computer system, while the memory 171 may be removable or use removable media (for example, a non-volatile memory). In such a case, data written onto the memory 171 medium by a specific computer system, may be read only by that specific computer system.

In one non-limiting example, the adapters 226 are provided in pairs, where the two devices in the pair are similar or identical duplicates, or otherwise embed the same scrambling scheme. In such a case, the two devices of the pair may be integrated in, or connected to, two different computer systems. In such a case, these two computer systems share the same scrambling scheme, and thus may exchange memories (or storage mediums) between them. The memories (or the mediums) written by one of the computer systems can only be read and decrypted by these computer systems, and cannot be read or decrypt by other computer systems. In one non-limiting example, the two devices are associated with distant computer systems, where the memories (or the mediums) may be securely exchanged. Similarly, multiple duplicates of the scrambling scheme may exist, such as in an enterprise employing multiple computer systems, all associated with the same scrambling scheme. In such an environment, memories (or mediums) may be easily exchanged between the computer systems, but the original memory content cannot be accessed outside the enterprise.

The memory 171 physical storage means may be based on electrostatic, ferroelectric, magnetic, acoustic, optical, chemical, electronic, electrical, or mechanical medium. The memory may semiconductor (a.k.a. solid-state) based, and in the form of a chip, IC, module, ICs mounted on a PCB, memory card, or a rigidly enclosed box. The memory may be volatile or non-volatile, and may be of static or dynamic types. The memory may be written more than once at any time, or may be written once, as part of the manufacturing process or afterwards (e.g., by the user using a dedicated equipment, or as part of an electronic circuit as part of normal operation). The memory may use random or sequential access. Further, the memory may be location-addressable or file-addressable or content-addressable. The memory may employ a non-removable medium, or a removable medium associated with a suitable writer/reader (or read-only) drive. A memory may be accessed using a parallel or serial connection or bus, and may be characterized by its capacity and access time. The memory may be designed as portable or as in-computer enclosure. The memory may include multiple memory devices, and may be a DAS, or part of NAS or SAN. The NAS may be a clustered NAS, where distributed file system is used, running simultaneously on multiple servers, allowing for distributing of data and metadata across the cluster nodes or storage devices. A SAN may be based on IP storage as described in White Paper "IP storage Inside White Paper", Storage Networking Industry Association (SNIA) IP Storage Forum, October 2007, which is incorporated in its entirety for all purposes as if fully set forth herein. The SAN may use storage virtualization, where logical storage is abstracted from physical storage. In this case, the physical storage resources (memories such as disk arrays) are aggregated into storage pools, from which the logical storage is created. Hence presenting to the user a logical uniform space for data storage, that transparently handles the process of mapping it to the actual physical locations. Multiple disk arrays (may be from different vendors and scattered over the network) may be virtualized into a single monolithic device, which can be managed uniformly. The methods described herein may be used as part of translating the logical space into the physical space.

Similarly, the methods herein may be used in a clustered file system, where the files are shared by being simultaneously mounted on multiple servers. Such a system may be a shared disk file system, which uses a storage area network (SAN) or RAID to provide direct disk access from multiple computers at the block level. Translation from file-level operations that applications use to block-level operations used by the SAN must take place on the client node. In one type of clustered file system, a shared disk file system adds a mechanism for concurrency control which gives a consistent and serializable view of the file system, avoiding corruption and unintended data loss even when multiple clients try to access the same files at the same time. Shared disk file systems also usually employ some sort of a fencing mechanism to prevent data corruption in case of node failures. The underlying storage area network might use any of a number of block-level protocols, including SCSI, iSCSI, HyperSCSI, ATA over Ethernet (AoE), Fibre Channel, and InfiniBand. Similarly, distributed file systems may be used that use a network protocol, but may not share block level access to the same storage.

The adapter 226 including the address or data scrambling functionalities (or both) may be implemented by electrical power consuming components, such as PLDs, memories or processors. The adapter 226 may be powered by a dedicated power supply fed from a dedicated power source. The power source or the power supply (or both) may be separated from the power sources or the power supplies used for powering the processor 163 or the memory 171. Alternatively, the powering scheme used for powering the processor 163 or for powering the memory 171 (or both) may also be used by the adapter 226, and thus obviating the need for additional power related hardware. A power source for powering the adapter 226 may be a domestic AC power, or a battery (either primary or rechargeable).

Figure 25:
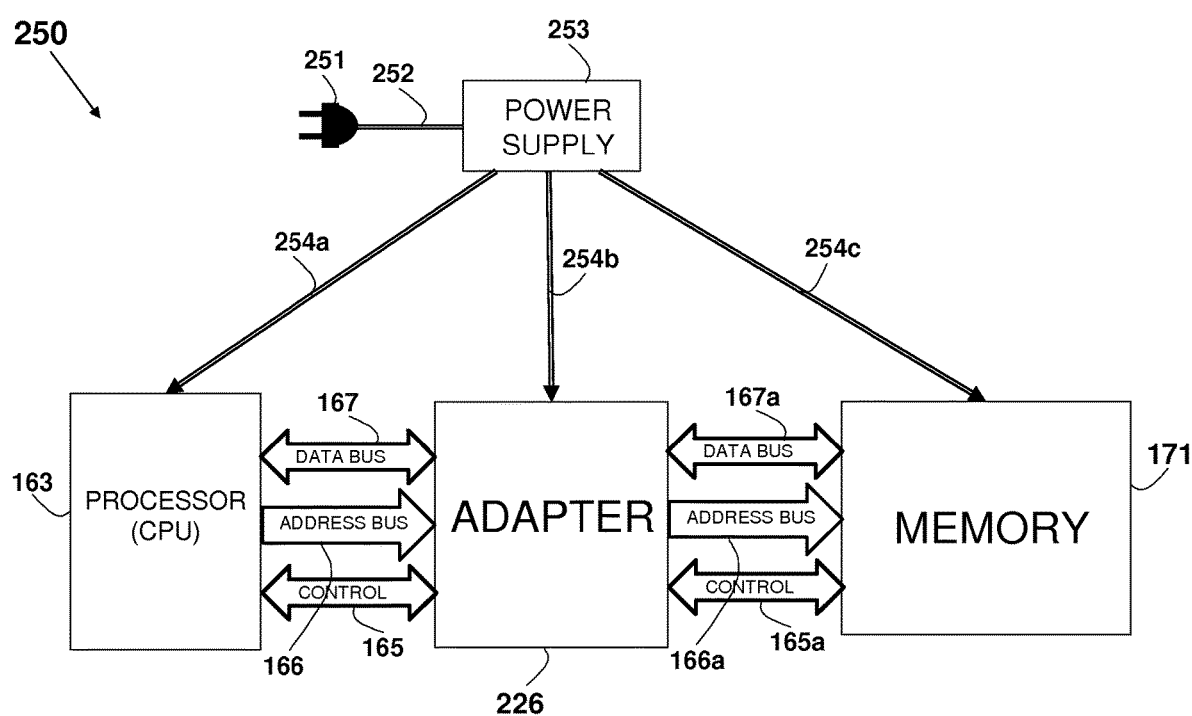
FIG. 25 illustrates a schematic electrical diagram of a shared powering scheme.

Referring to FIG. 25, showing a sub-system 250 where the processor 163, adapter 226 and the memory 171 are power fed from the same power source and the same power supply. The power supply 253 is power fed from the common AC power supply via AC plug connector 251 and a power cord 252, using the mains AC power (commonly 115 VAC/60 Hz in North America or 220 VAC/50 Hz in Europe) as the power source. The power supply commonly includes an AC/DC converter, for converting the AC voltage into the required low-level stabilized DC voltage or voltages, commonly suitable for power the digital circuits, such as 33 VDC, 5 VDC or 12 VDC. Power supplies commonly include voltage stabilizers for ensuring that the output remains within certain limits under various load conditions, and typically employs a transformer, silicon diode bridge rectifier, reservoir capacitor and voltage regulator IC. Switched mode regulator supplies also include an inductor. In one embodiment, power supply 253 is integrated into a single device or circuit, in order to share common circuits. Further, the power supply 253 may include a boost converter, such as a buck boost converter, charge pump, inverter and regulators as known in the art, as required for conversion of one form of electrical power to another desired form and voltage. While power supply 253 (either separated or integrated) can be an integral part and housed within the computer system enclosure (together with the processor 163), it may be enclosed as a separate housing connected via cable to the computer system enclosure. For example, a small outlet plug-in step-down transformer shape can be used (also known as wall-wart, "power brick", "plug pack", "plug-in adapter", "adapter block", "domestic mains adapter", "power adapter", or AC adapter). Further, power supply 253 may be a linear or switching type.

The low level DC voltage (or several voltages) output from the power supply 253 is connected to power the processor 163 (and commonly its environment and some of its peripheral components) by the power wiring 254 (wires, cable or PCB traces). Similarly, the power supply 253 is connected to DC power the adapter 226 via the power wiring 254b, and the memory 171 via the power wiring 254c. Dedicated wirings may be used, as well as power bus to which all the power consuming components are connected to be power fed from.

Figure 26:
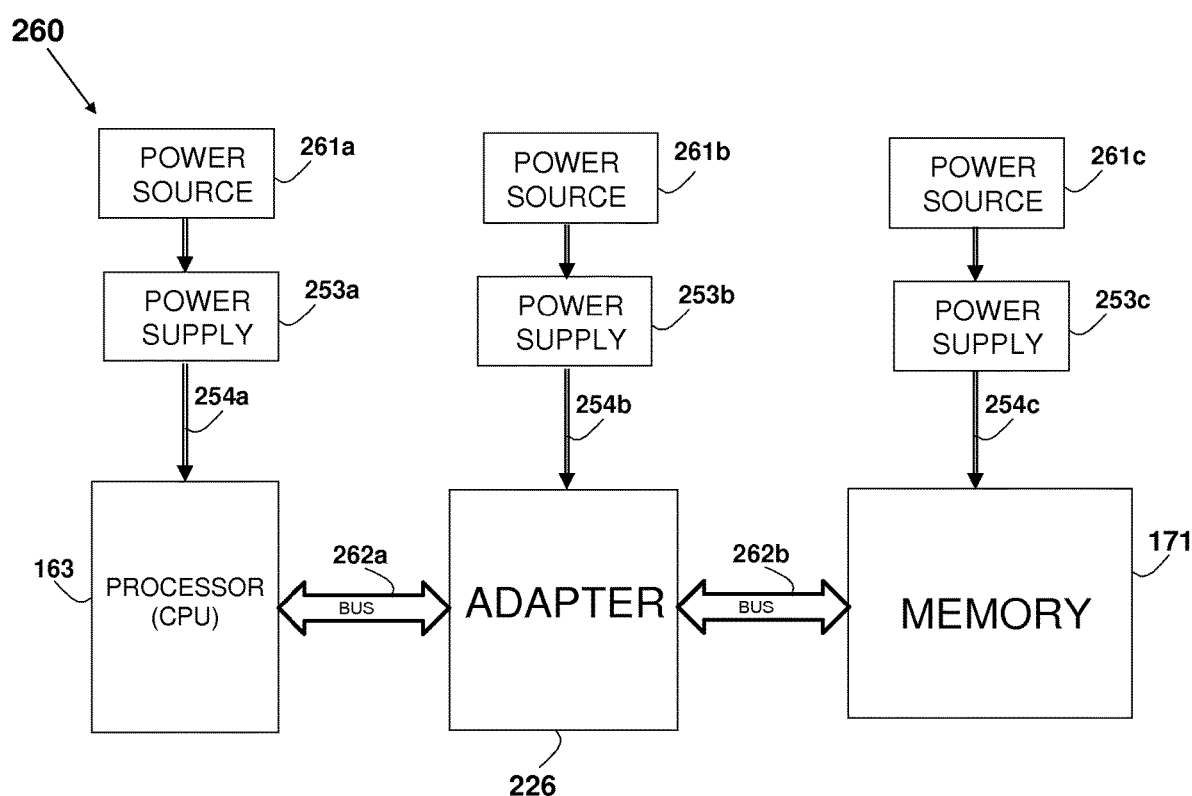
FIG. 26 illustrates a schematic electrical diagram of a separate powering scheme.

In an alternative powering scheme shown in FIG. 26, the arrangement 260 describes the case where each of the elements is power fed from a dedicated power supply powered from a dedicated power source. The processor 163 is DC-power fed via the power wiring 254a from the power supply 253a, which is fed from the power source 261a, while the adapter 226 is DC power fed via the power wiring 254b from the power supply 253b, which is fed from the power source 261b, and the memory 171 is DC power fed via the power wiring 254c from the power supply 253c, which is fed from the power source 261c. Each of the power sources 261a, 261b and 261c may be the domestic AC power, or a battery. For example, batteries are commonly used in laptops and other portable devices, as well as in some UPS (Uninterruptible Power Supply) systems. The power supplies 253a, 253b and 254c may be respectively adapted to work with the respective power source, such as having an AC/DC converter for AC power based power source and a DC/DC converter for DC power source. Each of the power supplies 253a-c and each of the power sources 261a-c may be separate from, or integrated with, the respective power fed device. Such integration may take the form of sharing a common enclosure, sharing a mechanical support, sharing a PCB, sharing components or circuits, or sharing common connections. The buses 262a and 262b may be of the same type, or alternately different type, where the adapter 226 further serves as a converter between the bus types.

Figure 27:
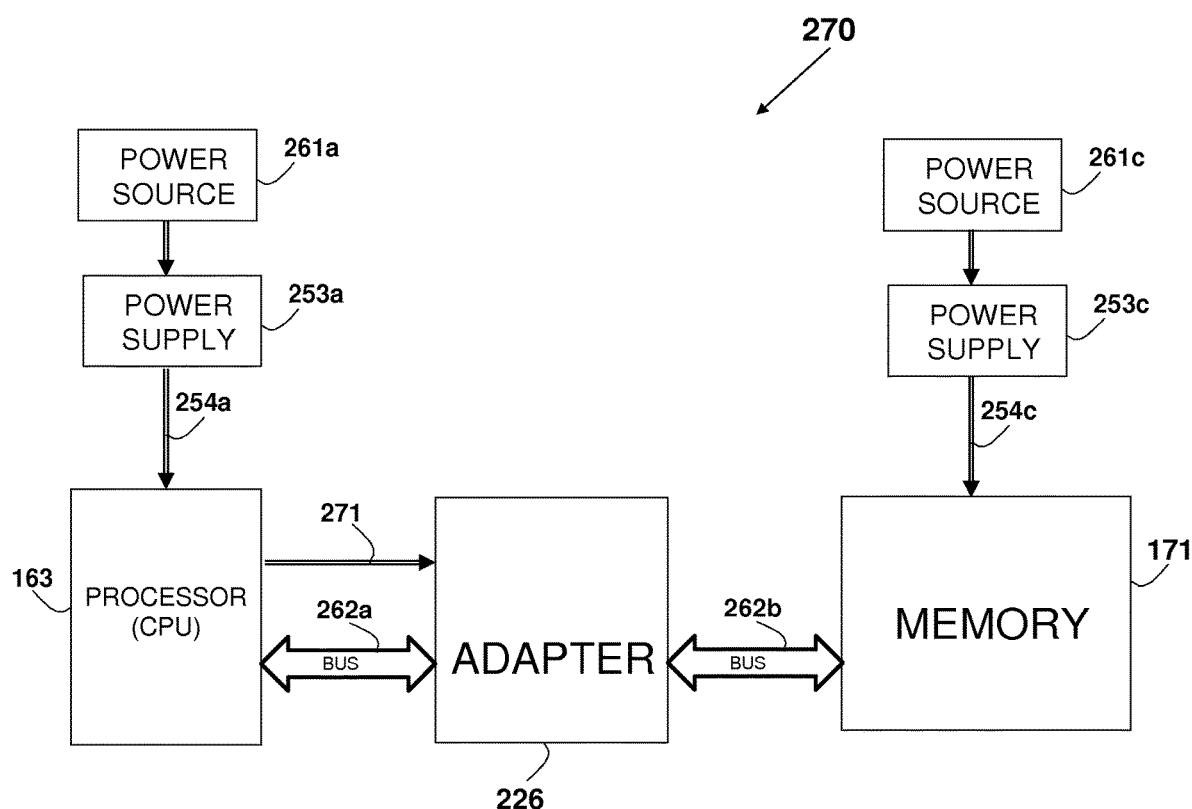
FIG. 27 illustrates a schematic electrical diagram of an adapter powering scheme.

In one non-limiting example, the power signal (typically DC—Direct Current) is associated with the data signals connecting the processor 163 to the adapter 226. Such an arrangement 272 is shown in FIG. 27, where the bus 262a (serial or parallel), carrying data words, address words, or both, is connecting the adapter 226 to the processor 163. The adapter 226 is power fed via the power wiring 271. For example, the power wiring 271 may be routed substantially along the cable carrying the bus 262a, typically between the motherboard on which the processor 163 is mounted and the adapter 226. In one non-limiting example, a SATA-compliant bus is used, defined to use two separate and distinct cables, one cable 262a for carrying data/address words only, and one cable 271 for carrying power only. Each of the data and power point-to-point cables uses separate connectors (data and power) for connecting to mating connectors at the cable ends. In one non-limiting example, a single cable is used for carrying both data/address words and the power signal (commonly DC), thus requiring a single connector at each cable end (for connecting to mating connectors). The single cable includes separate wires (or other conductors) dedicated and for carrying the power signal, while the other wires/conductors are used for carrying the information, typically digital data signal. The devices at each of the cable ends connect the power related circuits to the power related pins in the connector, while the communication related circuits are connected to the communication related pins in the same connector. Such scheme is used for example in USB (Universal Serial Bus) where 5 VDC power is carried on the same cable and using the same connector together with the bi-directional digital data signal.

In an alternative arrangement, the power and communication signals are carried over the wires in the cable using Frequency Division Multiplexing (FDM, a.k.a. Frequency Domain Multiplexing). In such an implementation, the power and the communications signals are carried each in its frequency band (or a single frequency) distinct from each other. For example, the power signal can be a DC (Direct Current) power (effectively 0 Hz), while the communication signal is carried over the 100 Hz-10 MHz (or 4-30 MHz) frequency band, which is distinct and above the DC power frequency. In this case, the component on each side may further include a low pass filter coupled between the connector and the transceiver (transmitter/receiver) for substantially passing only the power frequency, for powering the device from the power signal, or for injecting the power signal. Such device may also further include a high pass filter coupled between the connector and the transceiver for substantially passing only the communication frequency band, for passing the communication signal between the connector and the transceiver. Another technique for carrying power and data signals over the same conductors is known as Power-over-Ethernet (PoE) (i.e., Power over LAN—PoL) and standardized under IEEE 802.3af and IEEE 802.3at, also explained in U.S. Pat. No. 6,473,609 to Lehr et al. titled: "Structure Cabling System", which is incorporated in its entirety for all purposes as if fully set forth herein, which describes a method to carry power over LAN wiring, using the spare pairs and the phantom mechanism. The latter makes use of center-tap transformers. The powering scheme may use the standards above, as well as using non-standard and proprietary powering schemes.

Figure 27A:
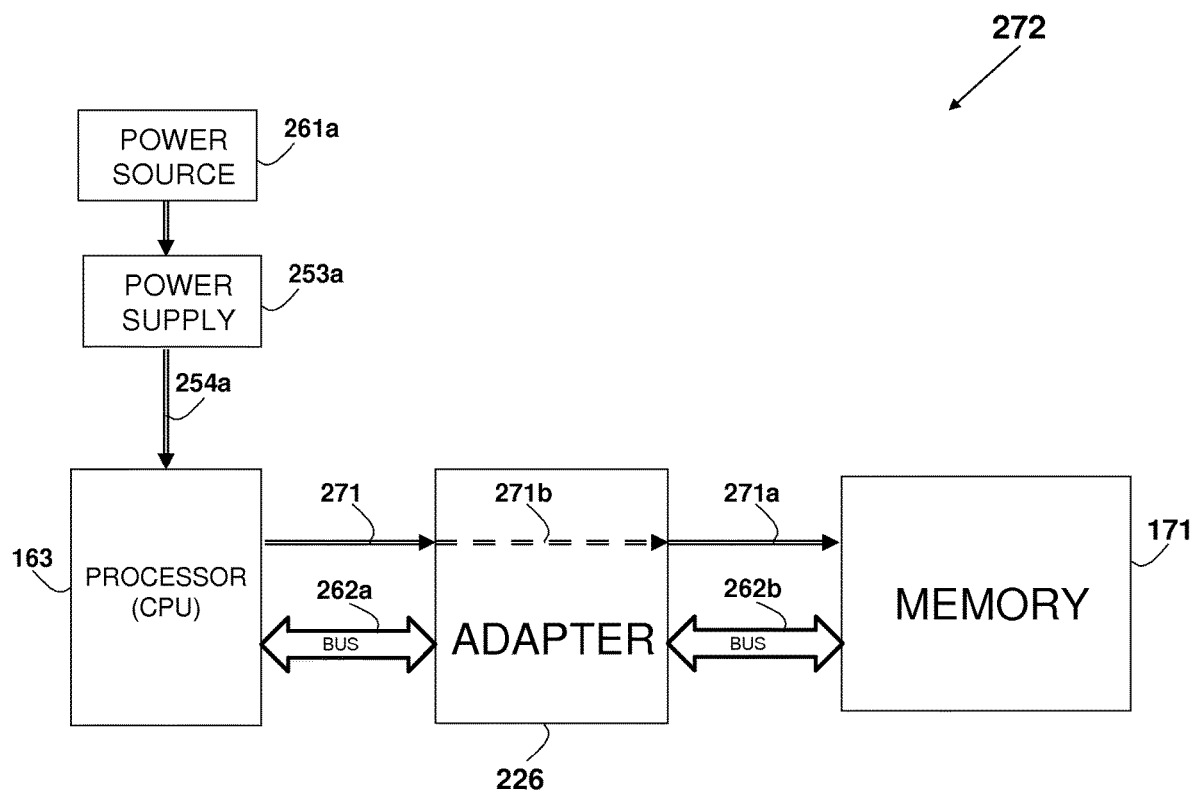
FIG. 27a illustrates a schematic electrical diagram of a powering scheme of an adapter and a memory.

The memory 171 may be power fed from dedicated power supply and power source, as shown in FIG. 27. Alternatively or additionally, the memory 171 may be power fed from the same power supply 253 feeding the processor 163, as shown in arrangement 272 in FIG. 27*a*. The memory 171 is connected to the adapter 226 via bus 262*b*, allowing the processor 163 to access the memory 171, preferably in a way as if adapter 226 is not present. The memory 171 is power fed by the power connection 271*a*. In this non-limiting example, the power required for the memory 171 operation is passed through the adapter 226, shown as line 271*b* in the adapter 226. Hence, the power connection 271 is used to power feed both the adapter 226 and the memory 171 from the same power supply 253*a*. The carrying of the power signal over connection 271*a* and the digital data over bus 262*b* may be separated or combined, and may use different or the same scheme used for carrying the power signal over connection 271 and digital data over bus 262*a* as described above.

Figure 27B:
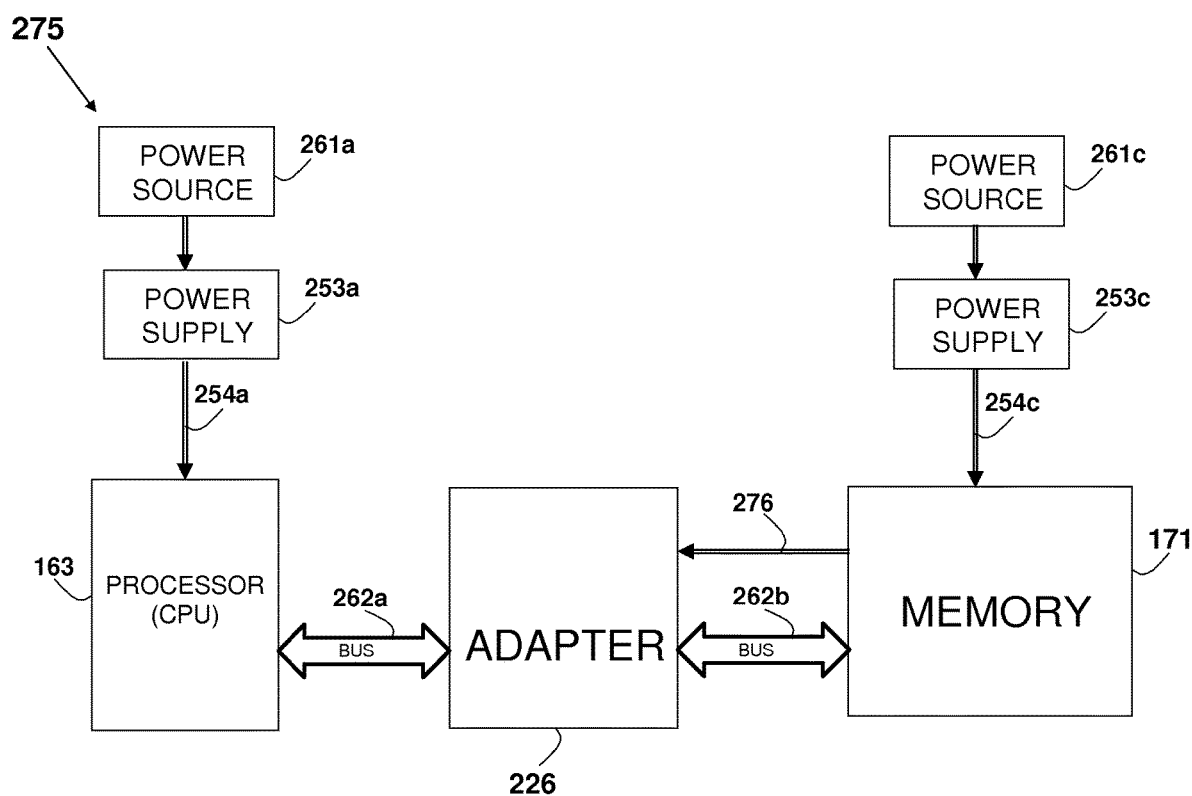
FIG. 27b illustrates a schematic electrical diagram of an adapter powering scheme.
Figure 27C:
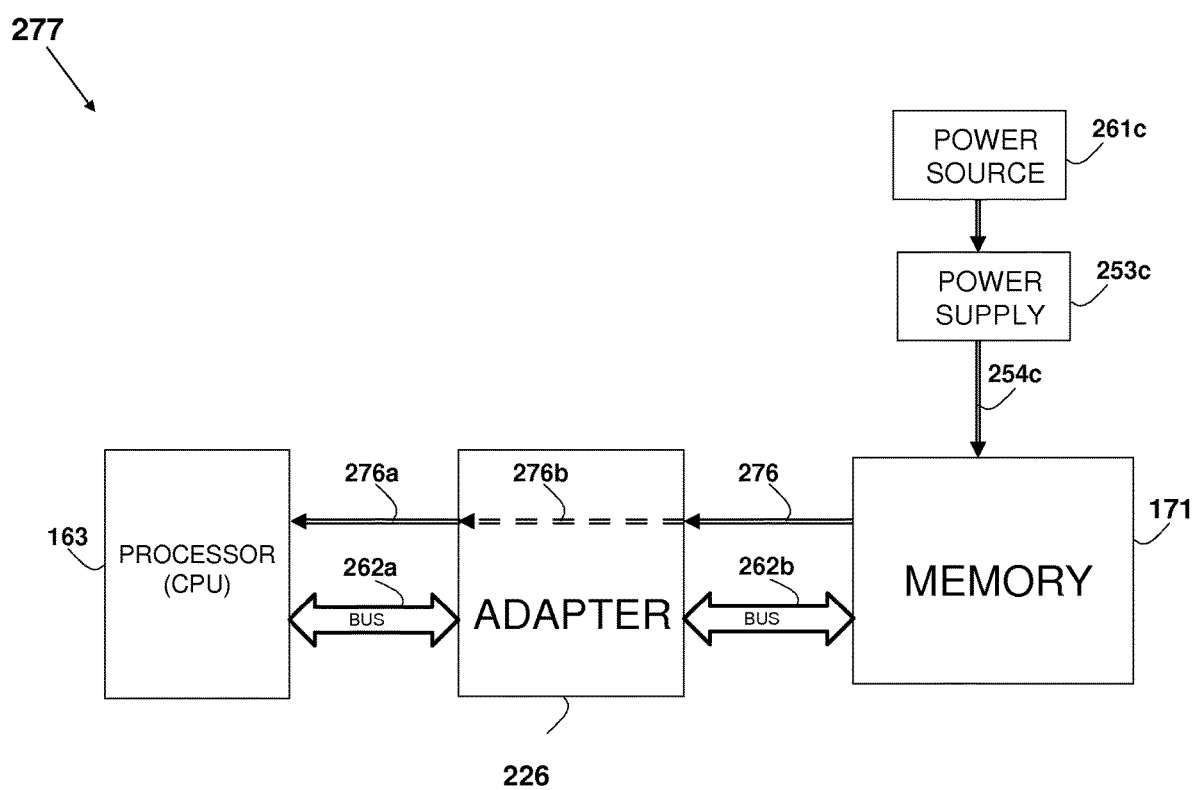
FIG. 27c illustrates a schematic electrical diagram of a powering scheme of an adapter and a memory.

Referring now to FIG. 27*b* showing an arrangement 275 where the processor 163 is power fed via connection 254*a* from the power supply 253*a* (sourcing power from the power source 261*a*), and where the memory 171 is separately power-fed via connection 254*c* from the power supply 253*c* (sourcing power from the power source 261*c*). The adapter 226 may be power fed via the memory 171 over the power connection 276. The carrying of the power signal over connection 276 and the digital data over bus 262*b* may be separated or combined, and may use different or the same scheme used for carrying the power signal over connection 271 and digital data over bus 262*a* as described above. Further, the adapter may pass through the power signal as shown in arrangement 277 shown in FIG. 27*c*, where the power signal is passed through connection 276*b* from the memory 171, and may power feed the processor 163 (and related support components) via the power connection 276*a*. Any combination of powering scheme may be used for powering the adapter 226. For example, part of the required power may be provided locally by a battery, part of the power may be supplied from an external dedicated power source, and part may be powered from a power-carrying bus.

Figure 28:
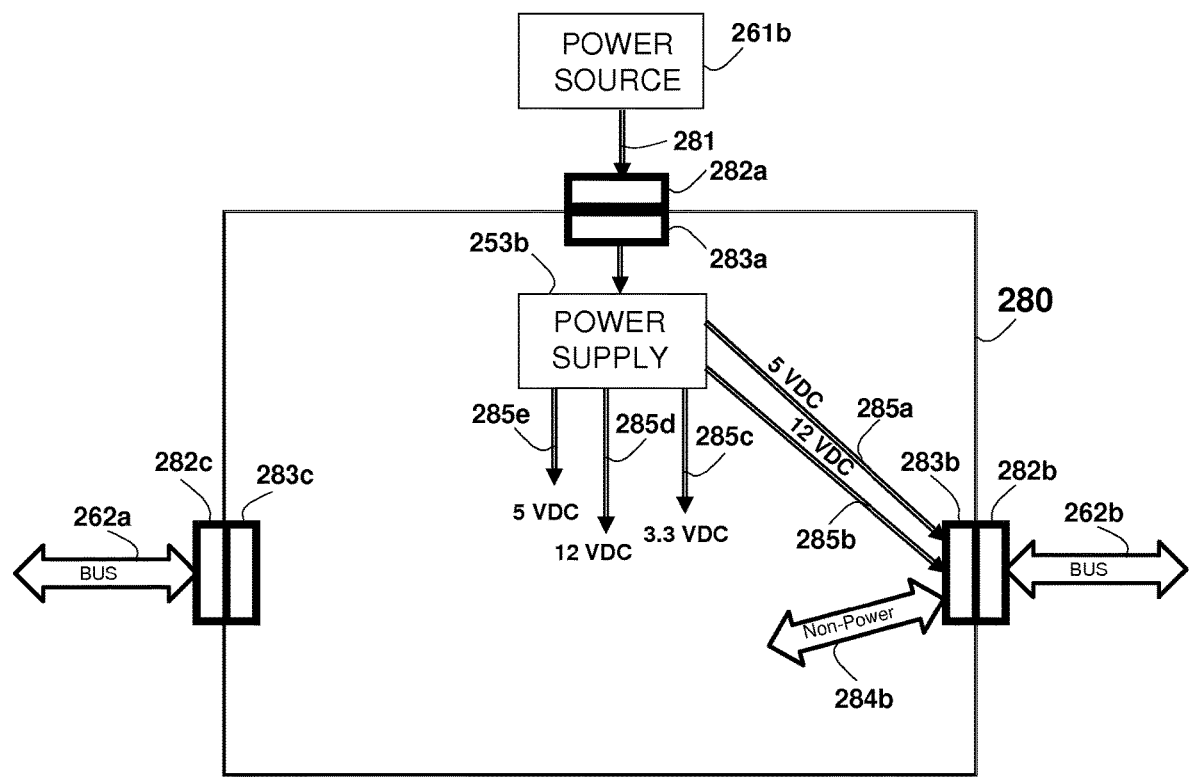
FIG. 28 illustrates a schematic electrical diagram of a powering scheme of an adapter and a bus.

Referring now to FIG. 28, showing the powering scheme 280 of an adapter (such as adapter 226), that is locally powered from a power source 261*b*, and further power feeds the memory 171 via the bus 262*b*. The adapter 280 connects to the processor 163 via connector 283*c*, for connecting to the bus 262*a* carried over a cable and accessed via the mating connector 282*c*. The adapter 280 is power fed via the power connector 283*a*, connectable to the mating connector 282*b* of the cable 281, used for connecting to the power source 261*b*. The power feeds the power supply 253*b*, which provides various DC voltages for powering the internal adapter electronic circuits, such as 5 VDC via connection 285*e*, 12 VDC via connection 285*d*, and 3.3 VDC via connection 285*c*. The number of connections and the voltages specified herein are for example only, and other voltages may be equally used. In addition, the power supply 253*b* supplies 5 VDC via connection 285*a*, and 12 VDC via connection 285*b*, to the bus connector 283*b*. The non-power related signals (such as the serial digital data) 284*b* are combined with the power signals at the connector 283*b*, forming the bus 262*b* carrying both power and data, connected via the mating connector 282*b*.

Figure 28A:
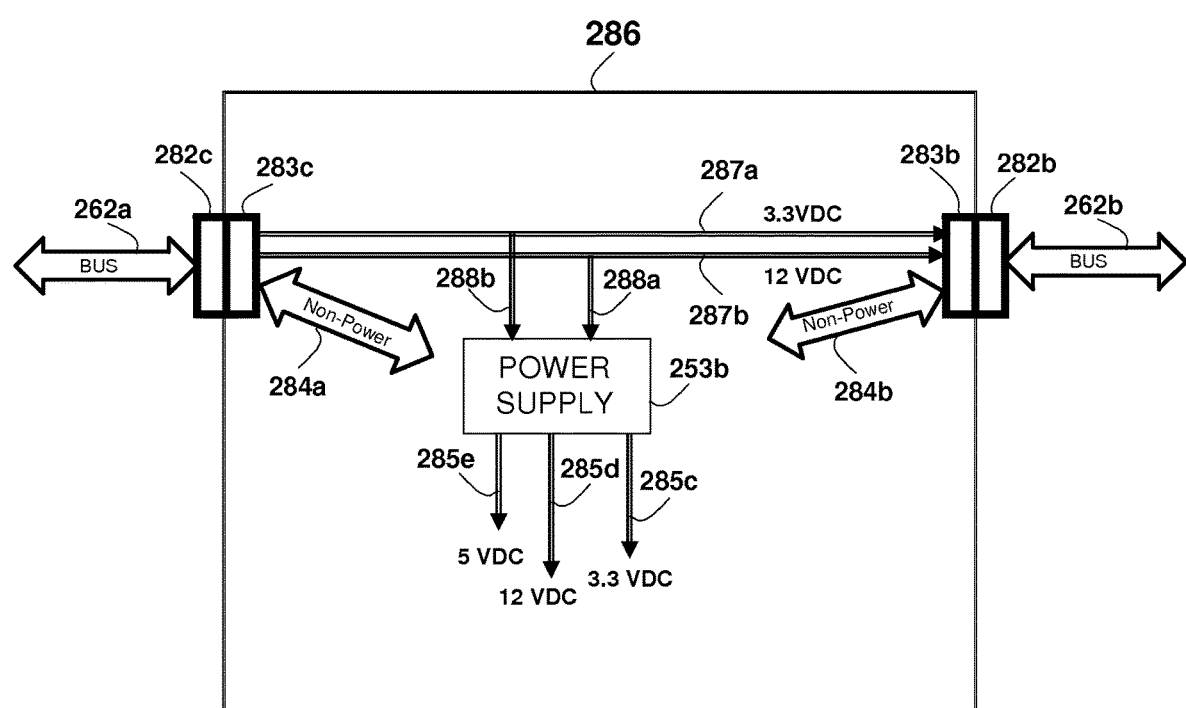
FIG. 28a illustrates a schematic electrical diagram of a powering scheme of a bus-powered adapter.

Referring now to FIG. 28*a*, showing an alternative powering scheme 286 of an adapter (such as adapter 226), that is connected to a power carrying bus 262*a*, where both the adapter circuits and the memory 171 are power fed from the power carried over the bus 262*a*. In this non-limiting example, the buses 262*a* and 262*b* are both carrying 3.3 VDC and 12 VDC power signals. The power carrying wires in the cable of the bus 262*a* are accessed in connector 283, and are connected to the mating wires in the cable of bus 262*b*, via the pass-through connection 287*a* carrying the 3.3 VDC power signal, and connection 287*b* for the 12 VDC power signals. The non-power related wires and signals of the bus 262*a* are designated as the bus 284*a* to the suitable circuits of the adapter. Further, the power supply 253*b* is power fed from the 3.3 VDC line via connection 288*b* and from the 12 VDC line via connection 288*a*, and feeds the voltages required for part or all adapter circuits operation.

Figure 29:
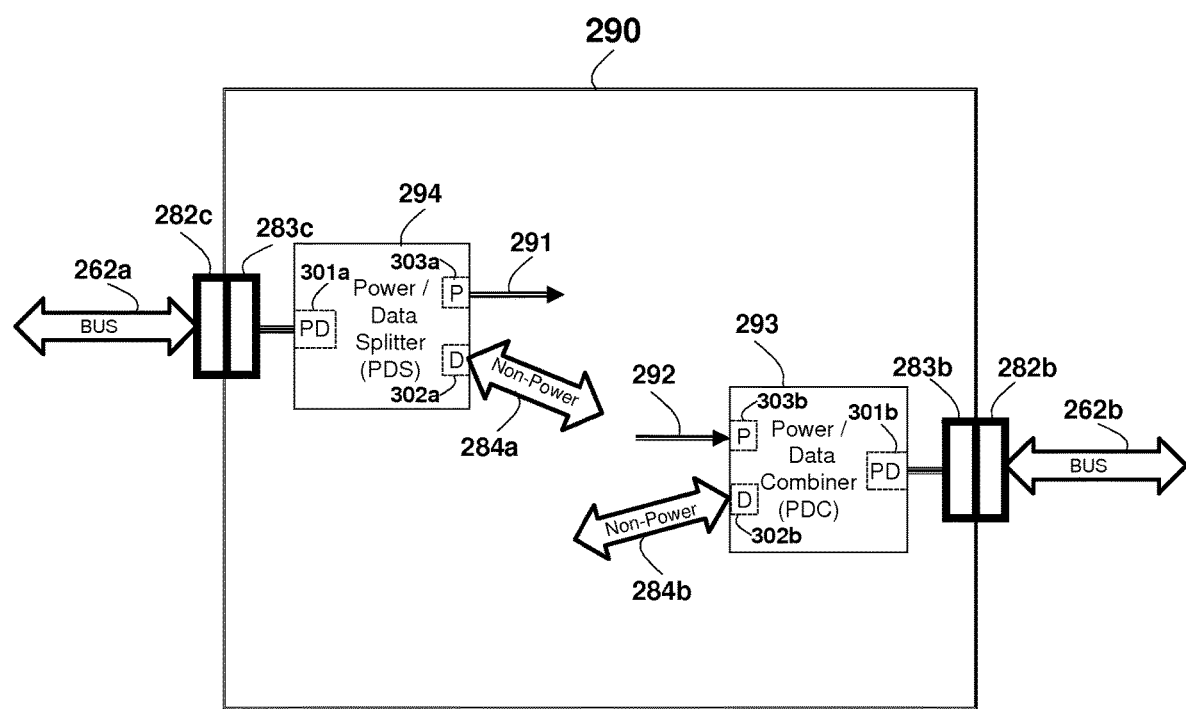
FIG. 29 illustrates a schematic electrical diagram of a powering scheme of a bus-powered adapter and a powered-bus.

FIGS. 28-28*a* described above exampled the case wherein the power is carried over dedicated and distinct wires, thus the power signal is carried separated from any other signals carried over the buses. Such configuration further requires the use of connectors (such as connectors 282*c* and 282*b*, and the mating connectors) having at least four contacts, two for the power and at least two for the digital data signal (or any other signal carried in the system). In an alternative remote powering scheme, the power signal and the data signal (e.g., serial digital data signal) are concurrently carried together over the same wires, as shown in arrangement 290 in FIG. 29. This scheme makes use of a power/data splitter (PDS) 294 and a power/data combiner (PDC) circuit 293, where the latter combines the power and data signals to a combined signal, and the first splits a combined signal into its power and data signals components. Such PDS or PDC circuits (e.g., PDC 294 and PDS 293 in FIG. 29) commonly employ three ports designated as 'PD' 301 (stands for Power+Data), 'D' 302 (stands for Data only) and 'P' 303 (stands for Power only). In the PDS 294, the bus 262*a* (carrying both power and data) is connected to port 'PD' 301*a*, which passes the a data signal received from, or transmitted to, the port 'D' 302*a* via the bus 284*a* (which carry all non-power signals of the bus 262*a*), while the power signal carried over the bus 262*a* is split and supplied to port P 303*a* and connected to via the connection 291. Similarly, the power signal fed from connection 292 to the power port P 303*b*, and the digital data signal carried over the bus 284*b* (which carry all non-power signals of the bus 262*b*) are combined in PDC 293 and connected via port 'PD' 301*b* to form the bus 262*b*. Thus, power signal transparently passes between ports 'PD' 301 and P 303, while data signal (e.g. serial digital data signal) is transparently passed between ports 'PD' 301 and 'D' 302. The power signal may be AC or DC, and the PDC 293 or the PDS 294 may each contain only passive components or alternatively may contain both active and passive electronic circuits.

Figure 30:
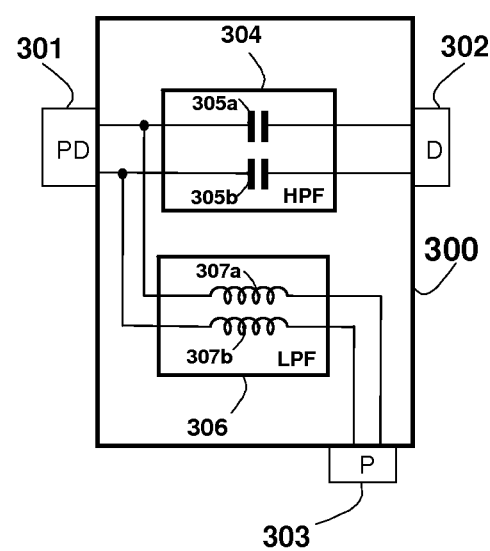
FIG. 30 illustrates a schematic electrical diagram of FDM power/data signals combining/splitting circuit.

In one non-limiting example, the data and power signals are carried over the same wires using Frequency Division Multiplexing (FDM), where each signal is using a different frequency band, and wherein the frequency bands are spaced in frequency. For example, the power signal can be a DC signal (0 Hz), while the data signal will be carried over a band excluding the DC frequency. Similarly, the power signal can be an AC power signal, using a frequency above the frequency band used by the data signal. Separation or combining the power and data signals makes use of filters, passing or stopping the respective bands. A non-limiting example of a circuit 300 that may serve as a PDS 294 or as PDC 293 is shown in FIG. 30, corresponding to the case wherein the power signal is a DC signal (0 Hz), while the data signal is an AC signal carried over a band excluding the DC frequency. A capacitor 305*a*, which may be supplemented with another capacitor 305*b* is connected between the PD port 301 and the D port 302, implementing a High Pass Filter (HPF) 304. The HPF 304 substantially stops the DC power signal and substantially passes the data signal (or any AC signal) between the connected corresponding ports. An inductor 307a, which may be supplemented with another inductor 307b is connected between the PD port 301 and the P port 303, implementing a Low Pass Filter (LPF) 306. The LPF 306 substantially stops the data signal and substantially passes the DC power signal between the connected corresponding ports. Other passive or active implementations of the HPF 304 and LPF 306 can be equally used. Similarly, the power signal may be low-frequency power voltage, such as 50 Hz or 60 Hz.

Figure 31:
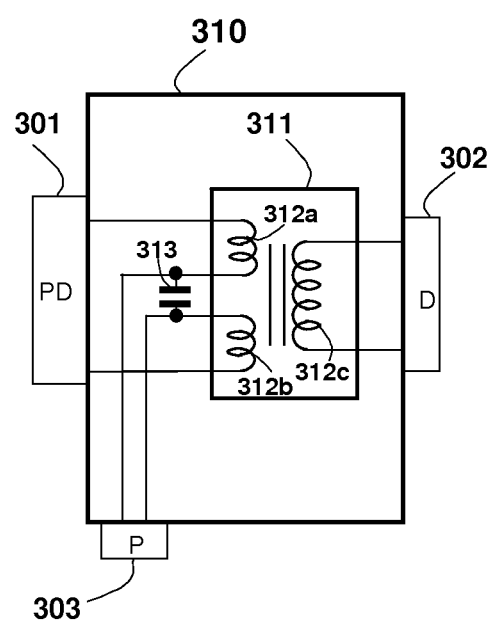
FIG. 31 illustrates a schematic electrical diagram of FDM power/data signals combining/splitting circuit using capacitor and transformer.

Alternatively or in addition, the data and power signals are carried over the same wires using a split-tap transformer, as commonly known for powering an analog telephone set known as POTS (Plain Old Telephone Service and ISDN). A non-limiting example of a circuit 310 that may serve as a PDS 294 or as PDC 293 is shown in FIG. 31, corresponding for example to the case wherein the power signal is a DC signal (0 Hz), while the data signal is an AC signal carried over a band excluding the DC frequency. A transformer 311 is connected between the PD port 301 and the D port 302, where the primary side windings 312a and 312b connected to the PD port 301, and the secondary winding 312c is connected to the D port 302. The primary side is split to be formed of two windings 312a and 312b, connected together with capacitor 313. The transformer substantially passes the data signal between PD port 301 and the D port 302, while the DC power signal (or a low frequency AC signal) is blocked by the capacitor 303. Any DC signal such as the DC power signal is substantially passed between the PD port 301 and the P port 303.

Figure 32:
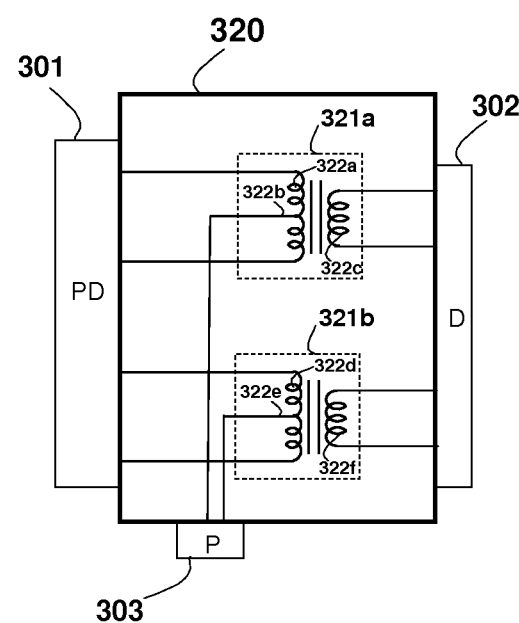
FIG. 32 illustrates a schematic electrical diagram of phantom scheme power/data signals combining/splitting circuit.

In another alternative, the power signal is carried over a phantom channel between two pairs carrying the data signal or other signals. A non-limiting example of a of a circuit 320 that may serve as a PDS 294 or as PDC 293 is shown in FIG. 32, corresponding for example to the case wherein the power signal is a DC signal (0 Hz), while the data signal is an AC signal carried over a band excluding the DC frequency. The transformers 321a and 321b are connected between the PD port 301 and the D port 302, substantially passing data signals there between. The split tap 322b (of the winding 322a of transformer 321a) and the split tap 322e (of the winding 322d of transformer 321b) are connected to the P port 303, allowing for DC power flow between the PD port 301 and the P port 303. Such a phantom arrangement is used in communication based on IEEE802.3af or IEEE8023at standards. Using the phantom channel for carrying power may be used in the case wherein at least four conductors are used as a connecting medium between modules.

In one non-limiting example, such as in some NAS, the bus connecting to the memory or to the processor is based on a LAN communication, such as Ethernet, and may be partly or in full in accordance with the IEEE802.3 standard. For example, Gigabit Ethernet (GbE or 1 GigE) may be used, describing various technologies for transmitting Ethernet frames at a rate of a gigabit per second (1,000,000,000 bits per second), as defined by the IEEE 802.3-2008 standard. There are five physical layer standards for gigabit Ethernet using optical fiber (1000BASE-X), twisted pair cable (1000BASE-T), or balanced copper cable (1000BASE-CX). The IEEE 802.3z standard includes 1000BASE-SX for transmission over multi-mode fiber, 1000BASE-LX for transmission over single-mode fiber, and the nearly obsolete 1000BASE-CX for transmission over balanced copper cabling. These standards use 8b/10b encoding, which inflates the line rate by 25%, from 1000 Mbit/s to 1250 Mbit/s, to ensure a DC balanced signal. The symbols are then sent using NRZ. The IEEE 8023ab, which defines the widely used 1000BASE-T interface type, uses a different encoding scheme in order to keep the symbol rate as low as possible, allowing transmission over twisted pair. Similarly, The 10 gigabit Ethernet (10GE or 10 GbE or 10 GigE may be used, which is a version of Ethernet with a nominal data rate of 10 Gbit/s (billion bits per second), ten times faster than gigabit Ethernet. The 10 gigabit Ethernet standard defines only full duplex point to point links which are generally connected by network switches. The 10 gigabit Ethernet standard encompasses a number of different physical layers (PHY) standards. A networking device may support different PHY types through pluggable PHY modules, such as those based on SFP+.

The powering scheme may be based on Power over Ethernet or PoE, which describes a system to pass electrical power safely, along with data, on Ethernet cabling, and may use phantom configuration for carrying the power. The PoE technology and applications are described in the White Paper "All You Need To Know About Power over Ethernet (PoE) and the IEEE 802.3af Standard", by PowerDsine Ltd., 06-0002-082 20 May 2004, and in U.S. Pat. No. 6,473,609 to Lehr et al. titled: "Structure Cabling System", which are all incorporated in their entirety for all purposes as if fully set forth herein. The IEEE standard for PoE requires category 5 cable or higher for high power levels, but can operate with category 3 cable for low power levels. The power is supplied in common mode over two or more of the differential pairs of wires found in the Ethernet cables, and comes from a power supply within a PoE-enabled networking device such as an Ethernet switch or can be injected into a cable run with a midspan power supply. The IEEE 8023af-2003 PoE standard, which is incorporated in its entirety for all purposes as if fully set forth herein, provides up to 15.4 Watts of DC power (minimum 44 V DC and 350 mA) to each device. Only 12.95 Watts is assured to be available at the powered device as some power is dissipated in the cable. The updated IEEE 8023at-2009 PoE standard, also known as PoE+ or PoE plus, and which is incorporated in its entirety for all purposes as if fully set forth herein, provides up to 25.5 Watts of power. In PoE environment, an adapter 226 may serve as a Power Sourcing Equipment (PSE) that provides ("sources") power on the Ethernet cable. An adapter 226 consuming power from the LAN is referred to as a Powered Device (PD).

The scrambling (data and/or data) arrangements described above may be used for memory sanitization, in particular HDDs and SSDs. In one non-limiting example, the adapter 226 is a removable device, mechanically attached to the memory 171. When the need for data sanitization of the memory arises, it is only required to mechanically (and electrically) remove the adapter 226 from the memory 171. The adapter 226 may then be destructed or just disassociated from the memory 171. The content of the memory 171 thus rendered indecipherable to any attacker without the adapter 226. Further, another adapter 226 may now be used with this memory 171, making it fully operational for storing other information, yet without any actual risk of data breaching. The adapter in such configuration serves as the 'key' for accessing the memory 171 content. Such sanitization is advantageous over the destruction of the whole memory, and much quicker than most data erasure techniques. Further, an organization using multiple memories (such as in installed in a plurality of computer systems) may attach a separate adapter to each memory, and when a specific memory content is required to be erased, another adapter (carrying a different scrambling scheme) may be attached to this memory, allowing the continuing of this memory for storing other information. The removed adapter may now be used with another memory, this allowing repurpose of the memories and the adapters by easily swapping the adapters, where the old data become irretrievable, and thus obviating the need for any physical destruction. The scrambling may thus be used for Full Disk Encryption (FDE), as a substitute or in addition to other FDE schemes.

Figure 33:
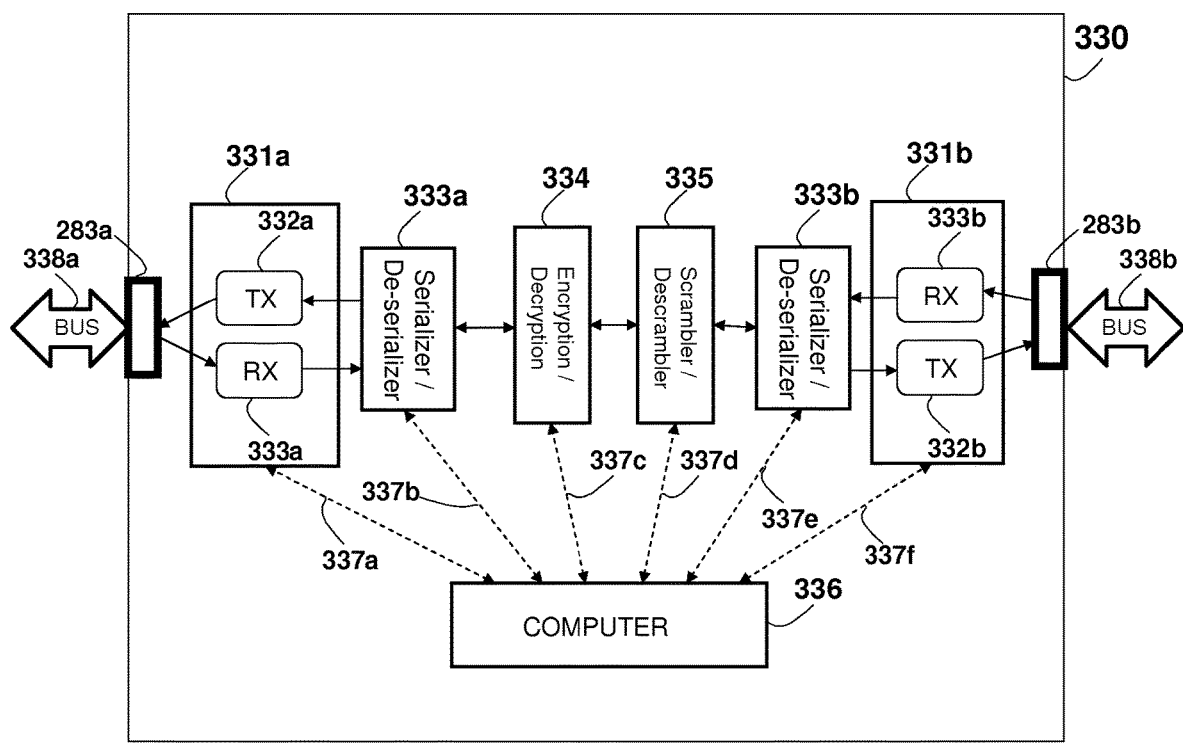
FIG. 33 illustrates a schematic electrical diagram of an adapter including encryption functionality.

An encryption (other than an address or data scrambling) may be used as a substitute or in addition to address or data scrambling. A non-limiting example of an adapter 330, which is based on adapter 226 described above, is shown in FIG. 33, supporting both scrambling and encryption functionalities. The adapter 330 is used between the buses 338*a* and 338*b*, both assumed to be serial buses. The buses may be of the same type or of similar types, or alternatively may be different buses. The buses 338*a* and 338*b* and respectively connected via connectors 283*a* and 283*b*, mating with the respective buses cable connectors. The serial data input from the bus 338*a* is received by the receiver 333*a*, being part of the transceiver 331*a*. The received data stream is converted into parallel by a deserializer (part of the serializer/de-serializer block 333*a*), and then encrypted by the encryption block (part of the encryption/decryption block 334). A scrambling (either data or address or both) is performed by a scrambler (part of the scrambler/descrambler block 335), and then the data is serialized by a serializer (part of the serializer/de-serializer block 333*b*). The serial data stream is then transmitted to the bus 338*b* by the transmitter 332*b*, being part of the transceiver 331*b*. The other direction is similar, where the serial data input from the bus 338*b* is received by the receiver 333*b*, being part of the transceiver 331*b*. The received data stream is converted into parallel by a deserializer (part of the serializer/de-serializer block 333*b*). A descrambling (either data or address or both) is performed by a descrambler (part of the scrambler/descrambler block 335), and then decrypted by the encryption block (part of the encryption/decryption block 334). Then the data is serialized by a serializer (part of the serializer/de-serializer block 333*a*). The serial data stream is then transmitted to the bus 338*a* by the transmitter 332*a*, being part of the transceiver 331*a*.

Each or both of the transmitters 332*a* and 332*b* are preferably capable of operating at serial bit rates above 1 Gigabit/second, and commonly use differential signaling and low voltages for faster switching, such as MOS Current Mode Logic (MCML) based technology. The transmitters may use pre-emphasis or de-emphasis to shape the transmitted signal to compensate for expected losses and distortion. PLLs (Phase Locked Loops) are commonly used for achieving a serial clock that is an exact multiple of the parallel data. The line-code commonly employs self-clocking and other encoding schemes, and control information is transmitted along with the data for error detection, alignment, clock correction, and channel bonding. Some popular encoding schemes are 8B/10B, 64B/66B, and 64B/67B. The receivers 333*a* and 333*b* are commonly designed to mate with the corresponding transmitters and to recover the data and clock from the received signals, and commonly use equalization, and may further include impedance matching termination. The receivers commonly decode the received signal, and detect encoding-based errors. The byte boundaries and other alignment schemes may also be performed by the receivers. The serializer/de-serializer blocks 333*a* and 333*b* may be identical or similar, and may further be similar or identical to the serial/parallel blocks 246 and 247 described above. The combination of Serializer/Deserializer (such as blocks 333*a* and 333*b*) and the transceiver (such as transceivers 331*a* and 331*b*) is sometimes referred to as 'SerDes' or Multi-Gigabit Transceiver (MGT). The transceiver may be based on RocketIO™ Transceiver available from Xilinx Inc., and described in the presentation "Multi-Gigabit Transceivers—Getting Started with Xilinx's Rocket I/Os", by Sandia National Laboratories, Jul. 26, 2007, in Athavale A. and Christensen C., "High-Speed Serial I/O Made Simple—A designers' Guide, with FPGA Applications", Edition 1.0, Xilinx Connectivity Solutions, Xilinx Inc., PN0402399, April 2005, in the Product Specification "Virtex-4 Family Overview", DS112 (v3.1) by Xilinx, Inc., Aug. 30, 2010, in the presentation "Virtex-5 FXT—A new FPGA Platform, plus a Look into the Future", by Xilinx, Inc., August 2010, in U.S. Pat. No. 7,133,648 to Robinson et al. titled: "Bidirectional Multi-Gigabit Transceiver", and in the "RockeIO™ Transceiver User Guide", UG024 (v3.0), Feb. 22, 2007, which are all incorporated in their entirety for all purposes as if fully set forth herein. SerDes may be based on Suckow E.H., "Basics of High-Performance SerDes Design: Part I", Design Guide—"18-bit SerDes Design Guide" by National Semiconductor Corporation, June 2005, Fairchild Semiconductor International, downloaded October 2011 and Lewis D., DesignCon 2004—"SerDes architectures and Applications", National semiconductor Corporation, 2004, which are incorporated in their entirety for all purposes as if fully set forth herein.

The encryption/decryption block 334 may use any type of encryption, and may be hardware based or software based (or both). In the latter case, the block 334 includes a computer such as computer 140 described herein. Preferably, a small processor having an on-board memory is used. Any type of Full Disk Encryption (FDE) may be used. Common schemes use 128 or 256 bit Advanced Encryption Standard (AES) keys. Preferably, such encryption and decryption is On-the-fly encryption (OTFE), also known as Real-time Encryption. "On-the-fly" refers to the fact that the data or files are accessible immediately after the key is provided, and is transparent to the end user and done without any user intervention. Information about FDE technologies, requirements, guides and non-limiting examples are described in Special Publication 800-111 "Guide to Storage Encryption Technologies for End User Devices", by the National Institute of Standards and Technology (NIST), November 2007, in Fruhwirth C., "New Methods in Hard Disk Encryption", Institute for Computer Languages, Jul. 18, 2005, in Schiesser M., "Complete Hard Disk Encryption Using FreeBSD's GEOM Framework", October 20th 2005, in Technology Paper "128-Bit Versus 256-Bit AES Encryption", Seagate Technology LLC., 2008, in PP-CSIDK-CCv3.1 Version 1.4 "Protection Profile—On-the-fly Mass Storage Encryption Application", by 'Direction central de la securite systems d'information', August 2008, and in "Full Disk Encryption—A cryptovision whitepaper", version 1.0, by cv cryptovision GmbH, downloaded October 2011, in Technology Paper "Seagate DriveTrust™ Technology Enables Robust Security within the Hard Drive", by Seagate Technology LLC, 2006, and in Technology Paper "DriveTrust™ Technology: A Technical Overview", by Seagate Technology LLC, 2006, which are all incorporated in their entirety for all purposes as if fully set forth herein.

Any of the adapters or scramblers herein (or any part thereof) may be in the form a die (or chip) or an Integrated Circuit (IC). For example, the circuits and components described herein may be integrated with, or be part of, a memory IC (such as memory 171), a processor IC (such as processor 163), a computer that includes the processor, or other circuits.

Alternatively or in addition, the adapters or scramblers herein (or any part thereof) may be in the form of few ICs and other electrical components physically mounted on, and connected by, a PCB (a.k.a. Printed Wiring Board—PWB), which is used to mechanically support and electrically connect the electronic components using conductive pathways, tracks or signal traces etched from copper sheets laminated onto a non-conductive substrate. The PCB carrying the circuits may be dedicated unit designed or used substantially or only for implementing the functionality of an adapter or scrambler (or any part thereof). Alternately, the components or circuits are integrated as part of another circuit. For example, the motherboard on which the processor 163 is mounted may be used also for carrying the components (e.g., ICs) described herein. Alternatively or in addition, the memory 171 may be an HDD including an internal PCB for its control, where this PCB also used for the circuits described herein.

In the case where dedicated PCB is used, the electrical connection may use an edge connector, relating to the portion of a printed circuit board (PCB) consisting of traces leading to the edge of the board that are intended to plug into a matching socket. Such connectors are used in computers for expansion slots for peripheral cards, such as PCI, PCI Express, and AGP cards. Edge connector sockets consist of a plastic "box" open on one side, with pins on one or both side(s) of the longer edges, sprung to push into the middle of the open center. Connectors are often keyed to ensure the correct polarity, and may contain bumps or notches both for polarity and to ensure that the wrong type of device is not inserted. The socket width is chosen to fit to the thickness of the connecting PCB.

In another non-limiting example, the dedicated PCB is enclosed in a protective enclosure, and connects via a PCB-mounted connector such as in PCMCIA or ExpressCard standard expansion cards. Preferably, such a connection supports hot-plugging. The ExpressCard standard specifies two form factors, ExpressCard/34 (34 mm wide) and ExpressCard/54 (54 mm wide, in an L-shape), where the connector is the same on both (34 mm wide). Standard cards are 75 mm long (10.6 mm shorter than CardBus) and 5 mm thick, but may be thicker on sections that extend outside the standard form. The 34 mm slot accepts only 34 mm cards, while the 54 mm slot accepts both 34 mm and 54 mm cards. A diagonal guide in the rear of the 54 mm slot guides 34 mm cards to the connector. Further, the form factor may be box-shaped having a protecting enclosure, further having one or more connectors for connecting to the buses for connecting between a processor and a memory, using the suitable standard bus connectors.

Some buses allow for intermediate separate devices to be connected between a processor and peripherals, or between other end-units. For example, the Ethernet environment allows for hubs, switches and router to be connected. Similarly, the SAS bus standard defines SAS fanout and edge expanders. The adapter or scramblers circuits and components may be integrated into these intermediaries, sharing the enclosure, power, PCB and connections.

In the case of a dedicated or separated PCB or enclosure, the PCB or enclosure may be designed to be easily removable, for example by an end user. Such plug-in module is commonly designed to be installed and removed typically by respectively connecting or disconnecting the module connectors (pins, plugs, jacks, sockets, receptacles or any other types) to or from the mating connectors, commonly using human hand force and without any tool. The connection mechanical support may be based only on the connectors, or supplemented by guides, rails, or any other mechanical support. Such a plug-in module may be pluggable into a computer system, motherboard, an intermediary device, or a memory.

Figure 34:
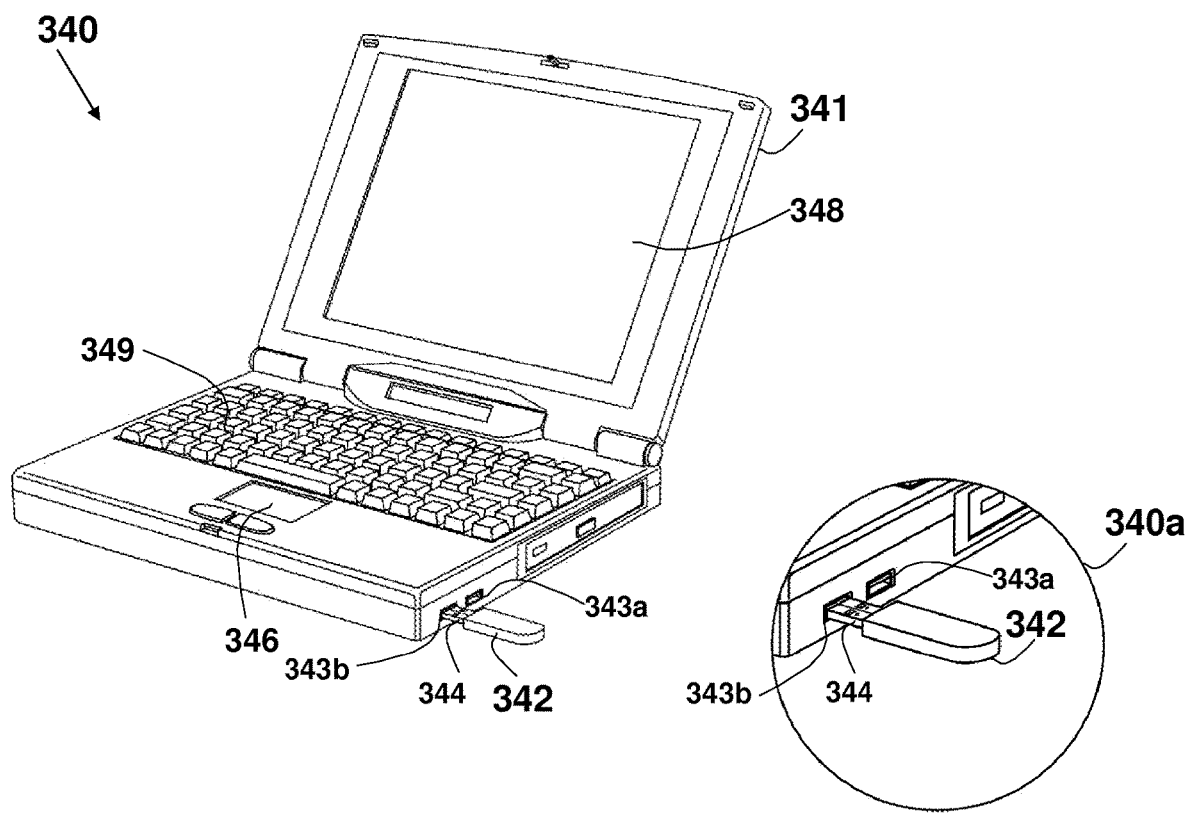
FIG. 34 depicts schematically a laptop and flash drive.
Figure 34A:
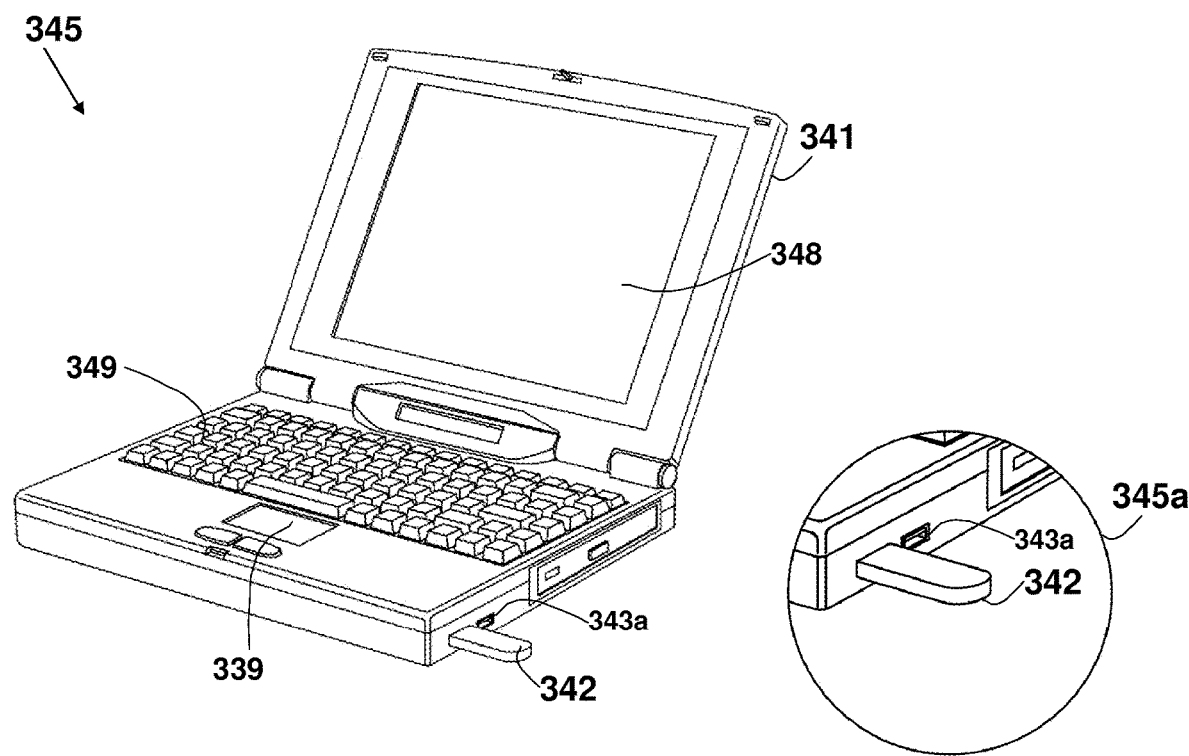
FIG. 34a depicts schematically a laptop and flash drive inserted thereto.

Referring now to FIG. 34, showing a view 340 of a laptop 341, which may correspond to the computer 140 shown in FIG. 13. The laptop 341 is shown to include a display screen 348 (may be corresponding to display 131 in FIG. 13), a keyboard 349 (may be corresponding to input device 132 in FIG. 13) and a touch pad surface 346 (may be corresponding to cursor control 133 in FIG. 13). The laptop 341 may connect to peripherals via two USB ports, shown as standard Type-A receptacles 343a and 343b. FIG. 34 further shows a USB flash drive 342, having a standard Type-A plug 344. Such a flash drive typically consists of a small printed circuit board carrying the circuit elements and a USB connector, insulated electrically and protected inside a plastic, metal, or rubberized case which can be carried in a pocket or on a key chain, for example. The USB connector may be protected by a removable cap or by retracting into the body of the drive, although it is not likely to be damaged if unprotected. Most flash drives use a standard type-A USB connection allowing plugging into a port on a personal computer, but drives may be using other interfaces. Such flash drive 342 commonly includes a flash-based memory. View 340a is a close view of the flash drive 342 and the USB connections. Referring now to FIG. 34a showing a view 345 of the flash drive 342 inserted into the laptop 341 using the USB connection, and view 345a is a close view of the USB connection. The connection allows for the bi-directional serial communication between the flash drive 342 and the laptop 341, and further provides mechanical support and power feeding to the USB drive 342.

Figure 35:
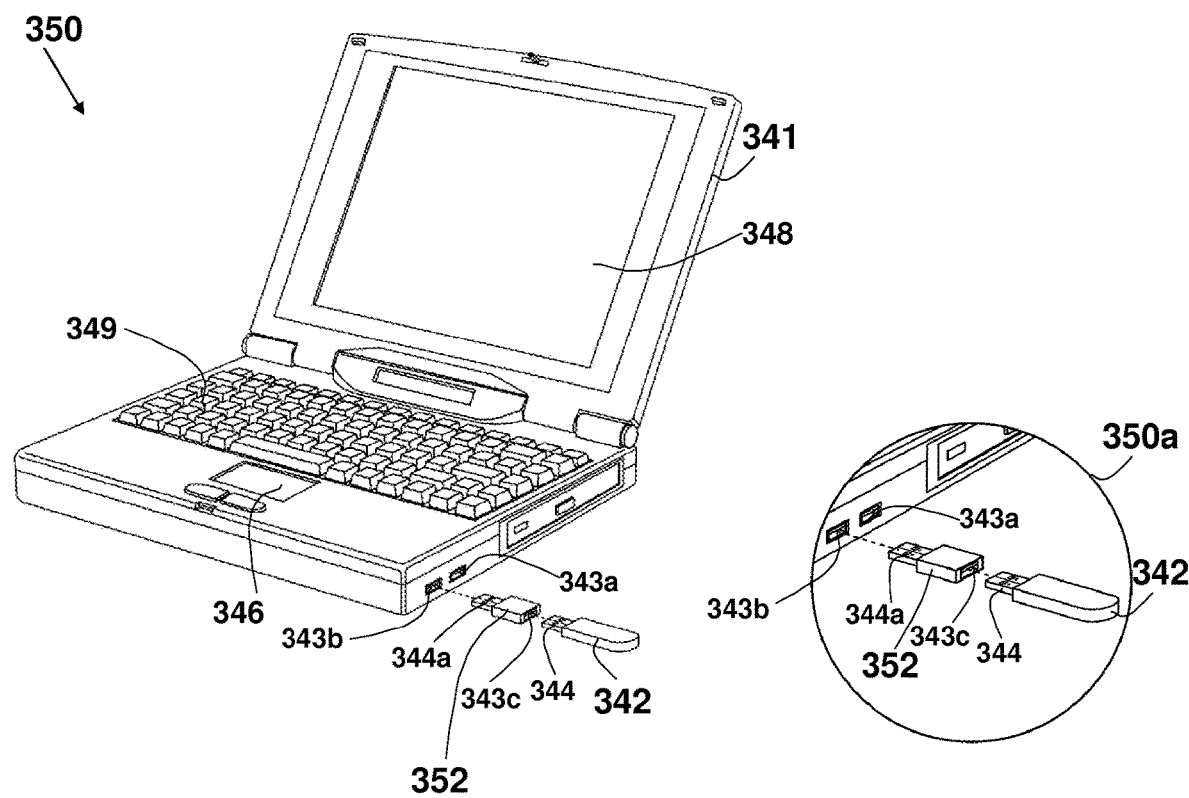
FIG. 35 depicts schematically a laptop, an adapter, and flash drive.
Figure 35A:
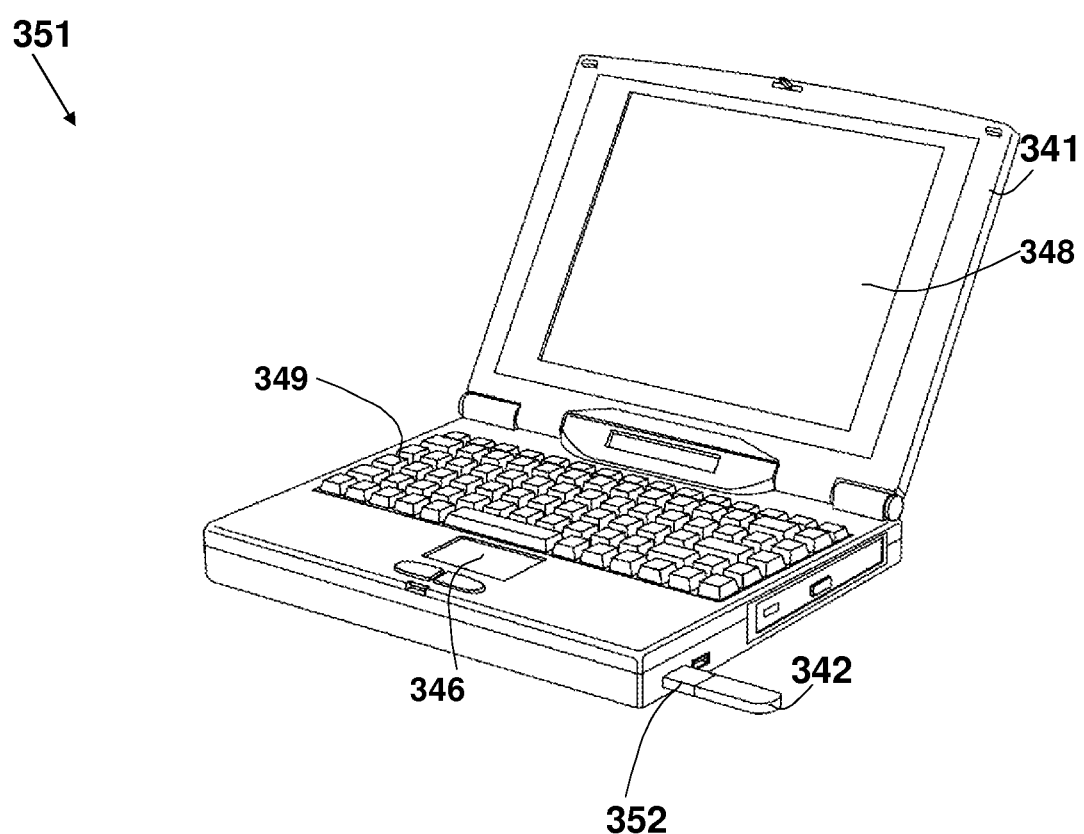
FIG. 35a depicts schematically a laptop, an adapter and a flash drive inserted thereto.
Figure 35B:
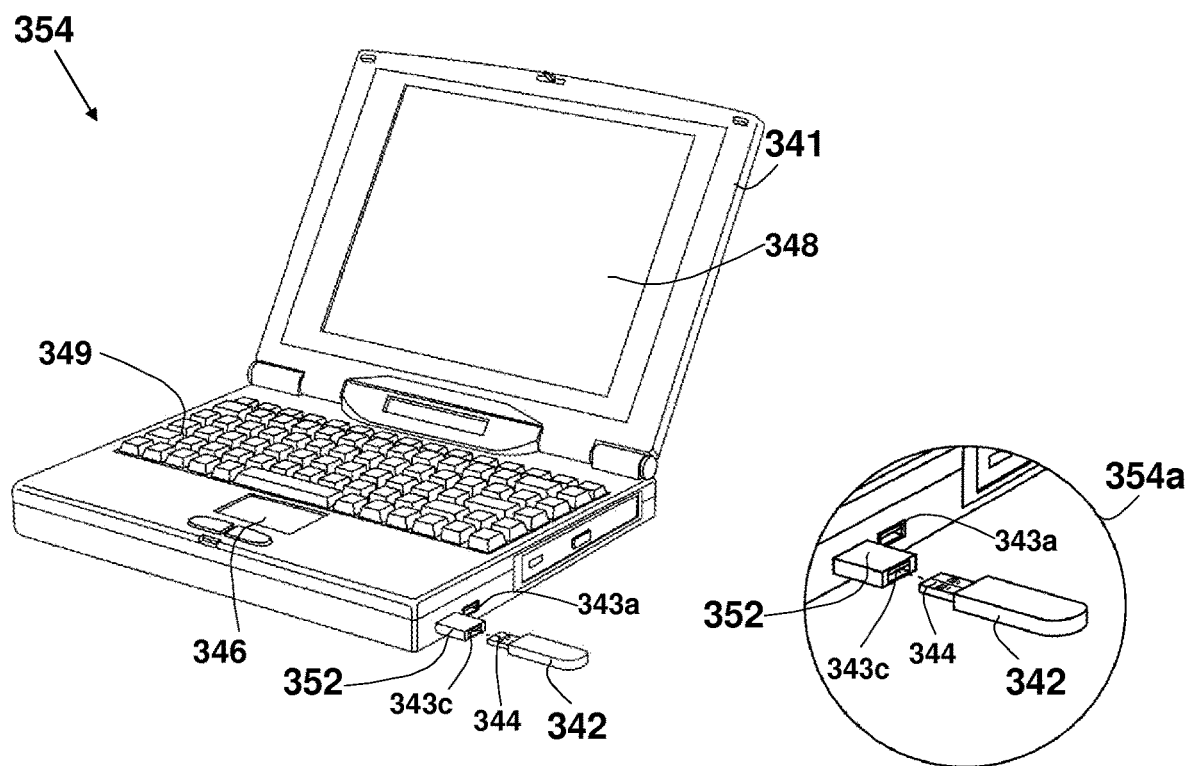
FIG. 35b depicts schematically a laptop, a flash drive, and an adapter inserted thereto.
Figure 35C:
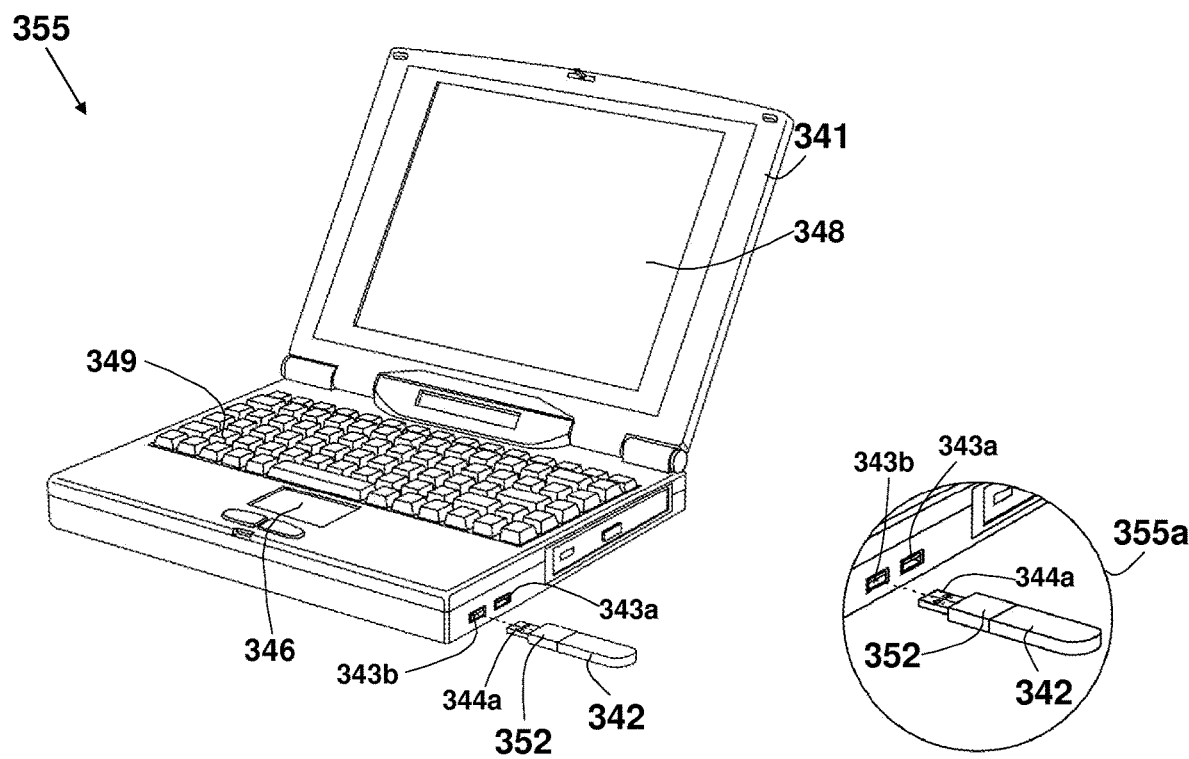
FIG. 35c depicts schematically an adapter, a flash drive inserted thereto, and a laptop.

An adapter (or a scrambler) described herein may be used for encrypting digital data stored on the flash drive 342. Such an adapter (or a scrambler) may be in full or in part integrated into the enclosure of the laptop 341, or to the flash drive 342. Further, part or all of an adapter (or a scrambler) may be a separate enclosure, such as adapter 352 shown in view 350 in FIG. 35. The adapter 352 includes a Type-A receptacle 343c, which may mate with the A-Type plug 344 of the flash drive 342, and an A-Type plug 344a which mates with the Type-A receptacle 343b of the laptop 341. View 350a is a close view of the adapter 352 and its connections. Using such an adapter 352 may allow the use of unchanged laptop 341 and flash drive 342, yet providing encryption or scrambling as described herein. Further, the data stored in the flash drive 342 (via the adapter 352) is easily secured by separating by separating the drive 342 and the adapter 352, and can easily be retrieved by connecting them together. Such connection is shown in view 351 in FIG. 35a, where the flash drive is inserted to the adapter 352, which is inserted to the laptop 341. The adapter 352 may be mechanically attached or secured, and electrically connected to, laptop 341, as shown in view 354 in FIG. 35b. Assuming a unique scrambling (or encryption) scheme in the adapter 352, once data is written via the adapter 352 in the flash drive 342, such data may be read only by connecting the flash drive 342 to the laptop 341 via the adapter 352 port. View 354a is a close view of the adapter 352 and its connections. Alternatively or in addition, the adapter 352 may be mechanically attached (and electrically connected) to the flash drive 342, and the combined set (adapter 352 and the flash drive 342) may be plugged into any USB port (of any computer), while encrypting data stored on the drive 342. View 355a is a close view of the adapter 352 and its connections.

Figure 36:
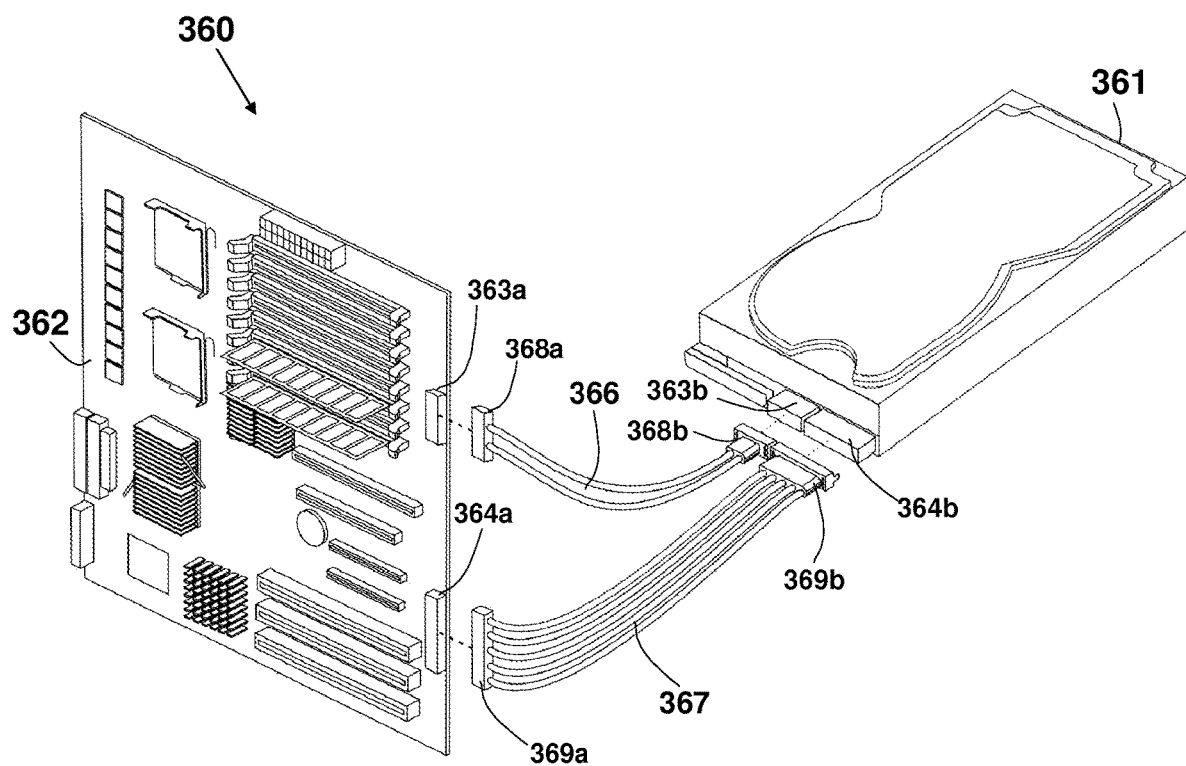
FIG. 36 depicts schematically an HDD, a motherboard, and bus cables for connecting them.
Figure 36A:
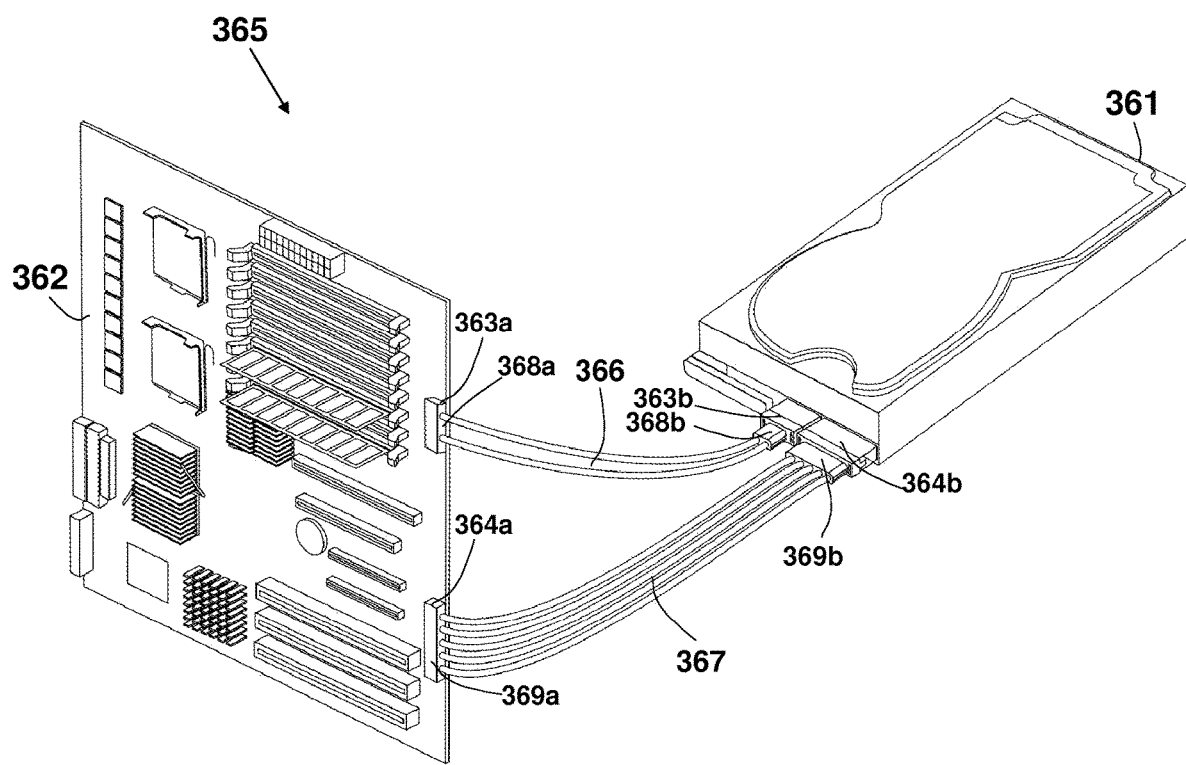
FIG. 36a depicts schematically an HDD connected via a bus to a motherboard.

Referring now to FIG. 36, showing a view 360 of an HDD 361 connected via bus power cable 366 and bus data cable 367 to the motherboard 362, which may correspond to the computer 140 shown in FIG. 13. The bus power cable 366 includes two wires, and terminates with power connectors 368a and 368b, respectively capable of mating with the motherboard mounted power connector 363a and the HDD power connector 363b. The data power cable 367 includes 5 wires, and terminates with data connectors 369a and 369b, respectively capable of mating with the motherboard mounted data connector 364a and the HDD power connector 364b. The HDD 361 connected via the power cable 366 and the data cable 367 to the motherboard 362 is shown in view 365 in FIG. 36a. For example, the bus may be SATA bus. In this example, the data cable 367 is a SATA data cable having 7 conductors (instead of the 5 shown), 3 grounds and 4 active data lines arranged in two pairs (each carrying differential signaling). Connectors 369a and 369b are SATA data cable wafer-based connectors, mating with SATA data connectors 364a and 364b. Similarly, the power cable 366 is a SATA power cable having 5 conductors (instead of the 2 shown), and carrying 3.3 VDC, 5 VDC and 12 VDC. Connectors 368a and 368b are SATA power cable wafer-based connectors having 15 pins, mating with SATA power connectors 363a and 363b.

Figure 37:
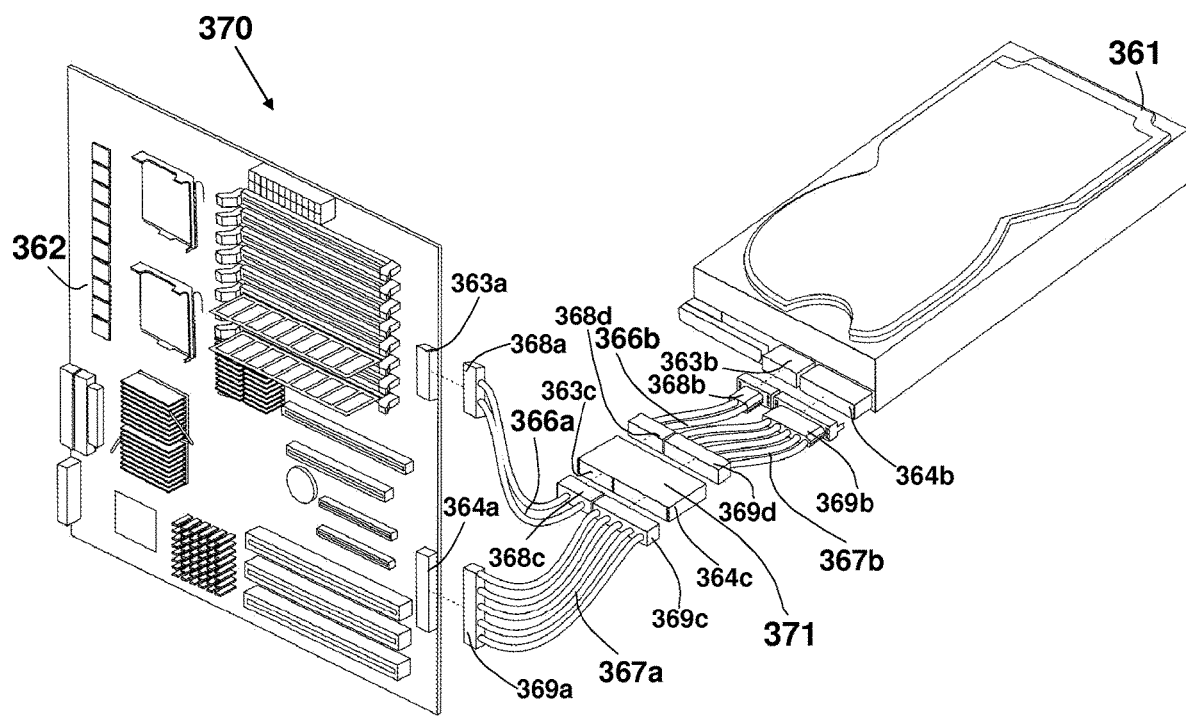
FIG. 37 depicts schematically an HDD, an adapter, a motherboard, and bus cables.
Figure 37A:
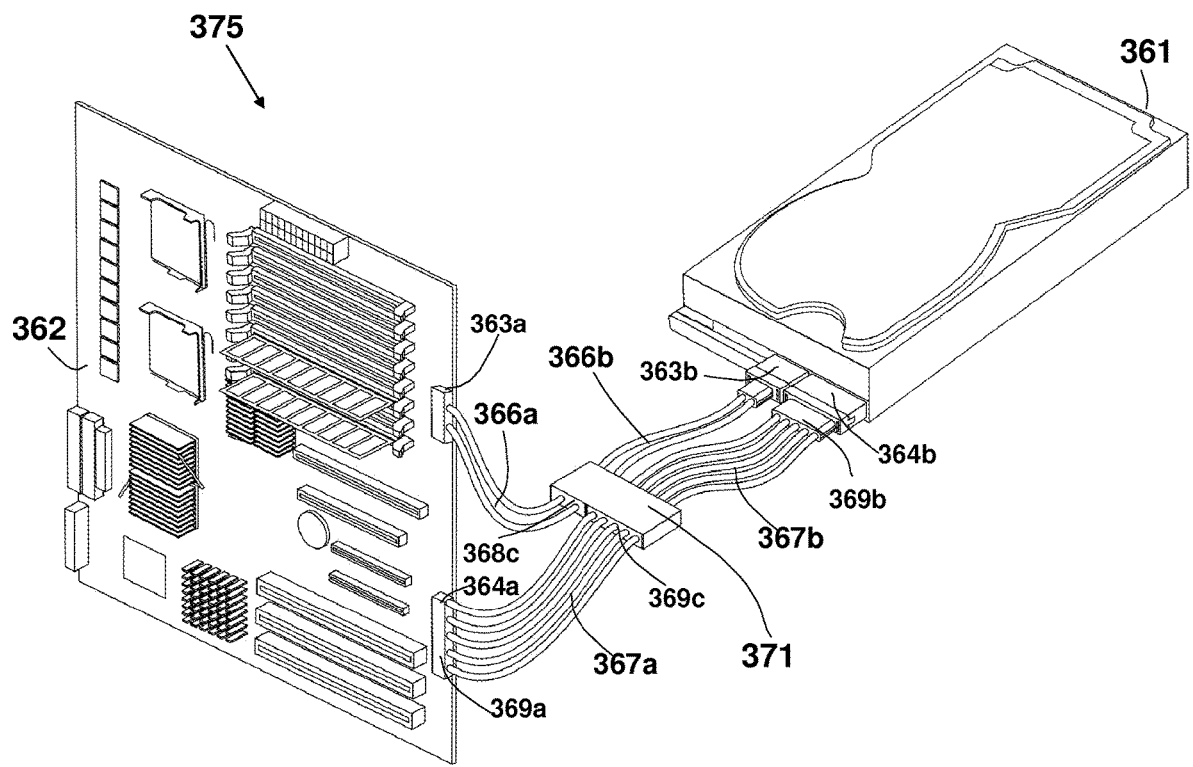
FIG. 37a depicts schematically an HDD connected to a motherboard via an adapter using bus cables.

An adapter (or a scrambler) described herein may be used for encrypting digital data stored in the HDD 361. Such an adapter (or a scrambler) may be in full or in part integrated onto the motherboard 362, or to the HDD 361. Further, part or all of an adapter (or a scrambler) may be a separate enclosure, such as the box-shaped adapter 371 shown in view 370 in FIG. 37, connected between the motherboard 362 and the HDD 361. A power cable 366a is terminated with the cable power connectors 368a and 368c, which may be respectively connected to the mating power connector 363a in the motherboard 362 and the mating power connector 363c in the adapter 371. A power cable 366b is terminated with the cable power connectors 368d and 368b, which may be respectively connected to the mating power connector in the adapter 371 and the mating power connector 363b in the HDD 361. A data cable 367a is terminated with the cable data connectors 369a and 369c, which may be respectively connected to the mating data connector 364a in the motherboard 362 and the mating data connector in the adapter 371. A data cable 367b is terminated with the cable data connectors 369d and 369b, which may be respectively connected to the mating data connector of the adapter 371 and the mating data connector 364b in the HDD 361. The adapter 371 connected between the motherboard 362 and the HDD 361 is shown in view 375 in FIG. 37a.

Figure 38:
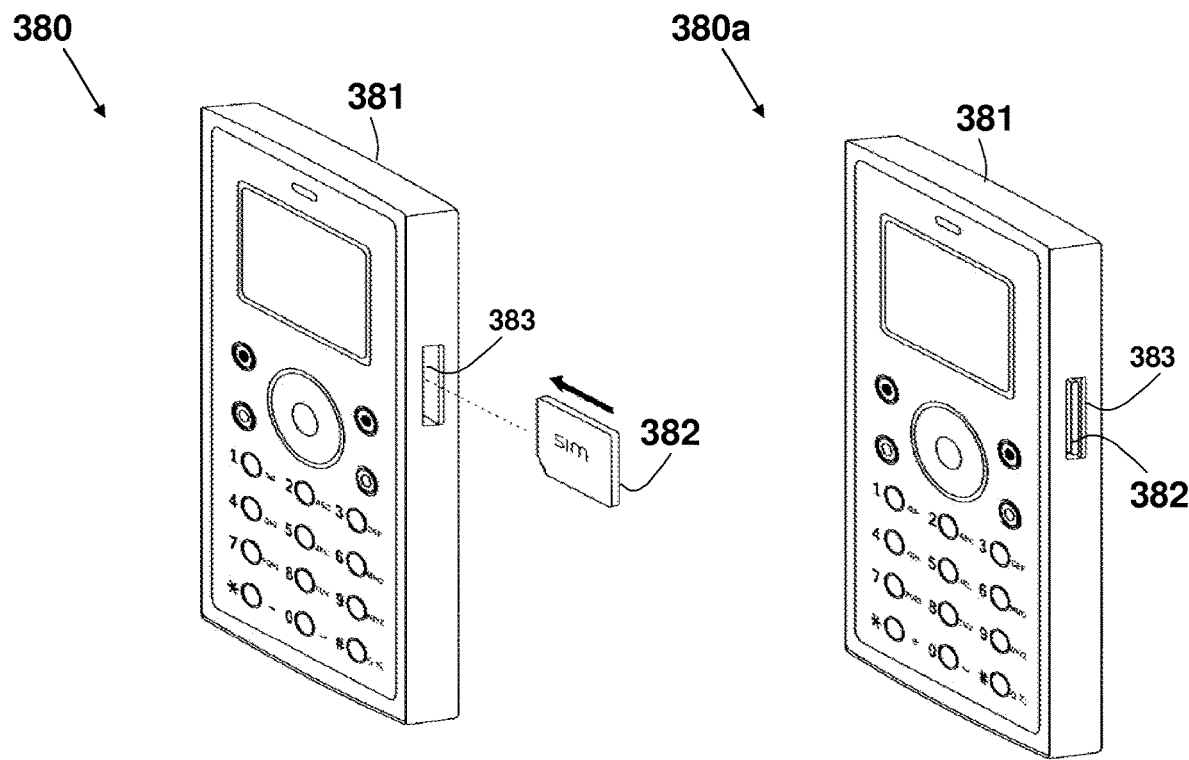
FIG. 38 depicts schematically a cellular telephone handset and a memory card.

Similarly, FIG. 38 shows a view 380 of a cellular telephone handset 381 having a slot 383, mating to receive a memory card 382, and view 380a shows the card 382 installed with the handset 381. The memory card 382 may include sensitive, private, confidential, or information that needs to be stored in as encrypted. For example, the card 382 may be a subscriber identity module or Subscriber Identification Module (SIM) that stores in a non-volatile memory the International Mobile Subscriber Identity (IMSI) and the related key used to identify and authenticate the subscriber on mobile telephony devices (such as mobile phones and computers). A SIM card may be in accordance with ISO/IEC 7810—Identification cards standard. The memory card 382 may further store a Personal Identification Number (PIN), which is a secret alpha-numeric password shared between a user and a system that can be used to authenticate the user to the system. Typically, the user is required to provide a non-confidential user identifier or token (the user ID) and a confidential PIN to gain access to the system. Upon receiving the user ID and PIN, the system looks up the PIN based upon the user ID and compares the looked-up PIN with the received PIN. The user is granted access only when the number entered matches with the number stored in the system.

Figure 39:
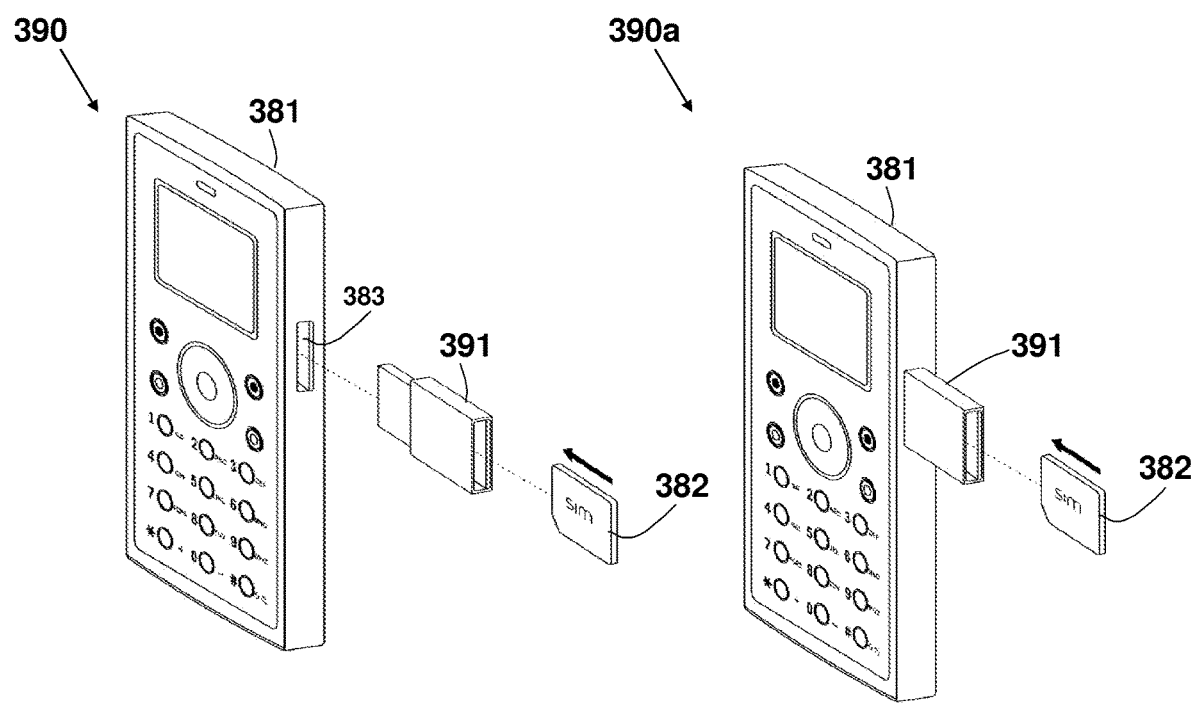
FIG. 39 depicts schematically a cellular telephone handset, an adapter, and a memory card.
Figure 39A:
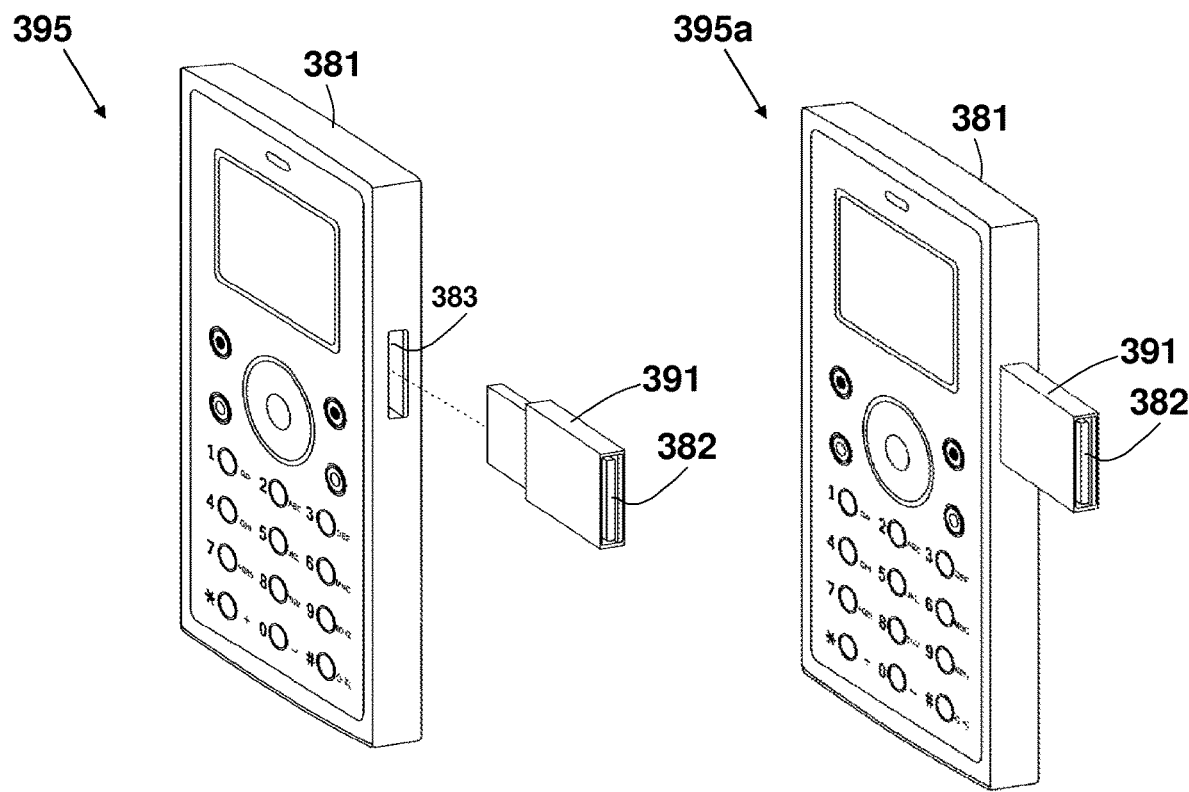
FIG. 39a depicts schematically the connections of a cellular telephone handset, an adapter, and a memory card.

Referring now to FIG. 39a showing in view 390 an adapter 391, which correspond to an adapter or a scrambler described herein. The adapter 391 is shaped to fit into the slot 383 similar to the memory card 382, as shown in view 390a. Further, the adapter 391 provides a slot capable of receiving the memory card 382, as shown in view 395 in FIG. 39a. View 395a in FIG. 39a shows the adapter 391 (with the inserted memory card 382) inserted in slot 383 of the cellular handset 381.

Figure 40:
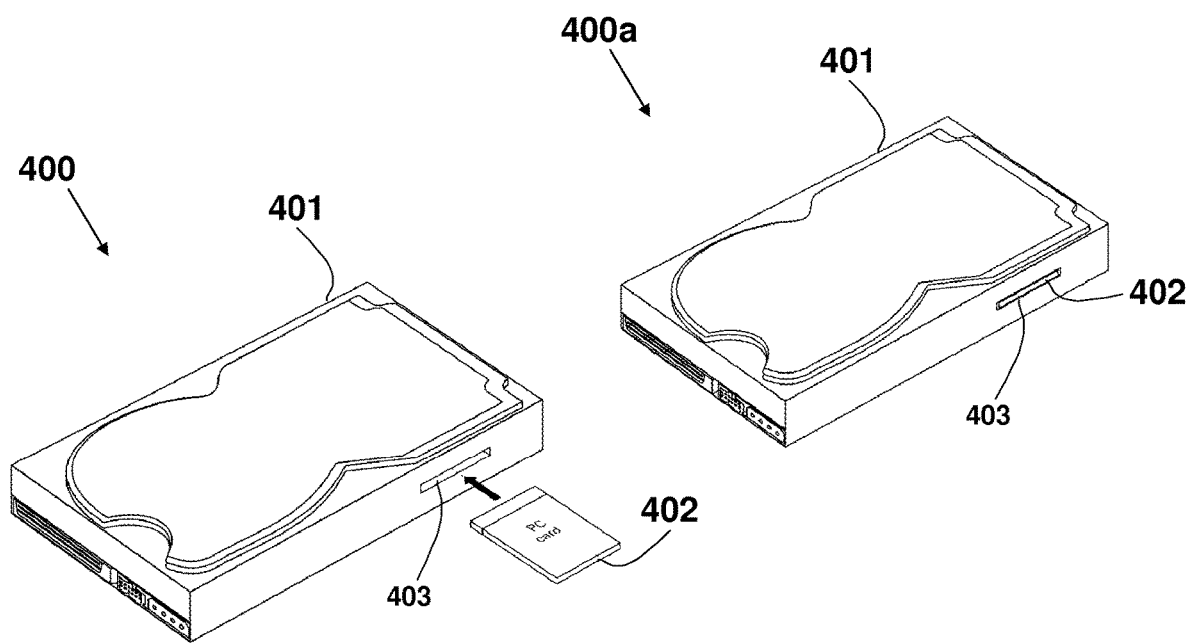
FIG. 40 depicts schematically an HDD and a plug-in adapter.

View 400 in FIG. 40 shows an HDD 401 and an adapter 402 shaped as plug-in PC card, mating to be inserted into the slot 403 of HDD 401. The adapter 402 installed in HDD 401 is shown in view 400a. Upon insertion of the adapter 402, information is stored encrypted in the HDD 401. When the adapter 402 is removed from the HDD 401, the stored information cannot be read, and thus is secured.

Figure 41:
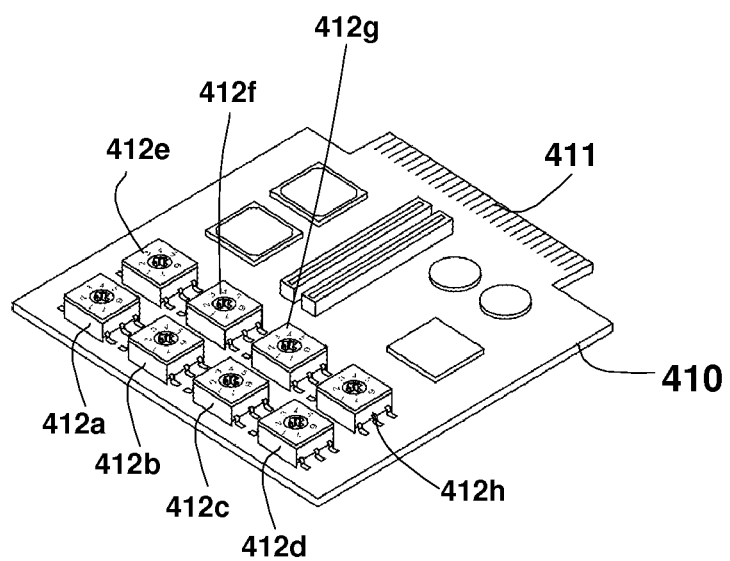
FIG. 41 depicts schematically an adapter based on rotary switches.
Figure 41A:
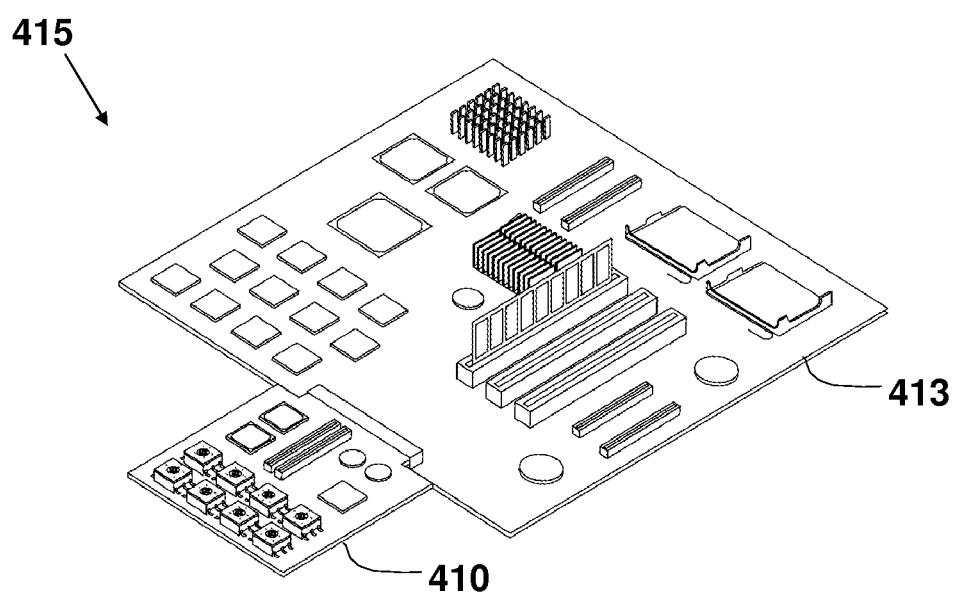
FIG. 41a depicts schematically an adapter based on rotary switches connected to a motherboard.
Figure 42:
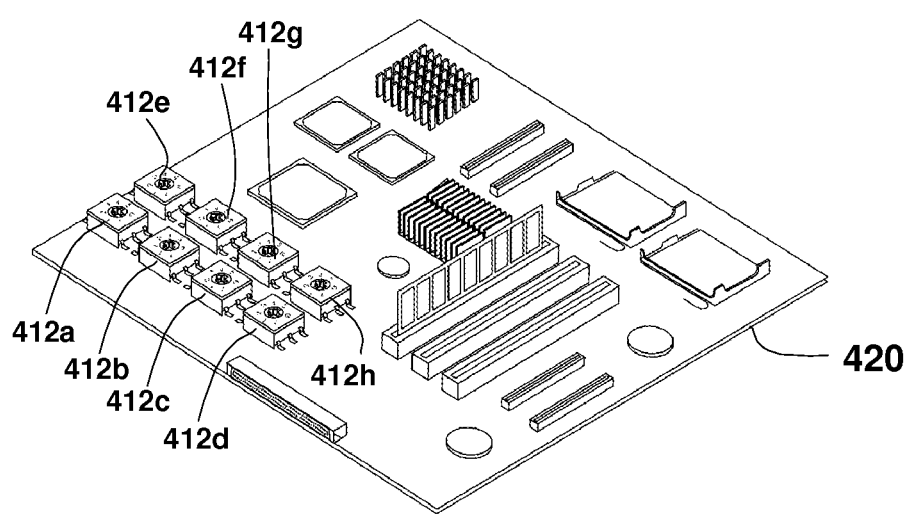
FIG. 42 depicts schematically a motherboard including an adapter based on rotary switches.

Referring now to FIG. 41 showing an adapter 410, which correspond to any adapter or a scrambler described herein. The adapter 410 is shaped as a plug-in unit based on a PCB and components mounted thereon, and using an edge card connector 411. The adapter 410 may correspond to the address scrambler 191 shown in FIG. 19 or to the data scrambler 211 shown in FIG. 21, where the scrambling is based on swapping, re-arranging or otherwise changing the bus connections. The scrambling may be implemented using the miniature rotary switches 412a-h shown as part of the adapter 410. The rotary switches 412a-h shown are each operated by mechanical rotation of the shaft by a human user, and has a single pole and 8 positions or states, selected upon the shaft position. For example, rotary switch 412a center may be connected to $A_7$ address line 176a shown in FIG. 19, and may be connected to any of the $A_7$182a to $A_0$ 182h lines connected to the memory 171. Similarly, the rotary switch 412b center may be connected to $A_6$ address line 176b, the rotary switch 412c center may be connected to $A_5$ address line 176c, the rotary switch 412d center may be connected to $A_4$ address line 176d, the rotary switch 412e center may be connected to $A_3$ address line 176d, the rotary switch 412f center may be connected to $A_2$ address line 176f, the rotary switch 412g center may be connected to $A_1$ address line 176g, and the rotary switch 412h center may be connected to $A_0$ address line 176h. Each of the switches 412a-h may connect to one of the lines 182a-h connecting to the memory 171, thus implementing a unique, user selected, scrambling scheme. View 415 in FIG. 41a shows the adapter 410 connected (and mechanically attached) to a motherboard 413. FIG. 42 shows a non-limiting example where the miniature rotary switches 412a-h implementing a scrambler (data or address) are mounted as part of a motherboard 420.

Figure 43:
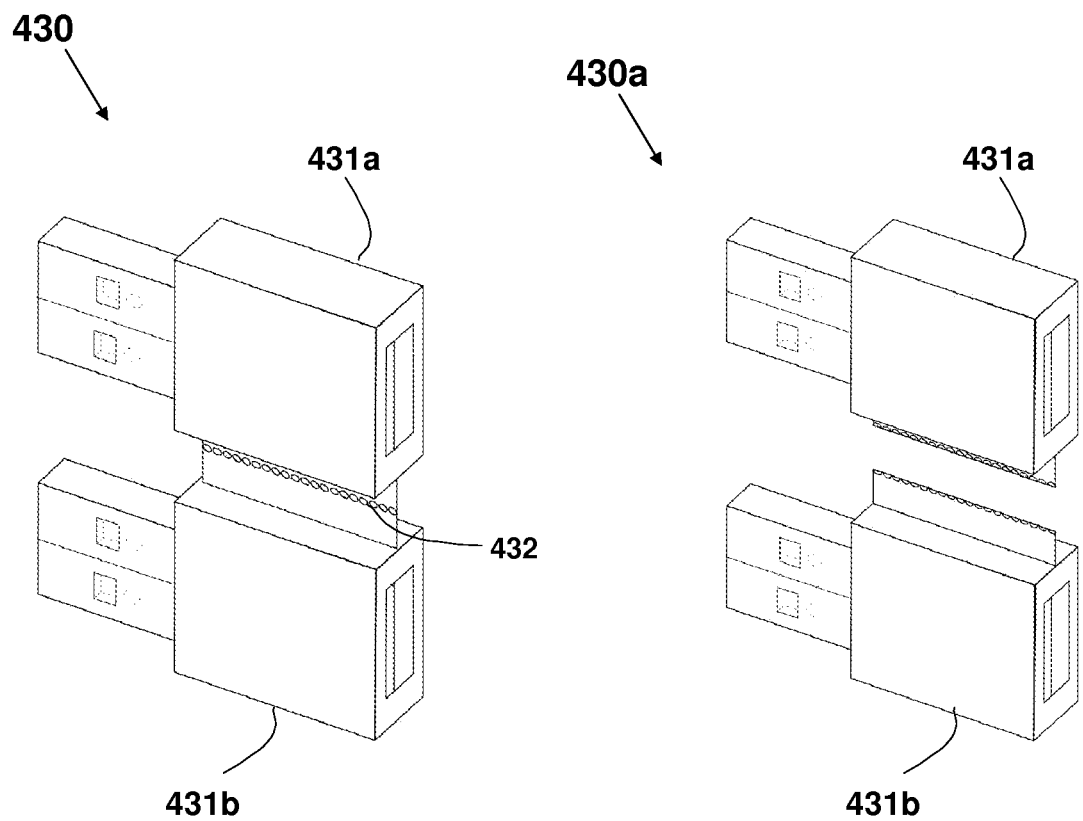
FIG. 43 depicts schematically a set of detachable USB adapter pair.
Figure 44:
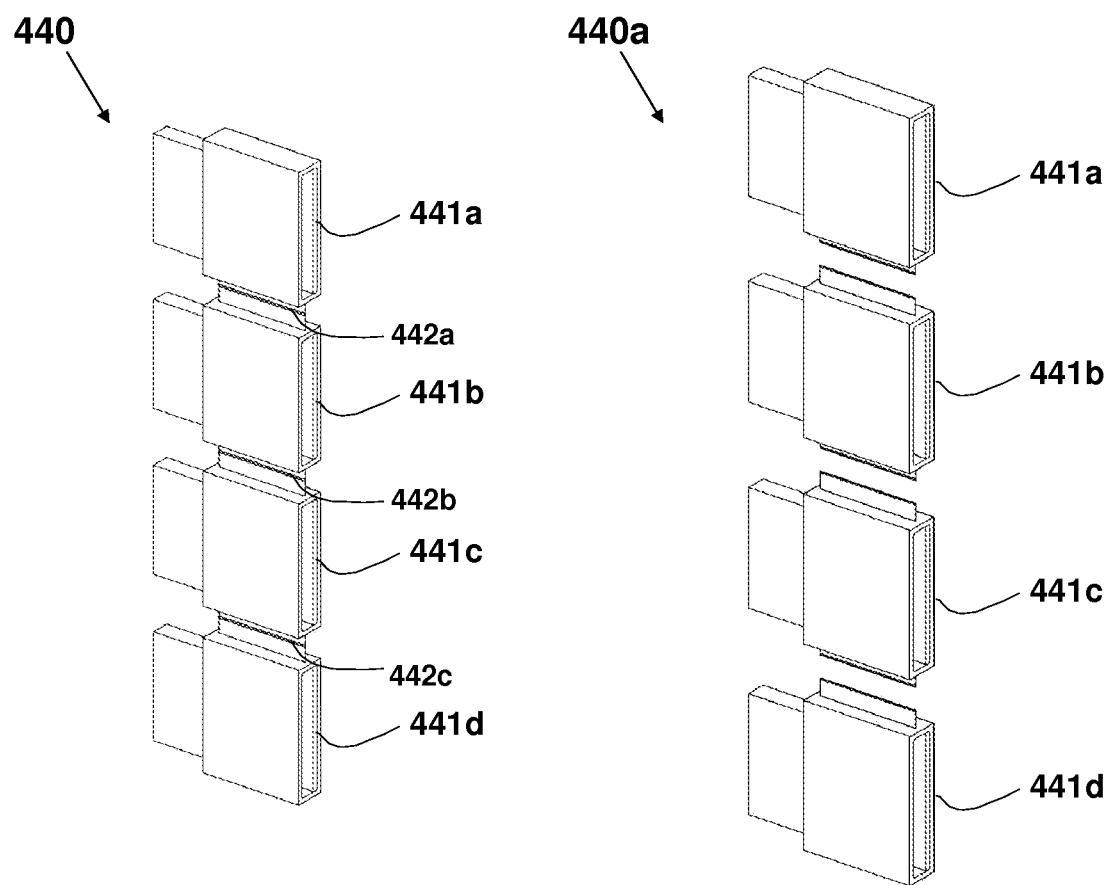
FIG. 44 depicts schematically a set of detachable SIM adapter quad.

Adapters (or scramblers) may be implemented, manufactured or otherwise provided as a set containing multiple units. Preferably, all the units in such a set share the same scrambling scheme (or any other encryption method), such that any encryption (such as scrambling) via one of the units in the set, may be decrypted (such as descrambled) via any other one of the other units in the set. FIG. 43 shows a view 430 of a pair of USB adapters 431a and 431b. Each of these adapters may correspond to the USB adapter 352 shown in FIG. 35 above. The USB adapters 431a and 431b in the set are mechanically attached, via a surface having a perforation line 432, making the mechanical attachment easily breakable along the perforation line 432 by applying reasonable human force. View 430a shows the USB adapters 431a and 431b physically separated, such that each unit may be used with a different and distant computer. Similarly, view 440 in FIG. 44 shows a set of 4 SIM adapters 441a, 441b, 441c and 441d, mechanically attached to each other, detachable by using the breakable perforation lines 442a, 442b and 442c. Each of the SIM adapters 441a, 441b, 441c and 441d may correspond to the adapter 391 shown in FIG. 39 above. View 440a shows the adapters 441a, 441b, 441c and 441d detached from each other, after breaking along the respective perforated lines.

Digital Rights Management (DRM) refers to access control technologies used to limit the use of digital content and devices. DRM is typically used by hardware manufacturers, publishers, copyright holders and others for protecting the copyrights (or other rights) of data circulated via the Internet or other via other digital media, by enabling secure distribution or usage and/or disabling illegal distribution or usage of the data. In some cases, a DRM mechanism protects intellectual property by either encrypting the data so that it can only be accessed by authorized users or marking the content with a digital watermark or similar method, so that the content may not be freely distributed. The arrangements, methods and systems described herein may be used as an alternative or in addition to other DRM mechanisms.

In one example, the adapter described above is used for the purpose of copy protection or authentication. A software file (which may be a program, data or both) in the form of scrambled (or otherwise encrypted) data may be distributed in various forms, such as downloaded via the Internet or from a server, as an optical disk (e.g., DVD-ROM), residing in a storage USB adapter, or stored in any type of memory. Being scrambled, the software cannot be deciphered without the use of the appropriate adapter, suitable to the specific scrambling scheme used for the specific copy of the software. For example, if the scrambled software is stored in the USB adapter 342 shown in FIG. 35 above, a suitable adapter 352 need to be used in order to properly access or use the data in the adapter 342.

While some of the preceding examples have been presented with respect to scrambling or encrypting relating to a processor writing to or reading from a memory, using scrambling may be equally applied to any digital data communication. In such a case, a message to be sent (such as packet payload) is converted using scrambling. For example, the message may be segmented into groups of equal length of bits such as 8 bits (bytes), 10 bits, 11 bits or any other length. Each group is then converted to another group of bits, according to a one-to-one mapping scheme known to the sender and to the receiver. The receiver applies the inverse mapping scheme to reconstruct the original message. Further, in the case of two way communication, each direction may use the same, similar, or different scrambling scheme.

Figure 45:
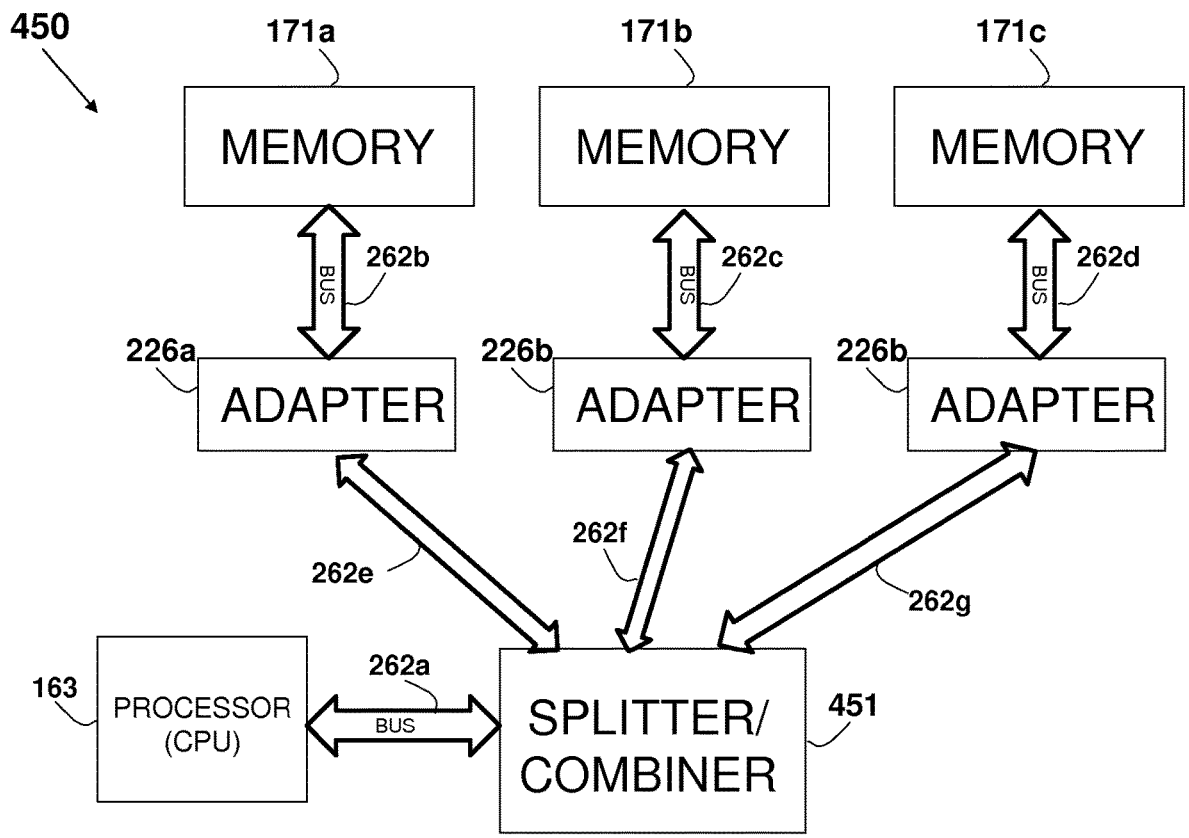
FIG. 45 illustrates a schematic electrical diagram of splitting/combining using multiple memories via adapters.
Figure 45A:
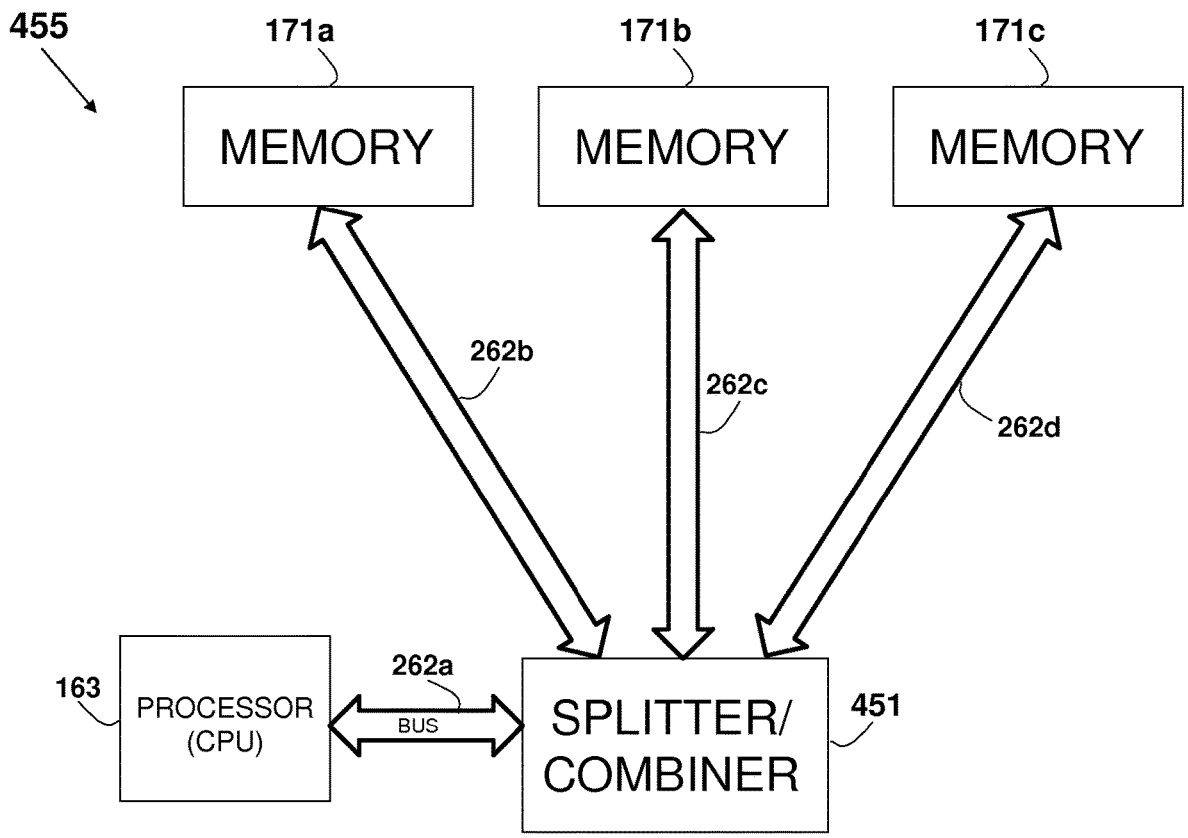
FIG. 45a illustrates a schematic electrical diagram of splitting/combining using multiple memories.

In one example, multiple memories are used for cooperatively storing information. FIG. 45 shows in arrangement 450 3 memories 171a, 171b and 171b, respectively connected via buses 262b, 262c and 262d, similar to FIGS. 25-27 above. The memories may be included in the same physical device or in the same enclosure, such as different sectors in an HDD, or may preferably be distinct physical entities, such as 3 HDDs. Further, the memories may be the same type or using the same type of medium, or each memory may be of different type, such that memory 171a may be an HDD, while memory 171b may be a Flash-based memory, and memory 171c may be an optical drive. Similarly, the buses may be of the same type, of similar types, or of different types. The memories 171a, 171b and 171c are respectively connected via adapters 226a, 226b and 226c. Each such adapter 226 corresponds to the adapters described above. The adapters may be of the same type and may use the same scheme. Alternatively, the adapters may be of different types (such as address and data scramblers), or use the same, similar, or different scrambling schemes. The memories 171a, 171b and 171c are connected (via the respective buses and adapters) to a splitter/combiner block 451, via the respective buses 262e, 262f, and 262g, which be of the same type, of similar types, or of different types. Each of the adapters and memories may use any one of the powering schemes described above, or any combination thereof. Similarly, the splitter/combiner 451 may be powered by any one of the power schemes described above, or any combination thereof. Further, part or all of the adapters and the splitter/combiner 451 may be housed together or separately, and may further be integrated with each other, integrated with any of the memories or with the processor 163. In another example shown in arrangement 455 in FIG. 45a, no adapters 226 are used, and the memories 171 are connected via their respective buses directly to the splitter/combiner 451. While exampled in FIG. 45 with 3 memories, any number of memories may be equally used.

The information to be stored is received in the splitter/combiner 451, for example from processor 163 via bus 262a. The splitter/combiner 451 splits the information into information portions, and then the portions are written in one or more of the memories 171 according to a splitting scheme. When information is to be read, for example to processor 163 via bus 262a, the splitter/combiner 451 combine the information from the memories 171, using a combining scheme which is the inverse of the splitting scheme. Preferably, the splitting and combining are transparent to the processor 163, and are performed autonomously (without the intervention of processor 163) by the splitter/combiner 451. Preferably, the information is stored in memories 171 as partitioned, encrypted, scrambled, or any combination thereof. In order to reconstruct (or decipher) part or all the stored information, all memories need to be accessed, as well as the splitter/combiner 451 (or the splitting or combining schemes). An attacker having access to the content of one or more of the memories may not be able to eligible access part or all of the information stored. An attacker having access to all memories may need the splitter/combiner 451 or information about the splitting scheme in order to eligibly reconstruct the stored information.

The splitting of the information to be stored between the memories may be overlapping or non-overlapping. In the case of non-overlapping splitting, each portion of the information to be stored is stored in only one of the memories. For example, if the information to be stored (e.g., a file) may be split into three non-overlapping parts referred to as 'A', 'B' and 'C', then the splitter/combiner 451 may split the information such that part 'A' is stored in memory 171a, part 'B' is stored in memory 171b, and part 'C' is stored in memory 171c. In the case of overlapping splitting, each portion of the information to be stored is stored in one or more of the memories. For example, if the information to be stored (e.g., a file) may be split into three non-overlapping parts referred to as 'A', 'B' and 'C', then the splitter/ combiner 451 may split the information such that the parts 'A' and 'B' are stored in memory 171a, parts 'B' and 'C' are stored in memory 171b, and parts 'C' and 'A' are stored in memory 171c. As such, in the case of a failure in one of the memories, the full information may be restored from the remaining memories. Similar to the adapters described above, many specific splitting schemes may be used, and information stored using a specific splitter/combiner 451 implementing a specific splitting scheme, need to be read using a mating combining scheme, or by using the same splitter/combiner 451 used for the splitting. The techniques described above regarding the scrambling schemes or slicing schemes equally apply to splitting schemes.

The splitting of the splitter/combiner 451 may use address space splitting, where the address space 'seen' by the processor 163 is translated to various addresses (locations) in the memories 171, based on an address mapping. In one example, the mapping is sequentially based, where sequential addresses of the processor 163 are translated to sequential addresses in the memories 171. For example, processor related address '0' will be translated to address '0' of memory 171a, processor related address '1' will be translated to address '0' of memory 171b, processor related address '2' will be translated to address '0' of memory 171c, processor related address '3' will be translated to address '1' of memory 171a, processor related address '4' will be translated to address '1' of memory 171b, and so forth. Similarly, sequential group mapping may be used, where processor related address group '0' to '9' will be translated to address group '0' to '9' of memory 171a, processor related address group '0' to '19' will be translated to address group '0' to '9' of memory 171b, processor related address group '20' to '29' will be translated to address group '0' to '9' of memory 171c, processor related address group '30' to '39' will be translated to address group '10' to '19' of memory 171a, processor related address group '40' to '49' will be translated to address group '10' to '19' of memory 171b, and so forth.

Preferably, a non-sequential address mapping is used, which may be based on a table or logic implemented by the splitter/combiner 451. For example, the processor related address group '0' to '8' may be mapped according to arbitrarily one specific non-overlapping splitting scheme to the first 3 addresses of each of the memories 171 addresses '0' to '2' as follows: Processor related address '0' will be translated to address '2' of memory 171c, processor related address '1' will be translated to address '0' of memory 171b, processor related address '2' will be translated to address '1' of memory 171a, processor related address '3' will be translated to address '2' of memory 171b, processor related address '4' will be translated to address '1' of memory 171c, processor related address '5' will be translated to address '2' of memory 171a, processor related address '6' will be translated to address '0' of memory 171c, processor related address '7' will be translated to address '0' of memory 171a, and processor related address '8' will be translated to address '1' of memory 171b. The next 9 processor related addresses ('9' to '17') will be similarly allocated to the address '3' to '5' of the memories 171. While exampled using groups having 9 addresses, any size of groups may be equally used. For example, a group of 300 addresses may be used as split into three groups of 100 addresses, each allocated to 100 addresses in the 3 memories 171. Larger group size makes it harder for an attacker to reconstruct the information without knowledge of the splitting scheme or having the splitter/combiner itself.

The splitting of the splitter/combiner 451 may use data word splitting, where the data word to be written into a memory is split into parts, where each part is stored in one or more of the memories, according to a splitting scheme. The splitting may be non-overlapping, where each part is stored in a single memory, or may be overlapping, where a part is stored in two (or more) memories. The data word splitting may be used in addition to the address space splitting.

Figure 46:
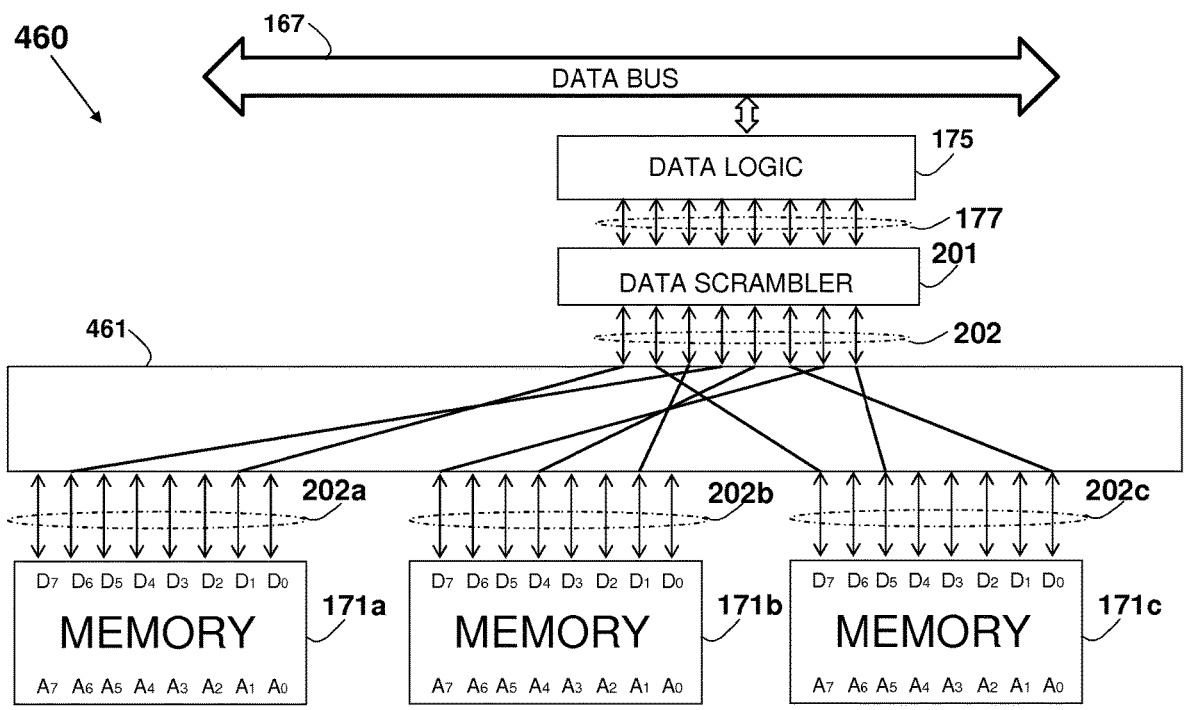
FIG. 46 illustrates a schematic electrical diagram of data word splitting/combining using multiple memories.
Figure 46A:
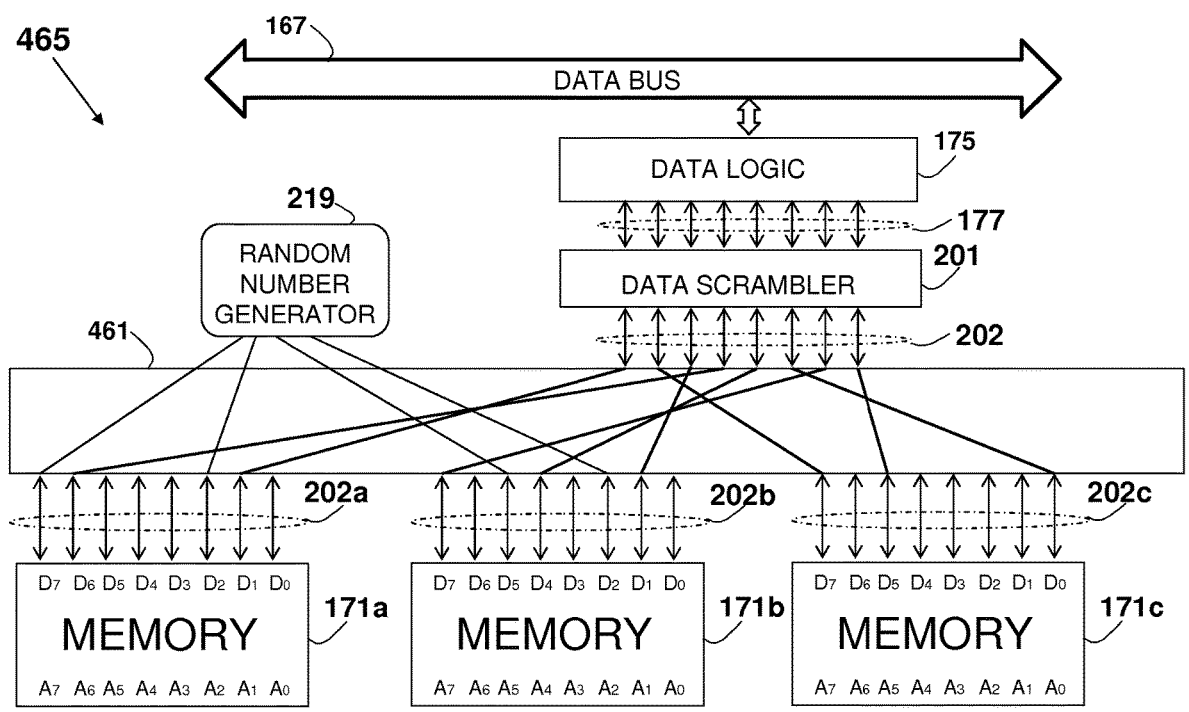
FIG. 46a illustrates a schematic electrical diagram of data word splitting/combining using multiple memories and random numbers.

An example of a data word splitting is shown in arrangement 465 shown in FIG. 46, which may be based on FIG. 22 above. Three memories 171a, 171b, and 171c are used, respectively connecting via the data buses 202a, 202b and 202c. The memories 171 are connected to the data bus 202 of the data scrambler 201 via the splitter/combiner 461, implementing a specific data word splitting scheme. The splitter/combiner 461 connects $D_7$ of bus 202 to line $D_1$ of memory 171a, line $D_6$ of bus 202 to line $D_7$ of memory 171c, line $D_5$ of bus 202 to line $D_1$ of memory 171b, line $D_4$ of bus 202 to line $D_6$ of memory 171a, line $D_3$ of bus 202 to line $D_4$ of memory 171b, line $D_2$ of bus 202 to line $D_0$ of memory 171c, line $D_1$ of bus 202 to line $D_7$ of memory 171b, and line $D_0$ of bus 202 to line $D_5$ of memory 171c. Random data may be used in storage locations not actually used for storing the actual data, in order to further the security of the data stored in the memories 171. Such an example of arrangement 465 is shown in FIG. 46a, where the random number generator 219 (which may be part of, or integrated with, the splitter/combiner 461) outputs are connected to data lines D7 and D2 of memory 171a, and to D5 and D2 of memory 171b. Similarly, all or part of the lines not connected to carry real data may be connected to the random number generator 219.

All publications, standards, patents, and patent applications cited in this specification are herein incorporated by reference as if each individual publication, patent, or patent application were specifically and individually indicated to be incorporated by reference and set forth in its entirety herein.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "comprise" and variations of that word such as "comprises" and "comprising", means "including, but not limited to . . . ", and is not intended to exclude other additives, components, integers or steps. Throughout the description and claims of this specification, the word "couple' and variations of that word such as "coupling", "coupled" and "couplable" refers to an electrical connection (such as a copper wire or soldered connection), a logical connection (such as through logical devices of a semiconductor device), a virtual connection (such as through randomly assigned memory locations of a memory device) or any other suitable direct or indirect connections, for example for allowing for the transfer of power, signal or data. The terms "plurality" and "a plurality" as used herein includes, for example, "multiple" or "two or more". For example, "a plurality of items" includes two or more items.

The arrangements and methods described herein may be implemented using hardware, software or a combination of both. The term "software integration" or any other reference to the integration of two programs or processes herein refers to software components (e.g. programs, modules, functions, processes etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g. by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration or a combination.

The term "message" is used generically herein to describe at least an ordered series of characters or bits intended to convey a package of information (or a portion thereof), which may be transferred from one point to another, such as by using communication via one or more communication mechanisms or by transferring among processes. The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

As used herein, the term "Integrated Circuit" (IC) shall include any type of integrated device of any function where the electronic circuit is manufactured by the patterned diffusion of trace elements into the surface of a thin substrate of semiconductor material (e.g., silicon), whether single or multiple die, or small or large scale of integration, and irrespective of process or base materials (including, without limitation Si, SiGe, CMOS and GAs) including without limitation applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs. The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a multi-chip module (MCM) may be used, where multiple integrated circuits (ICs), semiconductor dies or other discrete components are packaged onto a unifying substrate, facilitating their use as a single component (as though a larger IC).

The term "computer" is used generically herein to describe any number of computers, including, but not limited to personal computers, embedded processing elements and systems, control logic, ASICs, chips, workstations, mainframes, etc. Any computer herein may consist of, or be part of, a handheld computer, including any portable computer which is small enough to be held and operated while holding in one hand or fit into a pocket. Such a device, also referred to as a mobile device, typically has a display screen with touch input and/or miniature keyboard. Non-limiting examples of such devices include Digital Still Camera (DSC), Digital video Camera (DVC or digital camcorder), Personal Digital Assistant (PDA), and mobile phones and smartphones. The mobile devices may combine video, audio and advanced communication capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network which includes other mobiles and fixed-line phones across the world. The smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the smartphones may support a wide variety of other services such as text messaging, MMS, email, Internet access, short-range wireless communications (infrared, Bluetooth), business applications, gaming and photography.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

As used herein, the terms "program", "programmable", and "computer program" are meant to include any sequence or human or machine cognizable steps which perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the like, as well as in firmware or other implementations. Generally, program modules include routines, programs, objects, components, data structures, etc., that performs particular tasks or implement particular abstract data types.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

As used herein, the terms "network", "communication link" and "communications mechanism" are used generically herein to describe one or more networks, communications media or communications systems, including, but not limited to, the Internet, private or public telephone, cellular, wireless, satellite, cable, data networks. Data networks include, but not limited to, Metropolitan Area Networks (MANs), Wide Area Networks (WANs), Local Area Networks (LANs), Personal Area networks (PANs), WLANs (Wireless LANs), Internet, internets, NGN, intranets, Hybrid Fiber Coax (HFC) networks, satellite networks, and telco networks. Communication media include, but not limited to, a cable, an electrical connection, a bus, and internal communications mechanisms such as message passing, interprocess communications, and shared memory. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 8023, ATM, X25, Frame Relay, 3GPP, 3GPP2, WAP, SIP, UDP, FTP, RTP/RTCP, H.323, etc.). While exampled herein with regard to secured communication between a pair of network endpoint devices (host-to-host), the described method can equally be used to protect the data flow between a pair of gateways or any other networking-associated devices (network-to-network), or between a network device (e.g., security gateway) and a host (network-to-host).

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Further, a wireless communication may be based on wireless technologies that are described in Chapter 20: "Wireless Technologies" of the publication number 1-587005-001-3 by Cisco Systems, Inc. (July 1999) titled: "Internetworking Technologies Handbook", which is incorporated in its entirety for all purposes as if fully set forth herein.

To allow communications between the general purpose computing devices, a computing or networking device preferably includes a network interface or an adapter, such as communication interface 141. While the preferred embodiment contemplates that communications will be exchanged primarily via Ethernet, Internet or a broadband network, other means of exchanging communications are also contemplated. For example, a wireless access interface that receives and processes information exchanged via a wireless communications medium, such as, cellular communication technology, satellite communication technology, Bluetooth technology, WAP (Wireless Access Point) technology, or similar means of wireless communication can be utilized by the general purpose computing devices. Such an interface commonly includes a connector for wired or conductive medium, an antenna for over-the-air radio-frequency based communication and fiber-optic connector for fiber-optic cable based medium. A transceiver (transmitter/receiver set) is coupled to the connector or antenna, for transmitting to, and receiving from, the communication medium. A transmitter may be capable of operating at serial bit rates above 1 Gigabit/second, and a wired transmitter commonly use differential signaling and low voltages for faster switching, such as MOS Current Mode Logic (MCML) based technology. The transmitter may use pre-emphasis or de-emphasis to shape the transmitted signal to compensate for expected losses and distortion. The line-code may employ self-clocking and other encoding schemes, and control information is transmitted along with the data for error detection, alignment, clock correction, and channel bonding. Some popular encoding schemes are 8B/10B, 64B/66B, and 64B/67B. A receiver is commonly designed to mate with the corresponding transmitter and to recover the data and clock from the received signals, and commonly use equalization, and may further include impedance matching termination. PLLs (Phase Locked Loops) are commonly used for clock reconstruction and for achieving a serial clock that is an exact multiple of the parallel data. The receiver commonly decodes the received signal, and detects encoding-based errors. The byte boundaries and other alignment schemes may also be performed by the receivers. A transceiver may include a modem (MOdulator-DEModulator).

Any networking protocol may be utilized for exchanging information between the partners (e.g., the source computer, the ultimate destination computer and the relay servers) within the network (such as the Internet). For example, it is contemplated that communications can be performed using TCP/IP. Generally, HTTP and HTTPS are utilized on top of TCP/IP as the message transport envelope. These two protocols are able to deal with firewall technology better than other message management techniques. However, partners may choose to use a message-queuing system instead of HTTP and HTTPS if greater communications reliability is needed. A non-limiting example of a message queuing system is IBM's MQ-Series or the Microsoft Message Queue (MSMQ). The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure. The claims are intended to cover such modifications and equivalents.

The invention claimed is:

1. A method for use with a processor in a first enclosure and a location-addressable memory in a second enclosure having an address space, the memory is connectable to the processor via a bus of a first type, the method comprising:
receiving, from the processor by a first interface via a first connector that is coupled to a first bus, a first address word in the address space, the first address word consists of a sequence of bits where each of the bits is associated with a level of significance;
converting using a one-to-one mapping, by a scrambler coupled between the first interface and a second interface, the first address word to a second address word in the address space that is distinct from the first address word, wherein the second address word consists of a sequence of bits where each of the bits is associated with a level of significance;
transmitting, to the memory by the second interface via a second connector that is coupled to a second bus, the second address word; and
powering the scrambler only by a power signal carried over the first bus,
wherein the first and second connectors, the first and second interfaces, and the scrambler are housed in a single enclosure that is separate from, and external to, each of the first and second enclosures, and
wherein the first interface or the second interface comprises a transmitter that uses a differential signaling, an emphasis shaping, and a self-clocking line-code, and a receiver coupled to the respective connector for respectively transmitting to, and receiving from, the respective bus.

2. The method according to claim 1, wherein the converting comprises, is based on, or uses, re-arranging the sequence of at least two bits in the first address word.

3. The method according to claim 1, wherein the converting comprises, is based on, or uses, changing the significance level of at least two bits in the first address word.

4. The method according to claim 1, wherein the scrambler comprises, or is based on, electrical connections only.

5. The method according to claim 1, wherein the scrambler comprises, uses, or is based on, logic gates that implement a Boolean function.

6. The method according to claim 5, wherein the scrambler comprises, uses, or is based on, Programmable Logic Device (PLD), a memory, or a processor.

7. The method according to claim 1, wherein the mapping is programmable.

8. The method according to claim 7, wherein the mapping is programmable by the processor.

9. The method according to claim 8, wherein the scrambler is addressable by the processor via the first bus.

10. The method according to claim 1, wherein the second bus type is of the same type of the first bus, or wherein the first and second buses are according to a standard.

11. The method according to claim 1, wherein the second bus type is distinct from the first bus type, or wherein the first and second buses are according to different standards.

12. The method according to claim 1, wherein the memory is based on electrostatic, ferroelectric, magnetic, acoustic, optical, chemical, electronic, electric, or mechanical storage medium.

13. The method according to claim 12, wherein the memory is file-addressable or content-addressable.

14. The method according to claim 12, for use in a Network-attached Storage (NAS) or a Storage Area Network (SAN).

15. The method according to claim 12, wherein the memory is a once-written memory.

16. The method according to claim 12, wherein the memory is connectable to the processor to be read from, or written to, via the second bus.

17. The method according to claim 16, wherein the second bus is a parallel bus.

18. The method according to claim 16, wherein the second bus is a bit-serial bus.

19. The method according to claim 1, further for use with a power supply having a power port couplable to be powered from a power signal, and the method further comprising powering at least part of the memory by one or more Direct Current (DC) outputs of the power supply.

20. The method according to claim 1, wherein the memory is a sequential accessed memory, or wherein the memory is location-based, randomly-accessed, and can be written multiple times.

21. The method according to claim 1, wherein the memory is based on semiconductor storage medium.

22. The method according to claim 21, wherein the memory is a volatile memory that comprises RAM, SRAM, DRAM, TTRAM, or Z-RAM.

23. The method according to claim 21, wherein the memory is a non-volatile memory.

24. The method according to claim 23, wherein the memory is one out of: ROM, PROM, EPROM and EEROM, or is based on Flash technology.

25. The method according to claim 23, wherein the memory is a SSD drive or USB 'Thumb' drive.

26. The method according to claim 1, wherein the memory is based on non-volatile magnetic storage medium.

27. The method according to claim 26, wherein the memory comprises a Hard Disk Drive (HDD).

28. The method according to claim 1, wherein the memory is based on an optical storage medium.

29. The method according to claim 28, wherein the storage medium is recordable and removable, and wherein the memory includes an optical disk drive.

30. The method according to claim 29, wherein the storage medium comprises CD-RW, DVD-RW, DVD+RW, DVD-RAM, or BD-RE.

31. The method according to claim 1, wherein the memory form factor is an Integrated Circuit (IC), a Printed Circuit Board (PCB) on which one or more ICs are mounted, or a box-shaped enclosure.

32. The method according to claim 1, wherein the first bus or the second bus comprises a Personal Area Network (PAN) or a Wide Area Network (WAN) communication link.

33. The method according to claim 1, wherein the first bus or the second bus comprises a Local Area Network (LAN) communication link.

34. The method according to claim 33, wherein the LAN is based on Ethernet and is substantially compliant to IEEE 802.3 standard.

35. The method according to claim 34, wherein the LAN is based on one out of: 100BaseT/TX, 1000BaseT/TX, 10 gigabit Ethernet substantially according to IEEE Std 802.3ae-2002as standard, 40 Gigabit Ethernet, and 100 Gigabit Ethernet substantially according to IEEE P802.3ba standard.

36. The method according to claim 1, further for use with an encryptor/decryptor that uses an encryption scheme coupled between the first and second interfaces, the method further comprising encrypting and decrypting digital data between the first and second buses.

37. The method according to claim 36, wherein the encryption scheme is based on Advanced Encryption Standard (AES) 128, 192, or 256 bits.

38. The method according to claim 1, wherein the first bus or the second bus is based on a multi-drop or a daisy-chain topology.

39. The method according to claim 38, wherein the first bus or the second bus employs master/slave scheme or is based on half-duplex or full-duplex communication.

40. The method according to claim 1, wherein the first bus or the second bus is a wired-based, point-to-point, and bit-serial bus, and wherein a timing, clocking, or strobing signal is carried over dedicated wires.

41. The method according to claim 1, wherein the first bus or the second bus is a wired-based, point-to-point, and bit-serial bus, and wherein a timing, clocking or strobing signal is carried using a self-clocking scheme.

42. The method according to claim 1, wherein the first bus medium or the second bus medium is based on a fiber-optics cable connected thereto using a fiber-optics connector.

43. The method according to claim 1, wherein the power signal is Direct Current (DC) type and is carried over dedicated wires.

44. The method according to claim 1, wherein the power signal is Direct Current (DC) type and is carried over the same wires carrying digital data, and further for use with a power/data splitter arrangement having first, second and third ports, wherein only digital data signal is passed between the first and second ports, and only power signal is passed between the first and third ports, and wherein the first port is coupled to the bus connector.

45. The method according to claim 44, wherein the power and digital data signals are carried using Frequency Division Multiplexing (FDM), where the digital data signal is carried over a frequency band above and distinct from the power signal.

46. The method according to claim 45, wherein the power/data splitter comprising a High Pass Filter (HPF) between the first and second ports and a Low Pass Filter (LPF) between the first and third ports.

47. The method according to claim 44, wherein the power/data splitter comprising a transformer and a capacitor connected to the transformer windings, or wherein the power and digital data signals are carried using phantom scheme.

48. The method according to claim 44, wherein the power/data splitter comprising at least two transformers having a center-tap connection.

49. The method according to claim 44, wherein the power and digital data signals are carried substantially according to IEEE 802.3af-2003 or IEEE 802.3at-2009 standards.

50. The method according to claim 1, wherein the transmitter further employs error detection, alignment, clock-correction or channel-bonding.

51. The method according to claim 1, wherein the receiver uses equalization, impedance matching termination, and Phase Locked Loop (PLL).

* * * * *